United States Patent
Yamada et al.

(10) Patent No.: US 11,936,044 B2
(45) Date of Patent: Mar. 19, 2024

(54) CARBON MATERIAL, METHOD FOR PRODUCING CARBON MATERIAL, AND NON-AQUEOUS SECONDARY BATTERY USING CARBON MATERIAL

(71) Applicant: MITSUBISHI CHEMICAL CORPORATION, Chiyoda-ku (JP)

(72) Inventors: Shunsuke Yamada, Inashiki-gun (JP); Nobuyuki Ishiwatari, Inashiki-gun (JP); Satoshi Akasaka, Inashiki-gun (JP); Daigo Nagayama, Inashiki-gun (JP); Shingo Morokuma, Inashiki-gun (JP); Koichi Nishio, Inashiki-gun (JP); Iwao Soga, Inashiki-gun (JP); Hideaki Tanaka, Inashiki-gun (JP); Takashi Kameda, Sakaide (JP); Tooru Fuse, Sakaide (JP); Hiromitsu Ikeda, Sakaide (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 596 days.

(21) Appl. No.: 15/399,423

(22) Filed: Jan. 5, 2017

(65) Prior Publication Data

US 2017/0187041 A1 Jun. 29, 2017

Related U.S. Application Data

(63) Continuation of application No. PCT/JP2015/069574, filed on Jul. 7, 2015.

(30) Foreign Application Priority Data

Jul. 7, 2014 (JP) .................................. 2014-139782
Nov. 19, 2014 (JP) .................................. 2014-234606

(Continued)

(51) Int. Cl.
*H01M 4/583* (2010.01)
*C01B 32/21* (2017.01)
(Continued)

(52) U.S. Cl.
CPC ............. *H01M 4/587* (2013.01); *C01B 32/21* (2017.08); *H01M 4/583* (2013.01); *H01M 4/625* (2013.01);
(Continued)

(58) Field of Classification Search
None
See application file for complete search history.

(56) References Cited

U.S. PATENT DOCUMENTS 6,632,569 B1   10/2003  Kameda et al.
9,142,832 B2   9/2015   Suzuki et al.
(Continued)

FOREIGN PATENT DOCUMENTS

CN      101053098 A    10/2007
CN      2008/084675 A1  7/2008
(Continued)

OTHER PUBLICATIONS

Extended European Search Report dated May 19, 2017 in Patent Application No. 15818246.9.
(Continued)

*Primary Examiner* — Haixia Zhang
(74) *Attorney, Agent, or Firm* — Oblon, McClelland, Maier & Neustadt, L.L.P.

(57) ABSTRACT

A carbon material for a non-aqueous secondary battery containing a graphite capable of occluding and releasing lithium ions, and having a cumulative pore volume at pore diameters in a range of 0.01 μm to 1 μm of 0.08 mL/g or more, a roundness, as determined by flow-type particle image analysis, of 0.88 or greater, and a pore diameter to
(Continued)

particle diameter ratio (PD/d50 (%)) of 1.8 or less, the ratio being given by equation (1A): PD/d50 (%)=mode pore diameter (PD) in a pore diameter range of 0.01 μm to 1 μm in a pore distribution determined by mercury intrusion/volume-based average particle diameter (d50)×100 is provided.

19 Claims, 8 Drawing Sheets

(30) Foreign Application Priority Data

| Date | | Application No. |
|---|---|---|
| Dec. 8, 2014 | (JP) | 2014-248251 |
| Mar. 26, 2015 | (JP) | 2015-064897 |
| Mar. 27, 2015 | (JP) | 2015-067180 |
| Mar. 27, 2015 | (JP) | 2015-067184 |
| Mar. 27, 2015 | (JP) | 2015-067194 |
| Mar. 27, 2015 | (JP) | 2015-067201 |
| Jun. 17, 2015 | (JP) | 2015-122197 |
| Jun. 17, 2015 | (JP) | 2015-122198 |

(51) Int. Cl.
    H01M 4/587    (2010.01)
    H01M 4/62     (2006.01)
    H01M 10/0525  (2010.01)
    H01M 4/02     (2006.01)

(52) U.S. Cl.
    CPC ..... *H01M 10/0525* (2013.01); *C01P 2004/32* (2013.01); *C01P 2006/14* (2013.01); *C01P 2006/16* (2013.01); *H01M 2004/021* (2013.01)

(56) References Cited

U.S. PATENT DOCUMENTS

| | | |
|---|---|---|
| 2005/0014067 A1 | 1/2005 | Tenno et al. |
| 2007/0092428 A1 | 4/2007 | Sotowa et al. |
| 2008/0199777 A1 | 8/2008 | Onishi et al. |
| 2010/0086856 A1 | 4/2010 | Matsumoto et al. |
| 2010/0176767 A1* | 7/2010 | Long ............... H01M 4/133 320/137 |
| 2011/0059371 A1 | 3/2011 | Kamada et al. |
| 2011/0171532 A1 | 7/2011 | Okanishi et al. |
| 2011/0262802 A1 | 10/2011 | Uono et al. |
| 2013/0059207 A1 | 3/2013 | Takahata et al. |
| 2013/0071730 A1* | 3/2013 | Tokuda ............... H01M 4/587 429/199 |
| 2013/0252093 A1 | 9/2013 | Yokomizo et al. |
| 2013/0330620 A1 | 12/2013 | Nishimura et al. |
| 2014/0024761 A1 | 1/2014 | Kasahara et al. |
| 2014/0065479 A1 | 3/2014 | Yamada et al. |
| 2014/0335428 A1 | 11/2014 | Wakizaka et al. |
| 2015/0243989 A1 | 8/2015 | Yamada et al. |

FOREIGN PATENT DOCUMENTS

| | | |
|---|---|---|
| CN | 101863464 A | 10/2010 |
| CN | 101939865 A | 1/2011 |
| CN | 102067363 A | 5/2011 |
| CN | 103190019 A | 7/2013 |
| CN | 103328377 A | 9/2013 |
| CN | 103460459 A | 12/2013 |
| CN | 103476846 A | 12/2013 |
| CN | 103477476 A | 12/2013 |
| CN | 103518279 A | 1/2014 |
| EP | 1 775 785 A1 | 4/2007 |
| JP | 9-213328 A | 8/1997 |
| JP | 2000-340232 A | 12/2000 |
| JP | 2003-297352 A | 10/2003 |
| JP | 2005-010328 A | 1/2005 |
| JP | 2005-50807 A | 2/2005 |
| JP | 2005-60150 A | 3/2005 |
| JP | 2007-169154 A | 7/2007 |
| JP | 2007-180025 A | 7/2007 |
| JP | 2008-305661 A | 12/2008 |
| JP | 2008-305722 A | 12/2008 |
| JP | 2010-002314 A | 1/2010 |
| JP | 2010-135314 A | 6/2010 |
| JP | 2010-251126 A | 11/2010 |
| JP | 2011-86617 A | 4/2011 |
| JP | 2012-004131 A | 1/2012 |
| JP | 2012-74297 A | 4/2012 |
| JP | 2012-84520 A | 4/2012 |
| JP | 2012-216820 | 11/2012 |
| JP | 2013-8526 A | 1/2013 |
| JP | 2013-155110 A | 8/2013 |
| JP | 2013-197082 A | 9/2013 |
| JP | 2013-201125 A | 10/2013 |
| JP | 2013-216563 A | 10/2013 |
| JP | 2013-258130 A | 12/2013 |
| JP | 2014-60148 A | 4/2014 |
| JP | 2014-67680 A | 4/2014 |
| JP | 2014-114197 A | 6/2014 |
| JP | 2014-152041 A | 8/2014 |
| JP | 2014-067643 A | 4/2017 |
| KR | 10-2004-0012541 A | 2/2004 |
| KR | 10-2008-0022132 A | 3/2008 |
| KR | 10-2013-0086385 | 8/2013 |
| KR | 10-2014-0010406 A | 1/2014 |
| WO | WO 2011/145178 A1 | 11/2011 |
| WO | WO 2012/020816 A1 | 2/2012 |
| WO | 2013/058349 A1 | 4/2013 |
| WO | WO 2013/171985 A1 | 11/2013 |
| WO | WO 2014/030720 A1 | 2/2014 |
| WO | WO 2014/141372 A1 | 9/2014 |

OTHER PUBLICATIONS

International Search Report dated Oct. 13, 2015 in PCT/JP2015/069574.
International Preliminary Report on Patentability and Written Opinion dated Jan. 19, 2017 in PCT/JP2015/069574.
International Search Report dated Dec. 28, 2015 in PCT/JP2015/077205.
Combined Office Action and Search Report dated Nov. 5, 2018 in Chinese Patent Application No. 201580037146.6, 16 pages (with unedited computer generated English translation).
Japanese Office Action dated Sep. 17, 2019, in Patent Application No. 2016-058403, 6 pages (with unedited computer generated English translation).
Notification of Reason for Refusal dated Dec. 21, 2021, in Korean Patent Application No. 10-2017-7003403 filed Jul. 7, 2015 (with machine generated English translation).
European Search Report dated Sep. 24, 2020, in European Patent Application No. 20173381.3 filed Jul. 7, 2015.
European Search Report dated Sep. 4, 2020, in European Patent Application No. 20173381.3 filed Jul. 7, 2015.
Office Action dated May 18, 2022, in Chinese Patent Application No. 201910747995.0 filed Jul. 7, 2015 (with machine generated English translation).
Office Action dated Jun. 20, 2022, in Chinese Patent Application No. 20191070993.X filed Jul. 7, 2015 (with machine generated English translation).
Office Action dated Mar. 21, 2022, in Korean Patent Application No. 10-2022-7005390 (with machine English translation).
Office Action dated Jan. 24, 2022, in Chinese Patent Application No. 20190170993.X filed Jul. 7, 2015 (with machine English translation).
Decision of Refusal dated Aug. 27, 2022, in Korean Patent Application No. 10-2022-7005390 filed Jul. 7, 2015 (with machine generated English translation).
Korean Office Action dated Jan. 4, 2023 in Korean Patent Application No. 10-2022-7018527 (with unedited computer-generated English Translation), 14 pages.
Korean Office Action dated Jan. 4, 2023 in Korean Patent Application No. 10-2022-7018528 (with unedited computer-generated English Translation), 15 pages.

(56) References Cited

OTHER PUBLICATIONS

Korean Office Action dated Jan. 4, 2023 in Korean Patent Application No. 10-2022-7018529 (with unedited computer-generated English Translation), 15 pages.
Korean Office Action dated Jan. 4, 2023 in Korean Patent Application No. 10-2022-7018530 (with unedited computer-generated English Translation), 17 pages.
Yang Yu-Fen et al., The Chinese Journal of Process Engineering, vol. 4 Suppl., pp. 309-313, 2004 (with English Translation).
Foreign Office Action dated Jun. 6, 2023, in Chinese Patent Application No. 202211210603.5 (with English Translation).
Office Action dated Jun. 30, 2023, in Chinese Patent Application No. 202211231931.3 (with English Translation).
Shi Ying et al., Power Technology, vol. 30, No. 06, pp. 458-460, 2006.
Foreign Office Action dated Jul. 25, 2023, in Chinese Patent Application No. 202211210611.X, with English Machine Translation.
Foreign Office Action dated Aug. 22, 2023, Chinese Patent application No. 202211210686.8, with English Machine Translation.
Office Action dated Nov. 30, 2023, inChinese Patent Application No. 20221121067.0 (with English machine translation), 11 pgs.

\* cited by examiner 10 um 10 um

CARBON MATERIAL, METHOD FOR PRODUCING CARBON MATERIAL, AND NON-AQUEOUS SECONDARY BATTERY USING CARBON MATERIAL

CROSS-REFERENCE TO RELATED APPLICATION

This is a continuation of International Application PCT/JP2015/069574, filed on Jul. 7, 2015, and designated the U.S., (and claims priority from Japanese Patent Application 2014-139782 which was filed on Jul. 7, 2014, Japanese Patent Application 2014-234606 which was filed on Nov. 19, 2014, Japanese Patent Application 2014-248251 which was filed on Dec. 8, 2014, Japanese Patent Application 2015-064897 which was filed on Mar. 26, 2015, Japanese Patent Application 2015-067180 which was filed on Mar. 27, 2015, Japanese Patent Application 2015-067184 which was filed on Mar. 27, 2015, Japanese Patent Application 2015-067194 which was filed on Mar. 27, 2015, Japanese Patent Application 2015-067201 which was filed on Mar. 27, 2015, Japanese Patent Application 2015-122197 which was filed on Jun. 17, 2015 and Japanese Patent Application 2015-122198 which was filed on Jun. 17, 2015,) the entire contents of which are incorporated herein by reference.

TECHNICAL FIELD

The present invention relates to a carbon material, a method for producing a carbon material, and a non-aqueous secondary battery including a carbon material.

BACKGROUND ART

In recent years there has been an increasing demand for higher-performance non-aqueous secondary batteries having high energy densities and excellent high-current charge-discharge characteristics, and there has been a need to achieve further increases in capacity, input and output, and service life.

It is known that in non-aqueous secondary batteries, carbon-based materials, such as graphite, are used as carbon materials that serve as negative electrode materials (negative electrode active materials). Graphite, which has a high degree of graphitization, can provide a capacity near 372 mAh/g, which is a theoretical capacity of lithium occlusion, and is low cost and durable, and thus is suitable as a carbon material for non-aqueous secondary batteries, particularly, lithium ion secondary batteries.

Patent Document 1 has disclosed a technique for improving filling properties and fast charge-discharge characteristics by treating a flake natural graphite with mechanical energy to prepare a spheroidized natural graphite and coating the surface of the spheroidized natural graphite, a core graphite, with amorphous carbon.

Patent Document 2 has disclosed a technique for reducing the expansion during charging and discharging by spheroidizing a spheroidal graphite to inhibit the crystal orientation of graphite particles. Patent Document 3 has disclosed a technique for improving fast charge-discharge characteristics and cycle characteristics by isotropically pressurizing a spheroidized graphite obtained by spheroidizing a flake graphite to produce a highly isotropic graphite having a high density with no intra-particle voids.

Patent Document 4 has disclosed a method for producing a powdered carbon material by mixing a flake natural graphite, a meltable organic substance, and a pitch having a softening point of 70° C. under heating, applying a mechanical impact with a hybridizer, adding carbon black, applying another mechanical impact to prepare a spheroidized powder, and burning the powder. Patent Document 5 has disclosed a method for producing a spheroidized graphite particle having a smooth surface by adding a resin binder to raw carbon material (raw graphite) particles and spheroidizing the mixture. Patent Document 6 has disclosed a method of rapidly stirring coal-derived calcined coke and paraffin wax under heating to produce spheroidal particles.

Patent Document 7 has disclosed a carbon material produced by burning a spheroidized natural graphite in an air atmosphere at 650° C. using a muffle furnace and removing fine powder on the particle surface.

Patent Document 8 has disclosed a carbon material having an increased amount of micropore produced by irradiating a spheroidized natural graphite with ultrasonic waves in a circulating ultrasonic homogenizer.

Patent Document 2 has disclosed a carbon material having a frequency of particles with a diameter of 5 µm or less, as measured after ultrasonic waves have been applied for 10 minutes, of 40% to 85%.

Patent Document 9 has disclosed a technique for improving filling properties and input-output characteristics by treating a flake natural graphite with mechanical energy to prepare a spheroidized natural graphite and coating the surface of the spheroidized natural graphite, a core graphite, with amorphous carbon.

Patent Document 10 has disclosed a technique for improving input-output characteristics at low temperatures by loading carbon black particles and amorphous carbon onto the surface of a spheroidized graphite obtained by spheroidizing a flake graphite to form a fine structure on the particle surface.

Patent Document 11 has disclosed a multi-layered carbon material comprising a carbide of an organic substance deposited on the surface of a graphitic carbonaceous material; by controlling the residual amount of the carbide of an organic substance to be 12 parts by mass to 0.1 part by mass based on 100 parts by mass of the graphitic carbonaceous material, a non-aqueous solvent secondary battery can be produced having a high discharge capacity, a low charge-discharge irreversible capacity in an initial cycle, and a high level of safety against electrolyte solution.

Patent Document 12 has disclosed a composite carbon material made of high-crystallinity carbonaceous particles and a low-crystallinity carbon material on the particle surface; by controlling a tap density to be 0.43 to 0.69 g/cm$^3$ and the percentage of carbon materials having a microscopic Raman R value of 0.2 or larger to be at least 20%, a non-aqueous solvent secondary battery having excellent low-temperature characteristics can be produced.

Patent Document 10 has disclosed composite particles of graphite particles and carbon fine particles having a primary particle diameter of 3 nm to 500 nm; by controlling an $R_{(90/10)}$ value, a ratio of a microscopic Raman R value at 90% from the smallest value to an R value at 10%, to be 1 to 4.3, a non-aqueous solvent secondary battery having excellent input-output characteristics at low temperatures can be produced.

Patent Document 14 has disclosed a technique for controlling a pore volume by selecting conditions of curing and carbonizing a phenolic resin or other resins. Patent Document 15 has disclosed a technique for controlling a tap density, a specific surface area, and a pore volume by coating agglomerated particles obtained by isotropically pressurizing flake graphite particles and spheroidized graphite particles each with low-crystallinity carbon and blending the coated particles.

Patent Document 16 has disclosed a technique for controlling the excess reactivity with an electrolyte solution and improving fast charge-discharge characteristics by heat-treating a spheroidized natural graphite in a nitrogen atmosphere at 500° C. to 1,250° C.

PRIOR ART DOCUMENTS

Patent Documents

Patent Document 1: JP 2000-340232 A
Patent Document 2: JP 2011-086617 A
Patent Document 3: JP 2005-50807 A
Patent Document 4: JP 2008-305722 A
Patent Document 5: JP 2014-114197 A
Patent Document 6: WO 2014/141372
Patent Document 7: JP 2010-251126 A
Patent Document 8: JP 2012-84520 A
Patent Document 9: JP 2012-074297 A
Patent Document 10: JP 2014-060148 A
Patent Document 11: JP 09-213328 A
Patent Document 12: WO 11/145178
Patent Document 13: JP 2003-297352 A
Patent Document 14: JP 2003-297352 A
Patent Document 15: JP 2013-8526 A
Patent Document 16: JP 2010-135314 A

SUMMARY OF THE INVENTION

Problems to be Solved by the Invention

However, the investigation by the present inventors has shown that although the spheroidized natural graphites disclosed in Patent Document 1 and Patent Document 2 provide a high capacity and good fast charge-discharge characteristics as compared with the flake graphite used as a raw material, these characteristics are still insufficient. This is because the spheroidized natural graphites have coarse intra-particle voids and structures lacking fineness, and thus electrolyte solution cannot be smoothly and efficiently distributed into the intra-particle voids, and Li-ion insertion/extraction sites in the particles cannot be effectively used.

The isotropically pressurized spheroidized natural graphite disclosed in Patent Document 3, although providing a certain improvement in fast charge-discharge characteristics, which is due to the smooth movement of electrolyte solution between electrodes resulting from filling properties improved by the increased density of the particles, provides insufficient low-temperature output characteristics. This is because electrolyte solution cannot penetrate into the particles as a result of the elimination of intra-particle voids, and Li-ion insertion/extraction sites in the particles cannot be efficiently used.

The spheroidized natural graphite disclosed in Patent Document 1, although providing a high capacity and good fast charge-discharge characteristics as compared with the flake graphite used as a raw material, unfortunately provides low battery characteristics and productivity because the particles poorly adhere to each other to cause residual flake graphite and generate fine powder during the spheroidization.

The powdered carbon material disclosed in Patent Document 4 provides an insufficient improvement in battery characteristics because the meltable organic substance and the pitch contained during the spheroidization of the graphite contain softened solids, and thus the raw carbon materials poorly adhere to each other, and residual flake graphite and the generation of fine powder during the spheroidization cannot be reduced.

The method for producing a spheroidized graphite disclosed in Patent Document 5 also provides an insufficient improvement in battery characteristics because the addition of a resin binder hardly improves the adhesion between the graphite particles, and the generation of fine powder cannot be reduced. Although a method of spheroidization including the addition of a solution of the resin binder in toluene has also been disclosed, the method requires further improvement because the temperature during the spheroidization may exceed the low flash point of the solvent, which involves the risk of explosion or fire during the production.

Patent Document 6 has not disclosed a method of granulating a graphite into spheroidal particles, and, in addition, the method disclosed provides an insufficient reduction in generation of fine powder during the spheroidization and an insufficient improvement in battery characteristics because paraffin wax is solid.

The carbon materials disclosed in Patent Documents 7 and 8 still contain fine powder generated through the fracture of a raw flake graphite during the spheroidization, and the fine powder has a low binding capacity to parent particles. Thus, when a negative electrode is produced using these carbon materials, a great amount of fine powder may occur, for example, upon physical impact, and non-aqueous secondary batteries including these carbon materials may fail to provide a sufficient input and output in initial and subsequent cycles.

Specifically, for the carbon material described in Patent Document 7, only the fine powder on the surface of a spheroidized natural graphite contactable with the air is removed, and fine powder that generates upon physical impact is difficult to remove. The treatment performed on the carbon material described in Patent Document 8 can remove only the fine powder that increases the amount of micropore and can hardly remove fine powder that generates upon physical impact.

The carbon material described in Patent Document 2, which has a frequency of particles with a diameter of 5 μm or less, as measured after ultrasonic waves have been applied for 10 minutes, of 40% to 85%, can be considered to be a carbon material that generates a great amount of fine powder upon physical impact.

The investigation by the present inventors has shown that the spheroidized natural graphites disclosed in Patent Document 1 and Patent Document 9 have a structure lacking particle fineness, a poor balance between a specific surface area and a tap density (also referred to as tapping density), a small number of Li-ion insertion/extraction sites on particles, and insufficient filling properties of negative electrode, and thus there is room for improvement in input-output characteristics and increase in capacity of batteries.

The spheroidized natural graphite with carbon black deposited thereon disclosed in Patent Document 10, although providing a certain improvement in input-output characteristics, which is due to the smooth movement of electrolyte solution resulting from the fine structure formed on the particle surface, still has a poor balance between a specific surface area and a tap density; there is room for improvement in input-output characteristics and increase in capacity of batteries.

The above-described improvement in input-output characteristics can be achieved, for example, by increasing the specific surface area of the carbon material to improve the reactivity with an electrolyte solution. The increase in density of an active material layer for the increase in capacity can be achieved, for example, by increasing the tap density of the carbon material. The investigation by the present inventors has revealed that in the case of graphite particles having substantially the same true density and average particle diameter, the tap density increases as the shape comes closer to spheroidal and the particle surface becomes flat. In other words, to increase the tap density, it is important that the particle shape be rounded and closer to spheroidal, and the particle surface be made free from frays and chips and kept flat. A particle shape closer to spheroidal and a flat particle surface significantly improves powder filling properties. However, there is usually a trade-off between the specific surface area and the tap density, and, unfortunately, increasing the specific surface area decreases the tap density.

The investigation by the present inventors has shown that the spheroidized natural graphites disclosed in Patent Document 1 and Patent Document 9 have a structure lacking particle fineness, and coating the particle surface with amorphous carbon results in a reduced specific surface area and a small number of Li-ion insertion/extraction sites on particles; there is room for improvement in input-output characteristics of batteries.

It is generally known that graphite particles having a large specific surface area have a large number of Li-ion insertion/extraction sites and thus provide a battery with improved input-output characteristics.

Meanwhile, a carbonaceous material coating on graphite particles has shown to have a structure that has lower crystallinity than graphite and facilitates Li-ion insertion/extraction and thus provide a battery with improved input-output characteristics. That is to say, a large specific surface area and graphite particles with reduced crystallinity can enhance input-output characteristics. However, the carbonaceous material coating on graphite particles for increasing the low-crystallinity region that facilitates Li-ion insertion/extraction covers the fine structure of the particle surface; there is a trade-off between the increase in specific surface area and the increase in low-crystallinity region through the carbonaceous material coating.

The investigation by the present inventors has shown that although the composite graphites disclosed in Patent Documents 1 and 11, which are made of a graphite and an amorphous carbon coating on the graphite surface, can provide a high capacity and good fast charge-discharge characteristics as compared with the flake graphite or the spheroidized graphite particles used as a raw material, these characteristics are still insufficient because the coating uniformity of the amorphous carbon is not taken into account. For the composite carbon material disclosed in Patent Document 12, although exposed portions of high-crystallinity carbonaceous particles having a microscopic Raman R value of 0.2 or less are reduced by controlling the percentage of carbon materials having a microscopic Raman R value of 0.2 or larger to be at least 20, the distribution and variation of microscopic Raman values, particularly, the distribution and variation of microscopic Raman values of particles having a large microscopic Raman R value, that is, the degree of maldistribution of portions coated with low-crystallinity carbon material is not taken into account, and the characteristics are still insufficient. For the composite particles disclosed in Patent Document 10, although particles having extremely large microscopic Raman R values and particles having extremely small values are not contained, the distribution and variation of microscopic Raman R values are not taken into account, similarly to Patent Document 12, and the characteristics are still insufficient.

The investigation by the present inventors has shown that the technique disclosed in Patent Document 14 provides an improvement in charge-discharge efficiency through the use of an amorphous carbon having a controlled volume of pores of 0.33 nm to 0.40 nm but has a drawback in that the amorphous carbon is hard to densify for its small true density and poor pressability.

The investigation by the present inventors has shown that the technique disclosed in Patent Document 15 using an isotropically pressurized spheroidized natural graphite, although providing a certain improvement in fast charge-discharge characteristics, which is due to the smooth movement of electrolyte solution between the particles resulting from filling properties improved by the increased density of the particles, provides insufficient low-temperature output characteristics. This is because electrolyte solution cannot penetrate into the particles as a result of the elimination of intra-particle voids, and Li-ion insertion/extraction sites in the particles cannot be efficiently used.

The investigation by the present inventors has shown that although the spheroidized natural graphite disclosed in Patent Document 16, which is heat treated in a nitrogen atmosphere at 500° C. to 1,250° C., has low-temperature charge characteristics improved by the disorder of surface crystal structure, the characteristics are still insufficient. This is because the number of Li-ion insertion/extraction sites is still insufficient, and the increase of labile carbon layers resulting from the elimination of oxygen functional groups during the heat treatment impedes the smooth movement of Li ions.

The investigation by the present inventors has shown that although the granulated natural graphites disclosed in Patent Document 1 and Patent Document 2 provide a high capacity and good fast charge-discharge characteristics as compared with the flake graphite used as a raw material, these characteristics are still insufficient because the number of Li-ion insertion/extraction sites inside the graphites is small. Furthermore, side reactions with an electrolyte solution frequently occur due to the large amount of oxygen functional group, which disadvantageously results in the increase in irreversible capacity and gas generation.

Although the granulated natural graphite disclosed in Patent Document 16, which is heat treated in a nitrogen atmosphere at 500° C. to 1,250° C., can reduce side reactions with an electrolyte solution due to the reduction in oxygen functional group and has low-temperature charge characteristics improved by the moderately disordered surface crystal structure, the number of Li-ion insertion/extraction sites inside the graphite is insufficient, and the characteristics are insufficient.

The technique in Patent Document 6, in which coal-derived calcined coke is used as a raw material and granulated into spheroidal particles, provides a low discharge capacity, which is insufficient.

The investigation by the present inventors has shown that the spheroidized natural graphite disclosed in Patent Document 1, although providing a high capacity and good fast charge-discharge characteristics as compared with the flake graphite used as a raw material, unfortunately provides low battery characteristics and productivity because the particles poorly adhere to each other to cause residual flake graphite and generate fine powder during the spheroidization.

The powdered negative electrode material disclosed in Patent Document 4 provides an insufficient improvement in battery characteristics because the meltable organic substance and the pitch contained during the spheroidization of the graphite contain softened solids, and thus the raw carbon materials poorly adhere to each other, and residual flake graphite and the generation of fine powder during the spheroidization cannot be reduced. Furthermore, since the affinity with the pitch is not taken into account, the meltable organic substance contained during the spheroidization of the graphite cannot uniformly cover the carbonaceous material and provides an insufficient improvement in battery characteristics also when used as a raw material of composite particles containing the resulting spheroidized graphite particles and a carbonaceous material.

The method for producing a spheroidized graphite disclosed in Patent Document 5 also provides an insufficient improvement in battery characteristics because the addition of a resin binder hardly improves the adhesion between the graphite particles, and the generation of fine powder cannot be reduced. Although a method of spheroidization including the addition of a solution of the resin binder in toluene has also been disclosed, the method requires further improvement because the temperature during the spheroidization may exceed the low flash point of the solvent, which involves the risk of explosion or fire during the production. Furthermore, since the affinity with an organic substance, serving as a precursor of the carbonaceous material, is not taken into account, the resin binder described cannot uniformly cover the carbonaceous material and provides an insufficient improvement in battery characteristics also when used as a raw material of composite particles containing the resulting spheroidized graphite particles and a carbonaceous material.

Patent Document 6 has not disclosed a method of granulating a graphite into spheroidal particles, and, in addition, the method disclosed provides an insufficient reduction in generation of fine powder during the spheroidization and an insufficient improvement in battery characteristics because paraffin wax is solid. Furthermore, since the affinity with an organic substance, serving as a precursor of the carbonaceous material, is not taken into account, the paraffin wax cannot uniformly cover the carbonaceous material and provides an insufficient improvement in battery characteristics also when used as a raw material of composite particles containing the resulting granulated particles and a carbonaceous material.

Although the composite graphites disclosed in Patent Documents 1 and 11 to 12, which are made of a graphite and an amorphous carbon coating on the graphite surface, can provide a high capacity and good fast charge-discharge characteristics as compared with the flake graphite or the spheroidized graphite particles used as a raw material, these characteristics are still insufficient because the relationship between the tap density, the true density, and the density under a load of the graphite is not taken into account.

The present invention has been made in view of the above circumstances, and an object (object A) of the present invention is to provide a carbon material that can provide a non-aqueous secondary battery having a high capacity of 355 mAh/g or more, for example, and excellent input-output characteristics (low-temperature output characteristics) and, as a result, provide a high-performance non-aqueous secondary battery.

Another object (object B) of the present invention is to provide a method for producing a carbon material for a non-aqueous secondary battery, comprising the step of granulating a raw carbon material. The method can produce carbon materials for non-aqueous secondary batteries having various types of particle structures and can stably produce carbon materials that can be processed in bulk, have a high degree of spheroidization, good filling properties, and low anisotropy, and generate little amount of fine powder. A still another object is to provide a carbon material that can provide a non-aqueous secondary battery having a high capacity of 355 mAh/g or more, for example, and excellent input-output characteristics (low-temperature output characteristics) by this method and, as a result, provide a high-performance non-aqueous secondary battery.

Means for Solving the Problems

The inventors have intensively studied to achieve the object A to discover that a carbon material for a non-aqueous secondary battery, comprising a graphite capable of occluding and releasing lithium ions, the carbon material having a cumulative pore volume at pore diameters in a range of 0.01 μm to 1 μm of 0.08 mL/g or more, a roundness, as determined by flow-type particle image analysis, of 0.88 or greater, and a ratio (PD/d50(%)) of mode pore diameter (PD) in a pore diameter range of 0.01 μm to 1 μm in a pore distribution determined by mercury intrusion to volume-based average particle diameter (d50) of 1.8 or less can provide a non-aqueous secondary battery negative electrode material having a high capacity and excellent low-temperature output characteristics and cycle characteristics, thereby completing Invention A.

More specific aspects of Invention A are as follows:

(A1) A carbon material for a non-aqueous secondary battery, comprising a graphite capable of occluding and releasing lithium ions, the carbon material having a cumulative pore volume at pore diameters in a range of 0.01 μm to 1 μm of 0.08 mL/g or more, a roundness, as determined by flow-type particle image analysis, of 0.88 or greater, and a pore diameter to particle diameter ratio (PD/d50(%)) of 1.8 or less, the ratio being given by equation (1A):

$$PD/d50(\%) = \text{mode pore diameter } (PD) \text{ in } a \text{ pore diameter range of } 0.01 \text{ μm to } 1 \text{ μm in } a \text{ pore distribution determined by mercury intrusion/volume-based average particle diameter } (d50) \times 100 \quad (1A).$$

(A2) A carbon material for a non-aqueous secondary battery capable of occluding and releasing lithium ions, the carbon material being formed from a plurality of graphite particles without being pressed and having a pore diameter to particle diameter ratio (PD/d50(%) of 1.8 or less, the ratio being given by equation (1A):

$$PD/d50(\%) = \text{mode pore diameter } (PD) \text{ in } a \text{ range of } 0.01 \text{ μm to } 1 \text{ μm in } a \text{ pore distribution determined by mercury intrusion/volume-based average particle diameter } (d50) \times 100 \quad (1A).$$

(A3) The carbon material for a non-aqueous secondary battery according to (A1) or (A2), wherein the carbon material is a spheroidized graphite made of flake graphite, crystalline graphite, and vein graphite and has a half width at half maximum of pore distribution (log (nm)) of 0.45 or greater, the half width at half maximum of pore distribution (log (nm)) referring to a half width at half maximum at a micropore side of a peak in a pore diameter range of 0.01 μm to 1 μm in a pore distribution (nm), as determined by mercury intrusion (mercury porosimetry), of the carbon material for a non-aqueous secondary battery, with a horizontal axis expressed in common logarithm (log (nm)).

(A4) The carbon material for a non-aqueous secondary battery according to (A1) or (A2), wherein the carbon material is a composite carbon material comprising a spheroidized graphite made of flake graphite, crystalline graphite, and vein graphite and a carbonaceous material and has a half width at half maximum of pore distribution (log (nm)) of 0.3 or greater,
the half width at half maximum of pore distribution (log (nm)) referring to a half width at half maximum at a micropore side of a peak in a pore diameter range of 0.01 μm to 1 μm in a pore distribution (nm), as determined by mercury intrusion (mercury porosimetry), of the carbon material for a non-aqueous secondary battery, with a horizontal axis expressed in common logarithm (log (nm)).

(A5) The carbon material for a non-aqueous secondary battery according to any one of (A1) to (A4), wherein the carbon material is a spheroidized graphite made of flake graphite.

(A6) The carbon material for a non-aqueous secondary battery according to any one of (A1) to (A5), wherein the carbon material has a frequency of particles with a particle diameter of 3 μm or less of 1% to 60%, the particle diameter and the frequency of particles being measured using a flow-type particle image analyzer after the carbon material has been irradiated with ultrasonic waves of 28 kHz at a power of 60 W for 5 minutes.

(A7) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of (A1) to (A6).

The inventors have intensively studied to achieve the object B to find
A method for producing a carbon material for a non-aqueous secondary battery, comprising
a granulation step of granulating a raw carbon material by applying at least one type of mechanical energy selected from impact, compression, friction, and shear force, the step of granulating a raw carbon material being carried out in the presence of a granulating agent that satisfies conditions 1) and 2):
1) being liquid during the step of granulating the raw carbon material; and
2) in the granulating agent, no organic solvent is contained, or if contained, at least one of the organic solvents has no flash point or a flash point of 5° C. or higher.

More specific aspects of Invention B are as follows:

(B1) A method for producing a carbon material for a non-aqueous secondary battery, comprising
a granulation step of granulating a raw carbon material by applying at least one type of mechanical energy selected from impact, compression, friction, and shear force, the granulation step being carried out in the presence of a granulating agent that satisfies conditions 1) and 2):
1) being liquid during the step of granulating the raw carbon material; and 2) in the granulating agent, no organic solvent is contained, or if contained, at least one of the organic solvents has no flash point or a flash point of 5° C. or higher.

(B2) The production method according to (B1), wherein the granulating agent has a contact angle θ with a graphite of less than 90°, the contact angle being measured by the following method:

Method for Measuring Contact Angle θ with Graphite

Onto a surface of HOPG, 1.2 μL of a granulating agent is added dropwise, and when wetting and spreading has settled down and a rate of change in contact angle θ of the granulating agent added dropwise in one second has reached 3% or lower, the contact angle is measured using a contact angle meter (DM-501 automatic contact angle meter available from Kyowa Interface Science Co., Ltd). When a granulating agent having a viscosity at 25° C. of 500 cP or lower is used, a value at 25° C. is employed as a measurement of the contact angle θ, and when a granulating agent having a viscosity at 25° C. of higher than 500 cP is used, a value at an increased temperature where the viscosity is not higher than 500 cP is employed.

(B3) The production method according to (B1) or (B2), wherein the granulating agent has a viscosity of 1 cP or more during the granulation step.

(B4) The production method according to any one of (B1) to (B3), wherein the granulating agent has a viscosity at 25° C. of 1 cP to 100,000 cP.

(B5) The production method according to any one of (B1) to (B4), wherein the raw carbon material comprises at least one selected from the group consisting of flake, crystalline, and vein natural graphites.

(B6) The production method according to any one of (B1) to (B5), wherein the raw carbon material has a $d_{002}$ of 0.34 nm or less.

(B7) The production method according to any one of (B1) to (B6), wherein the granulation step comprises granulating the raw carbon material in the presence of at least one selected from the group consisting of metals capable of forming alloys with Li, oxides thereof, amorphous carbon, and green coke.

(B8) The production method according to any one of (B1) to (B7), wherein the granulation step is carried out in an atmosphere at 0° C. to 250° C.

(B9) The production method according to any one of (B1) to (B8), wherein the granulation step comprises placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

(B10) The production method according to any one of (B1) to (B9), further comprising the step of depositing a carbonaceous material having lower crystallinity than the raw carbon material on the granulated carbon material obtained in the granulation step.

The inventors have intensively studied to achieve the object A to find another object, that is, to achieve a carbon material for a non-aqueous secondary battery having so high particle strength as to generate little amount of fine powder even upon physical impact, and discovered that using a carbon material for a non-aqueous secondary battery capable of occluding and releasing lithium ions and formed from a plurality of graphite particles as a negative electrode active material, the carbon material satisfying inequality (1C):

$$Q_{5min}(\%)/D50\ (\mu m) \leq 3.5 \quad (1C)$$

where $Q_{5min}$ (%) is a frequency (%) of particles with a diameter of 5 μm or less measured using a flow-type particle image analyzer after the carbon material has been irradiated with ultrasonic waves of 28 kHz at a power of 60 W for 5 minutes; and D50 (μm) is a volume-based median diameter determined by laser diffraction/scattering after the carbon material has been irradiated with ultrasonic waves of 28 kHz at a power of 60 W for 1 minute, can provide a non-aqueous secondary battery having excellent input-output characteristics and excellent cycle characteristics, thereby completing Invention C.

More specific aspects of Invention C are as follows:

(C1) A carbon material for a non-aqueous secondary battery capable of occluding and releasing lithium ions and formed from a plurality of graphite particles, the carbon material satisfying inequality (1C):

$$Q_{5min}(\%)/D50\ (\mu m) \leq 3.5 \qquad (1C)$$

where $Q_{5min}$ (%) is a frequency (%) of particles with a diameter of 5 μm or less measured using a flow-type particle image analyzer after the carbon material has been irradiated with ultrasonic waves of 28 kHz at a power of 60 W for 5 minutes; and D50 (μm) is a volume-based median diameter determined by laser diffraction/scattering after the carbon material has been irradiated with ultrasonic waves of 28 kHz at a power of 60 W for 1 minute.

(C2) The carbon material for a non-aqueous secondary battery according to (C1), wherein the carbon material has a $Q_{5min}$ (%) of 40% or less.

(C3) The carbon material for a non-aqueous secondary battery according to (C1) or (C2), wherein the total amount of eliminated CO and eliminated $CO_2$, as measured using a pyrolysis mass spectrometer (TPD-MS) by heating the carbon material from room temperature to 1,000° C., is 125 μmol/g or less.

(C4) The carbon material for a non-aqueous secondary battery according to any one of (C1) to (C3), wherein the amount of eliminated CO, as measured using a pyrolysis mass spectrometer (TPD-MS) by heating the carbon material from room temperature to 1,000° C., is 100 μmol/g or less.

(C5) The carbon material for a non-aqueous secondary battery according to any one of (C1) to (C4), wherein the amount of eliminated $CO_2$ as measured using a pyrolysis mass spectrometer (TPD-MS) by heating the carbon material from room temperature to 1,000° C., is 25 μmol/g or less.

(C6) The carbon material for a non-aqueous secondary battery according to any one of (C1) to (C5), wherein the carbon material has a tap density of 0.7 g/cm³ to 1.3 g/cm³.

(C7) The carbon material for a non-aqueous secondary battery according to any one of (C1) to (C6), wherein the carbon material has a roundness of 0.86 or greater.

(C8) The carbon material for a non-aqueous secondary battery according to any one of (C1) to (C7), wherein the carbon material has a BET specific surface area of 2 m²/g to 30 m²/g.

(C9) The carbon material for a non-aqueous secondary battery according to any one of (C1) to (C8), wherein the carbon material has a volume-based median diameter (D50) of 1 μm to 50 μm.

(C10) The carbon material for a non-aqueous secondary battery according to any one of (C1) to (C9), wherein the carbon material has an Lc of 90 nm or more and a $d_{002}$ of 0.337 nm or less, the values being determined by wide-angle X-ray diffractometry.

(C11) The carbon material for a non-aqueous secondary battery according to any one of (C1) to (C10), wherein the graphite particles contain a natural graphite.

(C12) A composite carbon material for a non-aqueous secondary battery, comprising
the carbon material according to any one of (C1) to (C11); and
a carbonaceous material combined with the carbon material.

(C13) A non-aqueous lithium ion secondary battery comprising:
a positive electrode and a negative electrode, each being capable of occluding and releasing lithium ions; and
an electrolyte,
the negative electrode comprising the carbon material for a non-aqueous secondary battery according to any one of (C1) to (C11) or the composite carbon material for a non-aqueous secondary battery according to (C12).

The inventors have intensively studied to achieve the object A to discover that a carbon material for a non-aqueous secondary battery capable of occluding and releasing lithium ions, the carbon material comprising a carbonaceous material on a particle surface and having a tap density and a specific surface area (SA) determined by BET method satisfying a specific relationship, can provide a non-aqueous secondary battery negative electrode material having a high capacity and excellent input-output characteristics and cycle characteristics, thereby completing Invention D.

More specific aspects of Invention D are as follows:

(D1) A carbon material for a non-aqueous secondary battery capable of occluding and releasing lithium ions, the carbon material comprising a carbonaceous material on a particle surface and satisfying the relationship of inequality (1D):

$$10Y_d + 0.26X_d \geq \alpha \qquad (1D)$$

($Y_d$=tap density (g/cm³), $X_d$=specific surface area (SA) (m²/g) of carbon material determined by BET method, α=12.60).

(D2) The carbon material for a non-aqueous secondary battery according to (D1), wherein the specific surface area (SA) (m²/g) of the carbon material determined by BET method is 2 or greater.

(D3) The carbon material for a non-aqueous secondary battery according to (D1) or (D2), wherein the carbon material comprises a plurality of graphites selected from the group consisting of at least one of flake graphite, crystalline graphite, and vein graphite.

(D4) The carbon material for a non-aqueous secondary battery according to any one of (D1) to (D3), wherein the carbon material has a 1st discharge capacity of 300 mAh/g or more.

(D5) A non-aqueous secondary battery comprising
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of (D1) to (D4).

The inventors have intensively studied to achieve the object A to find another object, that is, to provide a carbon material for a non-aqueous secondary battery overcoming the traditional trade-off between specific surface area and low-crystallinity region and having excellent input-output characteristics, and discovered that a carbon material for a non-aqueous secondary battery capable of occluding and releasing lithium ions, the carbon material comprising a carbonaceous material on a particle surface and having a true density and a specific surface area (SA) determined by BET method satisfying a specific relationship, can provide a carbon material for a non-aqueous secondary battery having excellent input-output characteristics, thereby completing Invention E. The true density is a physical property that indicates the crystallinity of graphite particles.

More specific aspects of Invention E are as follows:

(E1) A carbon material for a non-aqueous secondary battery capable of occluding and releasing lithium ions, the carbon material comprising a carbonaceous material on a particle surface and satisfying the relationship of inequality (1E):

$$Y_e - 0.01 X_e \leq \alpha \tag{1E}$$

($Y_e$=true density (g/cm$^3$), $X_e$=specific surface area (SA) (m$^2$/g) of carbon material determined by BET method, $\alpha$=2.20).

(E2) The carbon material for a non-aqueous secondary battery according to (E1), wherein the specific surface area (SA) (m$^2$/g) of the carbon material determined by BET method is 2 or greater.

(E3) The carbon material for a non-aqueous secondary battery according to (E1) or (E2), wherein the carbon material comprises a plurality of graphites selected from the group consisting of at least one of flake graphite, crystalline graphite, and vein graphite.

(E4) The carbon material for a non-aqueous secondary battery according to any one of (E1) to (E3), wherein the carbon material has a 1st discharge capacity of 300 mAh/g or more.

(E5) The carbon material for a non-aqueous secondary battery according to any one of (E1) to (E4), wherein the carbon material has a 90% particle diameter (d90) to 10% particle diameter (d10) ratio (d90/d10) in a volume-based particle size distribution of 2.6 or greater.

(E6) A non-aqueous secondary battery comprising:
a positive electrode and a negative electrode, each being capable of occluding and releasing lithium ions; and
an electrolyte, the negative electrode comprising a current collector and a negative electrode active material layer on the current collector, the negative electrode active material layer comprising the carbon material according to any one of (E1) to (E5).

The inventors have intensively studied to achieve the object A to discover that a composite carbon material comprising a carbon material (A) capable of occluding and releasing lithium ions (hereinafter also referred to as "the carbon material (A)") and a carbonaceous material (B) on the surface of the carbon material (A) (hereinafter also referred to as "the composite carbon material"), wherein the average value of microscopic Raman R values of 30 randomly selected composite carbon materials is 0.1 to 0.85, and the standard deviation ($\sigma_R$) is 0.1 or less, can provide a non-aqueous secondary battery negative electrode material having a high capacity and excellent low-temperature output characteristics and cycle characteristics, thereby completing Invention F.

More specific aspects of Invention F are as follows:

(F1) A composite carbon material comprising:
a carbon material (A) capable of occluding and releasing lithium ions: and
a carbonaceous material (B) on the surface of the carbon material (A),
wherein the average value of microscopic Raman R values of 30 randomly selected composite carbon materials is 0.1 to 0.85, and the standard deviation ($\sigma_R$) is 0.1 or less.

(F2) The composite carbon material for a non-aqueous secondary battery according to (F1), wherein the composite carbon material has a microscopic Raman $R_{15}$ value of 12% or less, the value being given by equation (1F):

$$\text{Microscopic Raman } R_{(15)} \text{ value (\%)} = \text{the number of composite carbon materials having a microscopic Raman } R \text{ value of 0.15 or less among 30 randomly selected composite carbon materials}/30 \times 100 \tag{1F}$$

(F3) The composite carbon material for a non-aqueous secondary battery according to (F1) or (F2), wherein the composite carbon material has a tap density of 0.6 g/cm$^3$ to 1.20 g/cm$^3$.

(F4) The composite carbon material for a non-aqueous secondary battery according to any one of (F1) to (F3), wherein the composite carbon material has a specific surface area (SA) of 1 m$^2$/g to 30 m$^2$/g.

(F5) The composite carbon material for a non-aqueous secondary battery according to any one of (F1) to (F4), wherein the carbon material is a spheroidized graphite made of at least one carbon material selected from the group consisting of flake natural graphite, crystalline natural graphite, and vein natural graphite.

(F6) A method for producing a composite carbon material for a non-aqueous secondary battery, comprising:
mixing a carbon material having a cumulative pore volume in a range of 0.01 μm to 1 μm of 0.07 mL/g or more and a pore diameter to particle diameter ratio (PD/d50(%)), as given by equation (2F), of 1.8 or less with a carbonaceous material precursor at a temperature equal to or higher than a softening point of the carbonaceous material precursor; and then
carbonizing the carbonaceous material precursor by heat treatment.

$$PD/d50(\%) = \text{mode pore diameter } (PD) \text{ in a range of } 0.01 \text{ μm to 1 μm in a pore distribution determined by mercury intrusion/volume-based average particle diameter } (d50) \times 100 \tag{2F}$$

(F7) The method for producing a composite carbon material for a non-aqueous secondary battery according to (F6), wherein the carbon material is a spheroidized graphite made of at least one carbon material selected from the group consisting of flake natural graphite, crystalline natural graphite, and vein natural graphite.

(F8) The method for producing a composite carbon material for a non-aqueous secondary battery according to (F6) or (F7), wherein the carbonaceous material precursor has a softening point of 400° C. or lower.

(F9) A composite carbon material for a non-aqueous secondary battery produced by the method for producing a composite carbon material for a non-aqueous secondary battery according to any one of (F6) to (F8).

(F10) A non-aqueous secondary battery comprising:
a positive electrode and a negative electrode, each being capable of occluding and releasing lithium ions; and
an electrolyte, the negative electrode comprising a current collector and a negative electrode active material layer on the current collector, the negative electrode active material layer comprising the composite carbon material according to any one of (F1) to (F5) and (F9).

The inventors have intensively studied to achieve the object A to discover that a carbon material having specific values of a cumulative pore volume at pore diameters in a range of 2 to 4 nm and a tap density improves low-temperature output characteristics, thereby completing Invention G.

More specific aspects of Invention G are as follows:
(G1) A carbon material for a non-aqueous secondary battery capable of occluding and releasing lithium ions, the carbon material having a cumulative pore volume at pore diameters in a range of 2 to 4 nm, as determined by nitrogen gas adsorption, of 0.0022 cm$^3$/g or more and a tap density of 0.83 g/cm$^3$ or more.
(G2) The carbon material for a non-aqueous secondary battery according to (G1), wherein the carbon material has a maximum dV/dlog (D) (V: cumulative pore volume, D: pore diameter) at pore diameters in a range of 2 to 4 nm, as determined by nitrogen gas adsorption, of 0.0090 cm$^3$/g or more.
(G3) The carbon material for a non-aqueous secondary battery according to (G1) or (G2), wherein the carbon material has a cumulative pore volume at pore diameters in a range of 2 to 100 nm of 0.025 cm$^3$/g or more.
(G4) The carbon material for a non-aqueous secondary battery according to any one of (G1) to (G3), wherein the carbon material comprises a plurality of graphites selected from the group consisting of at least one of flake graphite, crystalline graphite, and vein graphite.
(G5) A non-aqueous secondary battery comprising:
a positive electrode and a negative electrode, each being capable of occluding and releasing lithium ions; and
an electrolyte, the negative electrode comprising a current collector and a negative electrode active material layer on the current collector, the negative electrode active material layer comprising the carbon material according to any one of (G1) to (G5).

The inventors have intensively studied to achieve the object A to discover that a carbon material for a non-aqueous secondary battery capable of occluding and releasing lithium ions, the carbon material having a Raman R value given by the following equation 1H and a thermal weight loss ratio per unit area (ΔTG/SA) in specific ranges, can provide a non-aqueous secondary battery negative electrode material having a high capacity and excellent low-temperature output characteristics and cycle characteristics, thereby completing Invention H.

More specific aspects of Invention H are as follows:
(H1) A carbon material for a non-aqueous secondary battery capable of occluding and releasing lithium ions, the carbon material having a Raman R value, as given by equation (1H), of 0.31 or greater and a thermal weight loss ratio per unit area (ΔTG/SA), as given by equation (2H), of 0.05 to 0.45.

Raman value $R$=intensity $I_B$ of peak $P_B$ near 1,360 cm$^{-1}$/intensity $I_A$ of peak $P_A$ near 1,580 cm$^{-1}$ by Raman spectrum analysis    Equation (1H)

(ΔTG/SA)=(thermal weight loss (ΔTG) (%) on heating from 400° C. to 600° C. at 2° C./min in air atmosphere, measured with differential thermal balance)/(specific surface area (SA) (m$^2$/g) of carbon material determined by BET method)    Equation (2H)

(H2) The carbon material for a non-aqueous secondary battery according to (H1), wherein the carbon material is a spheroidized graphite made of flake graphite, crystalline graphite, and vein graphite.
(H3) The carbon material for a non-aqueous secondary battery according to (H1) or (H2), wherein the carbon material has a roundness, as determined by flow-type particle image analysis, of 0.88 or greater.
(H4) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of (H1) to (H3).

The inventors have intensively studied to achieve the object A to discover that a carbon material for a non-aqueous secondary battery capable of occluding and releasing lithium ions, the carbon material being graphite particles satisfying the relationship of inequality (1I), can provide a non-aqueous secondary battery negative electrode material having a high capacity and excellent low-temperature output characteristics and cycle characteristics, thereby completing Invention I.

$$100Y_i+0.26X_i>\alpha \quad \text{Inequality (1I)}$$

(In inequality (1I), $Y_i$ is an oxygen functional group dispersity given by equation (2I); $X_i$ is a volume-based average particle diameter (d50) (μm); and α=9.4)

Oxygen functional group dispersity ($Y_i$)=total oxygen content (mol %) determined by elemental analysis/surface oxygen content (O/C) (mol %) determined by X-ray photoelectron spectroscopy    Equation (2I)

More specific aspects of Invention I are as follows:
(I$_1$) A carbon material for a non-aqueous secondary battery capable of occluding and releasing lithium ions, the carbon material being graphite particles satisfying the relationship of inequality (1I).

$$100Y_i+0.26X_i \geq \alpha \quad \text{Inequality (1I)}$$

(In inequality (1I), $Y_i$ is an oxygen functional group dispersity given by equation (2I); $X_i$ is a volume-based average particle diameter (d50) (μm); and α=9.4)

Oxygen functional group dispersity ($Y_i$)=total oxygen content (mol %) determined by elemental analysis/surface oxygen content (O/C) (mol %) determined by X-ray photoelectron spectroscopy    Equation (2I)

(I2) The carbon material for a non-aqueous secondary battery according to (I1), wherein the surface oxygen content (O/C) determined by X-ray photoelectron spectroscopy is 2 mol % or less.
(I3) The carbon material for a non-aqueous secondary battery according to any one of (I1) or (I2), wherein the carbon material has a Tap density of 0.7 g/cm$^3$ or more.
(I4) The carbon material for a non-aqueous secondary battery according to any one of (I1) to (I3), wherein the carbon material has a roundness, as determined by flow-type particle image analysis, of 0.88 or greater.

(I5) The carbon material for a non-aqueous secondary battery according to any one of (I1) to (I4), wherein the graphite particles are spheroidal graphite particles formed by granulation of flake graphite, crystalline graphite, and vein graphite.

(I6) The carbon material for a non-aqueous secondary battery according to any one of (I1) to (I5), wherein the granulation is carried out by applying at least one type of mechanical energy selected from impact, compression, friction, and shear force.

(I7) The carbon material for a non-aqueous secondary battery according to any one of (I1) to (I6), wherein the granulation is carried out by placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

(I8) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of (I1) to (I7).

The inventors have intensively studied to achieve the object B to find another object, that is, to provide a method for producing composite particles for a non-aqueous secondary battery, comprising spheroidally granulated graphite particles having a structure in which fine powder having a great number of Li-ion insertion/extraction sites exists on and in the particles, the graphite particles being uniformly coated with a carbonaceous material, and discovered that a production method comprising:

1) applying at least one type of mechanical energy selected from impact, compression, friction, and shear force in the presence of a granulating agent having an aniline point of 80° C. or lower or no aniline point to granulate a raw carbon material; and
2) mixing the granulated carbon material particles obtained in 1) with an organic compound, serving as a carbonaceous material precursor, and heat-treating the mixture, thereby completing Invention J.

More specific aspects of Invention J are as follows:

(J1) A method for producing composite particles for a non-aqueous secondary battery comprising a granulated carbon material and a carbonaceous material having lower crystallinity than the granulated carbon material, the method comprising the steps of 1) and 2):
1) applying at least one type of mechanical energy selected from impact, compression, friction, and shear force in the presence of a granulating agent having an aniline point of 80° C. or lower or no aniline point to granulate a raw carbon material; and
2) mixing the granulated carbon material obtained in 1) with an organic compound, serving as a carbonaceous material precursor, and heat-treating the mixture.

(J2) The method for producing composite particles for a non-aqueous secondary battery according to (J1), wherein the granulating agent is an organic compound having an aromatic ring and is liquid at 25° C.

(J3) The method for producing composite particles for a non-aqueous secondary battery according to (J1) or (J2), wherein the organic compound, serving as a carbonaceous material precursor, comprises an organic compound having an aromatic ring.

(J4) The method for producing composite particles for a non-aqueous secondary battery according to any one of (J1) to (J3), wherein the organic compound, serving as a carbonaceous material precursor, is a coal-derived raw oil.

(J5) The method for producing composite particles for a non-aqueous secondary battery according to any one of (J1) to (J4), wherein the raw carbon material particles comprise at least one selected from the group consisting of flake, crystalline, and vein natural graphites.

(J6) The method for producing composite particles for a non-aqueous secondary battery according to any one of (J1) to (J5), wherein the raw carbon material has a $d_{002}$ of 0.34 nm or less.

(J7) The method for producing composite particles for a non-aqueous secondary battery according to any one of (J1) to (J6), wherein the granulation step is carried out in an atmosphere at 0° C. to 250° C.

(J8) The method for producing composite particles for a non-aqueous secondary battery according to any one of (J1) to (J7), wherein the granulation step comprises placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

(J9) Composite particles for a non-aqueous secondary battery produced by the production method according to any one of (J1) to (J8).

(J10) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the composite particles for a non-aqueous secondary battery according to (J9).

The inventors have intensively studied to achieve the object A to discover that while the reasons are not fully understood, a carbon material having a true density that satisfies a specific relationship with a density under a specific load minus a tap density can provide a carbon material for a non-aqueous secondary battery negative electrode having a high capacity and excellent low-temperature output characteristics, thereby completing Invention K.

More specific aspects of Invention K are as follows:

(K1) A carbon material for a non-aqueous secondary battery, satisfying inequality (1K).

$$10.914 > 5x_k - y_k - 0.0087a \qquad \text{Inequality (1K)}$$

(In inequality (1K), $x_k$ is a true density [g/cm$^3$] of the carbon material; $y_k$ is a value determined by equation (2K); and a is a volume-based average particle diameter [μm] of the carbon material.)

$$y_k = (\text{density [g/cm}^3\text{] of carbon material under uni-axial load of 100 } kgf/3.14 \text{ cm}^2) - (tap \text{ density of carbon material [g/cm}^3\text{])} \qquad \text{Equation (2K)}$$

(K2) A carbon material for a non-aqueous secondary battery, satisfying inequality (3K).

$$10.990 > 5x_k - y_k \qquad \text{Inequality (3K)}$$

(In inequality (3K), $x_k$ is a true density [g/cm³] of the carbon material, and $y_k$ is a value determined by equation (2K).)

$y_k$=(density [g/cm³] of powder carbon material under uniaxial load of 100 kgf/3.14 cm²)−(tap density of carbon material [g/cm³])  Equation (2K)

(K3) The carbon material for a non-aqueous secondary battery according to (K1) or (K2), wherein the carbon material has a true density of 2.20 g/cm³ to 2.262 g/cm³.

(K4) The carbon material for a non-aqueous secondary battery according to any one of (K1) to (K3), wherein the carbon material has a tap density of 0.85 g/cm³ or more.

(K5) The carbon material for a non-aqueous secondary battery according to any one of (K1) to (K4), wherein at least part of the surface of the carbon material is coated with an amorphous carbon.

(K6) The carbon material for a non-aqueous secondary battery according to any one of (K1) to (K4), wherein the carbon material comprises spheroidal graphite particles formed by granulation of flake graphite, crystalline graphite, and vein graphite.

(K7) The carbon material for a non-aqueous secondary battery according to (K6), wherein the granulation is carried out by applying at least one type of mechanical energy selected from impact, compression, friction, and shear force.

(K8) The carbon material for a non-aqueous secondary battery according to (K6) or (K7), wherein the granulation is carried out by placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

(K9) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of (K1) to (K8).

The inventors have intensively studied to achieve the object A to discover that fining intra-particle pores ($L^1$), uniformly dispersing intra-particle pores ($L^2$), or controlling the orientation of and the interval between intra-particle voids ($L^3$) can provide a non-aqueous secondary battery negative electrode material having a high capacity and excellent low-temperature output characteristics and cycle characteristics, thereby completing Inventions L ($L^1$ to $L^3$).

More specifically, aspects of Invention $L^1$ are as follows:

($L^1$1) A carbon material for a non-aqueous secondary battery, comprising granulated particles satisfying (1L) and (2L):
the carbon material for a non-aqueous secondary battery having an average box-counting dimension relative to void regions of 30 particles of 1.55 or greater, as calculated from images obtained by randomly selecting 30 granulated particles from a cross-sectional SEM image of the carbon material for a non-aqueous secondary battery, dividing the cross-sectional SEM image of each granulated particle into void regions and non-void regions, and binarizing the image.

(1L) The granulated particles are made of a carbonaceous material; and (2L) The granulated particles satisfy the relationship $|X_1−X|/X_1 \leq 0.2$, where X is a volume-based average particle diameter determined by laser diffraction, and $X_1$ is an equivalent circular diameter as determined from a cross-sectional SEM image,
provided that the cross-sectional SEM image is a reflected electron image acquired at an acceleration voltage of 10 kV.

($L^1_2$) The carbon material for a non-aqueous secondary battery according to ($L^1$1), wherein the granulated particles satisfy the relationship $|R−R_1| \leq 0.1$, where R is a roundness determined with a flow-type particle image analyzer, and $R_1$ is a roundness determined from a cross-sectional SEM image.

($L^1$3) The carbon material for a non-aqueous secondary battery according to ($L^1$1) or ($L^1$2), wherein the carbon material has a tap density of 0.7 g/cm³ or more.

($L^1$4) The carbon material for a non-aqueous secondary battery according to any one of ($L^1$1) to ($L^1$3), wherein the carbon material has a roundness, as determined by flow-type particle image analysis, of 0.88 or greater.

($L^1$5) The carbon material for a non-aqueous secondary battery according to any one of ($L^1$1) to ($L^1$4), wherein the graphite particles are spheroidal graphite particles formed by granulation of flake graphite, crystalline graphite, and vein graphite.

($L^1$6) The carbon material for a non-aqueous secondary battery according to any one of ($L^1$1) to ($L^1$5), wherein the granulation is carried out by applying at least one type of mechanical energy selected from impact, compression, friction, and shear force.

($L^1$7) The carbon material for a non-aqueous secondary battery according to any one of ($L^1$1) to ($L^1$6), wherein the granulation is carried out by placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

($L^1$8) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of ($L^1$1) to ($L^1$7).

Aspects of Invention $L^2$ are as follows:

($L^2$1) A carbon material for a non-aqueous secondary battery, comprising granulated particles satisfying (1L) and (2L),
the carbon material for a non-aqueous secondary battery having an average dispersity D of 30 granulated particles, as determined by the following measurement method, of 60% or more, the 30 particles being randomly selected from a cross-sectional SEM image of the carbon material for a non-aqueous secondary battery.

(1L) Being made of a carbonaceous material.
(2L) Satisfying the relationship $|X_1-X|/X_1 \leq 0.2$, where X is a volume-based average particle diameter determined by laser diffraction, and $X_1$ is an equivalent circular diameter determined from a cross-sectional SEM image.

Measurement Method

Using a cross-sectional SEM image, grid lines are drawn to split the minor axis and the major axis of a target granulated particle each into 20 parts. Using cells in the grid, the granulated particle is compartmentalized as defined below. The expectation E of void area of each compartment is calculated using equation (A) below, and the dispersity D of the granulated particle is calculated using equation (B) below.

The cross-sectional SEM image is a reflected electron image acquired at an acceleration voltage of 10 kV.

Definition of Compartment of Granulated Particle

The compartment is defined as a granulated particle portion and/or a region where a void is present in the granulated particle in each cell of the above-described grid. The outside of the boundary of the granulated particle is excluded from the compartment.

Expectation $E[\mu m^2]$ of void area in target compartment=(gross area $[\mu m^2]$ of internal voids of one target granulated particle)/{(cross-sectional area $[\mu m^2]$ of one target granulated particle)×(area $[\mu m^2]$ of target compartment)}    Equation (A)

Dispersity $D(\%)$=(sum total $[\mu m^2]$ of areas of compartments that satisfy (gross area $[\mu m^2]$ of voids in target compartment)/(expectation $E[\mu m^2]$ of void area in target compartment)=0.5 or greater)/(sum total $[\mu m^2]$ of areas of all the compartments of one target granulated particle)×100    Equation (B)

($L^2$2) The carbon material for a non-aqueous secondary battery according to ($L^2$1), wherein the granulated particles satisfy the relationship $|R-R_1| \leq 0.1$, where R is a roundness determined with a flow-type particle image analyzer, and $R_1$ is a roundness determined from a cross-sectional SEM image.

($L^2$3) The carbon material for a non-aqueous secondary battery according to ($L^2$1) or ($L^2$2), wherein the carbon material has a tap density of 0.7 g/cm$^3$ or more.

($L^2$4) The carbon material for a non-aqueous secondary battery according to any one of ($L^2$1) to ($L^2$3), wherein the carbon material has a roundness, as determined by flow-type particle image analysis, of 0.88 or greater.

($L^2$5) The carbon material for a non-aqueous secondary battery according to any one of ($L^2$1) to ($L^2$4), wherein the graphite particles are spheroidal graphite particles formed by granulation of flake graphite, crystalline graphite, and vein graphite.

($L^2$6) The carbon material for a non-aqueous secondary battery according to any one of ($L^2$1) to ($L^2$5), wherein the granulation is carried out by applying at least one type of mechanical energy selected from impact, compression, friction, and shear force.

($L^2$7) The carbon material for a non-aqueous secondary battery according to any one of ($L^2$1) to ($L^2$6), wherein the granulation is carried out by placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

($L^2$8) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of ($L^2$1) to ($L^2$7).

Aspects of Invention $L^3$ are as follows:
($L^3$1) A carbon material for a non-aqueous secondary battery, comprising granulated particles satisfying (1L) and (2L),
the carbon material for a non-aqueous secondary battery having an average inter-void distance Z (Zave) of 30 granulated particles defined below and a volume-based average particle diameter X determined by laser diffraction in a ratio (Zave/X) of 0.060 or less, the 30 particles being randomly selected from a cross-sectional SEM image of the carbon material for a non-aqueous secondary battery.

(1L) Being made of a carbonaceous material.
(2L) Satisfying the relationship $|X_1-X|/X_1 \leq 0.2$, where X is a volume-based average particle diameter determined by laser diffraction, and $X_1$ is an equivalent circular diameter determined from a cross-sectional SEM image.

Definition of Average Inter-Void Distance Z (Zave) of 30 Particles

Three lines are drawn that are parallel to the minor axis of the granulated particle and split the major axis of the granulated particle into four parts, and inter-void distances Z (μm) of the granulated particle on each line are each measured. The average of 30 particles in total is calculated. This is defined as the average Z (Zave) of 30 particles.

The cross-sectional SEM image is a reflected electron image acquired at 10 kV.

($L^3$2) The carbon material for a non-aqueous secondary battery according to ($L^3$1), wherein the carbon material has a standard deviation (W) of void sizes Y of 30 granulated particles defined below and a volume-based average particle diameter X determined by laser diffraction in a ratio (W/X) of 0.018 or less, the 30 particles being randomly selected from a cross-sectional SEM image of the carbon material for a non-aqueous secondary battery.

Definition of Standard Deviation (W) of Void Sizes Y of 30 Particles

Three lines are drawn that are parallel to the minor axis of the granulated particle and split the major axis of the granulated particle into four parts, and void sizes Y (μm) of the granulated particle on each line are each measured. The standard deviation of 30 particles in total is calculated. This is defined as the standard deviation (W) of void sizes Y of 30 particles.

($L^3$3) The carbon material for a non-aqueous secondary battery according to ($L^3$1) or ($L^3$2), wherein 70% or more of 30 granulated particles randomly selected from a cross-sectional SEM image of the carbon material for a non-aqueous secondary battery have slit-like voids, and the slit-like voids are arranged mainly in layers.

($L^3$4) The carbon material for a non-aqueous secondary battery according to any one of ($L^3$1) to ($L^3$3), wherein the carbon material has a tap density of 0.7 g/cm$^3$ or more.

($L^3$5) The carbon material for a non-aqueous secondary battery according to any one of ($L^3$1) to ($L^3$4), wherein the carbon material has a roundness, as determined by flow-type particle image analysis, of 0.88 or greater.

($L^3$6) The carbon material for a non-aqueous secondary battery according to any one of ($L^3$1) to ($L^3$5), wherein the graphite particles are spheroidal graphite particles formed by granulation of flake graphite, crystalline graphite, and vein graphite.

($L^3$7) The carbon material for a non-aqueous secondary battery according to any one of ($L^3$1) to ($L^3$6), wherein the granulation is carried out by applying at least one type of mechanical energy selected from impact, compression, friction, and shear force.

($L^3$8) The carbon material for a non-aqueous secondary battery according to any one of ($L^3$1) to ($L^3$7), wherein the granulation is carried out by placing the graphite in an apparatus comprising a rotatable member that rotates at a high speed in a casing and having a rotor equipped with a plurality of blades in the casing, and applying any one of impact, compression, friction, and shear force to the graphite placed in the apparatus by rotating the rotor at a high speed.

($L^3$9) A non-aqueous secondary battery comprising:
a positive electrode and a negative electrode, each being capable of occluding and releasing lithium ions; and
an electrolyte,
the negative electrode comprising a current collector and a negative electrode active material layer on the current collector, the negative electrode active material layer comprising the carbon material according to any one of ($L^3$1) to ($L^3$8).

Effects of the Invention

The carbon material of Invention A, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention A is due to the following reason.

Specifically, the intra-particle pores of the carbon material formed to have a moderately fine intra-particle void structure such that the cumulative pore volume at pore diameters in a range of 0.01 μm to 1 μm is 0.08 mL/g or more, and the ratio of the mode pore diameter (PD) in a pore diameter range of 0.01 μm to 1 μm in a pore distribution determined by mercury intrusion to the volume-based average particle diameter (d50) (PD/d50(%)) is 1.8 or less allow an electrolyte solution to be smoothly and efficiently distributed into the particles. This enables effective and efficient use of Li-ion insertion/extraction sites in the particles as well as on the periphery of the particles during charging and discharging, thus providing a high capacity and good low-temperature output characteristics.

The production method of Invention B, that is, the method for producing a carbon material for a non-aqueous secondary battery, comprising the step of granulating a raw carbon material, can produce carbon materials for non-aqueous secondary batteries having various types of particle structures and stably produce spheroidized graphite particles that can be processed in bulk, have a moderately increased particle diameter (particle size), a high degree of spheroidization, good filling properties, and low anisotropy, and generate little amount of fine powder.

The inventors believe that the above effect is produced due to the following reason.

As a result of the addition of a granulating agent, the liquid adheres between particles to form liquid bridges (a phenomenon where bridges are built between the particles by the liquid). An attractive force caused by the capillary negative pressure in the liquid bridges and the surface tension of the liquid acts as a liquid cross-linking adhesive force between the particles to increase the liquid cross-linking adhesion between the raw carbon materials, allowing the raw carbon materials to adhere more firmly to each other. In addition, the granulating agent acts as a lubricant to reduce the generation of fine powder from the raw carbon materials. Furthermore, most of the fine powder generated during the granulation step adhere to the raw carbon materials due to the increased liquid cross-linking adhesive force, which leads to reduced independent fine powder particles. These effects enable the production of spheroidized graphite particles that include raw carbon materials adhering more firmly to each other, have a moderately increased particle diameter and a high degree of spheroidization, and generate little amount of fine powder.

When the granulating agent contains an organic solvent, the organic solvent has no flash point or a flash point of 5° C. or higher. This can avoid the risk of ignition of the granulating agent induced by impact or heat during the granulation step, fire, and explosion, and thus spheroidized graphite particles can be produced stably and efficiently.

The carbon material produced by the method of the present invention has a structure in which fine powder having a great number of Li-ion insertion/extraction sites exists on and in the particles. Furthermore, the structure formed by the granulation of a plurality of raw carbon materials enables effective and efficient use of the Li-ion insertion/extraction sites in the particles as well as on the periphery of the particles. As a result, the use of the carbon material obtained by the present invention in a non-aqueous secondary battery provides excellent input-output characteristics.

The carbon material for a non-aqueous secondary battery of Invention C has so high particle strength as to generate little amount of fine powder even upon physical impact and, when used as a negative electrode active material, can provide a non-aqueous secondary battery, particularly, a lithium secondary battery, having a capacity as high as 355 mAh/g or more and excellent input-output characteristics and excellent cycle characteristics.

The reason why using the carbon material of Invention C as a negative electrode active material can provide a non-aqueous secondary battery, particularly, a lithium ion secondary battery, having excellent input-output characteristics and excellent cycle characteristics is probably as follows:

When an electrode plate is formed using a carbon material as a negative electrode active material, step (A) of preparing a slurry by kneading the carbon material with a binder and other materials and step (B) of increasing the density by applying the slurry to a current collector, drying the slurry, and further applying a pressure, for example, with a roll press are typically employed. In step (A) of preparing a slurry, it is necessary to sufficiently knead the carbon material with a binder and other materials in order to bond the binder to the particle surface of the carbon material. During the kneading, the carbon material experiences a mechanical stress. Also in step (B) of increasing the density, the carbon material experiences a mechanical stress. These stresses can cause the carbon material, for example, to fracture to generate fine powder. Even if the fine powder is apparently in contact with parent particles of the carbon material after the formation of an electrode plate, when the electrode plate is used as a negative electrode of a non-aqueous secondary battery, the fine powder readily separates from the parent particles of the carbon material during charging and discharging in initial conditioning. This leads to (i) an increase in resistance between the particles due to a conductive path break (reduction in electrical conductivity) or (ii) an increase in resistance due to increased side reactions (film formation) by an increased contact area with an electrolyte solution, which presumably causes degradation of input-output characteristics.

When a non-aqueous secondary battery is charged, ions such as lithium ions are inserted into carbon material particles, a negative electrode active material, to swell the particles, and when the non-aqueous secondary battery is discharged, the ions are extracted from the carbon material particles to shrink the carbon material particles. Non-aqueous secondary batteries are rechargeable batteries, and carbon material particles repeatedly swell and shrink upon repeated charging and discharging. In this swelling and shrinking of the carbon material particles, fine powder is separated and isolated from parent particles of the carbon material and stops contributing to charging and discharging, which presumably causes a reduction in battery capacity. This separated and isolated fine powder tends to increase as charging and discharging is repeated, which presumably results in degradation in cycle characteristics.

The carbon material for a non-aqueous secondary battery of Invention C satisfies inequality (1C): $Q_{5min}$ (%)/D50 (μm)≤3.5, where $Q_{5min}$ (%) is a frequency (%) of particles with a diameter of 5 μm or less measured using a flow-type particle image analyzer after the carbon material has been irradiated with ultrasonic waves of 28 kHz at a power of 60 W for 5 minutes, and D50 (μm) is a volume-based median diameter determined by laser diffraction/scattering after the carbon material has been irradiated with ultrasonic waves of 28 kHz at a power of 60 W for 1 minute. This means that the carbon material has a high particle strength and generates little amount of fine powder when a mechanical stress, such as a physical impact, is applied. That is to say, little amount of fine powder is generated in the above step (A) of preparing a slurry and step (B) of increasing the density. Thus, using the carbon material of the present invention as a negative electrode active material provides a non-aqueous secondary battery (particularly, a lithium ion secondary battery) that experiences less reduction in electrical conductivity and less increase in side reaction and has excellent input-output characteristics. Furthermore, the carbon material of the present invention, for its high particle strength, generates little amount of separated and isolated fine powder upon repeated charging and discharging and, in turn, is unlikely to experience a reduction in electrical conductivity, thus providing a non-aqueous secondary battery (lithium ion secondary battery) having excellent cycle characteristics.

The carbon material of Invention D, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention D is due to the following reason.

Specifically, the carbon material according to Invention D, as compared with traditional carbon materials containing carbonaceous materials on particle surfaces, has a high tap density despite its large specific surface area (SA) ($m^2/g$), as determined by BET method. Thus, the carbon material according to Invention D allows Li-ion insertion/extraction sites to be used over an extensive area and is excellent in filling properties of a negative electrode, thus providing a carbon material for a battery having good low-temperature output characteristics and a high capacity.

The carbon material of Invention E, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention E is due to the following reason.

The carbon material according to Invention E, as compared with traditional carbon materials containing carbonaceous materials on particle surfaces, has a large specific surface area (SA), as determined by BET method, and thus allows Li-ion insertion/extraction sites to be used over an extensive area. Despite the large specific surface area (SA), as determined by BET method, the carbon material according to Invention E has a low true density (i.e., contains a high proportion of low-crystallinity carbonaceous material components), and thus provides good insertion/extraction of Li ions. That is to say, a carbon material for a non-aqueous secondary battery that combines an improvement in input-output characteristics due to its specific surface area and an improvement in input-output characteristics due to its low-crystallinity carbonaceous material can be provided.

The composite carbon material of Invention F, when used as a negative electrode active material for a non-aqueous secondary battery, can provide a non-aqueous secondary battery having a high capacity and good low-temperature output characteristics and cycle characteristics.

The inventors believe that the above effect of the composite carbon material according to Invention F is due to the following reason.

Specifically, the average value of microscopic Raman R values of 30 randomly selected composite carbon materials of 0.1 to 0.85 and the standard deviation ($\sigma_R$) of 0.1 or less means that the composite carbon material uniformly contains, on the surface of the carbon material (A), a low-crystallinity carbonaceous material into and from which Li ions are readily inserted and extracted. This inhibits a concentrated excessive current flow into a specific site on the carbon material (A) into and from which Li ions are readily inserted and extracted and enables uniform and smooth insertion/extraction of Li ions even at low temperatures and during high-current charging and discharging, thus providing a high capacity and excellent low-temperature output characteristics and cycle characteristics.

The carbon material of Invention G, when used as a negative electrode active material for a non-aqueous secondary battery, can provide a non-aqueous secondary battery having a capacity as high as 355 mAh/g or more and excellent low-temperature output characteristics.

The inventors believe that the above effect of the carbon material according to Invention G is due to the following reason.

The investigation by the present inventors has shown that the cumulative pore volume at pore diameters in a range of 2 to 4 nm larger than a specific value increases the number of lithium-ion insertion/extraction sites on the carbon material, which promotes the lithium insertion/extraction reaction on the carbon material surface during charging and discharging to improve low-temperature output characteristics. In addition, the tap density of 0.83 g/cm$^3$ or more smoothens the movement of electrolyte solution between particles to improve input-output characteristics.

The carbon material of Invention H, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention H is due to the following reason.

Specifically, having a Raman R value in the above range means that the carbon material has a moderately disordered surface crystal structure and a sufficient number of Li-ion insertion/extraction sites. Having a thermal weight loss ratio per unit area (ΔTG/SA) in the above range means that the number of labile carbons, which are carbons prone to thermal oxidation, is moderately small. This enables Li ions to smoothly move without being impeded during charging and discharging. Thus, despite the moderately disordered surface crystal structure, the moderately small number of labile carbons, which are carbons prone to thermal oxidation, enables Li ions to smoothly move without being impeded during charging and discharging despite the sufficient number of Li-ion insertion/extraction sites, thus providing a high capacity and good low-temperature output characteristics.

The carbon material of Invention I, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention I is due to the following reason.

Specifically, having $Y_i$ (oxygen functional group dispersity given by the above equation (2I)) and $X_i$ (volume-based average particle diameter (d50) (μm)) in the above ranges means that oxygen functional groups are not maldistributed on the particle surface and dispersed also in the particles. The presence of oxygen functional groups at graphite crystal edge portions that functions as Li-ion insertion/extraction sites suggests that the carbon material of Invention I has a moderate number of Li-ion insertion/extraction sites not only on but also in the particles. This enables efficient Li-ion insertion/extraction also in the particles, thus providing a high capacity and good low-temperature output characteristics.

The production method of Invention J can provide composite particles for a non-aqueous secondary battery, comprising spheroidally granulated graphite particles having a structure in which fine powder having a great number of Li-ion insertion/extraction sites exists on and in the particles, the graphite particles being uniformly coated with a carbonaceous material. The composite particles, when used as a negative electrode active material for a non-aqueous secondary battery, can provide a non-aqueous secondary battery having a high capacity and excellent low-temperature output characteristics and high-temperature storage characteristics.

The inventors believe that the above effect of the production method according to Invention J is due to the following reason.

As a result of the addition of a granulating agent, the liquid adheres between particles to form liquid bridges (a phenomenon where bridges are built between the particles by the liquid). An attractive force caused by the capillary negative pressure in the liquid bridges and the surface tension of the liquid acts as a liquid cross-linking adhesive force between the particles to increase the liquid cross-linking adhesion between the raw carbon materials (hereinafter also referred to as raw graphites), allowing the raw graphites to adhere more firmly to each other. In addition, the granulating agent acts as a lubricant to reduce the generation of fine powder from the raw graphites. Furthermore, most of the fine powder generated during the granulation step adhere to the raw graphites due to the increased liquid cross-linking adhesive force, which leads to reduced independent fine powder particles. These effects enable the production of spheroidized graphite particles that include raw graphite adhering more firmly to each other, have a moderately increased particle diameter and a high degree of spheroidization, and generate little amount of fine powder.

The composite particles produced by the method of Invention J has a structure in which fine powder having a great number of Li-ion insertion/extraction sites exists on and in the particles. Furthermore, the structure formed by the granulation of a plurality of raw graphites enables effective and efficient use of the Li-ion insertion/extraction sites in the particles as well as on the periphery of the particles.

Furthermore, in mixing the resulting granulated graphite particles with an organic compound, serving as a carbonaceous material precursor, and heat-treating the resulting mixture to obtain composite particles containing graphite particles and a carbonaceous material, selecting an organic compound, serving as a carbonaceous material precursor, and a granulating agent having a good affinity with each other allows the organic compound, serving as a carbonaceous material precursor, to be uniformly deposited on the surface of the granulated graphite. This enables the carbonaceous material suitable for Li-ion insertion/extraction to uniformly cover the composite particle surface to prevent the exposure of the granulated graphite surface.

As a result, the composite particles obtained by Invention J, when used for a non-aqueous secondary battery, can provide a high capacity and excellent input-output characteristics and high-temperature storage characteristics.

The carbon material of Invention K, when used as a negative electrode active material for a non-aqueous secondary battery, can provide a non-aqueous secondary battery having a high capacity and good low-temperature output characteristics and cycle characteristics.

The inventors believe that the above effect of the carbon material according to Invention K is presumably due to the following reason.

True density is an indicator of crystallinity of carbon materials. As the true density of a carbon material decreases and gets away from its theoretical value, the crystallinity lowers, and thus the particles of the carbon material will probably get harder, resulting in low filling properties under a specific load.

The density under a specific load minus a tap density will probably be an indicator that reflects the surface slidability and the particle strength of a carbon material under a specific load.

Specifically, having a true density and a density under a specific load minus a tap density in a specific relationship means that the carbon material of Invention K, as compared with traditional carbon materials having comparable crystallinities, undergoes less particle fracture and is easier to fill, leading to reduced particle fracture in pressing an electrode. This reduces the separation of amorphous carbon covering at least part of the carbon material during the pressing and enables filling to a predetermined density while maintaining lithium insertion/extraction sites derived from amorphous carbon and the particle shape, thus providing a high capacity and good low-temperature output characteristics.

The carbon material of Inventions L, when used as a negative electrode active material for a non-aqueous secondary battery, can provide a non-aqueous secondary battery having a high capacity and good low-temperature output characteristics and cycle characteristics.

The inventors believe that the above effects of the carbon materials according to Inventions L ($L^1$ to $L^3$) are presumably due to the following reason.

Specifically, fining intra-particle pores ($L^1$), uniformly dispersing intra-particle pores ($L^2$), or controlling the orientation of and the interval between intra-particle voids ($L^3$) allows an electrolyte solution to be smoothly and efficiently distributed into the particles. This enables effective and efficient use of Li-ion insertion/extraction sites in the particles as well as on the periphery of the particles during charging and discharging, thus providing a high capacity and good low-temperature output characteristics.

MODE FOR CARRYING OUT THE INVENTION

Figure 1:
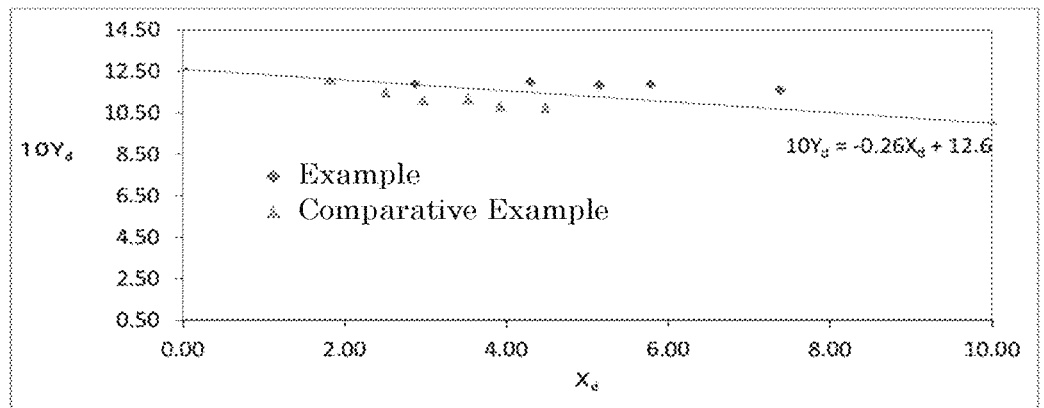
FIG. 1 is a graph showing the relationship between $X_d$ and $10Y_d$ of fourth Examples and Comparative Examples. Points of ($X_d$, $10Y_d$): Example D1, (7.38, 1.16); Example D2, (5.79, 1.19); Example D3, (5.15, 1.18); Example D4, (4.30, 1.20); Example D5, (2.88, 1.19); Comparative Example D1, (3.92, 1.08); Comparative Example D2, (2.97, 1.11); Comparative Example D3, (3.53, 1.11); Comparative Example D4, (2.51, 1.15); Comparative Example D5, (4.48, 1.07); Comparative Example D6, (1.82, 1.21)
Figure 2:
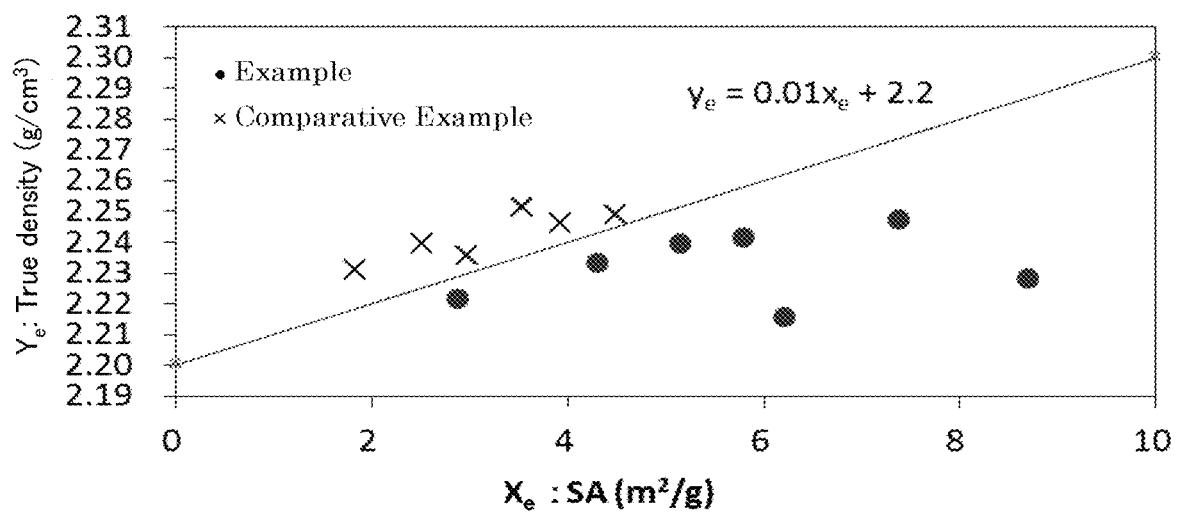
FIG. 2 is a graph showing the relationship between $X_e$ and $Y_e$ of fifth Examples and Comparative Examples. Points of ($X_e$, $Y_e$): Example E1, (7.38, 2.25); Example E2, (5.79, 2.24); Example E3, (5.15, 2.24); Example E4, (4.30, 2.23); Example E5, (2.88, 2.22); Example E6, (8.69, 2.23); Example E7, (6.21, 2.22); Comparative Example E1, (3.92, 2.25); Comparative Example E2, (2.97, 2.24); Comparative Example E3, (3.53, 2.25); Comparative Example E4, (2.51, 2.24); Comparative Example E5, (4.48, 2.25); Comparative Example E6, (1.82, 2.23)
Figure 3:
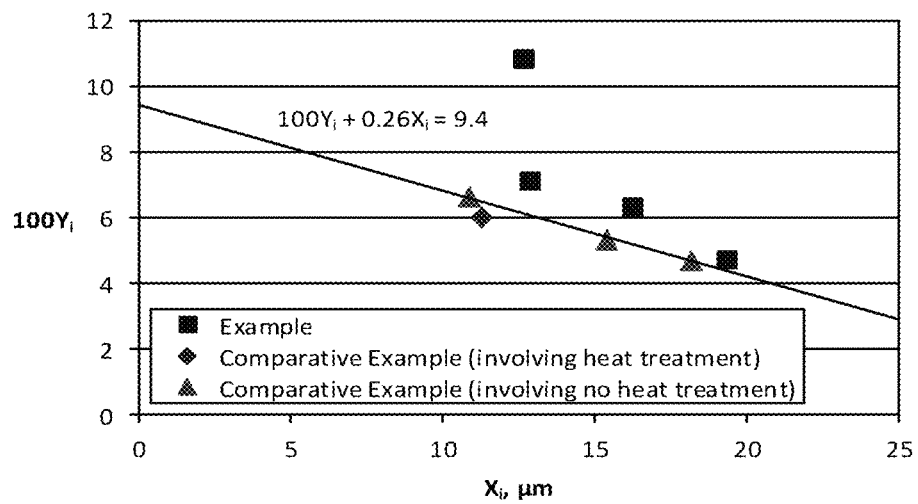
FIG. 3 is a graph showing the relationship between $X_i$ and $Y_i$ of ninth Examples and Comparative Examples. Points of ($X_i$, $Y_i$): Example I1, (12.7, 0.108); Example I2, (12.9, 0.071); Example I3, (16.3, 0.063); Example I4, (19.4, 0.047); Comparative Example I1, (10.9, 0.066); Comparative Example I2, (11.3, 0.060); Comparative Example I3, (15.4, 0.053); Comparative Example I4, (18.2, 0.047)
Figure 4:
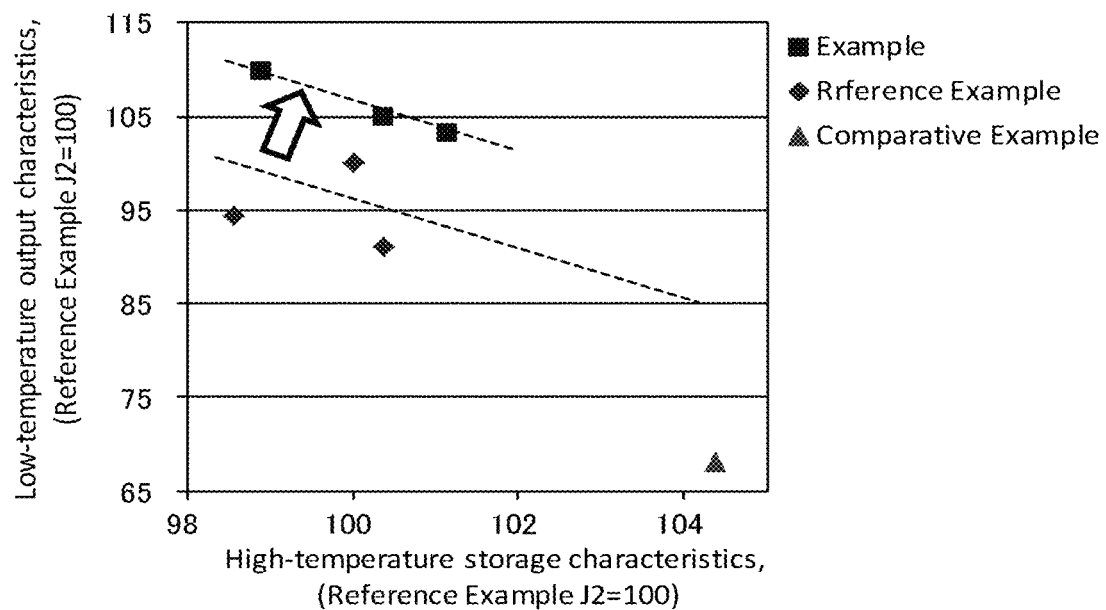
FIG. 4 is a graph showing the relationship between high-temperature storage characteristics and low-temperature output characteristics of tenth Examples and Comparative Examples. Points of (high-temperature storage characteristics, low-temperature output characteristics): Example J1, (98.9, 109.9); Example J2, (100.4, 104.8); Example J3, (101.1, 103.1); Reference Example J1, (98.6, 94.4); Reference Example J2, (100.0, 100.0); Reference Example J3, (100.4, 91.2); Comparative Example J1, (104.4, 68.1)
Figure 5:
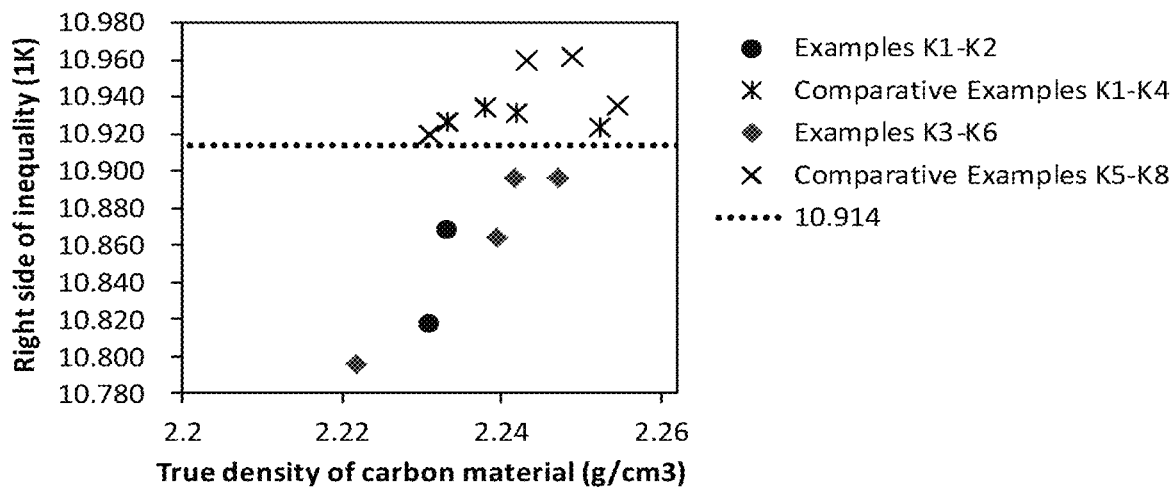
FIG. 5 is a graph showing the relationship between inequality (1K) and true density of eleventh Examples and Comparative Examples. The results of Example K1 to 6 and Comparative Example K1 to K8 are shown with the right side of inequality (1K) plotted on the vertical axis and the true density of a carbon material on the horizontal axis.
Figure 6:
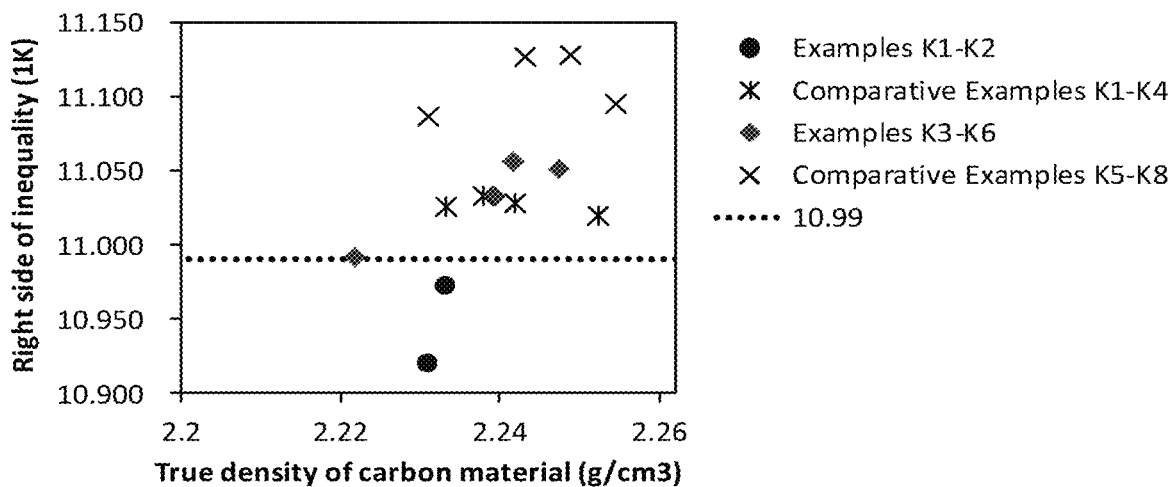
FIG. 6 is a graph showing the relationship between inequality (3K) and true density of eleventh Examples and Comparative Examples. The results of Example K1 to 6 and Comparative Example K1 to K8 are shown with the right side of inequality (3K) plotted on the vertical axis and the true density of a carbon material on the horizontal axis.

The present invention will now be described in detail. It should be appreciated that the following description of the features of the invention is one aspect (a typical example) of the present invention, and other variations may be applied without departing from the spirit of the invention.

One embodiment of the carbon material for a non-aqueous secondary battery according to the present invention is a carbon material for a non-aqueous secondary battery, comprising a graphite capable of occluding and releasing lithium ions, the carbon material having a cumulative pore volume at pore diameters in a range of 0.01 μm to 1 μm of 0.08 mL/g or more, a roundness, as determined by flow-type particle image analysis, of 0.88 or greater, and a pore diameter to particle diameter ratio (PD/d50(%)) of 1.8 or less, the ratio being given by equation (1A):

$PD/d50(\%)$=mode pore diameter ($PD$) in a pore diameter range of 0.01 μm to 1 μm in a pore distribution determined by mercury intrusion/volume-based average particle diameter ($d50$)× 100    (1A).

Another embodiment is a carbon material for a non-aqueous secondary battery capable of occluding and releasing lithium ions, the carbon material being formed from a plurality of graphite particles without being pressed and having a pore diameter to particle diameter ratio (PD/d50 (%)) of 1.8 or less, the ratio being given by equation (1A):

PD/d50(%)=mode pore diameter (PD) in a range of 0.01 μm to 1 μm in a pore distribution determined by mercury intrusion/volume-based average particle diameter (d50)×100   (1A).

"Without being pressed" means not being pressed to the extent that the density or the isotropy of the graphite particles is increased. Specifically, for example, the pressure may be 50 kgf/cm$^2$ or more, 100 kgf/cm$^2$ or more, or 200 kgf/cm$^2$ or more.

Types of Carbon Material for Non-Aqueous Secondary Battery

Examples of the carbon material for a non-aqueous secondary battery capable of occluding and releasing lithium ions according to the present invention include, but are not limited to, graphites, amorphous carbons, and carbonaceous materials with low degrees of graphitization. Of these, graphites are preferred because it is commercially readily available, has, theoretically, a charge-discharge capacity as high as 372 mAh/g, and, further, is more effective in improving high-current-density charge-discharge characteristics as compared with other negative electrode active materials. Graphites having low impurity contents are preferred, and, if necessary, various known purification treatments may be carried out before use. Examples of graphites include natural graphites and artificial graphites, and natural graphites, which have high capacities and good high-current-density charge-discharge characteristics, are more preferred.

These may be coated with a carbonaceous material, for example, an amorphous carbon or a graphitized carbon. In the present invention, these graphites may be used alone or in combination.

Examples of amorphous carbons include particles obtained by burning a bulk mesophase and particles obtained by infusibilizing and burning a carbon precursor.

Examples of carbonaceous material particles with low degrees of graphitization include those obtained by burning organic substances typically at a temperature lower than 2,500° C. Examples of organic substances include coal-derived heavy oils, such as coal-tar pitch and dry distillation/liquefaction oil; straight-run heavy oils, such as atmospheric residues and vacuum residues; petroleum-derived heavy oils such as heavy oils resulting from cracking, such as ethylene tar produced as a by-product of thermal cracking of crude oil, naphtha, or other oils; aromatic hydrocarbons, such as acenaphthylene, decacyclene, and anthracene; nitrogen-containing cyclic compounds, such as phenazine and acridine; sulfur-containing cyclic compounds, such as thiophene; aliphatic cyclic compounds, such as adamantane; and thermoplastic polymers, including polyphenylenes, such as biphenyl and terphenyl, polyvinyl esters, such as polyvinyl chloride, polyvinyl acetate, and polyvinyl butyral, and polyvinyl alcohols.

Depending on the degree of graphitization of the carbonaceous material particles, the burning temperature may be 600° C. or higher, preferably 900° C. or higher, more preferably 950° C. or higher, and may be typically in the range of lower than 2,500° C., preferably 2,000° C. or lower, more preferably 1,400° C. or lower.

In burning, the organic substance may be mixed with acids, such as phosphoric acid, boric acid, and hydrochloric acid, and alkalis, such as sodium hydroxide.

Examples of artificial graphites include those obtained by burning and graphitizing organic substances such as coal-tar pitch, coal-derived heavy oils, atmospheric residues, petroleum-derived heavy oils, aromatic hydrocarbons, nitrogen-containing cyclic compounds, sulfur-containing cyclic compounds, polyphenylenes, polyvinyl chlorides, polyvinyl alcohols, polyacrylonitriles, polyvinyl butyrals, natural polymers, polyphenylene sulfides, polyphenylene oxides, furfuryl alcohol resins, phenol-formaldehyde resins, and imide resins.

The burning temperature may be in the range of 2,500° C. to 3,200° C., and in burning, a silicon-containing compound, a boron-containing compound, or other compounds may be used as a graphitizing catalyst.

Natural graphites are classified into flake graphite, crystalline graphite, vein graphite, and amorphous graphite depending on their properties (see "Encyclopedia of powder process industry and technology" (Industrial Technology Center, 1974), Section "Graphite", and "HANDBOOK OF CARBON, GRAPHITE, DIAMOND AND FULLERENES" (published by NoyesPubLications)). Crystalline graphite and vein graphite have highest degrees of graphitization of 100%, and flake graphite has a next highest degree of graphitization of 99.9%. Graphites having higher degrees of graphitization are more suitable for the present invention. In particular, those having low impurity contents are preferred, and, if necessary, various known purification treatments may be carried out before use.

Natural graphites are produced in Madagascar, China, Brazil, Ukraine, Canada, and other districts. Among natural graphites, crystalline graphite is mainly produced in Sri Lanka, and amorphous graphite is mainly produced in the Korean Peninsula, China, Mexico, and other districts.

Among natural graphites, for example, crystalline, flake, and vein natural graphites, highly purified flake graphite, and natural graphite subjected to spheroidization described below (hereinafter referred to as spheroidized natural graphite) are preferred. Of these, in an embodiment of the present invention, spheroidized natural graphite is most preferred because it can form favorable fine pores in a carbon material to provide excellent particle-filling properties and charge-discharge load characteristics.

For carbon materials for non-aqueous secondary batteries, use may also be made of natural graphite or artificial graphite particles coated with an amorphous carbon and/or a graphite material having a low degree of graphitization. In addition, oxides and other metals may be contained. Examples of other metals include metals capable of forming alloys with Li, such as Sn, Si, Al, and Bi.

Method for Producing Carbon Material for Non-Aqueous Secondary Battery

In one embodiment, the carbon material of the present invention can be produced, for example, by spheroidizing a flake natural graphite whose particle size has been adjusted to a d50 of 80 μm or less while depositing and/or incorporating fine powder generated during the spheroidization (granulation) on and/or into a base material, the graphite that has been subjected to spheroidization (hereinafter also referred to as spheroidized graphite). Specifically, the carbon material is preferably produced by a method for producing a carbon material for a non-aqueous secondary battery, comprising a granulation step of granulating a raw carbon material by applying at least one type of mechanical energy selected from impact, compression, friction, and shear force, the granulation step being carried out in the presence of a granulating agent that satisfies conditions 1) and 2):
1) being liquid during the step of granulating the raw carbon material; and
2) in the granulating agent, no organic solvent is contained, or if contained, at least one of the organic solvents has no flash point or a flash point of 5° C. or higher.

In another embodiment, the carbon material of the present invention can be produced by a method for producing composite particles for a non-aqueous secondary battery comprising a granulated carbon material and a carbonaceous material having lower crystallinity than the granulated carbon material, the method comprising the steps of 1) and 2):
1) applying at least one type of mechanical energy selected from impact, compression, friction, and shear force in the presence of a granulating agent having an aniline point of 80° C. or lower or no aniline point to granulate a raw carbon material; and
2) mixing the granulated carbon material obtained in 1) with an organic compound, serving as a carbonaceous material precursor, and heat-treating the mixture.

As long as the granulation step is included, the method may optionally include other steps. The other steps may be carried out individually or simultaneously. One embodiment includes the following 1st step to 6th step.
1st step: adjusting the particle size of a raw carbon material
2nd step: mixing the raw carbon material with a granulating agent
3rd step: granulating the raw carbon material
4th step: removing the granulating agent
5th step: increasing the purity of the granulated carbon material
5'th step: increasing the crystallinity of the granulated carbon material
6th step: depositing a carbonaceous material having lower crystallinity than the raw carbon material on the granulated carbon material These steps will be described below.

1st Step: Adjusting Particle Size of Raw Carbon Material

In the present invention, any raw carbon material may be used, and artificial graphites and natural graphites described above can be used. In particular, natural graphites, which have high crystallinity and high capacities, are suitable for use.

Examples of natural graphites include crystalline, flake, vein, and plate-like natural graphites, among which flake graphite is preferred.

The raw carbon material such as a flake graphite obtained through the 1st step, which is used as a raw material of a spheroidized graphite, has an average particle diameter (volume-based median diameter: d50) of preferably 1 μm or more, more preferably 2 μm or more, still more preferably 3 μm or more, preferably 80 μm or less, more preferably 50 μm or less, still more preferably 35 μm or less, very preferably 20 μm or less, particularly preferably 10 μm or less, most preferably 8 μm or less. The average particle diameter can be determined by the method described below.

An average particle diameter in this range can prevent the increase in irreversible capacity and the degradation of cycle characteristics and strictly control the intra-particle void structure of the spheroidized graphite. This allows an electrolyte solution to be efficiently distributed into intra-particle voids and enables the efficient use of Li-ion insertion/extraction sites in the particles, as a result of which low-temperature output characteristics and cycle characteristics tend to improve. Furthermore, such an average particle diameter can adjust the roundness of the spheroidized graphite to be high and thus allows an electrolyte solution to smoothly move in intra-particle voids with no increase in flection of Li-ion diffusivity, leading to improved fast charge-discharge characteristics.

Furthermore, an average particle diameter in the above range enables performing granulation while depositing or incorporating the fine powder generated during the granulation step on or into a base material, the granulated graphite (hereinafter referred to as granulated carbon material), thus providing a granulated carbon material that has a high degree of spheroidization and generates little amount of fine powder.

The average particle diameter (d50) of the raw carbon material can be adjusted to be in the above range, for example, by crushing and/or classifying (natural) graphite particles.

Examples of apparatuses for use in crushing include, but are not limited to, coarse crushers, such as shear mills, jaw crushers, impact crushers, and cone crushers; intermediate crushers, such as roll crushers and hammer mills; and fine crushers, such as mechanical crushers, air-flow crushers, and swirl-flow crushers. Specific examples include ball mills, vibration mills, pin mills, agitation mills, jet mills, cyclone mills, and turbo mills. In particular, when graphite particles of 10 μm or less are produced, air-flow crushers and swirl-flow crushers are suitable for use.

In classification, any apparatuses can be used. In the case of dry sieving, a rotary sieve, a shaking sieve, a gyratory sieve, a vibratory sieve, or other sieves can be used. In the case of dry air-flow classification, a gravity classifier, an inertia classifier, or a centrifugal classifier (e.g., a classifier or a cyclone) can be used. In the case of wet sieving, a mechanical wet classifier, a hydraulic classifier, a sedimentation classifier, a centrifugal wet classifier, or other classifiers can be used.

The raw carbon material obtained through the 1st step preferably has physical properties as described below.

The ash content of the raw carbon material is preferably 1% by mass or less, more preferably 0.5% by mass or less, still more preferably 0.1% by mass or less, based on the total mass of the raw carbon material. The ash content is preferably at least 1 ppm.

An ash content in this range can provide a non-aqueous secondary battery that undergoes only negligible degradation of battery performance due to the reaction between carbon material and electrolyte solution during charging and discharging. In addition, such an ash content does not require much time or energy to produce a carbon material and eliminates the need for equipment for preventing contamination, thus reducing the increase in cost.

The raw carbon material has an aspect ratio of preferably 3 or greater, more preferably 5 or greater, still more preferably 10 or greater, particularly preferably 15 or greater, and preferably 1,000 or less, more preferably 500 or less, still more preferably 100 or less, particularly preferably 50 or less. The aspect ratio is determined by the method described below. An aspect ratio in this range is less likely to yield large particles having a particle diameter of approximately 100 μm and, on the other hand, more likely to yield a robust granulated carbon material because a moderate contact area is provided when pressure is applied from one direction. An excessively high aspect ratio tends to yield large particles having a particle diameter of approximately 100 μm. Excessively small particles tend to fail to form robust granulated particles because a small contact area is provided when pressure is applied from one direction, and if the particles are granulated, the granulated particles tend to have a specific surface area of more than 30 m²/g reflecting the small specific surface area of flake graphite.

For an interplanar spacing of the (002) plane ($d_{002}$) and a crystallite size (Lc), as determined by wide-angle X-ray diffractometry, of the raw carbon material, typically, ($d_{002}$) is 3.37 angstroms or less, and (Lc) is 900 angstroms or more; preferably, ($d_{002}$) is 3.36 angstroms or less, and (Lc) is 950 angstroms or more. The interplanar spacing ($d_{002}$) and the crystallite size (Lc) are indicators of the crystallinity of a carbon material bulk. As the interplanar spacing of the (002) plane ($d_{002}$) decreases and the crystallite size (Lc) increases, the crystallinity of the carbon material increases, and the amount of lithium that enters between graphite layers comes closer to the theoretical value to increase the capacity. When the crystallinity is low, excellent battery characteristics (a high capacity and a low irreversible capacity) that are exhibited when a high-crystallinity graphite is used as an electrode are not exhibited. Particularly preferably, the interplanar spacing ($d_{002}$) and the crystallite size (Lc) are both in the above ranges.

The X-ray diffraction is carried out as follows: using a mixture of carbon powder and X-ray standard high-purity silicon powder in an amount of about 15% by mass based on the total mass as a sample and a CuKα radiation monochromatized with a graphite monochromator as a radiation source, a wide-angle X-ray diffractometry curve is obtained by reflection diffractometry. After that, the method of the Japan Society for Promotion of Scientific Research is used to determine an interplanar spacing ($d_{002}$) and a crystallite size (Lc).

The packed structure of the raw carbon material varies depending on the size and shape of particles, the degree of interactivity between particles, and other factors, and in this specification, tap density can be used as an indicator for quantitatively discussing the packed structure. The investigation by the present inventors has revealed that in the case of lead particles having substantially the same true density and average particle diameter, the tap density increases as the shape comes closer to spheroidal and the particle surface becomes flat. In other words, to increase the tap density, it is important that the particle shape be rounded and closer to spheroidal, and the particle surface be made free from frays and chips and kept flat. A particle shape closer to spheroidal and a flat particle surface significantly improves powder filling properties. The tap density of the raw carbon material is preferably 0.1 g/cm³ or more, more preferably 0.15 g/cm³ or more, still more preferably 0.2 g/cm³ or more, particularly preferably 0.3 g/cm³ or more. The tap density is determined by the method described below in Examples.

The argon-ion laser Raman spectrum of the raw carbon material is used as an indicator of conditions of a particle surface. The Raman R value, a ratio of peak intensity near 1,360 cm⁻¹ to peak intensity near 1,580 cm⁻¹ in the argon-ion laser Raman spectrum of the raw carbon material, is preferably 0.05 to 0.9, more preferably 0.05 to 0.7, still more preferably 0.05 to 0.5. The Raman R value is an indicator of the crystallinity near the surface (from the particle surface to a depth of about 100 angstroms) of a carbon particle, and smaller Raman R values indicate higher crystallinities or less disordered crystalline states. The Raman spectrum is measured by the method described below. Specifically, a sample is loaded by gravity-dropping target particles into a measuring cell of a Raman spectroscope, and the measuring cell is irradiated with an argon-ion laser beam while being rotated in a plane perpendicular to the laser beam. The wavelength of the argon-ion laser beam is 514.5 nm.

The wide-angle X-ray diffractometry of the raw carbon material is used as an indicator of the crystallinity of the whole particle. The 3R/2H ratio of intensity 3R (101) of the (101) plane based on a rhombohedral crystal structure to intensity 2H (101) of the (101) plane based on a hexagonal crystal structure, as determined by wide-angle X-ray diffractometry, of the flake graphite is preferably 0.1 or greater, more preferably 0.15 or greater, still more preferably 0.2 or greater. The rhombohedral crystal structure is a crystal form in which network structures of a graphite are stacked on top of each other at every three layers. The hexagonal crystal structure is a crystal form in which network structures of a graphite are stacked on top of each other at every two layers. A flake graphite having a crystal form containing a high proportion of rhombohedral crystal structures 3R has high Li-ion receiving properties as compared with a graphite containing a low proportion of rhombohedral crystal structures 3R.

The raw carbon material has a specific surface area as measured by BET method of preferably 0.3 m²/g or more, more preferably 0.5 m²/g or more, still more preferably 1 m²/g or more, particularly preferably 2 m²/g or more, most preferably 5 m²/g or more, and preferably 30 m²/g or less, more preferably 20 m²/g or less, still more preferably 15 m²/g or less. The specific surface area as measured by BET method is determined by the method in Examples below. A specific surface area of the raw carbon material in this range improves the Li-ion receiving properties, which can prevent the decrease in battery capacity due to the increase in irreversible capacity. An excessively small specific surface area of the flake graphite reduces the Li-ion receiving properties, and an excessively large specific surface area tends to fail to prevent the decrease in battery capacity due to the increase in irreversible capacity.

The water content of the raw carbon material (raw graphite) of a granulated carbon material is preferably 1% by mass or less, more preferably 0.5% by mass or less, still more preferably 0.1% by mass or less, particularly preferably 0.05% by mass or less, most preferably 0.01% by mass or less, based on the total mass of the raw graphite. The water content is preferably at least 1 ppm. The water content can be determined, for example, by a method in accordance with JIS M8811. A water content in this range advantageously increases the interparticle electrostatic attraction during spheroidization, leading to increased interparticle adhesion, which facilitates the deposition of fine powder on a base material and the incorporation of fine powder into spheroidized particles. In addition, such a water content can prevent the decrease in wettability when a hydrophobic granulating agent is used.

To adjust the water content of the raw carbon material (raw graphite) of a granulated carbon material to be in the above range, a drying treatment may optionally be performed. The drying treatment is carried out typically at 60° C. or higher, preferably 100° C. or higher, more preferably 200° C. or higher, still more preferably 250° C. or higher, particularly preferably 300° C. or higher, most preferably 350° C. or higher, and typically 1,500° C. or lower, preferably 1,000° C. or lower, more preferably 800° C. or lower, still more preferably 600° C. or lower. An excessively low temperature tends to fail to sufficiently reduce the water content, and an excessively high temperature tends to lead to reduced productivity and increased cost.

The drying treatment is carried out typically for 0.5 to 48 hours, preferably 1 to 40 hours, more preferably 2 to 30 hours, still more preferably 3 to 24 hours. An excessively long time tends to lead to reduced productivity, and an excessively short time tends to fail to fully exert a heat treatment effect.

The atmosphere in the heat treatment may be an active atmosphere, such as an air atmosphere, or an inert atmosphere, such as a nitrogen atmosphere or an argon atmosphere. When the heat treatment is carried out at 200° C. to 300° C., there is no particular restriction, but when the heat treatment is carried out at 300° C. or higher, it is preferable to use an inert atmosphere, such as a nitrogen atmosphere or an argon atmosphere, to prevent the oxidation of the graphite surface.

The surface functional group amount O/C value (%), as determined by XPS, of the flake graphite, a raw carbon material which is used as a raw material of a spheroidized graphite, is preferably 0.01 or greater, more preferably 0.1 or greater, still more preferably 0.3 or greater, particularly preferably 0.5 or greater, preferably 5 or less, more preferably 3 or less, still more preferably 2.5 or less, particularly preferably 2 or less, most preferably 1.5 or less. An O/C value in this range advantageously reduces hygroscopicity, making it easy to keep the particles dry, and increases the interparticle electrostatic attraction during spheroidization, leading to increased interparticle adhesion, which facilitates the deposition of fine powder on a base material and the incorporation of fine powder into spheroidized particles.

2nd Step: Mixing Raw Carbon Material with Granulating Agent

The granulating agent for use in one embodiment of the present invention satisfies conditions 1) being liquid during the step of granulating the raw carbon material, and 2) in the granulating agent, no organic solvent is contained, or if contained, at least one of the organic solvents has no flash point or a flash point of 5° C. or higher.

In the subsequent 3rd step of granulating the raw carbon material, the granulating agent satisfying these conditions forms liquid bridges between the raw carbon materials, whereby an attractive force caused by the capillary negative pressure in the liquid bridges and the surface tension of the liquid acts as a liquid cross-linking adhesive force between the particles to increase the liquid cross-linking adhesion between the raw carbon materials, allowing the raw carbon materials to adhere more firmly to each other.

In one embodiment of the present invention, the strength of the liquid cross-linking adhesive force between the raw carbon materials produced by the liquid bridges of the granulating agent between the raw carbon materials is proportional to $\gamma \cos \theta$ value (where $\gamma$ is a surface tension of a liquid, and $\theta$ is a contact angle between the liquid and a particle). That is to say, in granulating the raw carbon material, the granulating agent preferably has higher wettability to the raw carbon material. Specifically, it is preferable to select a granulating agent that satisfies $\cos \theta > 0$ so that $\gamma \cos \theta > 0$ is satisfied, and the granulating agent preferably has a contact angle $\theta$ with a graphite, as measured by the following method, of less than 90°.

Method for Measuring Contact Angle $\theta$ with Graphite

Onto a surface of HOPG, 1.2 µL of a granulating agent is added dropwise, and when wetting and spreading has settled down and a rate of change in contact angle $\theta$ in one second has reached 3% or lower (also referred to as a steady state), the contact angle is measured using a contact angle meter (e.g., DM-501 automatic contact angle meter available from Kyowa Interface Science Co., Ltd). When a granulating agent having a viscosity at 25° C. of 500 cP or lower is used, a value at 25° C. is employed as a measurement of the contact angle $\theta$, and when a granulating agent having a viscosity at 25° C. of higher than 500 cP is used, a value at an increased temperature where the viscosity is not higher than 500 cP is employed.

Furthermore, as the contact angle $\theta$ between the raw carbon material and the granulating agent comes closer to 0°, the $\gamma \cos \theta$ value increases to increase the liquid cross-linking adhesion between the graphite particles, allowing the graphite particles to adhere more firmly to each other. Thus, the contact angle $\theta$ between the granulating agent and the graphite is more preferably 85° or less, still more preferably 80° or less, even more preferably 50° or less, particularly preferably 30° or less, most preferably 20° or less.

Also by using a granulating agent having a high surface tension $\gamma$, the $\gamma \cos \theta$ value is increased to improve the adhesion between the graphite particles, and thus $\gamma$ is preferably 0 or greater, more preferably 15 or greater, still more preferably 30 or greater.

The surface tension $\gamma$ of the granulating agent for use in the present invention is measured by the Wilhelmy method using a surface tensiometer (e.g., DCA-700 available from Kyowa Interface Science Co., Ltd).

A viscous force acts as a resistant to the extension of liquid bridges associated with the movement of particles, and the strength of the viscous force is proportional to viscosity. Thus, the viscosity of the granulating agent, although not limited to any particular value as long as the granulating agent is liquid during the granulation step of granulating the raw carbon material, is preferably 1 cP or more during the granulation step.

In addition, the granulating agent has a viscosity at 25° C. of preferably 1 cP to 100,000 cP, more preferably 5 cP to 10,000 cP, still more preferably 10 cP to 8,000 cP, particularly preferably 50 cP to 6,000 cP. A viscosity in this range can prevent deposited particles from being detached by impact force, such as a collision with a rotor or a casing, in granulating the raw carbon material.

The viscosity of the granulating agent for use in the present invention is measured using a rheometer (e.g., ARES available from Rheometric Scientific) by placing an appropriate amount of a target (in this case, the granulating agent) into a cup and adjusting the temperature to a predetermined temperature. In this specification, the viscosity is defined as a measurement at a shear rate $100\ s^{-1}$, in the case where the shear stress at a shear rate $100\ s^{-1}$ is not less than 0.1 Pa; a measurement at $1,000\ s^{-1}$, in the case where the shear stress at a shear rate $100\ s^{-1}$ is less than 0.1 Pa; and a measurement at a shear rate at which the shear stress is not less than 0.1 Pa, in the case where the shear stress at a shear rate $1,000\ s^{-1}$ is less than 0.1 Pa. The shear stress can be not less than 0.1 Pa also by using a spindle having a shape suitable for low-viscosity fluids.

Furthermore, in the granulating agent for use in one embodiment of the present invention, no organic solvent is contained, or if contained, at least one of the organic solvents has no flash point or a flash point of 5° C. or higher. This can avoid the risk of ignition of the organic compound induced by impact or heat, fire, and explosion in the subsequent 3rd step of granulating the raw carbon material, thus achieving stable and efficient production.

In one aspect of another embodiment of the present invention (e.g., but not limited to, Invention J), the granulating agent for use in this step is preferably a granulating agent having an aniline point of 80° C. or lower or no aniline point.

Granulating Agent Having Aniline Point of 80° C. or Lower or No Aniline Point

Since the solvency for organic compounds increases with decreasing aniline point, the use of a granulating agent satisfying the above requirement improves the affinity for an organic compound, serving as a carbonaceous material precursor, and allows the organic compound, serving as a carbonaceous material precursor, when mixed with granulated graphite particles obtained through this step, to be uniformly deposited on the surface and in the internal voids of the granulated graphite. In particular, the granulating agent for use in the present invention, having an aniline point of 80° C. or lower or no aniline point, has high affinity and compatibility also with an organic compound containing an aromatic compound, for which a granulating agent having a high aniline point has low affinity and poor solvency. Thus, even when such an organic compound containing an aromatic compound is used as a carbonaceous material precursor, the organic compound, serving as a carbonaceous material precursor, when mixed with granulated graphite particles obtained through this step, can be uniformly deposited on the surface and in the internal voids of the granulated graphite.

For example, the aniline point and the mixed aniline point of hydrocarbon compounds tend to decrease in order of paraffinic hydrocarbons, naphthenic hydrocarbons, and aromatic hydrocarbons, and the aniline point and the mixed aniline point tend to decrease with decreasing molecular weight.

The aniline point of the granulating agent is typically 80° C. or lower, preferably 50° C. or lower, more preferably 30° C. or lower, still more preferably 10° C. or lower, particularly preferably 0° C. or lower. For the lower limit, some granulating agents have aniline points lower than their freezing points, that is, have no aniline point. The properties of such granulating agents having no aniline point can be evaluated by their mixed aniline points, and the mixed aniline point is preferably 50° C. or lower, more preferably 30° C. or lower, still more preferably 20° C. or lower, particularly preferably 0° C. or lower.

The aniline point and the mixed aniline point are determined in accordance with JIS K2256. The aniline point is defined as a minimum temperature at which a mixed solution of aniline and a measurement sample (granulating agent) (volume ratio, 1:1) can be in the form of a homogeneous solution (a temperature at which aniline and the measurement sample (granulating agent) completely mixed with each other begin to separate and cause turbidity with decreasing temperature). The mixed aniline point is defined as a minimum temperature at which a mixed solution of aniline, a measurement sample (granulating agent), and heptane (volume ratio, 2:1:1) can be in the form of a homogeneous solution (a temperature at which aniline, the measurement sample (granulating agent), and heptane completely mixed with each other begin to separate and cause turbidity with decreasing temperature).

Examples of granulating agents include coal tar; petroleum-derived heavy oils; synthetic oils, such as paraffinic oils, including liquid paraffin, olefinic oils, naphthenic oils, and aromatic oils; natural oils, such as vegetable oils and fats, animal fats, esters, and higher alcohols; organic compounds such as solutions of resin binders in organic solvents having flash points of 5° C. or higher, preferably 21° C. or higher; aqueous solvents, such as water; and mixtures thereof. Examples of organic solvents having flash points of 5° C. or higher include aromatic hydrocarbons, such as alkylbenzenes, including xylene, isopropylbenzene, ethylbenzene, and propylbenzene, alkylnaphthalenes, including methylnaphthalene, ethylnaphthalene, and propylnaphthalene, allylbenzenes, including styrene, and allylnaphthalenes; aliphatic hydrocarbons, such as octane, nonane, and decane; ketones, such as methyl isobutyl ketone, diisobutyl ketone, and cyclohexanone; esters, such as propyl acetate, butyl acetate, isobutyl acetate, and amyl acetate; alcohols, such as methanol, ethanol, propanol, butanol, isopropyl alcohol, isobutyl alcohol, ethylene glycol, propylene glycol, diethylene glycol, triethylene glycol, tetraethylene glycol, and glycerol; glycol derivatives, such as ethylene glycol monomethyl ether, ethylene glycol monoethyl ether, ethylene glycol monobutyl ether, diethylene glycol monobutyl ether, triethylene glycol monobutyl ether, tetraethylene glycol monobutyl ether, methoxy propanol, methoxy propyl-2-acetate, methoxymethyl butanol, methoxybutyl acetate, diethylene glycol dimethyl ether, dipropylene glycol dimethyl ether, diethylene glycol ethyl methyl ether, triethylene glycol dimethyl ether, tripropylene glycol dimethyl ether, tetraethylene glycol dimethyl ether, and ethylene glycol monophenyl ether; ethers, such as 1,4-dioxane; nitrogen-containing compounds, such as dimethylformamide, pyridine, 2-pyrrolidone, and N-methyl-2-pyrrolidone; sulfur-containing compounds, such as dimethyl sulfoxide; halogen-containing compounds, such as dichloromethane, chloroform, carbon tetrachloride, dichloroethane, trichloroethane, and chlorobenzene; and mixtures thereof, and exclude compounds having low flash points, such as toluene. These organic solvents can be used alone as a granulating agent. In this specification, the flash point can be determined by any known method.

The resin binder may be any known resin binder. For example, use may be made of cellulose resin binders, such as ethylcellulose, methylcellulose, and salts thereof; acrylic resin binders, such as polymethyl acrylate, polyethyl acrylate, polybutyl acrylate, polyacrylic acid, and salts thereof; methacryl resin binders, such as polymethyl methacrylate, polyethyl methacrylate, and polybutyl methacrylate; and phenolic resin binders. Among the granulating agents listed above, coal tar, petroleum-derived heavy oils, paraffinic oils, including liquid paraffin, and aromatic oils are preferred because they have high degrees of spheroidization (roundness) and can provide carbon materials that generate little amount of fine powder.

The granulating agent having an aniline point of 80° C. or lower or no aniline point, for its tendency to have a low aniline point, preferably contains an organic compound having an aromatic and has an average molecular weight of preferably 5,000 or less, more preferably 1,000 or less, still more preferably 700 or less, particularly preferably 500 or less. The aniline point can be adjusted also by introducing a functional group having a hetero element such as oxygen or nitrogen.

More preferably, the granulating agent contains an organic compound having a polycyclic aromatic, such as naphthalene, acenaphthylene, acenaphthene, fluorene, anthracene, phenanthrene, and pyrene, because these compounds are highly interactive with the basal surface of graphite and allow an organic compound, serving as a carbonaceous material precursor, when mixed with granulated graphite particles obtained through this step, to be more uniformly deposited on the surface and in the internal voids of the granulated graphite.

Specific examples include synthetic oils, such as olefinic oils, naphthenic oils, and aromatic oils; natural oils, such as vegetable oils and fats, animal fats, esters, and higher alcohols; coal-derived light oil fractions produced through the distillation of coal tar, such as light oil, carbolic oil, creosote oil, naphthalene oil, and anthracene oil; and mixtures thereof.

Use may also be made of solutions adjusted to have an aniline point of 80° C. or lower by diluting a coal-derived raw oil or a petroleum-derived heavy oil, such as coal tar or pitch, with an organic solvent having a flash point of 5° C. or higher, preferably 21° C. or higher. Examples of the organic solvent having a flash point of 5° C. or higher include the organic solvents listed above, and of these organic solvents, those having an aniline point of 80° C. or lower can be used alone as a granulating agent.

Among the granulating agents having an aniline point of 80° C. or lower or no aniline point listed above, aromatic oils are more preferred because they can provide granulated graphite particles having a high degree of spheroidization and generating little amount of fine powder, have a good affinity for an organic compound, serving as a carbonaceous material precursor, and allow the organic compound, serving as a carbonaceous material precursor, when mixed with granulated graphite particles obtained through this step, to be uniformly deposited on the surface and in the internal voids of the granulated graphite.

The granulating agent preferably has properties that enable efficient removal in the step of removing the granulating agent described below (4th step) and have no adverse effect on battery characteristics such as capacity, input-output characteristics, and storage/cycle characteristics. Specifically, those which undergo a weight loss of typically 50% or more, preferably 80% or more, more preferably 95% or more, still more preferably 99% or more, particularly preferably 99.9% or more, when heated to 700° C. in an inert atmosphere, can be selected as appropriate.

Examples of the method of mixing the raw carbon material and the granulating agent include mixing the raw carbon material with the granulating agent using a mixer or a kneader; mixing the raw carbon material with the granulating agent in the form of a solution of an organic compound in a low-viscosity diluted solvent (organic solvent), and then removing the diluted solvent (organic solvent); and mixing the raw carbon material and the granulating agent placed in a granulator while performing granulation in the subsequent 3rd step of granulating the raw carbon material.

The amount of granulating agent added is preferably 0.1 part by mass or more, more preferably 1 part by mass or more, still more preferably 3 parts by mass or more, even more preferably 6 parts by mass or more, still even more preferably 10 parts by mass or more, particularly preferably 12 parts by mass or more, most preferably 15 parts by mass or more, and preferably 1,000 parts by mass or less, more preferably 100 parts by mass or less, still more preferably 80 parts by mass or less, particularly preferably 50 parts by mass or less, most preferably 20 parts by mass or less, based on 100 parts by mass of the raw carbon material. Within this range, problems are less likely to occur, such as decreases in degree of spheroidization due to decreases in interparticle adhesion and decreases in productivity due to the adhesion of the raw carbon material to apparatuses.

3rd Step: Granulating Raw Carbon Material (Subjecting Raw Carbon Material to Spheroidization)

The carbon material is preferably prepared by subjecting a raw carbon material to spheroidization (hereinafter also referred to as granulation) by applying a mechanical action(s) such as impact compression, friction, and/or shear force to the raw carbon material. The spheroidized graphite is preferably made of a plurality of flake graphites or crystalline graphites and ground graphite fine powder, particularly preferably made of a plurality of flake graphites.

One embodiment of the present invention (e.g., but not limited to, Inventions B and J) includes the granulation step of granulating a raw carbon material by applying at least one type of mechanical energy selected from impact, compression, friction, and shear force.

For this step, for example, apparatuses can be used that repeatedly apply a mechanical action(s), mainly impact force such as compression, friction, and/or shear force, including the interaction of the raw carbon material.

Specifically, those apparatuses are preferred which have a rotor equipped with numbers of blades in a casing, the rotor being configured to rotate at a high speed to apply a mechanical action(s) such as impact, compression, friction, and/or shear force to a raw carbon material placed in the apparatus, thereby surface treating the raw carbon material. Furthermore, those apparatuses are preferred which have a mechanism by which a mechanical action(s) is repeatedly applied by circulating the raw carbon material.

Examples of such apparatuses include Hybridization System (Nara Machinery Co., Ltd.), Kryptron and Kryptron Orb (Earthtechnica Co., Ltd.), CF Mill (Ube Industries, Ltd.), Mechanofusion System, Nobilta, and Faculty (Hosokawa Micron Corporation), Theta Composer (Tokuju Co., Ltd.), and COMPOSI (Nippon Coke & Engineering. Co., Ltd). Of these, Hybridization System available from Nara Machinery Co., Ltd. is preferred.

When the treatment is carried out using any of these apparatuses, for example, the peripheral speed of the rotor is preferably 30 m/sec or more, more preferably 50 m/sec or more, still more preferably 60 m/sec or more, particularly preferably 70 m/sec or more, most preferably 80 m/sec or more, and preferably 100 m/sec or less. A peripheral speed in this range advantageously enables more efficient spheroidization and, at the same time, the deposition and the incorporation of fine powder on and into a base material.

Although the mechanical action(s) can be applied to the raw carbon material simply by passing the raw carbon material through the apparatus, preferably, the raw carbon material is circulated through or retained in the apparatus for 30 seconds or more, more preferably 1 minute or more, still more preferably 3 minutes or more, particularly preferably 5 minutes or more.

In the step of granulating the raw carbon material, the raw carbon material may be granulated in the presence of any other substances. Examples of the other substances include metals capable of forming alloys with lithium and oxides thereof, flake graphite, crystalline graphite, ground graphite fine powder, amorphous carbon, and green coke. Granulation in combination with substances other than the raw carbon material can produce carbon materials for non-aqueous secondary batteries having various types of particle structures.

The raw carbon material, the granulating agent, and the other substances each may be loaded into the above-described apparatus all at one time, sequentially in several times, or continuously. The raw carbon material, the granulating agent, and the other substances may be loaded into the apparatus simultaneously, as a mixture, or individually. The raw carbon material, the granulating agent, and the other substances may be mixed at one time; the other substances may be added to a mixture of the raw carbon material and the granulating agent; or the raw carbon material may be added to a mixture of the other substances and the granulating agent. Depending on the particle design, they can be added/mixed at any other appropriate timing.

In spheroidizing the carbon material, it is more preferable to carry out the spheroidization while depositing and/or incorporating fine powder generated during the spheroidization on a base material and/or into spheroidized particles. Carrying out the spheroidization while depositing and/or incorporating fine powder generated during the spheroidization on a base material and/or into spheroidized particles can form a finer intra-particle void structure. As a result, an electrolyte solution tends to be effectively and efficiently distributed into the intra-particle voids, and Li-ion insertion/extraction sites in the particles cannot be efficiently used, thus providing good low-temperature output characteristics and cycle characteristics. The fine powder to be deposited on a base material may be generated during the spheroidization, may be generated in adjusting the flake graphite particle size, or may be added/mixed at any other appropriate timing.

To deposit and incorporate the fine powder on a base material and into spheroidized particles, it is preferable to enhance flake graphite particle-flake graphite particle, flake graphite particle-fine powder particle, and fine powder particle-fine powder particle adhesive forces. Specific examples of adhesive forces between particles include van der Waals force and electrostatic attraction, which involve no interparticle mediator, and physical and/or chemical cross-linking forces, which involve interparticle mediators.

For Van der Waals force, the relation of "self-weight<adhesion" becomes distinct as the average particle diameter (d50) decreases from 100 μm. Thus, as the average particle diameter (d50) of the flake graphite, a raw material of a spheroidized graphite (raw carbon material), decreases, the interparticle adhesion increases, which advantageously facilitates the deposition and the incorporation of fine powder on a base material and into spheroidized particles. The average particle diameter (d50) of the flake graphite is preferably 1 μm or more, more preferably 2 μm or more, still more preferably 3 μm or more, preferably 80 μm or less, more preferably 50 μm or less, still more preferably 35 μm or less, very preferably 20 μm or less, particularly preferably 10 μm or less, most preferably 8 μm or less.

Electrostatic attraction is derived from electrification resulting, for example, from particle friction, and drier particles tend to be more easily electrified and have stronger interparticle adhesion. Thus, the interparticle adhesion can be enhanced, for example, by reducing the water content of a graphite before being spheroidized.

The spheroidization is preferably carried out in a low-humidity atmosphere to keep the flake graphite under treatment from absorbing moisture. Furthermore, to prevent the surface of the flake graphite from being oxidized by the energy of a machine process and receiving acidic functional groups during the treatment, the spheroidization is preferably carried out in an inert atmosphere.

Examples of physical and/or chemical cross-linking forces, which involve interparticle mediators, include physical and/or chemical cross-linking forces that involve liquid mediators and solid mediators. Examples of the chemical cross-linking forces include cross-linking forces of covalent bonds, ionic bonds, hydrogen bonds, and other bonds formed between particles and interparticle mediators, for example, by chemical reactions, sintering, and mechano-chemical effects.

In one embodiment of the present invention, the spheroidized graphite is prepared by carrying out spheroidization while depositing and/or incorporating fine powder generated by the fracture of a flake graphite during the spheroidization on and/or into a parent particle, whereby the particle strength can be increased to reduce the generation of fine powder upon physical impact. To deposit and/or incorporate the fine powder generated during the spheroidization on and/or into a parent particle, it is preferable to enhance parent particle-parent particle, parent particle-fine powder, and fine powder-fine powder binding capacities. For example, when a flake graphite is spheroidized by repeatedly applying a mechanical action(s), mainly impact force such as compression, friction, and/or shear force, including the interaction of the target particles, the graphite reacts with oxygen in the atmosphere to generate $CO_2$ and CO. The inventors intensively studied to discover that the parent particle-parent particle, parent particle-fine powder, and fine powder-fine powder binding capacities can be enhanced by carrying out spheroidization under conditions where the amount of $CO_2$ and CO generated is in a specific range, thereby achieving a carbon material that can provide a high capacity and low-temperature output characteristics when used in a non-aqueous secondary battery.

Specifically, the spheroidization is preferably carried out under conditions where the amount of CO that generates from 1 kg of a flake graphite is 5 mmol or less, more preferably 4 mmol or less, still more preferably 3 mmol or less. The lower limit of the amount of CO that generates from 1 kg of a flake graphite can be, for example, but not limited to, 0.05 mmol or more. The spheroidization is preferably carried out under conditions where the amount of $CO_2$ that generates from 1 kg of a flake graphite is 9 mmol or less, more preferably 8 mmol or less, still more preferably 7 mmol or less. The lower limit of the amount of $CO_2$ that generates from 1 kg of a flake graphite can be, for example, but not limited to, 0.1 mmol or more. The spheroidization is preferably carried out under conditions where the total amount of CO and $CO_2$ that generate from 1 kg of a flake graphite is 14 mmol or less, more preferably 12 mmol or less, still more preferably 10 mmol or less. The lower limit the total amount of CO and $CO_2$ that generate from 1 kg of a flake graphite can be, for example by but not limited to, 0.15 mmol or more. Carrying out the spheroidization under conditions within these ranges reduces the amount of graphite functional group of flake graphite particles, such as hydroxy (—OH), carboxyl (—C=O(—OH)), carbonyl (C=O), and quinone, which can reduce the obstruction of parent particle-parent particle, parent particle-fine powder, and fine powder-fine powder bindings, thus providing a carbon material having high particle strength. As a result, the carbon material used as a negative electrode material for a non-aqueous secondary battery generates a reduced amount of fine powder even when a physical impact is applied.

The amount of $CO_2$ and CO that generate in the spheroidization can be controlled to be in the above ranges, for example, by reducing the oxygen concentration in an apparatus for applying a mechanical action(s) by purging with an inert gas atmosphere, such as nitrogen, or reducing the pressure; treating the flake graphite without being exposed to oxygen; adding an auxiliary that is more reactive with oxygen than the flake graphite to preferentially react the auxiliary with oxygen, thereby inhibiting the reaction between the flake graphite and oxygen; or if a raw natural graphite is exposed to oxygen, deoxidizing the graphite by burning before use. These methods may be combined as appropriate. Alternatively, the spheroidization can be carried out by repeatedly applying a mechanical action(s), mainly impact force such as compression, friction, and/or shear force, including the interaction of the target particles, to the flake graphite to enhance the parent particle-parent particle, parent particle-fine powder, and fine powder-fine powder binding capacities, thus reducing the amount of graphite functional group.

4th Step: Removing Granulating Agent

One embodiment of the present invention may include the step of removing the granulating agent. The granulating agent can be removed, for example, by washing with a solvent or volatilizing/decomposing the granulating agent by heat treatment.

The heat treatment is carried out preferably at 60° C. or higher, more preferably 100° C. or higher, still more preferably 200° C. or higher, even more preferably 300° C. or higher, particularly preferably 400° C. or higher, most preferably 500° C. or higher, preferably 1,500° C. or lower, more preferably 1,000° C. or lower, still more preferably 800° C. or lower. A heat treatment temperature in this range can sufficiently volatilize/decompose the granulating agent away, leading to improved productivity.

The heat treatment is carried out preferably for 0.5 to 48 hours, more preferably 1 to 40 hours, still more preferably 2 to 30 hours, particularly preferably 3 to 24 hours. A heat treatment time in this range can sufficiently volatilize/decompose the granulating agent away, leading to improved productivity.

The atmosphere in the heat treatment may be an active atmosphere, such as an air atmosphere, or an inert atmosphere, such as a nitrogen atmosphere or an argon atmosphere. When the heat treatment is carried out at 200° C. to 300° C., there is no particular restriction, but when the heat treatment is carried out at 300° C. or higher, it is preferable to use an inert atmosphere, such as a nitrogen atmosphere or an argon atmosphere, to prevent the oxidation of the graphite surface.

5th Step: Increasing Purity of Granulated Carbon Material

One embodiment of the present invention may include the step of increasing the purity of the granulated carbon material. The purity of the granulated carbon material can be increased, for example, by treating with acids including nitric acid and hydrochloric acid. This method can advantageously remove impurities in the graphite, such as metals, metal compounds, and inorganic compounds, without introducing sulfates, which can be highly active sulfur sources, into the system.

For the acid treatment, acids including nitric acid and hydrochloric acid may be used, and use may also be made of other acids, for example, acids made by appropriately mixing inorganic acids, such as bromic acid, hydrofluoric acid, boric acid, and iodine acid, or organic acids, such as citric acid, formic acid, acetic acid, oxalic acid, trichloroacetic acid, and trifluoroacetic acid. Preferred are concentrated hydrofluoric acid, concentrated nitric acid, and concentrated hydrochloric acid, and more preferred are concentrated nitric acid and concentrated hydrochloric acid. In the present invention, the graphite may be treated with sulfuric acid, provided that sulfuric acid is used in such an amount and at such a concentration that have no adverse effect on the effects and the physical properties of the present invention.

When different acids are used, for example, the combination of hydrofluoric acid, nitric acid, and hydrochloric acid is preferred because it can efficiently remove the above-described impurities. For the mixing ratio of a mixed acid made by combining types of acids as described above, the amount of the fewest component is typically 10% by mass or more, preferably 20% by mass or more, more preferably 25% by mass or more. The upper limit is a value of acids mixed in equal amounts (expressed as 100% by mass/types of acids).

The mixing ratio (by mass) of graphite to acids in the acid treatment is typically 100:10 or greater, preferably 100:20 or greater, more preferably 100:30 or greater, still more preferably 100:40 or greater, and 100:1,000 or less, preferably 100:500 or less, more preferably 100:300 or less. An excessively small ratio tends to fail to efficiently remove the above-described impurities. An excessively large ratio disadvantageously reduces the amount of graphite that can be washed at one time, leading to reduced productivity and increased cost.

The acid treatment is carried out by immersing the graphite into an acidic solution as described above. The immersion is carried out typically for 0.5 to 48 hours, preferably 1 to 40 hours, more preferably 2 to 30 hours, still more preferably 3 to 24 hours. An excessively long immersion tends to lead to reduced productivity and increased cost, and an excessively short immersion tends to fail to sufficiently remove the above-described impurities.

The immersion is carried out typically at 25° C. or higher, preferably 40° C. or higher, more preferably 50° C. or higher, still more preferably 60° C. or higher. When an aqueous acid is used, the theoretical upper limit is 100° C., which is the boiling point of water. An excessively low temperature tends to fail to sufficiently remove the above-described impurities.

To remove a residual acid content after the acid washing to increase the pH from weak acid to neutral, it is preferable to further perform washing with water. For example, when the pH of the graphite washed with acids (the treated graphite) is typically 3 or greater, preferably 3.5 or greater, more preferably 4 or greater, still more preferably 4.5 or greater, washing with water can be omitted, and when the pH is not in this range, it is preferable to wash the treated graphite with water as required. The water used for washing is preferably ion-exchanged water or distilled water to improve washing efficiency and prevent contamination. A specific resistance, an indicator of ion content of the water, is typically 0.1 MΩ·cm or more, preferably 1 MΩ·cm or more, still more preferably 10 MΩ·cm or more. The theoretical upper limit at 25° C. is 18.24 MΩ·cm. A small specific resistance means a high ion content of the water and tends to lead to contamination and reduced washing efficiency.

The time for washing with water, that is, stirring the treated graphite and water is typically 0.5 to 48 hours, preferably 1 to 40 hours, more preferably 2 to 30 hours, still more preferably 3 to 24 hours. An excessively long stirring tends to reduce production efficiency, and an excessively short stirring tends to increase residual impurities/acid content.

The mixing ratio of the treated graphite to water is typically 100:10 or greater, preferably 100:30 or greater, more preferably 100:50 or greater, still more preferably 100:100 or greater, and 100:1,000 or less, preferably 100:700 or less, more preferably 100:500 or less, still more preferably 100:400 or less. An excessively high ratio tends to reduce production efficiency, and an excessively low ratio tends to increase residual impurities/acid content.

The stirring is carried out typically at 25° C. or higher, preferably 40° C. or higher, more preferably 50° C. or higher, still more preferably 60° C. or higher. The upper limit is 100° C., which is the boiling point of water. An excessively low temperature tends to increase residual impurities/acid content.

When the washing with water is carried out batchwise, the process of stirring in pure water and filtration is preferably repeated several times to remove impurities/acid content. This process may be carried out repeatedly until the pH of the above-described treated graphite is in the above range, typically once or more, preferably twice or more, more preferably three times or more.

As a result of the above-described treatment, the hydrogen-ion concentration of waste water of the resulting graphite is typically 200 ppm or less, preferably 100 ppm or less, more preferably 50 ppm or less, still more preferably 30 ppm or less, and typically 1 ppm or more, preferably 2 ppm or more, more preferably 3 ppm or more, still more preferably 4 ppm or more. An excessively high hydrogen-ion concentration tends to result in a residual acid content to decrease the pH, and an excessively low hydrogen-ion concentration tends to result in a prolonged treating time to lead to reduced productivity.

5'Th Step: Heat Treating Granulated Carbon Material

The present invention may include the step of heat-treating the granulated carbon material to adjust its labile carbon content and crystallinity. Although the labile carbon content on the surface of the carbon material particles may excessively increase in the granulation described above, the heat treatment can decrease the labile carbon content to a moderate level.

The temperature condition in the heat treatment is not limited and typically in the range of 300° C. or higher, preferably 500° C., more preferably 700° C., particularly preferably 800° C. or higher, and typically 2,000° C. or lower, preferably 1,500° C. or lower, particularly preferably 1,200° C. or lower, depending on the desired degree of crystallinity. Such temperature conditions can moderately increase the crystallinity of the surface of the carbon material particles.

When the granulated carbon material contains a low-crystallinity carbon material, the low-crystallinity carbon material can be graphitized to increase its crystallinity in this step for the purpose of increasing discharge capacity. The temperature condition in the heat treatment is not limited and typically in the range of 600° C. or higher, preferably 900° C. or higher, more preferably 1,600° C. or higher, particularly preferably 2,500° C. or higher, and typically 3,200° C. or lower, preferably 3,100° C. or lower, depending on the desired degree of crystallinity. Such temperature conditions can increase the crystallinity of the surface of the carbon material particles.

Crystals on the surface of the carbon material particles may be disordered, and the disorder is particularly pronounced when the above-described granulation is performed. The heat treatment can repair the disordered crystals on the surface of the carbon material particles.

In the heat treatment, the retention time during which the temperature is held in the above range is not limited and typically longer than 10 seconds and up to 72 hours.

The heat treatment is carried out in an inert gas atmosphere, such as nitrogen gas, or in a non-oxidizing atmosphere created by the gas generated from raw graphite. Examples of apparatuses that can be used for the heat treatment include, but are not limited to, shuttle furnaces, tunnel furnaces, electric furnaces, lead hammer furnaces, rotary kilns, direct energization furnaces, Acheson furnaces, resistance heating furnaces, and induction heating furnaces.

6th Step: Depositing Carbonaceous Material Having Lower Crystallinity than Raw Carbon Material on Granulated Carbon Material One embodiment of the present invention may include the step of depositing a carbonaceous material (B) having lower crystallinity than the raw carbon material on the granulated carbon material. In other words, the above-described carbon material and the carbonaceous material (B) can be combined to form a composite carbon material for the purpose of inhibiting side reactions with an electrolyte solution and improving fast charge-discharge characteristics. This step can provide a carbon material that can inhibit side reactions with an electrolyte solution and improve fast charge-discharge characteristics.

The composite graphite obtained by depositing the carbonaceous material having lower crystallinity than the raw carbon material on the granulated carbon material is also referred to as a "composite carbon material with a carbonaceous material (composite graphite with a carbonaceous material)" or a "composite carbon material".

Carbonaceous Material (B) Content of Composite Carbon Material

The carbonaceous material (B) content of the composite carbon material is typically 0.01% by mass or more, preferably 0.1% by mass or more, more preferably 0.5% or more, still more preferably 1% by mass or more, particularly preferably 2% by mass or more, most preferably 3% by mass or more, based on the carbon material (A) content. The carbonaceous material (B) content is typically 30% by mass or less, preferably 20% by mass or less, more preferably 15% by mass or less, still more preferably 10% by mass or less, particularly preferably 7% by mass or less, most preferably 5% by mass or less.

An excessively high carbonaceous material (B) content of the composite carbon material tends to cause damage to the carbon material (A) to cause material fracture when the composite carbon material is rolled under a sufficient pressure in order to achieve a non-aqueous secondary battery having a high capacity, leading to an increased charge-discharge irreversible capacity in an initial cycle and reduced initial efficiency. An excessively low content tends to be less likely to produce an effect of the coating.

The carbonaceous material (B) content of the composite carbon material can be calculated from sample masses before and after the material is burnt using the equation below. The calculation is made on the assumption that the mass of the carbon material (A) shows no change before and after burning.

Carbonaceous material($B$)content (% by mass)= $[(w2-w1)/w1] \times 100$ (where w1 is a mass (kg) of the carbon material (A), and w2 is a mass (kg) of the composite carbon material)

When the carbonaceous material (B) is combined by a mixing method, the amount of the carbonaceous material (B) in the composite carbon material can be controlled, for example, by the amount of a carbonaceous material (B) precursor added when the carbon material (A) and the carbonaceous material (B) precursor are combined or the residual carbon ratio of the carbonaceous material (B) precursor. For example, when the residual carbon ratio of the carbonaceous material (B) precursor, as determined by a method described in JIS K2270, is p %, the carbonaceous material (B) precursor is added in an amount 100/p times the desired amount of the carbonaceous material (B). When the carbonaceous material (B) is combined by a gas phase method, the amount of the carbonaceous material (B) can be controlled by conditions of the distribution of the carbonaceous material (B) precursor, such as temperature, pressure, and time.

X-Ray Parameter of Carbonaceous Material (B)

The carbonaceous material (B) has a d-value (interplanar spacing) of lattice planes ((002) planes), as determined by X-ray diffractometry in accordance with the method of the Japan Society for Promotion of Scientific Research, of typically 0.3445 nm or less, preferably 0.335 nm to less than 0.340 nm. The d-value is more preferably 0.339 nm or less, still more preferably 0.337 nm or less. A $d_{002}$-value in this range increases the amount of lithium that enters between graphite layers, thus providing a high charge-discharge capacity.

The carbonaceous material (B) has a crystallite size (Lc), as determined by X-ray diffractometry in accordance with the method of the Japan Society for Promotion of Scientific Research, in the range of preferably 1.5 nm or more, more preferably 3.0 nm or more. A crystallite size in this range increases the amount of lithium that enters between graphite layers, thus providing a high charge-discharge capacity. The lower limit of Lc is a theoretical value of graphite.

The X-ray parameter of the carbonaceous material (B) can be analyzed, for example, by heating and burning the carbonaceous material (B) precursor alone to yield the carbonaceous material (B).

Combination with Carbon Material (A)

To load the carbonaceous material (B) onto the surface of the carbon material (A), for example, a precursor of the carbonaceous material (B) is mixed with the carbon material (A), or the carbonaceous material (B) is vapor deposited on the carbon material (A). Particularly preferred methods include (e.g., but not limited to, Invention F) mixing the carbon material (A) with an organic compound, serving as a carbonaceous material (B) precursor, so as to be uniformly coated, and heating the mixture in a non-oxidizing atmosphere (which is referred to as a mixing method in the present invention), and uniformly vapor-depositing a material compound for gas phase coating, serving as a carbonaceous material (B) precursor, on the carbon material (A) in an inert gas atmosphere (which is referred to as a gas phase method in the present invention). The mixing method and the gas phase method will be described below.

Mixing Method

In the mixing method, the carbon material (A) is mixed with an organic compound, serving as a carbonaceous material (B) precursor, so as to be uniformly coated, and the mixture is heated in a non-oxidizing atmosphere.

Types of Organic Compound Serving as Carbonaceous Material (B) Precursor

As an organic compound, serving as a carbonaceous material (B) precursor, use can be made of various types of compounds including coal-derived heavy oils, such as soft to hard various coal-tar pitches, coal tars, and coal liquefaction oils; petroleum-derived heavy oils, such as residual oils from atmospheric or vacuum distillation of crude oil; and heavy oils resulting from cracking, such as by-products of ethylene production by naphtha cracking.

In one embodiment of the present invention, petroleum-derived raw oils and coal-derived raw oils, which have a good affinity for granulating agents having aniline points of 80° C. or lower and allow the organic compound, serving as a carbonaceous material precursor, to be uniformly deposited on the surface of a granulated graphite, are suitable for use, and coal-derived raw oils are particularly suitable for use.

Examples of resin-derived organic compounds include thermosetting resins, such as phenolic resins, polyacrylonitriles, and polyimides; thermoplastic resins, such as polyvinyl chlorides, polyvinylidene chlorides, and polyvinyl alcohols; and natural polymers, such as celluloses, starch, and polysaccharides.

Examples of coal-derived raw oils that can be used include coal-derived heavy oils produced from coal, such as coal-tar pitches, impregnating pitches, molded pitches, and coal liquids; and refined coal-tar pitches produced by removing insolubles in coal-tar pitches. Coal-derived raw oils contain large amounts of flat aromatic hydrocarbons formed of numbers of benzene rings bonded to each other, such as dibenzocoronene and pentacene. When aromatic hydrocarbons having flat structures are heated in the burning step to be more flowable, planes of the aromatic hydrocarbons having flat structures tend to be superposed on each other, and a thermal polycondensation reaction proceeds with the flat structures superposed on each other. As a result, the van der Waals force between the planes of the hydrocarbons polymerized by the polycondensation tends to be enhanced to reduce the plane-to-plane distance between the polymerized hydrocarbons, resulting in a higher degree of crystallinity.

Examples of petroleum-derived raw oils include residual oils from a distillation of heavy oils, residual oils from naphtha cracking, and catalytically cracked heavy oils. Other examples include heat-treated pitches obtained by heat treating heavy oils resulting from cracking, such as ethylene tar pitch, FCC decant oil, and Ashland pitch. It is known that petroleum-derived raw oils, although containing flat aromatic hydrocarbons formed of numbers of benzene rings bonded to each other, contain large amounts of linear paraffinic hydrocarbons; moreover, the flat aromatic hydrocarbons formed of numbers of benzene rings bonded to each other often have pendant methyl or other groups, and some of the benzene rings are often substituted with cyclohexane rings. Thus, when aromatic hydrocarbons having flat structures are heated in the burning step to be more flowable and planes of the aromatic hydrocarbons having flat structures are superposing on each other, the large amounts of linear paraffins on the planes tend to obstruct the superposition. The flat aromatic hydrocarbons having pendant methyl or other groups tend to hinder the superposition of the flat aromatic hydrocarbons. The cyclohexane rings also tend to obstruct the superposition of the aromatic hydrocarbons, and the cyclohexane rings tend to be pyrolyzed to be pendant methyl or other groups, further obstructing the superposition. These facts suggest that coal-derived raw oils, as compared with petroleum-derived raw oils, tend to crystallize to a higher degree and thus are suitable for use as the organic compound, serving as a carbonaceous material precursor, for use in the present invention.

Specifically, preferred are petroleum-derived heavy oils produced in oil refining and coal-derived raw oils produced using coal tar, which is produced when coke for ironmaking is produced, as a starting material, and more preferred are pitches called a soft pitch or a middle pitch having a softening point of 0° C. or higher, preferably 30° C. to 100° C., which are recovered from a column bottom during the distillation of coal tar. The organic compound, serving as a carbonaceous material precursor, of the present invention may be a mixture of these coal-derived raw oils and petroleum-derived raw oils, resin-derived organic compounds, and other solvents.

These coal-derived raw oils, which typically contain a light oil fraction, are preferably refined by distillation to extract useful fractions and improve productivity.

Physical Properties of Organic Compound, Serving as Carbonaceous Material (B) Precursor The organic compound, serving as a carbonaceous material (B) precursor, may be any compound as long as a carbonaceous powder obtained by burning and crushing the organic compound, serving as a carbonaceous material (B) precursor, in an inert atmosphere at 1,300° C. has an interplanar spacing of the crystallite (002) plane ($d_{002}$), as determined by wide-angle X-ray diffractometry in accordance with the method of the Japan Society for Promotion of Scientific Research, of 0.3445 nm or less. A description will be given below of physical properties and a production method of a coal-derived raw oil, a preferred organic compound, by way of illustration and not by way of limitation.

Quinoline Insoluble (Hereinafter Referred to as Qi) Content and β-Resin Content

The Qi content of the organic compound, serving as a carbonaceous material (B) precursor, is typically 0% by mass or more, and typically 30% by mass or less, preferably 20% by mass or less, more preferably 15% by mass or less, still more preferably 10% by mass or less, particularly preferably 5% by mass or less, most preferably 1% by mass or less. The β-resin content of the organic compound, serving as a carbonaceous material precursor, is typically 1% by mass or more, preferably 2% by mass or more, more preferably 3% by mass or more, and typically 80% by mass or less, preferably 70% by mass or less, more preferably 60% by mass or less, still more preferably 50% by mass or less, particularly preferably 30% by mass or less, most preferably 15% by mass or less.

Within the above ranges, composite particles for a non-aqueous secondary battery can be obtained which has a good-quality carbon structure due to good crystal growth during the carbonization by burning and has a structure in which graphite particles are uniformly coated with a carbonaceous material due to the high affinity for the above-described granulating agent, and thus excellent low-temperature output characteristics and high-temperature storage characteristics tend to be exhibited.

The Qi content and the β-resin content can be determined by the method described below.

If the organic compound, serving as a carbonaceous material (B) precursor, contains a large amount of Qi, crystals will grow insufficiently during the process of carbonization by burning, resulting in poor-quality carbon. Thus, it is preferable to remove Qi from the organic compound, serving as a carbonaceous material (B) precursor, before carbonization in advance.

Qi can be removed by any known method such as centrifugation, mass sedimentation, or filtration. To reduce residual Qi, Qi is preferably removed by filtration or mass sedimentation. In this case, an appropriate solvent may optionally be used to facilitate operations. When Qi is removed by filtration, it is carried out under the conditions of a pressure of typically 0.05 to 1.0 MPa, preferably 0.1 to 0.5 MPa, and a temperature of 20° C. to 200° C., preferably 50° C. to 150° C. The opening size of a filter used for the filtration is preferably 3 microns or less.

When Qi is removed by mass sedimentation, it is carried out under the conditions of a temperature of typically 20° C. to 350° C. and a standing time of typically 10 minutes to 10 hours.

After the Qi removal treatment has been performed as described above, the Qi content of the organic compound, serving as a carbonaceous material precursor, is typically 0.1% by mass or less, preferably 0.01% by mass or less. After the Qi removal operation, the β-resin content of the organic compound, serving as a carbonaceous material precursor, is typically 1.0 to 15.0% by mass, preferably 4.0 to 10.0% by mass.

Qi Content, β-Resin Content, and Measuring Method

Quinoline (purity: 95.0% or more, available from Wako Pure Chemical Industries, Ltd.) and toluene (purity: 99.5% or more, available from Wako Pure Chemical Industries, Ltd.) were provided as solvents, and insolubles of the organic compound, serving as a carbonaceous material precursor, in each solvent are measured by the following procedures (1) to (6).

(1) Take 2.0 g of a sample (e.g., coal tar or coal-tar pitch) into a flask and precisely weigh it (W1).
(2) Pour 100 mL of the above-described measurement solvent (e.g., quinoline) into the flask containing the sample, attach a condenser, and put the flask into an oil bath at 110° C. (130° C. in the case of toluene). Heat the solution with stirring for 30 minutes to dissolve the sample in the solvent.
(3) Attach filter paper (W2) precisely weighed in advance to a filter. Pour the solution obtained in (2) into the filter and perform suction filtration. Pour 100 mL of the measurement solvent heated at 60° C. onto the filtration residue to dissolve and wash it. Repeat this operation four times.
(4) Dry the filtration residue on the filter paper in a dryer at 110° C. for 60 minutes.
(5) Remove the filtration residue on the filter paper from the dryer, allow it to cool in a desiccator for 30 minutes, and then precisely weigh its weight (W3).
(6) Calculate the solvent insoluble by the following equation.

$$\text{Solvent insoluble (\% by mass)} = (\text{residue weight after dissolution/sample weight}) \times 100 = ((W3-W2)/W1) \times 100$$

The measurements were made according to the above procedure (1) to (6) using various measurement solvents: acetone, quinoline, nitrobenzene, morpholine, and toluene. Insolubles (% by mass) in these solvents are respectively referred to as acetone insoluble, quinoline insoluble, nitrobenzene insoluble, morpholine insoluble, and toluene insoluble.

Based on the insoluble measured for each solvent, β, α, and β1 can be obtained as follows:

β (toluene insoluble that is soluble in quinoline)=(toluene insoluble)−(quinoline insoluble)

α (acetone insoluble that is soluble in toluene)=(acetone insoluble)−(toluene insoluble)

β1 (morpholine insoluble that is soluble in nitrobenzene)=(morpholine insoluble)−(nitrobenzene insoluble)

In the present invention, a soluble in each solvent is a value obtained by subtracting the insoluble (% by mass) measured by the above method from 100 (% by mass).

Specific Gravity

The lower limit of the specific gravity of the organic compound, serving as a carbonaceous material (B) precursor, is typically 1.1 or greater, preferably 1.14 or greater, more preferably 1.17 or greater, still more preferably 1.2 or greater. The upper limit is typically 1.5 or less, preferably 1.45 or less, more preferably 1.4 or less, still more preferably 1.35 or less. An excessively small specific gravity tends to increase the amount of linear paraffinic hydrocarbon in the organic compound, leading to low crystallinity in the carbonization by burning. An organic compound having an excessively large specific gravity tends to have a high molecular weight and a high melting point. An organic compound having an excessively high melting point, when mixed with graphite particles to deposit the organic compound on the graphite particles in the 6th step of the method for producing a carbon material for a non-aqueous secondary battery, the step of depositing a carbonaceous material having lower crystallinity than a raw carbon material on a granulated carbon material, tends to mix with the graphite particles ununiformly. The specific gravity is a value at 15° C.

Softening Point

The upper limit of the softening point of the organic compound, serving as a carbonaceous material (B) precursor, is typically 400° C. or lower, preferably 200° C. or lower, more preferably 150° C. or lower, still more preferably 100° C. or lower. The lower limit of the softening point of the organic compound is typically 0° C. or higher, preferably 25° C. or higher, more preferably 30° C. or higher, still more preferably 40° C. or higher. A softening point over the upper limit can make it difficult to uniformly mix with graphite particles, thus necessitating mixing at a higher temperature and leading to low productivity. An organic compound having a softening point below the lower limit tends to contain flat aromatic hydrocarbons in a small amount and linear paraffinic hydrocarbons in a relatively large amount and tends to provide a carbonaceous material coating, obtained by carbonization by burning, with low crystallinity and a carbon material for an non-aqueous secondary battery with a high specific surface area.

The organic compound, serving as a carbonaceous material (B) precursor, has a residual carbon ratio of typically 1% or more, preferably 10% or more, more preferably 20% or more, still more preferably 30% or more, particularly preferably 45% or more, and typically 99% or less, preferably 90% or less, more preferably 70% or less, still more preferably 60% or less. The residual carbon ratio can be measured by a method in accordance with JIS 2270, for example. A residual carbon ratio in this range tends to enable uniform diffusion and permeation on the surface and into micropores of the carbon material (A) and enable the surface and the micropores of the carbon material (A) to be more uniformly coated with the carbonaceous material (B), thus making it possible to control the average value and the standard deviation ($\sigma_R$) of microscopic Raman R values to be in the preferred ranges of the present invention, leading to improved input-output characteristics.

The addition amount of the carbonaceous material (B) precursor by volume (=mass/density) is typically at least 0.1 time the cumulative pore volume at pore diameters in a range of 0.01 μm to 1 μm of the carbon material (A), preferably at least 0.5 time, more preferably at least 0.7 time, still more preferably at least 0.8 time, particularly preferably at least 0.9 time, most preferably at least 0.95 time, and typically up to 10 times, preferably up to 5 times, more preferably up to 3 times, still more preferably up to 2 times, particularly preferably up to 1.4 times, most preferably up to 1.2 times. An addition amount in this range tends to enable sufficient permeation into pores of the carbon material (A) having a diameter in the range of 0.01 μm to 1 μm and prevent the excess carbonaceous material (B) precursor from overflowing the pores to be maldistributed on the surface of the carbon material (A), thus enabling the carbonaceous material (B) precursor to more uniformly diffuse and permeate on the surface and into the micropores of the carbon material (A), which allows the average value and the standard deviation ($\sigma_R$) of microscopic Raman R values of 30 randomly selected composite carbon materials to be controlled within the preferred ranges of the embodiment of the present invention.

Furthermore, the carbonaceous material (B) precursor can be diluted by adding a solvent or the like as required. Adding a solvent or the like tends to reduce the viscosity of the carbonaceous material (B) precursor, thereby improving the permeability into the pores of the carbon material (A) having a diameter in the range of 0.01 μm to 1 μm, as a result of which the carbonaceous material (B) precursor more uniformly diffuses and permeates on the surface and into the micropores of the carbon material (A).

The organic compound, serving as a carbonaceous material (B) precursor, can be mixed with the granulated carbon material by any method, for example, by mixing the granulated carbon material and the organic compound, serving as a carbonaceous material (B) precursor, using a commercially available mixer, kneader, or the like to obtain a mixture in which the organic compound is deposited on the granulated carbon material.

The granulated carbon material, the organic compound, serving as a carbonaceous material (B) precursor, and other raw materials such as solvents optionally added are mixed under heating as required. As a result, the organic compound, serving as a carbonaceous material (B) precursor, in liquid form is deposited on the granulated carbon material. The mixing may be carried out in such a manner that all of the raw materials are charged into a mixer, and mixing and heating are performed at the same time, or that components other than the organic compound, serving as a carbonaceous material (B) precursor, are charged into a mixer and preheated with stirring, and after the temperature has increased to a mixing temperature, the organic compound, serving as a carbonaceous material precursor, at normal temperature or preheated to be molten is added. To prevent the organic compound, serving as a carbonaceous material (B) precursor, when brought into contact with the granulated graphite particles, from being cooled to have an increased viscosity and form an ununiform coating, the mixing is preferably carried out in such a manner that components other than the organic compound, serving as a carbonaceous material (B) precursor, are charged into a mixer and preheated with stirring, and after the temperature has increased to a mixing temperature, the organic compound, serving as a carbonaceous material (B) precursor, preheated to a mixing temperature to be molten is added.

The heating is carried out typically at a temperature equal to or higher than the softening point of the organic compound, serving as a carbonaceous material (B) precursor, preferably a temperature higher than the softening point by 10° C. or more, more preferably a temperature higher than the softening point by 20° C. or more, still more preferably by 30° C. or more, particularly preferably by 50° C. or more, and typically 450° C. or lower, preferably 250° C. or lower. An excessively low heating temperature may increase the viscosity of the organic compound, serving as a carbonaceous material (B) precursor, to make it difficult to perform mixing, resulting in an ununiform coating. An excessively high heating temperature may cause the organic compound, serving as a carbonaceous material (B) precursor, to be volatilized and polycondensed, which increases the viscosity of the mixing system to make it difficult to perform mixing, resulting in an ununiform coating.

The mixer is preferably of a type having a stirring blade, and for example, use can be made of commercially available products such as ribbon mixers, MC processors, plowshare mixers, and KRC kneaders. The mixing is carried out typically for 1 minute or more, preferably 2 minutes or more, more preferably 5 minutes or more, and typically 300 minutes or less, preferably 120 minutes or less, more preferably 80 minutes or less. An excessively short mixing may form an ununiform coating, and an excessively long mixing tends to cause reduced productivity and increased cost.

Although the heating temperature (burning temperature) varies depending on the carbonaceous material (B) precursor used to prepare the mixture, the heating is typically carried out at 800° C. or higher, preferably 900° C. or higher, more preferably 950° C. or higher, to achieve sufficient amorphous carbonization or graphitization. The upper limit of the heating temperature is a temperature at which a carbide of the carbonaceous material (B) precursor does not form a crystal structure equivalent to the crystal structure of a flake graphite, which is the carbon material (A) in the mixture, and typically up to 3,500° C. The upper limit of the heating temperature is 3,000° C., preferably 2,000° C., more preferably 1,500° C.

To prevent oxidation, the heat treatment is performed under a stream of an inert gas, such as nitrogen or argon, or in a non-oxidizing atmosphere in which gaps are filled with a granular carbon material, such as breeze or packing coke. The equipment used for the heat treatment may be any equipment that suits the above purpose, including reaction vessels such as shuttle furnaces, tunnel furnaces, lead hammer furnaces, rotary kilns, and autoclaves, cokers (heat treatment vessels for coke production), electric furnaces, gas furnaces, and Acheson furnaces for electrode materials. The heating rate, the cooling rate, the heat treatment time, and other conditions can be freely selected within the allowable range of the equipment used.

Gas Phase Method

Examples of gas phase methods include processes such as chemical vapor deposition (CVD) in which a material compound for gas phase coating, serving as a carbonaceous material (B) precursor, is uniformly vapor deposited on the surface of the carbon material (A) in an inert gas atmosphere.

A specific example of the material compound for gas phase coating, serving as a carbonaceous material (B) precursor, that can be used is a gaseous compound capable of being decomposed by heat, plasma, or the like to form the carbonaceous material (B) coating on the surface of the carbon material (A). Examples of the gaseous compound include unsaturated aliphatic hydrocarbons, such as ethylene, acetylene, and propylene; saturated aliphatic hydrocarbons, such as methane, ethane, and propane; and aromatic hydrocarbons, such as benzene, toluene, and naphthalene. These compounds may be used alone or as a mixture of two or more gases. The temperature, pressure, time, and other conditions in the CVD process can be appropriately selected depending on the type of coating material used and the desired amount of the carbonaceous material (B) coating.

When the carbon material (A) is combined with the carbonaceous material (B) by the gas phase method, adjusting the cumulative pore volume and the pore diameter (e.g., cumulative pore volume at pore diameters in a range of 0.01 μm to 1 μm of the carbon material (A), 0.07 mL/g or more; PD/d50(%), 1.8 or less) enables diffusion via the pores to contact portions between the carbon material (A) particles and into the particles where the material compound for gas phase coating can hardly reach, thus enabling the surface and the micropores of, the carbon material (A) to be more uniformly coated with the carbonaceous material (B), which allows the average value and the standard deviation ($\sigma_R$) of microscopic Raman R values of 30 randomly selected composite carbon materials to be easily controlled within the preferred ranges of the present invention.

Other Steps

After the mixing method or the gas phase method described above is performed, processes such as disintegration and/or crushing and classification can be optionally performed to provide a composite carbon material of the present invention.

The composite carbon material may be of any shape and typically has an average particle diameter of 2 to 50 μm, preferably 5 to 35 μm, particularly preferably 8 to 30 μm. To achieve the particle diameter in this range, disintegration and/or crushing and/or classification are performed as required.

As long as the effect of the embodiment is not adversely affected, other additional steps may be performed, or control conditions not described above may be added.

According to the production method according to one embodiment of the present invention, carbon materials having various types of particle structures can be stably produced. Typical particle structures include carbon materials produced by folding a flake graphite, a raw carbon material, having a large or medium average particle diameter, carbon materials produced by granulating (folding) a flake graphite having a small average particle diameter, and carbon materials produced by depositing an artificial graphite on a natural graphite.

As an indicator of stable production of such carbon materials having various types of particle structures, the yield expressed as a carbon material weight to total solid material weight ratio (carbon material weight/total solid material weight) is typically 60% or more, preferably 80% or more, more preferably 95% or more.

Mixing with Other Carbon Materials

To improve the orientation of electrode plates, the permeability of electrolyte solution, the conductive path, and other properties to improve cycle characteristics, electrode plate expansion, and other characteristics, a carbon material different from the above-described granulated carbon material or the above-described composite carbon material can be mixed (hereinafter the carbon material different from the granulated carbon material or the composite carbon material is also referred to as an "additional carbon material", and a carbon material obtained by mixing the granulated carbon material or the composite carbon material with the carbon material different from the granulated carbon material or the composite carbon material is also referred to as a "mixed carbon material").

As the additional carbon material, use can be made of a material selected from natural graphites, artificial graphites, coated graphites made of carbon materials and carbonaceous material coatings thereon, amorphous carbons, and carbon materials containing metal particles or metal compounds. The carbon material (A) may be mixed. These materials may be used alone or in any combination and composition of two or more materials.

Examples of natural graphites that can be used include highly purified carbon materials and spheroidized natural graphites. The high purification typically means an operation of dissolving away ash, metals, and other impurities in a low-purity natural graphite by treating in an acid, such as hydrochloric acid, sulfuric acid, nitric acid, or hydrofluoric acid, or performing different acid treatments in combination. Typically, water washing or any other treatment is performed following the acid treatment to remove the acids used in the high purification process. In place of the acid treatment, a high-temperature treatment at 2,000° C. or higher may be performed to evaporate off ash, metals, and other impurities. The high-temperature heat treatment may be performed in a halogen gas atmosphere, such as chlorine gas, to remove ash, metals, and other impurities. Furthermore, these techniques may be used in any combination.

The volume-based average particle diameter (also referred to as the average particle diameter for short) of such a natural graphite is typically in the range of 5 μm or more, preferably 8 μm or more, more preferably 10 μm or more, particularly preferably 12 μm or more, and typically 60 μm or less, preferably 40 μm or less, particularly preferably 30 μm or less. An average particle diameter in this range advantageously improves fast charge-discharge characteristics and productivity.

The BET specific surface area of the natural graphite is typically in the range of 1 m$^2$/g or more, preferably 2 m$^2$/g or more, and typically 30 m$^2$/g or less, preferably 15 m$^2$/g or less. A specific surface area in this range advantageously improves fast charge-discharge characteristics and productivity.

The tap density of the natural graphite is typically in the range of 0.6 g/cm$^3$ or more, preferably 0.7 g/cm$^3$ or more, more preferably 0.8 g/cm$^3$ or more, still more preferably 0.85 g/cm$^3$ or more, and typically 1.3 g/cm$^3$ or less, preferably 1.2 g/cm$^3$ or less, more preferably 1.1 g/cm$^3$ or less. A tap density in this range advantageously improves fast charge-discharge characteristics and productivity.

Examples of artificial graphites include particles obtained by graphitizing a carbon material, and, for example, use can be made of particles obtained by burning and graphitizing a single graphite precursor particle in powder form and granulated particles obtained by forming, burning, graphitizing, and disintegrating a plurality of graphite precursor particles.

The volume-based average particle diameter of such an artificial graphite is typically in the range of 5 μm or more, preferably 10 μm or more, and typically 60 μm or less, preferably 40 μm or more, more preferably 30 μm or less. An average particle diameter in this range advantageously reduces the expansion of electrode plates and improves productivity.

The BET specific surface area of the artificial graphite is typically in the range of 0.5 m$^2$/g or more, preferably 1.0 m$^2$/g or more, and typically 8 m$^2$/g or less, preferably 6 m$^2$/g or less, more preferably 4 m$^2$/g or less. A BET specific surface area in this range advantageously reduces the expansion of electrode plates and improves productivity.

The tap density of the artificial graphite is typically in the range of 0.6 g/cm$^3$ or more, preferably 0.7 g/cm$^3$ or more, more preferably 0.8 g/cm$^3$ or more, still more preferably 0.85 g/cm$^3$ or more, and typically 1.5 g/cm$^3$ or less, preferably 1.4 g/cm$^3$ or less, more preferably 1.3 g/cm$^3$ or less. A tap density in this range advantageously reduces the expansion of electrode plates and improves productivity.

Examples of coated graphites made of carbon materials and carbonaceous material coatings thereon that can be used include particles obtained by coating a natural graphite or an artificial graphite with the above-described organic compound, serving as a carbonaceous material precursor, and burning and/or graphitizing the coated material and particles obtained by coating a natural graphite or an artificial graphite with a carbonaceous material by CVD.

The volume-based average particle diameter of such a coated graphite is typically in the range of 5 μm or more, preferably 8 μm or more, more preferably 10 μm or more, particularly preferably 12 μm or more, and typically 60 μm or less, preferably 40 μm or less, particularly preferably 30 μm or less. An average particle diameter in this range advantageously improves fast charge-discharge characteristics and productivity.

The BET specific surface area of the coated graphite is typically in the range of 1 m$^2$/g or more, preferably 2 m$^2$/g or more, more preferably 2.5 m$^2$/g or more, and typically 20 m$^2$/g or less, preferably 10 m$^2$/g or less, more preferably 8 m$^2$/g or less, particularly preferably 5 m$^2$/g or less. A specific surface area in this range advantageously improves fast charge-discharge characteristics and productivity.

The tap density of the coated graphite is typically 0.6 g/cm$^3$ or more, preferably 0.7 g/cm$^3$ or more, still more preferably 0.8 g/cm$^3$ or more, even more preferably 0.85 g/cm$^3$ or more, and typically 1.3 g/cm$^3$ or less, preferably 1.2 g/cm$^3$ or less, more preferably 1.1 g/cm$^3$ or less. A tap density in this range advantageously improves fast charge-discharge characteristics and productivity.

Examples of amorphous carbons that can be used include particles obtained by burning a bulk mesophase and particles obtained by infusibilizing and burning a readily graphitizable organic compound.

The volume-based average particle diameter of such an amorphous carbon is typically in the range of 5 μm or more, preferably 12 μm or more, and typically 60 μm or less, preferably 40 μm or less. An average particle diameter in this range advantageously improves fast charge-discharge characteristics and productivity.

The BET specific surface area of the amorphous carbon is typically in the range of 1 m$^2$/g or more, preferably 2 m$^2$/g or more, more preferably 2.5 m$^2$/g or more, and typically 8 m$^2$/g or less, preferably 6 m$^2$/g or less, more preferably 4 m$^2$/g or less. A specific surface area in this range advantageously improves fast charge-discharge characteristics and productivity.

The tap density of the amorphous carbon is typically 0.6 g/cm$^3$ or more, preferably 0.7 g/cm$^3$ or more, more preferably 0.8 g/cm$^3$ or more, still more preferably 0.85 g/cm$^3$ or more, and typically 1.3 g/cm$^3$ or less, preferably 1.2 g/cm$^3$ or less, more preferably 1.1 g/cm$^3$ or less. A tap density in this range advantageously improves fast charge-discharge characteristics and productivity.

Examples of carbon materials containing metal particles or metal compounds include composite materials of a graphite and a metal selected from the group consisting of Fe, Co, Sb, Bi, Pb, Ni, Ag, Si, Sn, Al, Zr, Cr, P, S, V, Mn, Nb, Mo, Cu, Zn, Ge, In, and Ti or a compound thereof. The metal or compound thereof may be an alloy of two or more metals, and the metal particles may be alloy particles formed of two or more metal elements. Of these, metals selected from the group consisting of Si, Sn, As, Sb, Al, Zn, and W and compounds thereof are preferred, and Si and SiOx are particularly preferred. The general formula SiOx is made from Si dioxide (SiO$_2$) and metal Si (Si), and the value of x is typically 0<x<2, preferably 0.2 to 1.8, more preferably 0.4 to 1.6, still more preferably 0.6 to 1.4. A value of x in this range can provide a high capacity and also reduce the irreversible capacity due to the bond of Li and oxygen.

From the viewpoint of cycle life, the volume-based average particle diameter of such metal particles is typically 0.005 μm or more, preferably 0.01 μm or more, more preferably 0.02 μm or more, still more preferably 0.03 μm or more, and typically 10 μm or less, preferably 9 μm or less, more preferably 8 μm or less. An average particle diameter in this range reduces the volume expansion that accompanies charging and discharging, thus providing good cycle characteristics while maintaining charge-discharge capacity.

The BET specific surface area of the metal particles is typically 0.5 m$^2$/g to 120 m$^2$/g, preferably 1 m$^2$/g to 100 m$^2$/g. A specific surface area in this range advantageously provides a battery with high charge-discharge efficiency, a high discharge capacity, quick insertion and extraction of lithium in fast charging and discharging, and excellent rate characteristics.

Examples of apparatuses used to mix the above-described granulated carbon material or the above-described composite carbon material with the additional carbon material include, but are not limited to, rotary mixers, such as cylindrical mixers, twin-cylindrical mixers, double-cone mixers, regular cubic mixers, and hoe mixers; and fixed mixers, such as spiral mixers, ribbon mixers, Muller mixers, Helical Flight mixers, Pugmill mixers, and fluidizing mixers.

Physical Properties of Carbon Material for Non-Aqueous Secondary Battery

A description will be given below of preferred physical properties of the carbon material according to an embodiment of the present invention.

Volume-Based Average Particle Diameter (Average Particle Diameter d50)

The volume-based average particle diameter (also referred to as "average particle diameter d50" or "median diameter") of the carbon material is preferably 1 µm or more, more preferably 3 µm or more, still more preferably 5 µm or more, even more preferably 8 µm or more, particularly preferably 10 µm or more, most preferably 12 µm or more. The average particle diameter d50 is typically 80 µm or less, preferably 50 µm or less, more preferably 40 µm or less, still more preferably 35 µm or less, even more preferably 31 µm or less, particularly preferably 30 µm or less, most preferably 25 µm or less. An average particle diameter in this range tends to prevent the increase in irreversible capacity and prevent streaks that can occur during a slurry application, thus leading to no reduction in productivity.

An excessively small average particle diameter d50 tends to cause an increase in irreversible capacity and a loss in initial battery capacity of a non-aqueous secondary battery comprising the carbon material. An excessively large average particle diameter d50 can cause process defects such as streaks that occur in a slurry application, degraded high-current-density charge-discharge characteristics, and degraded low-temperature output characteristics.

The average particle diameter d50 is defined as a volume-based median diameter determined by suspending 0.01 g of a carbon material in 10 mL of a 0.2% by mass aqueous solution of a polyoxyethylene sorbitan monolaurate surfactant (e.g., Tween 20 (registered trademark)), placing the suspension (a measurement sample) in a commercially available laser diffraction/scattering particle size distribution analyzer (e.g., LA-920 available from HORIBA), irradiating the measurement sample with ultrasonic waves of 28 kHz at a power of 60 W for 1 minute, and then performing a measurement with the analyzer.

Tap Density

The tap density of the carbon material is typically 0.7 g/cm$^3$ or more, preferably 0.75 g/cm$^3$ or more, more preferably 0.8 g/cm$^3$ or more, still more preferably 0.83 g/cm$^3$ or more, even more preferably 0.85 g/cm$^3$ or more, very preferably 0.88 g/cm$^3$ or more, particularly preferably 0.9 g/cm$^3$ or more, most preferably 0.95 g/cm$^3$ or more, and preferably 1.3 g/cm$^3$ or less, more preferably 1.2 g/cm$^3$ or less, still more preferably 1.1 g/cm$^3$ or less.

A tap density in this range prevents streaks that can occur during the formation of an electrode plate, thus leading to improved productivity and excellent fast charge-discharge characteristics. In addition, such a tap density tends to inhibit the increase in intraparticle carbon density, thus providing good rolling properties and making it easy to form a high-density negative electrode sheet.

The tap density is defined as a density calculated from a volume and a mass of a sample (carbon material). The volume is determined as follows: using a powder density meter, the carbon material of the present invention is dropped through a sieve with openings of 300 µm into a cylindrical tap cell with a diameter of 1.6 cm and a volume capacity of 20 cm$^3$ to fill up the cell; a tap with a stroke length of 10 mm is given 1,000 times; and the volume at this time is measured.

Mode Pore Diameter (PD) in Pore Diameter Range of 0.01 µm to 1 µm

The mode pore diameter (PD) in a pore diameter range of 0.01 µm to 1 µm of the carbon material is a value determined by mercury intrusion (mercury porosimetry) and typically 0.01 µm or more, preferably 0.03 µm or more, more preferably 0.05 µm or more, still more preferably 0.06 µm or more, particularly preferably 0.07 µm or more, and typically 1 µm or less, preferably 0.65 µm or less, more preferably 0.5 µm or less, still more preferably 0.4 µm or less, even more preferably 0.3 µm or less, particularly preferably 0.2 µm or less, most preferably 0.1 µm or less.

A mode pore diameter (PD) in the range of 0.01 µm to 1 µm outside this range tends to prevent an electrolyte solution from being efficiently distributed into intra-particle voids and prevent the efficient use of Li-ion insertion/extraction sites in the particles, thus resulting in degraded low-temperature output characteristics and cycle characteristics.

Furthermore, when a composite carbon material is formed, such a mode pore diameter (PD) tends to prevent the carbonaceous material (B) precursor from uniformly diffusing and permeating to the surface and into the micropores of the carbon material (A), thus resulting in reduced coating uniformity of the carbonaceous material (B). This makes it difficult to control the average value and the standard deviation ($\sigma_R$) of microscopic Raman R values of the composite carbon material and results in degraded low-temperature output characteristics and cycle characteristics.

Cumulative Pore Volume at Pore Diameters in Range of 0.01 µm to 1 µm

The cumulative pore volume at pore diameters in a range of 0.01 µm to 1 µm of the carbon material is a value determined by mercury intrusion (mercury porosimetry) and, even when pressure is applied, typically 0.07 mL/g or more, preferably 0.08 mL/g or more, more preferably 0.09 mL/g or more, most preferably 0.10 mL/g or more, and preferably 0.3 mL/g or less, more preferably 0.25 mL/g or less, still more preferably 0.2 mL/g or less, particularly preferably 0.18 mL/g or less.

An excessively small cumulative pore volume at pore diameters in a range of 0.01 µm to 1 µm tends to prevent an electrolyte solution from permeating into the particles and prevent the efficient use of Li-ion insertion/extraction sites in the particles. This impedes smooth insertion/extraction of lithium ions in fast charging and discharging and results in degraded low-temperature output characteristics. A cumulative pore volume within the above range tends to allow an electrolyte solution to be smoothly and efficiently distributed into the particles, thus enabling the effective and efficient use of Li-ion insertion/extraction sites in the particles as well as on the periphery of the particles during charging and discharging and providing good low-temperature output characteristics.

Half Width at Half Maximum of Pore Distribution (log (nm))

The half width at half maximum of pore distribution (log (nm)) of the carbon material refers to a half width at half maximum at a micropore side of a peak in a pore diameter range of 0.01 μm to 1 μm in a pore distribution (nm), as determined by mercury intrusion (mercury porosimetry), with a horizontal axis expressed in common logarithm (log (nm)).

(In the Case where the Carbon Material has a d50 of 13 μm or More)

When the carbon material having a d50 of 13 μm or more is a spheroidized carbon material made of flake graphite, crystalline graphite, and vein graphite, its half width at half maximum of pore distribution (log (nm)) is preferably 0.45 or greater, more preferably 0.5 or greater, still more preferably 0.6 or greater, particularly preferably 0.65 or greater, most preferably 0.7 or greater, and preferably 10 or less, more preferably 5 or less, still more preferably 3 or less, particularly preferably 1 or less.

(In the Case where the Carbon Material has a d50 of Less than 13 μm)

When the d50 of the carbon material is less than 13 μm, its half width at half maximum of pore distribution (log (nm)) is preferably 0.01 or greater, more preferably 0.05 or greater, still more preferably 0.1 or greater, and preferably 0.33 or less, more preferably 0.3 or less, still more preferably 0.25 or less, particularly preferably 0.23 or less.

When the half width at half maximum of pore distribution (log (nm)) is in this range, intra-particle voids in a pore diameter range of 0.01 μm to 1 μm tend to be formed to have a finer structure and thus allow an electrolyte solution to be smoothly and efficiently distributed into the particles. This enables the effective and efficient use of Li-ion insertion/extraction sites in the particles as well as on the periphery of the particles during charging and discharging, thus providing good low-temperature output characteristics and cycle characteristics.

Total Pore Volume

The total pore volume of the carbon material is a value determined by mercury intrusion (mercury porosimetry) and preferably 0.1 mL/g or more, more preferably 0.3 mL/g or more, still more preferably 0.5 mL/g or more, particularly preferably 0.6 mL/g or more, most preferably 0.7 mL/g or more. The total pore volume of the carbon material is preferably 10 mL/g or less, more preferably 5 mL/g or less, still more preferably 2 mL/g or less, particularly preferably 1 mL/g or less.

A total pore volume in this range eliminates the need for using an excess amount of binder in forming an electrode plate and facilitates the diffusion of a thickener and a binder in forming an electrode plate.

As an apparatus for the mercury porosimetry, a mercury porosimeter (Autopore 9520 available from Micromeritics Corp.) can be used. A sample (carbon material) is weighed to around 0.2 g and placed in a powder cell. The cell is sealed, and a pretreatment is carried out by degassing the cell at room temperature under vacuum (50 μmHg or lower) for 10 minutes.

Subsequently, mercury is introduced into the cell under a reduced pressure of 4 psia (approximately 28 kPa). The pressure is increased stepwise from 4 psia (approximately 28 kPa) to 40,000 psia (approximately 280 MPa) and then reduced to 25 psia (approximately 170 kPa).

The number of steps in the pressure increase is at least 80. In each step, the amount of mercury intrusion is measured after an equilibration time of 10 seconds. From the mercury intrusion curve thus obtained, a pore distribution is calculated using the Washburn equation.

The calculation is made assuming that the surface tension ($\gamma$) of mercury is 485 dyne/cm, and the contact angle ($\psi$) is 140°. The average pore diameter is defined as a pore diameter at a cumulative pore volume of 50%.

Ratio (PD/d50(%)) of Mode Pore Diameter (PD) in Pore Diameter Range of 0.01 μm to 1 μm to Volume-Based Average Particle Diameter (d50)

The ratio (PD/d50) of mode pore diameter (PD) in a pore diameter range of 0.01 μm to 1 μm to volume-based average particle diameter (d50) of the carbon material is expressed by equation (1A) and typically 1.8 or less, preferably 1.80 or less, more preferably 1.00 or less, still more preferably 0.90 or less, particularly preferably 0.80 or less, most preferably 0.70 or less, and typically 0.01 or greater, preferably 0.10 or greater, more preferably 0.20 or greater.

$$PD/d50(\%) = \text{mode pore diameter } (PD) \text{ in } a \text{ pore diameter range of } 0.01 \text{ μm to } 1 \text{ μm in } a \text{ pore distribution determined by mercury intrusion/volume-based average particle diameter } (d50) \times 100 \quad \text{Equation (1A):}$$

A mode pore diameter (PD) in a pore diameter range of 0.01 μm to 1 μm outside this range tends to prevent an electrolyte solution from being efficiently distributed into intra-particle voids and prevent the efficient use of Li-ion insertion/extraction sites in the particles, thus resulting in degraded low-temperature output characteristics and cycle characteristics.

Furthermore, when the carbon material is formed into a composite carbon material, such a mode pore diameter (PD) tends to prevent the carbonaceous material (B) precursor from more uniformly diffusing and permeating to the surface and into the micropores of the carbon material (A). This makes it difficult to control the average value and the standard deviation ($\sigma_R$) of microscopic Raman R values of the composite carbon material and results in degraded low-temperature output characteristics and cycle characteristics.

Frequency of Particles of 3 μm or Less

The frequency of particles with a particle diameter of 3 μm or less of the carbon material after ultrasonic waves of 28 kHz have been applied at a power of 60 W for 5 minutes is preferably 1% or more, more preferably 10% or more, and preferably 60% or less, more preferably 55% or less, still more preferably 50% or less, particularly preferably 40% or less, most preferably 30% or less.

A frequency of particles in this range tends to cause less particle decay and fine powder separation during, for example, kneading for preparing a slurry, rolling an electrode, and charging and discharging, thus providing good low-temperature output characteristics and cycle characteristics.

The frequency of particles with a particle diameter of 3 μm or less after ultrasonic waves of 28 kHz have been applied at a power of 60 W for 5 minutes is a value determined by mixing 50 mL of a 0.2% by volume aqueous solution of a polyoxyethylene sorbitan monolaurate surfactant (e.g., Tween 20 (registered trademark)) with 0.2 g of a carbon material, applying ultrasonic waves of 28 kHz at a power of 60 W for a predetermined time using a flow-type particle image analyzer "FPIA-2000 available from Sysmex Industrial Corp.", and then counting the number of particles with a detection range set to 0.6 to 400 μm.

Roundness

The roundness of the carbon material according to this embodiment is typically 0.88 or greater, preferably 0.90 or greater, more preferably 0.91 or greater, still more preferably 0.92 or greater. The roundness is preferably 1 or less, more preferably 0.98 or less, still more preferably 0.97 or less.

A roundness in this range tends to inhibit the degradation of high-current-density charge-discharge characteristics of non-aqueous secondary batteries. The roundness is defined by the following equation, and a theoretically perfect sphere has a roundness of 1.

A roundness in the above range tends to decrease the degree of flection of Li-ion diffusivity to smoothen the movement of electrolyte solution in intra-particle voids and enable moderate contact between the carbon materials, thus providing good fast charge-discharge characteristics and cycle characteristics.

Roundness=(perimeter of equivalent circle having the same area as projected particle shape)/(actual perimeter of projected particle shape)

As the value of the roundness is used a value determined, for example, using a flow-type particle image analyzer (e.g., FPIA available from Sysmex Industrial Corp.) by dispersing about 0.2 g of a sample (carbon material) in a 0.2% by mass aqueous solution (approximately 50 mL) of a polyoxyethylene (20) sorbitan monolaurate surfactant, irradiating the dispersion with ultrasonic waves of 28 kHz at a power of 60 W for 1 minute, and then measuring the roundness of particles with a diameter in the range of 1.5 to 40 μm with a detection range set to 0.6 to 400 μm. The ratio of the perimeter of a circle (equivalent circle) having the same area as the projected particle shape measured, as the numerator, to the perimeter of the projected particle shape measured, as the denominator, is calculated, and the average is calculated to determine the roundness.

X-Ray Parameter

The d-value (interplanar spacing) of lattice planes ((002) planes) of the carbon material, as determined by X-ray diffractometry in accordance with the method of the Japan Society for Promotion of Scientific Research, is preferably 0.335 nm to less than 0.340 nm. The d-value is more preferably 0.339 nm or less, still more preferably 0.337 nm or less, particularly preferably 0.336 nm or less. A $d_{002}$-value in this range tends to increase the crystallinity of the graphite, thus inhibiting the increase in initial irreversible capacity. The theoretical value of graphite is 0.335 nm.

The crystallite size (Lc) of the carbon material, as determined by X-ray diffractometry in accordance with the method of the Japan Society for Promotion of Scientific Research, is preferably in the range of 30 nm or more, more preferably 50 nm or more, still more preferably 90 nm or more, particularly preferably 100 nm or more. A crystallite size in this range provides particles having not too low crystallinity, thus providing a non-aqueous secondary battery the reversible capacity of which is less likely to decrease.

Ash Content

The ash content of the carbon material is preferably 1% by mass or less, more preferably 0.5 W by mass or less, still more preferably 0.1% by mass or less, based on the total mass of the carbon material. The ash content is preferably at least 1 ppm.

An ash content in this range can provide a non-aqueous secondary battery that undergoes only negligible degradation of battery performance due to the reaction between carbon material and electrolyte solution during charging and discharging. In addition, such an ash content does not require much time or energy to produce a carbon material and eliminates the need for equipment for preventing contamination, thus reducing the increase in cost.

Furthermore, such an ash content can inhibit the increase in the reactivity of a negative electrode formed using the carbon material with an electrolyte solution to reduce gas generation, thus providing a preferred non-aqueous secondary battery.

BET Specific Surface Area (SA)

The specific surface area (SA) of the carbon material, as determined by BET method, is preferably 1 m$^2$/g or more, more preferably 2 m$^2$/g or more, still more preferably 3 m$^2$/g or more, particularly preferably 4 m$^2$/g or more. The specific surface area (SA) is preferably 30 m$^2$/g or less, more preferably 25 m$^2$/g or less, still more preferably 20 m$^2$/g or less, even more preferably 18 m$^2$/g or less, particularly preferably 17 m$^2$/g or less, most preferably 15 m$^2$/g or less.

A specific surface area in this range tends to sufficiently secure sites where Li enters and exits, thus providing excellent fast charge-discharge characteristics and output characteristics, and tends to moderately control the activity of an active material against electrolyte solution, thus inhibiting the increase in initial irreversible capacity, as a result of which a high-capacity battery can be produced.

Furthermore, such a specific surface area can inhibit the increase in the reactivity of a negative electrode formed using the carbon material with an electrolyte solution to reduce gas generation, thus providing a preferred non-aqueous secondary battery.

The BET specific surface area is defined as a value determined as follows: using a surface area meter (e.g., a Gemini 2360 specific surface area analyzer available from Shimadzu Corporation), a carbon material sample is preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area is measured by a nitrogen adsorption BET multipoint method according to a flowing gas method.

True Density

The true density of the carbon material is preferably 1.9 g/cm$^3$ or more, more preferably 2 g/cm$^3$ or more, still more preferably 2.1 g/cm$^3$ or more, even more preferably 2.2 g/cm$^3$ or more, and up to 2.26 g/cm$^3$. The upper limit is the theoretical value of graphite. A true density in this range tends to avoid too low carbon crystallinity, thus inhibiting the increase in initial irreversible capacity of non-aqueous secondary batteries.

Aspect Ratio

The aspect ratio of the carbon material in powder form is theoretically 1 or greater, preferably 1.1 or greater, more preferably 1.2 or greater. The aspect ratio is preferably 10 or less, more preferably 8 or less, still more preferably 5 or less.

An aspect ratio in this range tends to prevent streaks of a slurry (a material for forming a negative electrode) containing the carbon material from occurring during the formation of an electrode plate so as to provide a uniform coated surface, thus avoiding degraded high-current-density charge-discharge characteristics of non-aqueous secondary batteries.

The aspect ratio is expressed as A/B, where A is the longest diameter of a carbon material particle observed in a three-dimensional manner, and B is the shortest diameter among the diameters orthogonal to the longest diameter. The observation of the carbon material particle is carried out under a scanning electron microscope capable of magnifying observation. Fifty carbon material particles immobilized on the surface of a metal having a thickness of 50 microns or less are randomly selected. For each of the particles, A and B are determined while a stage on which the samples are immobilized is rotated and tilted, and the average value of A/B is calculated.

Maximum Particle Diameter Dmax

The maximum particle diameter dmax of the carbon material is preferably 200 μm or less, more preferably 150 μm or less, still more preferably 120 μm or less, particularly preferably 100 μm or less, most preferably 80 μm or less. A dmax in this range tends to inhibit the occurrence of process defects such as streaks.

The maximum particle diameter is defined as a value of the largest particle diameter in a particle size distribution obtained in the measurement of average particle diameter d50.

Raman R Value

The Raman R value of the carbon material is preferably, but not necessarily, 0.01 or greater, more preferably 0.05 or greater, still more preferably 0.1 or greater, particularly preferably 0.15 or greater, most preferably 0.2 or greater. The Raman R value is typically 1 or less, preferably 0.8 or less, more preferably 0.7 or less, still more preferably 0.6 or less, particularly preferably 0.5 or less, most preferably 0.4 or less.

The Raman R value is defined as an intensity ratio ($I_B/I_A$) in a Raman spectrum obtained by Raman spectroscopy, where $I_A$ is an intensity of peak $P_A$ near 1,580 cm$^{-1}$, and $I_B$ is an intensity of peak $P_B$ near 1,360 cm$^{-1}$.

As used herein, "near 1,580 cm$^{-1}$" refers to a range of 1,580 to 1,620 cm$^{-1}$, and "near 1,360 cm$^{-1}$" a range of 1,350 to 1,370 cm$^{-1}$.

The Raman R value is an indicator of the crystallinity near the surface (from the particle surface to a depth of about 100 angstroms) of a carbon particle, and smaller Raman R values indicate higher crystallinities or less disordered crystalline states. A Raman R value in this range tends to reduce the possibility that the crystallinity of the surface of the carbon material particles increases and that crystals, when the density is increased, are oriented in the direction parallel to a negative electrode plate, thus avoiding degraded load characteristics. Furthermore, such a Raman R value tends to reduce the possibility that crystals on the particle surface are disordered and inhibit the increase in the reactivity of a negative electrode with an electrolyte solution, thus avoiding reduced charge-discharge efficiency and increased gas generation of non-aqueous secondary batteries.

The Raman spectrum described above can be measured using a Raman spectroscope. Specifically, a sample is loaded by gravity-dropping target particles into a measuring cell, and the measuring cell is irradiated with an argon-ion laser beam while being rotated in a plane perpendicular to the laser beam. The measurement conditions are as follows:
Wavelength of argon-ion laser beam: 514.5 nm
Laser power on sample: 25 mW
Resolution: 4 cm$^{-1}$
Measurement range: 1,100 cm$^{-1}$ to 1,730 cm$^{-1}$
Measurement of peak intensity, measurement of peak half-width: background processing, smoothing processing (convolution by simple average, 5 points)

DBP Absorption

The dibutyl phthalate (DBP) absorption of the carbon material is preferably 85 mL/100 g or less, more preferably 70 mL/100 g or less, still more preferably 65 mL/100 g or less, particularly preferably 60 mL/100 g or less. The DBP absorption is preferably 30 mL/100 g or more, more preferably 40 mL/100 g or more.

A DBP absorption in this range, which means that the carbon material is spheroidized to a sufficient degree, tends to reduce the risk of causing defects such as streaks when a slurry containing the carbon material is applied. Also, such a DBP absorption tends to avoid the decrease in reactivity because of the presence of pore structures in the particles.

The DBP absorption is defined as a value obtained by making a measurement in accordance with JIS K6217 using 40 g of a target material (carbon material) under the conditions of a drip rate of 4 mL/min, a rotation speed of 125 rpm, and a torque of 500 N·m. For the measurement, use can be made of a Brabender Model E absorptometer, for example.

Average Particle Diameter d10

The particle diameter corresponding to a cumulative total of 10% from the smallest particle (d10) of the carbon material, as measured on a volume basis, is preferably 30 μm or less, more preferably 20 μm or less, still more preferably 17 μm or less, and preferably 1 μm or more, more preferably 3 μm or more, still more preferably 5 μm or more.

A d10 in this range does not lead to too strong an aggregation tendency of the particles, thus avoiding process defects, such as increases in slurry viscosity, and reduced electrode strength and reduced initial charge-discharge efficiency of non-aqueous secondary batteries. Furthermore, such a d10 tends to avoid degraded high-current-density charge-discharge characteristics and degraded low-temperature output characteristics.

The d10 is defined as a value at which the particle frequency % is accumulated to 10% from the smallest particle diameter in a particle size distribution obtained in the measurement of average particle diameter d50.

Average Particle Diameter d90

The particle diameter corresponding to a cumulative total of 90% from the smallest particle (d90) of the carbon material, as measured on a volume basis, is preferably 100 μm or less, more preferably 70 μm or less, still more preferably 60 μm or less, even more preferably 50 μm or less, particularly preferably 45 μm or less, most preferably 42 μm or less, and preferably 20 μm or more, more preferably 26 μm or more, still more preferably 30 μm or more, particularly preferably 34 μm or more.

A d90 in this range tends to avoid reduced electrode strength and reduced initial charge-discharge efficiency of non-aqueous secondary batteries and also avoid process defects, such as streaks during the application of a slurry, degraded high-current-density charge-discharge characteristics, and degraded low-temperature output characteristics.

The d90 is defined as a value at which the particle frequency % is accumulated to 90% from the smallest particle diameter in a particle size distribution obtained in the measurement of average particle diameter d50.

The silicon content of the carbon material, as determined by X-ray fluorescence analysis (XRF), is typically 5 ppm or more, preferably 10 ppm or more, more preferably 15 ppm or more, still more preferably 20 ppm or more, and typically 500 ppm or less, preferably 300 ppm or less, more preferably 200 ppm or less, still more preferably 170 ppm or less, particularly preferably 150 ppm or less, most preferably 100 ppm or less.

A silicon content in this range tends to avoid reduced electrode strength and reduced initial charge-discharge efficiency of non-aqueous secondary batteries.

Frequency (%) of Particles with Diameter of 5 μm or Less

In one embodiment of the present invention (e.g., but not limited to, Invention C), $Q_{5min}$ (%), the frequency of particles with a diameter of 5 μm or less of the carbon material after ultrasonic waves of 28 kHz have been applied at a power of 60 W for 5 minutes, is preferably 40% or less, more preferably 35% or less, still more preferably 30% or less.

$Q_{1min}$ (%), the frequency of particles with a diameter of 5 μm or less of the carbon material after ultrasonic waves of 28 kHz have been applied at a power of 60 W for 1 minute, is preferably 30% or less, more preferably 27% or less, still more preferably 23% or less.

Furthermore, $Q_{10min}$ (%), the frequency of particles with a diameter of 5 μm or less of the carbon material after ultrasonic waves of 28 kHz have been applied at a power of 60 W for 10 minutes, is preferably 60% or less, more preferably 50% or less, still more preferably 45% or less, most preferably 40% or less.

Frequencies of particles in these ranges tend to cause less carbon material decay and fine powder separation during, for example, kneading for preparing a slurry, rolling an electrode, and charging and discharging, thus providing good low-temperature output characteristics and cycle characteristics.

In one embodiment of the present invention (e.g., but not limited to, Invention C), the carbon material for a non-aqueous secondary battery is preferably a carbon material for a non-aqueous secondary battery capable of occluding and releasing lithium ions and formed from a plurality of graphite particles, the carbon material satisfying inequality (1C):

$$Q_{5min} (\%)/D50(\mu m) \leq 3.5 \tag{1C}$$

where $Q_{5min}$ (%) is a frequency (%) of particles with a diameter of 5 μm or less determined with a flow-type particle image analyzer after the carbon material has been irradiated with ultrasonic waves of 28 kHz at a power of 60 W for 5 minutes, and D50 (μm) is a volume-based median diameter determined by laser diffraction/scattering after the carbon material has been irradiated with ultrasonic waves of 28 kHz at a power of 60 W for 1 minute.

The ratio of $Q_{5min}$ (%), a frequency of particles with a diameter of 5 μm or less after ultrasonic irradiation for 5 minutes, to D50 (μm), a volume-based median diameter, falling within the range defined by inequality (1C) indicates that the carbon material has so high particle strength as to generate little amount of fine powder even upon physical impact. Thus, the carbon material generates little amount of fine powder when used as a negative electrode active material to form an electrode plate, for example, and generates little amount of separated and isolated fine powder upon repeated charging and discharging of a battery, thus providing a non-aqueous secondary battery, particularly, a lithium ion secondary battery, having excellent input-output characteristics and excellent cycle characteristics.

The frequency (%) of particles with a diameter of 5 μm or less after ultrasonic irradiation and the volume-based median diameter in this specification are determined as described below.

Frequency (%) of Particles with Diameter of 5 μm or Less after Ultrasonic Irradiation The frequency (%) of particles with a diameter of 5 μm or less after ultrasonic irradiation is a percentage of the number of particles with a diameter of 5 μm or less in the total, as determined by mixing 50 mL of a dispersion medium with 0.2 g of a sample, placing the mixture in a flow-type particle image analyzer (e.g., FPIA-2000 available from Sysmex Industrial Corp.), applying ultrasonic waves of 28 kHz at a power of 60 W for a predetermined time, and then counting the number of particles with a detection range set to 0.6 to 400 μm. In this specification, the frequency (%) of particles with a diameter of 5 μm or less is expressed as $Q_{5min}$ (%), $Q_{1min}$ (%), and $Q_{10min}$ (%) when the ultrasonic irradiation time is 5 minutes, 1 minute, and 10 minutes, respectively.

The dispersion medium may be any medium capable of homogeneously dispersing the sample in the liquid, and, for example, alcohols, such as ethanol and butanol, and water can be used. Dispersant solutions containing dispersants can also be used, and examples include 0.2% by volume aqueous solutions of polyoxyethylene sorbitan monolaurate surfactants (e.g., Tween 20, registered trademark).

Ratio of Frequency of Particles with Diameter of 5 μm or Less (%)/Volume-Based Median Diameter D50 (μm)

In one embodiment of the present invention (e.g., but not limited to, Invention C), the ratio of $Q_{5min}$ (%), a frequency (%) of particles with a diameter of 5 μm or less after applying ultrasonic waves of 28 kHz to the carbon material at a power of 60 W for 5 minutes, to D50 (μm), a volume-based median diameter, ($Q_{5min}$/D50) is 3.5 or less, preferably 3.0 or less, more preferably 2.5 or less. Although the lower limit is not limited to a particular value, it can be at least 0.1.

A $Q_{5min}$/D50 ratio in this range can further reduce the generation of fine powder during the formation of an electrode plate and reduces the risk of causing a conductive path break and a side reaction with an electrolyte solution to increase resistance, thus providing a non-aqueous secondary battery, particularly, a lithium ion secondary battery, having excellent input-output characteristics. In addition, such a ratio reduces the risk of causing separation and isolation of fine powder to cause a conductive path break when the carbon material particles swell and shrink upon repeated charging and discharging, thus providing a non-aqueous secondary battery, particularly, a lithium ion secondary battery, having excellent cycle characteristics.

The ratio of $Q_{1min}$ (%), a frequency (%) of particles with a diameter of 5 μm or less after applying ultrasonic waves of 28 kHz at a power of 60 W for 1 minute, to D50 (μm) ($Q_{1min}$/D50) is preferably, but not necessarily, 2.4 or less, more preferably 2.0 or less, still more preferably 1.8 or less, particularly preferably 1.5 or less. Although the lower limit is not limited to a particular value, it can be at least 0.1.

A $Q_{1min}$/D50 ratio in this range can readily provide a non-aqueous secondary battery, particularly, a lithium ion secondary battery, comprising a negative electrode active material made of the carbon material, the battery being less likely to undergo separation and isolation of fine powder during charging and discharging to experience a conductive path break and having excellent cycle characteristics.

Furthermore, the ratio of $Q_{10min}$, a frequency (%) of particles with a diameter of 5 μm or less after applying ultrasonic waves of 28 kHz at a power of 60 W for 10 minutes, to D50 (μm) ($Q_{10min}$/D50) is preferably, but not necessarily, 4.0 or less, more preferably 3.5 or less, still more preferably 3.3 or less, particularly preferably 3.0 or less. Although the lower limit is not limited to a particular value, it can be at least 0.1.

A $Q_{10min}$/D50 ratio in this range can readily provide a non-aqueous secondary battery, particularly, a lithium ion secondary battery, comprising a negative electrode active material made of the carbon material, the battery being less likely to undergo separation and isolation of fine powder, for example, during charging and discharging to experience a conductive path break and having excellent cycle characteristics.

Total Amount of Eliminated CO and Eliminated $CO_2$ During Temperature Rise from Room Temperature to 1,000° C. Using Pyrolysis Mass Spectrometer (TPD-MS)

In one embodiment of the present invention (e.g., but not limited to, Invention C), the total amount of eliminated CO and eliminated $CO_2$ measured using a pyrolysis mass spectrometer (TPD-MS) by heating the carbon material from room temperature to 1,000° C. is preferably 125 μmol/g or less, more preferably 100 μmol/g or less, still more preferably 75 μmol/g or less. Although the lower limit is not limited to a particular value, it can be at least 1 μmol/g. As used herein, "room temperature" means 20° C. to 25° C.

Amount of Eliminated CO During Temperature Rise from Room Temperature to 1,000° C. Using Pyrolysis Mass Spectrometer (TPD-MS)

The amount of eliminated CO measured using a pyrolysis mass spectrometer (TPD-MS) by heating the carbon material according to this embodiment from room temperature to 1,000° C. is preferably 100 μmol/g or less, more preferably 80 μmol/g or less, still more preferably 60 μmol/g or less. Although the lower limit is not limited to a particular value, it can be at least 1 μmol/g.

Amount of Eliminated $CO_2$ During Temperature Rise from Room Temperature to 1,000° C. Using Pyrolysis Mass Spectrometer (TPD-MS)

The amount of eliminated $CO_2$ measured using a pyrolysis mass spectrometer (TPD-MS) by heating the carbon material according to this embodiment from room temperature to 1,000° C. is preferably 25 μmol/g or less, more preferably 20 μmol/g or less, still more preferably 15 μmol/g or less. Although the lower limit is not limited to a particular value, it can be at least 1 μmol/g.

Within the above ranges, the amount of graphite functional group, such as hydroxy (—OH), carboxyl (—C=O (—OH)), carbonyl (C=O), and quinone, of graphite particles of the carbon material is small, which reduces the obstruction of parent particle-parent particle, parent particle-fine powder, and fine powder-fine powder bindings that might otherwise be caused by these functional groups, thus providing a carbon material having high particle strength. As a result, the carbon material generates a reduced amount of fine powder even when a physical impact is applied. In addition, when the carbon material is used as a negative electrode of a battery, the small amount of functional group reduces the risk of side reactions with an electrolyte solution, which can reduce the amount of gas generated in the battery.

In one aspect of the carbon material according to an embodiment of the present invention, preferred is a carbon material for a non-aqueous secondary battery capable of occluding and releasing lithium ions, the carbon material having a cumulative pore volume at pore diameters in a range of 2 to 4 nm, as determined by nitrogen gas adsorption, of 0.0022 $cm^3/g$ or more and a tap density of 0.83 $g/cm^3$ or more.

In this embodiment (e.g., but not limited to, Invention G), a carbon material or a mixed carbon material is preferred.

Cumulative Pore Volume at Pore Diameters in Range of 2 to 4 nm Determined by Nitrogen Gas Adsorption In this embodiment (e.g., but not limited to, Invention G), the carbon material has a cumulative pore volume at pore diameters in a range of 2 to 4 nm, as determined by nitrogen gas adsorption, of 0.0022 $cm^3/g$ or more, preferably 0.0025 $cm^3/g$ or more, more preferably 0.0028 $cm^3/g$ or more, still more preferably 0.0032 $cm^3/g$ or more, particularly preferably 0.0035 $cm^3/g$ or more, and typically 1.0 $cm^3/g$ or less, preferably 0.10 $cm^3/g$ or less, more preferably 0.050 $cm^3/g$ or less, still more preferably 0.010 $cm^3/g$ or less, particularly preferably 0.0050 $cm^3/g$ or less.

A cumulative pore volume at pore diameters in a range of 2 to 4 nm of the carbon material smaller than 0.0022 $cm^3/g$ results in insufficient lithium insertion/extraction sites, thus leading to a low-temperature output. An excessively large cumulative pore volume tends to increase side reactions with an electrolyte solution, thus reducing storage characteristics and charge-discharge efficiency.

The cumulative pore volume can be determined by nitrogen gas adsorption. As an apparatus for the measurement, an Autoforb (Quantachrome) can be used. A sample is placed in a powder cell, and the cell is sealed and pre-treated at 350° C. under vacuum (1.3 Pa or lower) for 2 hours, after which an adsorption isotherm (adsorption gas: nitrogen) is measured at liquid nitrogen temperature.

Using the adsorption isotherm obtained, a BJH analysis was performed to determine a micropore distribution, from which the cumulative pore volume at pore diameters in a range of 2 nm to 100 nm is calculated.

Maximum dV/Dlog (D) (V: Cumulative Pore Volume, D: Pore Diameter) at Pore Diameters in Range of 2 to 4 nm Determined by Nitrogen Gas Adsorption In one embodiment of the present invention (e.g., but not limited to, Invention G), the maximum dV/dlog (D) (V: cumulative pore volume, D: pore diameter) at pore diameters in a range of 2 to 4 nm of the carbon material, as determined by nitrogen gas adsorption, is typically 0.0090 $cm^3/g$ or more, preferably 0.011 $cm^3/g$ or more, more preferably 0.013 $cm^3/g$ or more, and typically 0.50 $cm^3/g$ or less, preferably 0.10 $cm^3/g$ or less, more preferably 0.050 $cm^3/g$ or less, still more preferably 0.020 $cm^3/g$ or less.

A maximum dV/dlog in this range tends to ensure sufficient lithium-ion insertion/extraction sites, thus effectively improving low-temperature output.

The dV/dlog (D) is a quotient of a differential cumulative pore volume dV divided by the logarithmic differential value d (log D) of a pore diameter and is calculated by measuring the above cumulative pore volume at pore diameters in a range of 2 to 4 nm, as determined by nitrogen gas adsorption, such that the interval of log (D) is 0.010 to 0.050.

Cumulative Pore Volume at Pore Diameters in Range of 2 to 100 nm Determined by Nitrogen Gas Adsorption In this embodiment (e.g., but not limited to, Invention G), the cumulative pore volume at pore diameters in a range of 2 to 100 nm of the carbon material, as determined by nitrogen gas adsorption, is typically 0.025 $cm^3/g$ or more, preferably 0.030 $cm^3/g$ or more, more preferably 0.035 $cm^3/g$ or more, still more preferably 0.040 $cm^3/g$ or more, and typically 5.0 $cm^3/g$ or less, preferably 2.0 $cm^3/g$ or less, more preferably 1.0 $cm^3/g$ or less, still more preferably 0.50 $cm^3/g$ or less, particularly preferably 0.10 $cm^3/g$ or less.

A cumulative pore volume at pore diameters in a range of 2 to 100 nm of the carbon material in this range smoothens the movement of electrolyte solution between particles, thus improving input-output characteristics.

The cumulative pore volume at pore diameters in a range of 2 to 100 nm determined by nitrogen gas adsorption is calculated by the same measurement method as for the above cumulative pore volume at pore diameters in a range of 2 to 4 nm.

In one aspect of one embodiment of the present invention, preferred is a carbon material for a non-aqueous secondary battery capable of occluding and releasing lithium ions, the carbon material having a Raman R value, as given by equation (1H), of 0.31 or greater and a thermal weight loss ratio per unit area (ΔTG/SA), as given by equation (2H), of 0.05 to 0.45.

In other words, the carbon material according to an embodiment of the present invention (e.g., but not limited to, Invention H) is preferably a carbon material for a non-aqueous secondary battery capable of occluding and releasing lithium ions, the carbon material having a Raman R value, as given by equation (1H), of 0.31 or greater and a thermal weight loss ratio per unit area (ΔTG/SA), as given by equation (2H), of 0.05 to 0.45.

Raman value $R$=intensity $I_B$ of peak $P_B$ near 1,360 cm-1/intensity $I_A$ of peak $P_A$ near 1,580 cm-1 by Raman spectrum analysis     Equation (1H)

(ΔTG/SA)=(thermal weight loss (ΔTG) (%) on heating from 400° C. to 600° C. at 2° C./min in air atmosphere, measured with differential thermal balance)/(specific surface area (SA) ($m^2$/g) of carbon material determined by BET method)     Equation (2H)

Raman R Value

The Raman R value of the carbon material according to this embodiment (e.g., but not limited to, Invention H), as given by equation (1H), is 0.31 or greater, preferably 0.32 or greater, more preferably 0.33 or greater, still more preferably 0.35 or greater, particularly preferably 0.36 or greater, most preferably 0.37 or greater. The upper limit of the Raman R value is typically, but not necessarily, 1 or less, preferably 0.7 or less, more preferably 0.6 or less, still more preferably 0.5 or less.

Raman value $R$=intensity $I_B$ of peak $P_B$ near 1,360 $cm^{-1}$/intensity $I_A$ of peak $P_A$ near 1,580 $cm^{-1}$ by Raman spectrum analysis     Equation (1H)

As used herein, "near 1,580 $cm^{-1}$" refers to a range of 1,580 to 1,620 $cm^{-1}$, and "near 1,360 $cm^{-1}$" a range of 1,350 to 1,370 $cm^{-1}$.

A Raman R value of less than 0.31 tends to increase the crystallinity of the surface of the carbon material particles to reduce Li-ion insertion/extraction sites, thus resulting in degraded low-temperature output characteristics. An excessively large Raman R value tends to reduce graphite crystallinity, thus resulting in a low discharge capacity.

The Raman spectrum described above can be measured using a Raman spectroscope. Specifically, a sample is loaded by gravity-dropping target particles into a measuring cell, and the measuring cell is irradiated with an argon-ion laser beam while being rotated in a plane perpendicular to the laser beam. The measurement conditions are as follows:

Wavelength of argon-ion laser beam: 514.5 nm
Laser power on sample: 25 mW
Resolution: 4 $cm^{-1}$
Measurement range: 1,100 $cm^{-1}$ to 1,730 $cm^{-1}$
Measurement of peak intensity, measurement of peak half-width: background processing, smoothing processing (convolution by simple average, 5 points)

Thermal Weight Loss Ratio Per Unit Area (ΔTG/SA)

The thermal weight loss (ΔTG) (%) of the carbon material according to this embodiment (e.g., but not limited to, Invention H) is determined as follows: into a platinum pan, 5 mg of a carbon material is weighed, and the pan is placed in a differential thermal balance (TG8120 available from Rigaku Corporation); under an air stream of 100 mL/min, the temperature is raised from room temperature to 400° C. at a rate of 20° C./min and then from 400° C. to 600° C. at a rate of 2° C./min, and the amount of thermal weight loss is measured. The calculated value of thermal weight loss between 400° C. and 600° C. in this measurement is defined as a thermal weight loss (ΔTG) (%) in the present invention. The thermal weight loss ratio per unit area (ΔTG/SA) is calculated by equation (2H).

The ΔTG/SA is typically 0.05 or greater, preferably 0.08 or greater, more preferably 0.10 or greater, still more preferably 0.13 or greater, particularly preferably 0.15 or greater, most preferably 0.17 or greater, and typically 0.45 or less, preferably 0.43 or less, more preferably 0.40 or less, still more preferably 0.35 or less, particularly preferably 0.30 or less, most preferably 0.25 or less.

(ΔTG/SA)=(thermal weight loss (ΔTG) (%) on heating from 400° C. to 600° C. at 2° C./min in air atmosphere, measured with differential thermal balance)/(specific surface area (SA) ($m^2$/g) of carbon material determined by BET method)     Equation (2H)

A ΔTG/SA of greater than 0.45 reduces graphite crystallinity, thus resulting in a low discharge capacity, and further impedes the smooth movement of Li ions, thus resulting in degraded low-temperature output characteristics. A ΔTG/SA of less than 0.05 reduces the number of Li-ion insertion/extraction sites, thus resulting in degraded low-temperature output characteristics.

In this embodiment (e.g., but not limited to, Invention H), a carbon material or a mixed carbon material is preferred.

In one aspect of one embodiment of the present invention, the carbon material is preferably a carbon material for a non-aqueous secondary battery capable of occluding and releasing lithium ions, the carbon material being graphite particles satisfying the relationship of inequality (1I).

$$100Y_i + 0.26X_i > \alpha$$     Inequality (1I)

(In the inequality, $Y_i$ is an oxygen functional group dispersity given by equation (2I); $X_i$ is a volume-based average particle diameter (d50) (μm); and α=9.4)

Oxygen functional group dispersity ($Y_i$)=total oxygen content (mol %) determined by elemental analysis/surface oxygen content (O/C) (mol %) determined by X-ray photoelectron spectroscopy     Equation (2I)

Specifically, the carbon material for a non-aqueous secondary battery according to one embodiment of the present invention (e.g., but not limited to, Invention I) preferably satisfies the relationship of inequality (1I), which is a relationship between oxygen functional group dispersity and volume-based average particle diameter (d50).

$$100Y_i + 0.26X_i > \alpha$$     Inequality (1I)

(In the inequality, $Y_i$ is an oxygen functional group dispersity given by equation (2I); $X_i$ is a volume-based average particle diameter (d50) (μm); and α=9.4)

Oxygen functional group dispersity ($Y_i$)=total oxygen content (mol %) determined by elemental analysis/surface oxygen content (O/C) (mol %) determined by X-ray photoelectron spectroscopy     Equation (2I)

The value α given by inequality (1I) of the carbon material according to this embodiment (e.g., but not limited to, Invention I) is 9.4, preferably 9.5, more preferably 9.6, still more preferably 9.7, particularly preferably 9.8, most preferably 10.0. When the relationship represented by inequality (1I) is unsatisfied, efficient Li-ion insertion/extraction cannot be effected in the particles, which tends to result in degraded low-temperature output characteristics and a reduced capacity.

Surface Functional Group Amount O/C Value (Mol %)

For X-ray photoelectron spectroscopy (XPS), an X-ray photoelectron spectroscope (e.g., ESCA available from Ulvac-Phi, Incorporated) is used. A measuring object (in this case, a graphite material, i.e., the carbon material) is mounted on a sample stage such that the surface of the object is flat, and a multiplex measurement is performed using a Kα radiation of aluminum as an X-ray source to measure spectra of C1s (280 to 300 eV) and O1s (525 to 545 eV). Charge correction is performed with the C1s peak top obtained set to 284.3 eV. Peak areas of the spectra of C1s and O1s are determined and then multiplied by an apparatus sensitivity to determine the surface atom concentrations of C and O. The O/C ratio of the atom concentrations of O and C obtained (O atom concentration/C atom concentration)×100 is defined as the surface functional group amount O/C value of the carbon material.

The O/C value determined by XPS is preferably 0.01 or greater, more preferably 0.1 or greater, still more preferably 0.3 or greater, particularly preferably 0.5 or greater, most preferably 0.7 or greater, and preferably 2 or less, more preferably 1.5 or less, still more preferably 1.2 or less, particularly preferably 1 or less, most preferably 0.8 or less. A surface functional group amount O/C value in this range tends to enhance the desolvation reactivity of Li ions with an electrolyte solution solvent on the surface of a negative electrode active material, thus leading to improved fast charge-discharge characteristics, and reduce the reactivity with an electrolyte solution, thus leading to improved charge-discharge efficiency.

Total Oxygen Content (Mol %)

For measuring oxygen/nitrogen/hydrogen contents, an oxygen/nitrogen/hydrogen analyzer (TCH600 ONH determinator available from LECO) is used. In an inert gas atmosphere impulse furnace, 50 mg of the carbon material is melted and decomposed, and the amounts of carbon monoxide and carbon dioxide in a discharged carrier gas are measured using an infrared detector to determine the total oxygen content (mol %) of the carbon material.

The total oxygen content (mol %), as determined by the measurement of oxygen/nitrogen/hydrogen contents, is preferably 0.001 mol % or more, more preferably 0.01 mol % or more, still more preferably 0.02 mol % or more, particularly preferably 0.03 mol % or more, most preferably 0.04 mol % or more, and preferably 0.5 mol % or less, more preferably 0.2 mol % or less, still more preferably 0.15 mol % or less, particularly preferably 0.1 mol % or less, most preferably 0.08 mol % or less. A total oxygen content (mol %) in this range tends to promote the desolvation reaction of Li ions with an electrolyte solution solvent on the surface of a negative electrode active material, thus leading to improved fast charge-discharge characteristics, and reduce the reactivity with an electrolyte solution, thus leading to improved charge-discharge efficiency.

$Y_i$: Oxygen Functional Group Dispersity

The oxygen functional group dispersity of the carbon material is typically 0.01 or greater, preferably 0.04 or greater, more preferably 0.06 or greater, still more preferably 0.07 or greater, and typically 1 or less, preferably 0.5 or less, more preferably 0.3 or less, still more preferably 0.2 or less.

An oxygen functional group dispersity in this range means that oxygen functional groups are not maldistributed on the particle surface and dispersed also in the particles. The presence of oxygen functional groups at graphite crystal edge portions that functions as Li-ion insertion/extraction sites suggests that the carbon material having an oxygen functional group dispersity in this range has a moderate number of Li-ion insertion/extraction sites not only on but also in the particles. Thus, an oxygen functional group dispersity in this range enables efficient Li-ion insertion/extraction also in the particles and tends to provide a high capacity and good low-temperature output characteristics.

In this embodiment (e.g., but not limited to, Invention I), a carbon material or a mixed carbon material is preferred.

In one aspect of one embodiment of the present invention, the carbon material for a non-aqueous secondary battery is a carbon material for a non-aqueous secondary battery characterized in that a large number of voids having fine structures are present in the particles.

Specifically, the carbon material for a non-aqueous secondary battery according to an embodiment of the present invention (e.g., but not limited to, Inventions $L^1$ to $L^3$) preferably comprises a carbon material made of granulated particles satisfying (1L) and (2L) and further has a characteristic particle cross section such that a box-counting dimension is determined from an image of the particle cross section.

Carbon Material (Granulated Particles) Satisfying (1L) and (2L) in Carbon Material for Non-Aqueous Secondary Battery The granulated particles in the carbon material for a non-aqueous secondary battery satisfies the following:
(1) Being made of a carbonaceous material; and
(2) Satisfying the relationship $|X_1-X|/X_1 \leq 0.2$, preferably $\leq 0.15$, more preferably $\leq 0.1$, where X is a volume-based average particle diameter determined by laser diffraction, and $X_1$ is an equivalent circular diameter determined from a cross-sectional SEM image.

If $|X_1-X|/X_1$ is too large, typical particles cannot be selected, which may result in failure to express the overall tendency.

The volume-based average particle diameter X is defined as a volume-based median diameter determined by suspending 0.01 g of a carbon material in 10 mL of a 0.2% by mass aqueous solution of a polyoxyethylene sorbitan monolaurate surfactant (e.g., Tween 20 (registered trademark)), placing the suspension (a measurement sample) in a commercially available laser diffraction/scattering particle size distribution analyzer (e.g., LA-920 available from HORIBA), irradiating the measurement sample with ultrasonic waves of 28 kHz at a power of 60 W for 1 minute, and then performing a measurement with the analyzer.

The equivalent circular diameter $X_1$ determined from a cross-sectional SEM image is expressed by the following formula using a particle circumference L [μm].

$$X_1 = \frac{L}{2\pi} \qquad \text{[Mathematical 1]}$$

The granulated particles in the carbon material for a non-aqueous secondary battery satisfies the relationship $|R-R_1| \leq 0.1$, preferably $\leq 0.08$, more preferably $\leq 0.06$, where R is a roundness determined with a flow-type particle image analyzer, and $R_1$ is a roundness determined from a cross-sectional SEM image.

If $|R-R_1|$ is too large, a particle boundary is not defined correctly but overestimated, which may result in incorrect analysis.

As the value of the roundness R determined with a flow-type particle image analyzer is used a value determined, for example, using a flow-type particle image analyzer (e.g., FPIA available from Sysmex Industrial Corp.) by dispersing about 0.2 g of a sample (carbon material for a non-aqueous secondary battery) in a 0.2% by mass aqueous solution (approximately 50 mL) of a polyoxyethylene (20) sorbitan monolaurate surfactant, irradiating the dispersion with ultrasonic waves of 28 kHz at a power of 60 W for 1 minute, and then measuring the roundness of particles with a diameter in the range of 1.5 to 40 μm with a detection range set to 0.6 to 400 μm.

The roundness $R_1$ determined from a cross-sectional SEM image is calculated by the following formula using a particle area S [μm$^2$] determined from a cross-sectional SEM image and a circumference L [μm].

$$R_1 = \frac{4\pi S}{(L)^2} \quad \text{[Mathematical 2]}$$

The particle boundary may be defined by any method, and it may be defined automatically or manually using commercially available analysis software. It is preferable to approximate a particle by a polygon, and in this case, an approximation by a polygon with 15 or more sides is more preferred. This is because if a polygon with less than 15 sides is used, a background portion may be determined to be a part of the particle in approximating a curve.

Acquisition of Particle Cross-Sectional Image

For the image of a particle cross section is used a reflected electron image acquired at an acceleration voltage of 10 kV using a scanning electron microscope (SEM). An SEM observation sample for acquiring a particle cross-sectional image may be prepared by any method, and a particle cross-sectional image is acquired using an SEM after a sample is prepared by cutting an electrode plate containing the carbon material for a non-aqueous secondary battery, a film coated with the carbon material for a non-aqueous secondary battery, with a focused ion beam (FIB) or ion milling to obtain a particle cross section.

The acceleration voltage in observing the cross section of the carbon material for a non-aqueous secondary battery with a scanning electron microscope (SEM) is 10 kV.

This acceleration voltage makes a difference between a reflected electron SEM image and a secondary electron SEM image to allow void regions and other regions of the carbon material for a non-aqueous secondary battery to be easily distinguished. The imaging magnification is typically 500× or more, more preferably 1,000× or more, still more preferably 2,000× or more, and typically 10,000 or less. An imaging magnification in this range enables the acquisition of an entire image of one particle of the carbon material for a non-aqueous secondary battery. The resolution is 200 dpi (ppi) or more, preferably 256 dpi (ppi) or more. The number of picture elements suitable for evaluation is at least 800 pixels.

Average Box-Counting Dimension Relative to Void Regions in Cross-Sectional SEM Image The carbon material for a non-aqueous secondary battery has an average box-counting dimension relative to void regions of 1.55 or greater, preferably 1.60 or greater, more preferably 1.62 or greater, and typically 1.80 or less, preferably 1.75 or less, more preferably 1.70 or less, as calculated from images obtained by randomly selecting 30 granulated particles satisfying (1L) and (2L) above from a cross-sectional SEM image, dividing the cross-sectional SEM image of each granulated particle into void regions and non-void regions, and binarizing the image.

An excessively small average box-counting dimension relative to void regions means that the amount of finer structure is small, in which case excellent output characteristics, one of the effects of the present invention, cannot be provided. An excessively large average box-counting dimension increases the specific surface area of the particles, leading to low initial efficiency.

The box-counting dimensions of the particles of the carbon material for a non-aqueous secondary battery are determined taking the following (a) to (d) into account.

(a) Definition and Calculation Method of Box-Counting Dimension

Box-counting dimension is a method for estimating a fractal dimension by observing a certain area split into certain sizes (box sizes) to examine how much fractal patterns are contained (see, for example, JP 2013-77702 A). Box-counting dimension is an indicator of shape complexity, the degree of surface irregularity, and others, and larger fractal dimensions indicate more complex irregularities. The Box-counting dimension is defined below. The fractal dimension is defined by the following formula, where Nδ (F) is the number of square boxes of side δ necessary for covering a pattern F.

$$D = \lim_{\delta \to 0} \frac{N_\delta(F)}{\log \delta} \quad \text{[Mathematical 3]}$$

In this embodiment (e.g., but not limited to, Invention L[1]), a cross-sectional SEM image of a particle composed of voids and carbon is split into grid areas (boxes) at regular intervals δ (split into square subareas of side δ), and the number of boxes containing voids is counted with varying values of δ. Next, a double logarithmic graph is created with the number of boxes counted plotted on the vertical axis and δ on the horizontal axis, and a fractal dimension is determined from the slope of the graph.

Figure 7:
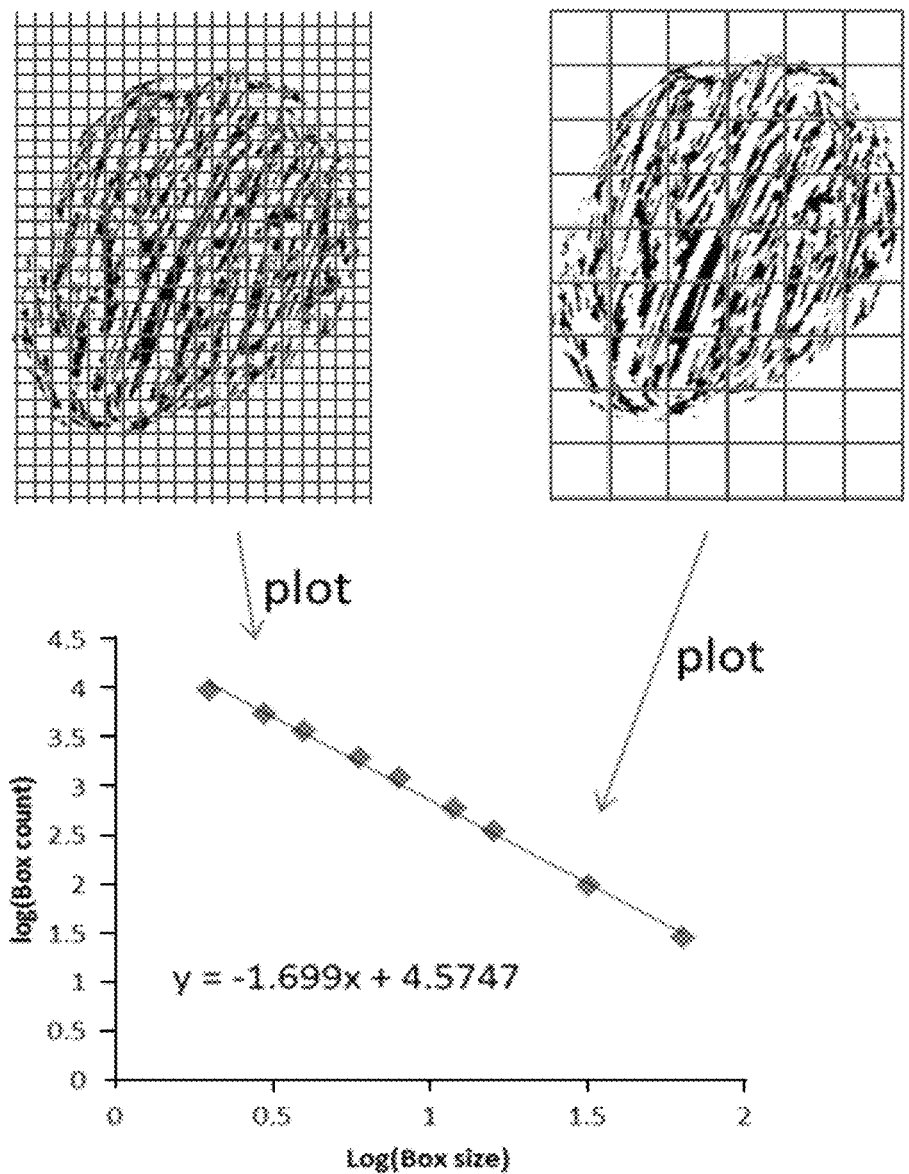
FIG. 7 shows binarized images (photographs substituted for drawings) of one granulated particle in the carbon material of Example L1 and a logarithmic graph, as determined by the box-counting method, with box size plotted on the horizontal axis and the number of boxes counted on the vertical axis.
Figure 8:
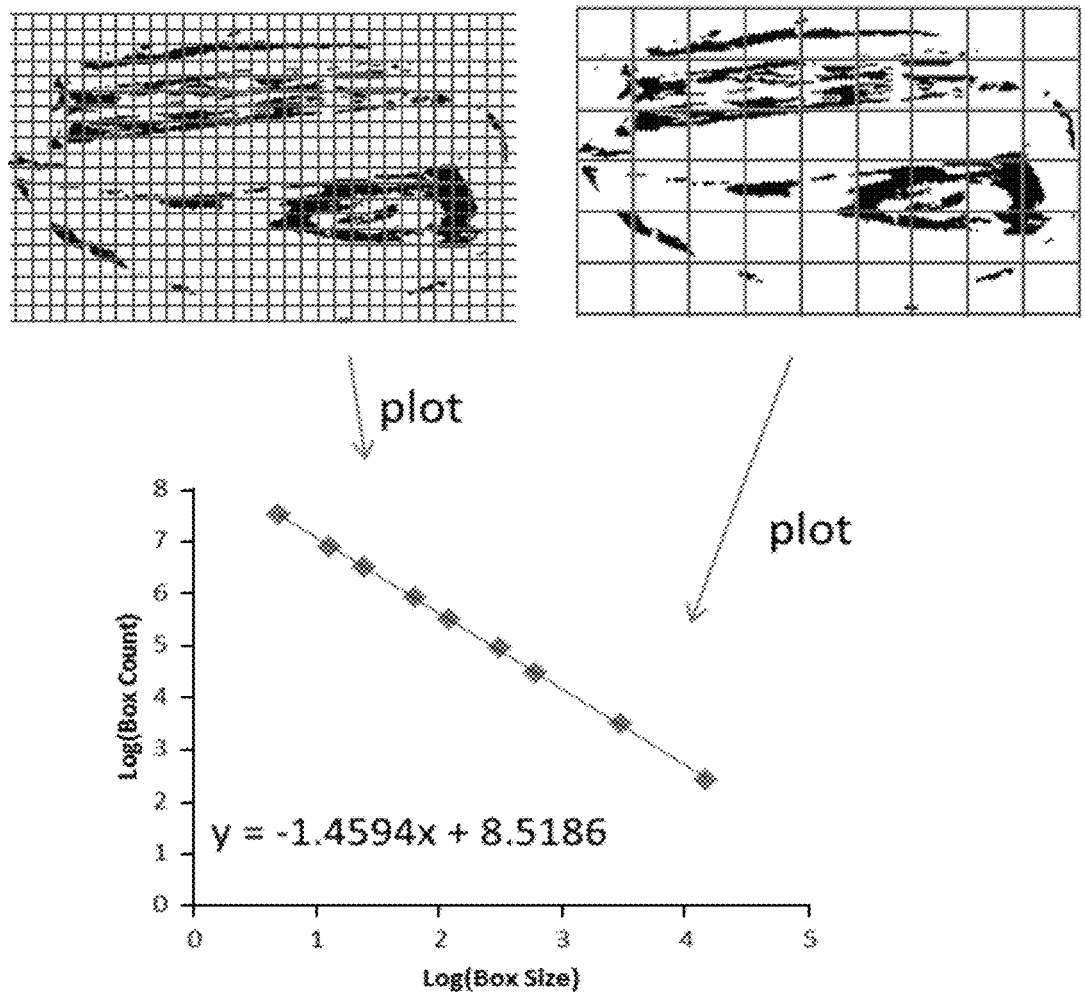
FIG. 8 shows binarized images (photographs substituted for drawings) of one granulated particle in the carbon material of Comparative Example L1 and a logarithmic graph, as determined by the box-counting method, with box size plotted on the horizontal axis and the number of boxes counted on the vertical axis.

Specifically, in a cross-sectional SEM image of a particle composed of voids and carbon, voids and other regions of the particle are binarized. The binarization is performed in units of pixels of the image. Analysis objects are portions representing pixels of voids among the binarized regions. The region outside the particle (outside the outline of the particle) requires value conversion so as not to be regarded as a void. The image is split into grid areas (boxes) having a specific pixel size. Although the boxes may be arranged in any manner, they are preferably arranged parallel to the major axis (the longest diameter passing through the barycenter) of the particle. In the arrangement, the image is split into boxes as shown in FIGS. 7 and 8. The number of split boxes including at least one pixel representing a void is counted. The same procedure is repeated with varying box sizes, and a double logarithmic graph is created with the number of boxes counted plotted on the vertical axis and the box size δ on the horizontal axis. A linear approximation of this plot is performed, and the slope of the line is multiplied by −1. The product obtained is the fractal dimension according to the box-counting method. The slope may be calculated by the least-squares method.

The fractal dimension is an indicator of the degree of self-similarity, and in expressing a binarized image, it serves as an indicator of the complexity and the fineness of a structure. This means that in a binarized image having a more complicated partial structure, the proportion of fine structure in a box tends to increase, that is, the slope tends to be steeper with decreasing box size, and the fineness of the partial structure and the amount of such structure are expressed. In other words, the box-counting dimension in the present invention is an indicator of the complexity of a fine structure of voids and the amount of such structure.

(b) Definition of Box Size

The image may be split into any box size, but based on the maximum pixel of the image, it is preferably split into 10 parts or more, more preferably 15 parts or more, particularly preferably 20 parts or more, and typically 50 parts or less, preferably 40 parts or less, more preferably 30 parts or less, on a logarithmic graph. A box size in this range reduces the possibility that differences between picture elements occur and eliminates the need for a high-resolution image.

(c) Method of Binarization

Figure 9:
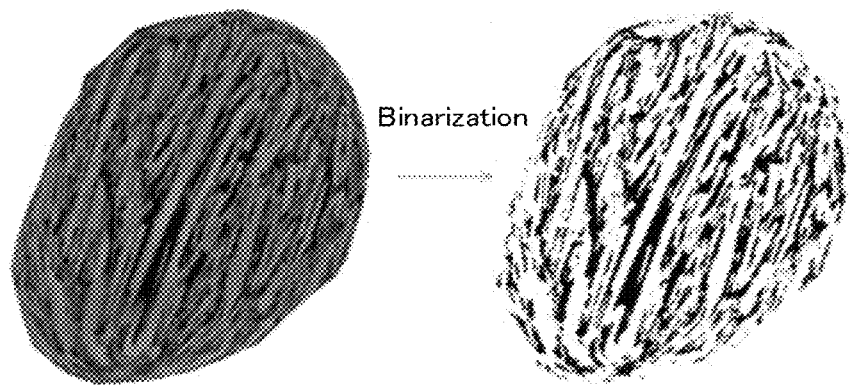
FIG. 9 shows a cross-sectional SEM image (a photograph substituted for a drawing) and a binarized image of one granulated particle in the carbon material of Example L1.

The binarization may be carried out by any method by which intra-particle voids and carbon portions are clearly distinguished from each other, as shown in FIG. 9. The binarization, when performed on an 8-bit gray-scale image, such as an SEM image, refers to dividing luminances into two and representing the two divided images in two values (e.g., 0 and 255, in the case of 8-bit). The binarization may be carried out using any desired image processing software. The division by setting a threshold can be carried out using any algorithm, such as the mode method and the Iterative Self-Organizing Data (ISOData) method, by which void portions and carbon portions can be clearly distinguished from each other.

Figure 10:
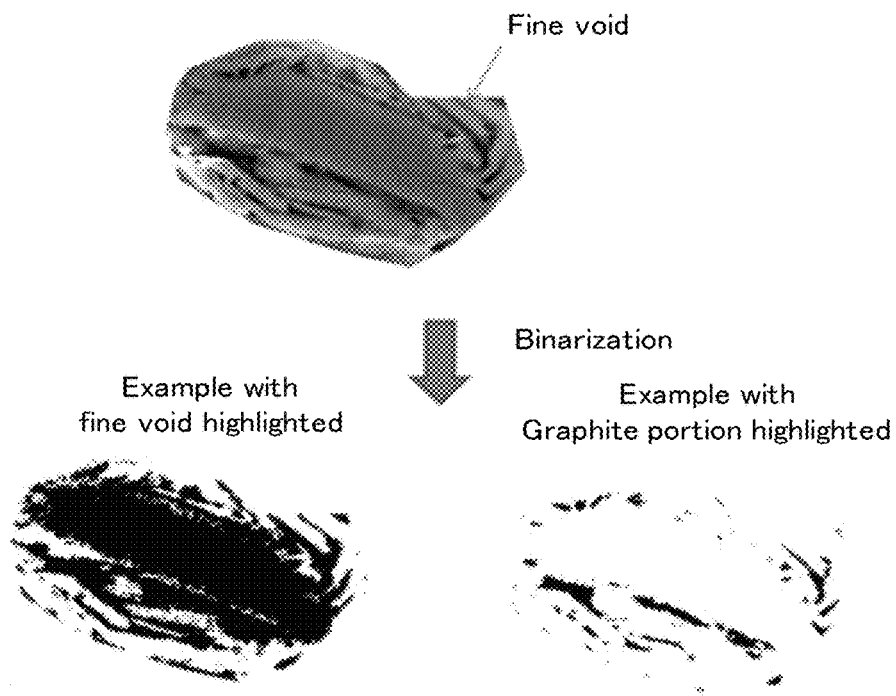
FIG. 10 shows exemplary images (photographs substituted for drawings) unsuitable for analysis in SEM image binarization.

The target image needs to be a binarizable image. The binarizable image, in this case, refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

(d) Definition of Particle Boundary

The particle boundary may be established by any method by which the boundary is clearly defined. For example, it may be established by freehand or the approximation by a polygon. In defining the boundary, it is necessary to establish the boundary between the particle and other regions such that the region of interest (ROI) representing the shape of the particle is completely included. When the boundary is not a simple oval but has a complicated shape, for example, the boundary may be divided into any desired number of equally spaced sections to approximate the particle region by a polygon. The boundary, however, is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1| \leq 0.1$. When an electrode coated with a binder having poor conductivity is used, the boundary may be difficult to determine under the measurement conditions in this embodiment. This is probably a phenomenon that occurs due to the poor conductivity of the binder when the side of the particle is visible in depth of the cross section of the particle. In such a case, it is necessary to take an image with a clear boundary at a lower acceleration voltage to determine a boundary.

In one aspect of one embodiment of the present invention, the carbon material for a non-aqueous secondary battery is a carbon material for a non-aqueous secondary battery comprising uniformly dispersed intra-particle pores.

Specifically, the carbon material for a non-aqueous secondary battery according to an embodiment of the present invention (e.g., but not limited to, Invention $L^2$) comprises a carbon material made of granulated particles satisfying (1L) and (2L) above and further has a characteristic particle cross section such that the void dispersity D of the present invention is determined from an image of the particle cross section.

Void Dispersity D in Cross-Sectional SEM Image

The carbon material for a non-aqueous secondary battery typically has an average dispersity D of 30 particles, as determined by the following measurement method using 30 granulated particles satisfying (1L) and (2L) above randomly selected from a cross-sectional SEM image, of 60% or more, preferably 61% or more, more preferably 62% or more, and typically 90% or less, preferably 85% or less, more preferably 80% or less.

Measurement Method

Using a cross-sectional SEM image, grid lines are drawn to split the minor axis and the major axis of a target granulated particle each into 20 parts. Using cells in the grid, the granulated particle is compartmentalized as defined below. The expectation E of void area of each compartment is calculated using equation (A) below, and the dispersity D of the granulated particle is calculated using equation (B) below.

The cross-sectional SEM image is a reflected electron image acquired at an acceleration voltage of 10 kV.

How to Create Grid

Figure 11:
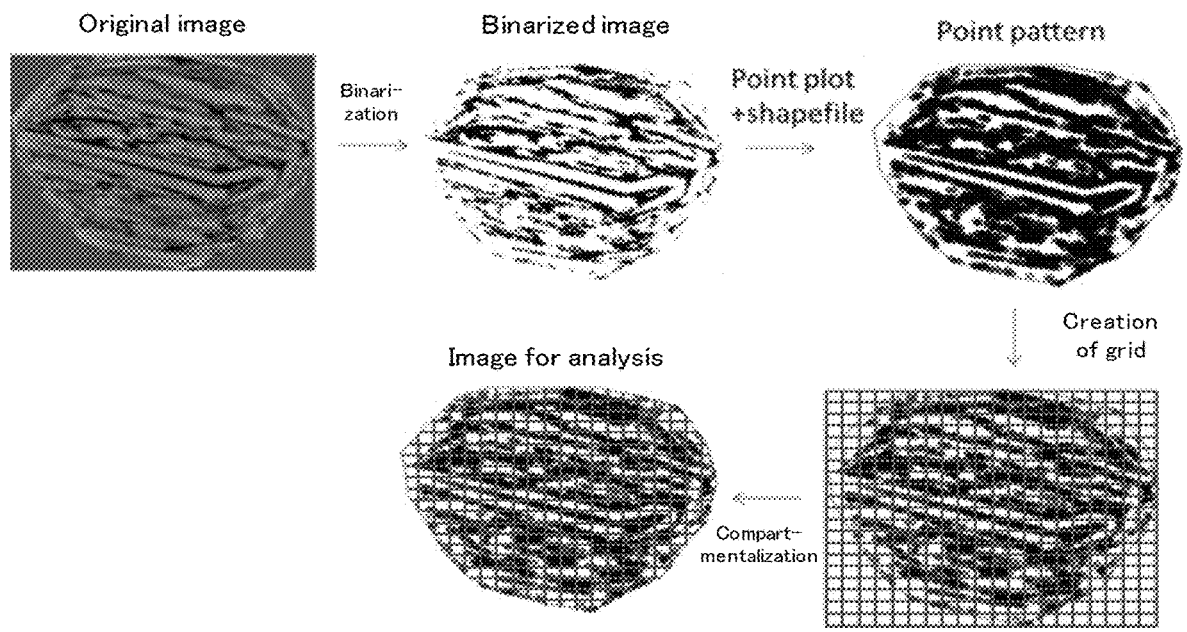
FIG. 11 shows a method of binarization, drawing of grid lines, and compartmentalization of one granulated particle in the carbon material of Example L1 (photographs substituted for drawings)

Using a cross-sectional SEM image, grid lines are drawn to split the minor axis and the major axis of a target granulated particle each into 20 parts, as shown in FIG. 11. This image needs to be parallel to the particle major axis and the image.

Definition of Compartment

Figure 12:
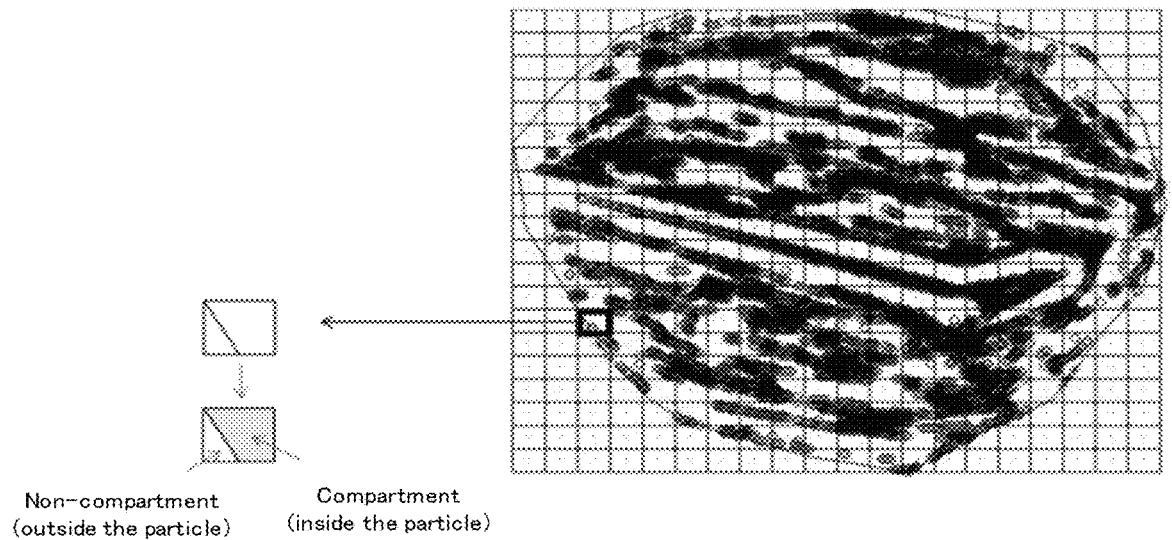
FIG. 12 shows a compartment and a non-compartment in a cell defined by grid lines (photographs substituted for drawings)

The compartment is defined as a granulated particle portion and/or a region where a void is present in the granulated particle in each cell of the grid. The outside of the boundary of the granulated particle is excluded from the compartment. For grid cells that are divided by the particle boundary into two, as shown in FIG. 12, the region including the particle is defined as a compartment.

Definition of Expectation

For compartments defined by grid lines and the particle boundary, the expectation E of a void area corresponding to each compartment area is determined from equation (A).

> Expectation $E[\mu m^2]$ of void area in target compartment=(gross area $[\mu m^2]$ of internal voids of one target granulated particle)/(cross-sectional area $[\mu m^2]$ of one target granulated particle)×(area $[\mu m^2]$ of target compartment)   Equation (A)

The expectation E of a compartment defined by the particle boundary is calculated to be smaller than the expectation E of a grid cell according to the area of the compartment.

Definition of Dispersity D

The dispersity D, an indicator of the void dispersity in a particle, is calculated by equation (B).

Dispersity $D(\%)$=(sum total [$\mu m^2$] of areas of compartments that satisfy (gross area [$\mu m^2$] of voids in target compartment)/(expectation $E[\mu m^2]$ of void area in target compartment)=0.5 or greater)/(sum total [$\mu m^2$] of areas of all the compartments of one target granulated particle)×100     Equation (B)

The dispersity D indicates how voids are dispersed throughout the inside of a particle, excluding compartments having only a small void area.

The equation (A) and the equation (B) of the carbon material for a non-aqueous secondary battery are calculated taking the following (a) to (d) into account.

(a) Method of Selecting Granulated Particles and Definition of Major Axis and Minor Axis The particle boundary may be established by any method by which the boundary is clearly defined. For example, it may be established by freehand or the approximation by a polygon. In defining the boundary, it is necessary to establish the boundary between the particle and other regions such that the region of interest (ROI) representing the shape of the particle is completely included. When the boundary is not a simple oval but has a complicated shape, for example, the boundary may be divided into any desired number of equally spaced sections to approximate the particle region by a polygon. The boundary, however, is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1|\leq 0.1$. When an electrode coated with a binder having poor conductivity is used, the boundary may be difficult to determine under the measurement conditions in this embodiment. This is probably a phenomenon that occurs due to the poor conductivity of the binder when the side of the particle is visible in depth of the cross section of the particle. In such a case, it is necessary to retake an image with a clear boundary at a lower acceleration voltage to determine a boundary.

For one randomly selected granulated particle, the barycenter (centroid) is defined. First, the particle defined by the boundary is approximated by square cells. The size of each cell is preferably, but not necessarily, 5 nm or less in actual size. Two-dimensional coordinates are determined in the image. The coordinates of the barycenter of each cell are defined. Assuming that the weights of the cells are the same, the cells are numbered from 1 to N. The following formula is used to determine the coordinates of the barycenter of the granulated particle.

$$\vec{r_G} = \frac{\sum_1^N \vec{r_i}}{N} \qquad \text{[Mathematical 4]}$$

In the formula, $r_i$ represents the coordinates of an i-th cell, and $r_G$ represents the coordinates of the barycenter. The barycenter may be determined by operating any desired image software, or by the following formula if the barycenter of each divided mesh can be defined by any given figure.

$$\vec{r_G} = \frac{\sum_1^N A_i \vec{r_i}}{\sum_1^N A_i} \qquad \text{[Mathematical 5]}$$

In the formula, $A_i$ is the area of an i-th figure, and $r_i$ is the barycentric (centroid) coordinates of the i-th figure.

Next, the longest line segment among line segments passing through the barycenter obtained and bounded by the boundary fixed as described above is defined as a major axis. The line segment orthogonal to the major axis among line segments passing through the barycenter and bounded by the boundary fixed as described above is defined as a minor axis.

(b) Definition of Void Region and Non-Void Region and Method of Calculating their Areas The binarization may be carried out by any method by which intra-particle voids and carbon portions are clearly distinguished from each other, as shown in FIG. 9, and is preferably carried out such that void regions and other carbon particle regions are clearly distinguished from each other. The binarization, when performed on an 8-bit grayscale image, such as an SEM image, refers to dividing luminances into two and representing the two divided images in two values (e.g., 0 and 255, in the case of 8-bit). The binarization may be carried out using any desired image processing software. The division by setting a threshold can be carried out using any algorithm, such as the mode method and the ISOData method, by which void portions and carbon portions can be clearly distinguished from each other. The target image needs to be a binarizable image. The binarizable image refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

The areas of the void region and the non-void region in the particle thus calculated are each calculated as an approximation in a pixel unit and converted into an actual unit.

(c) Creation of Grid

In the binarized image is created cells that split the minor axis and the major axis of the granulated particle each into 20 parts. As for the cell arrangement, the cells may be arranged such that they are parallel to the major axis and the minor axis of the granulated particle.

(d) Calculation of Expectation E and Dispersity D of Target Compartment

For each of the 400 cells created by splitting the minor axis and the major axis of the granulated particle each into 20 parts, the expectation E is calculated by equation (A) above. The sum total of areas of compartments having an expectation E of 0.5 or greater is calculated, and the dispersity D is calculated by equation (B) above.

For each of the 30 granulated particles selected, the dispersity D is calculated, and the average dispersity D of the 30 particles is calculated.

In one aspect of one embodiment of the present invention, the carbon material for a non-aqueous secondary battery is preferably a carbon material for a non-aqueous secondary battery comprising intra-particle voids the orientation of which and the interval between which are controlled.

Specifically, the carbon material for a non-aqueous secondary battery according to an embodiment of the present invention (e.g., but not limited to, Invention $L^3$) comprises a carbon material made of granulated particles satisfying the following (1L) and (2L) and further has a characteristic particle cross section such that the ratio (Zave/X) of average inter-void distance Z (Zave) of 30 particles to volume-based average particle diameter X determined by laser diffraction of the present invention is determined from an image of the particle cross section.

Zave/X

The carbon material for a non-aqueous secondary battery according to this embodiment (e.g., but not limited to, Invention $L^3$) comprises granulated particles satisfying (1L) and (2L) above and has an average inter-void distance Z (Zave) of 30 particles as defined below and a volume-based average particle diameter X determined by laser diffraction in a ratio (Zave/X) of typically 0.060 or less, preferably 0.055 or less, more preferably 0.050 or less, still more preferably 0.045 or less, and typically 0.001 or greater, preferably 0.010 or greater, more preferably 0.020 or greater, the 30 granulated particles satisfying (1L) and (2L) above and being randomly selected from a cross-sectional SEM image.

An excessively large Zave/X means that the distance between the carbon material and voids constituting the granulated particle is wide, which results in a low liquid retention in the particle.

Definition of Average Inter-Void Distance Z (Zave) of 30 Particles

Figure 13:
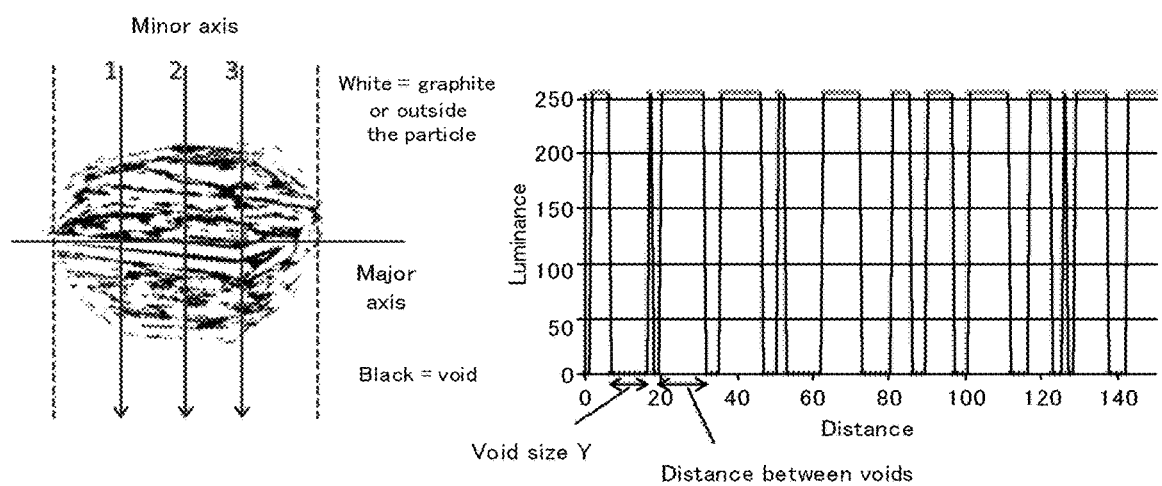
FIG. 13 shows a method for calculating the void distance and the distance between voids of one granulated particle in the carbon material of Example L1 (photographs substituted for drawings)
Figure 14:
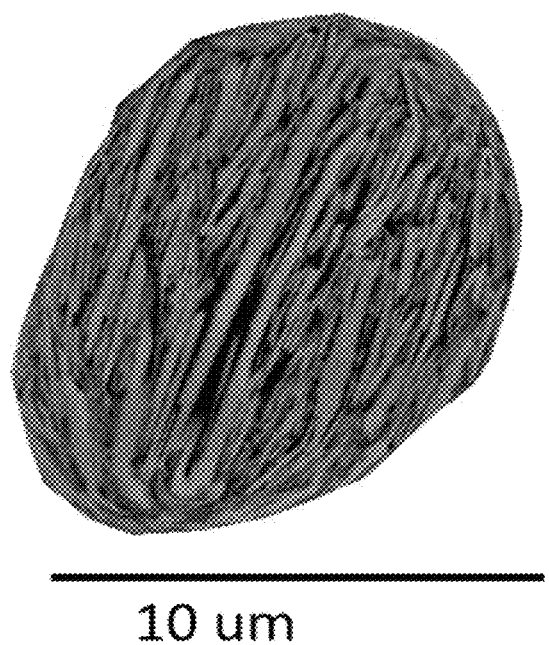
FIG. 14 is an SEM image of one granulated particle in the carbon material of Example L1 (a photograph substituted for a drawing)
Figure 15:
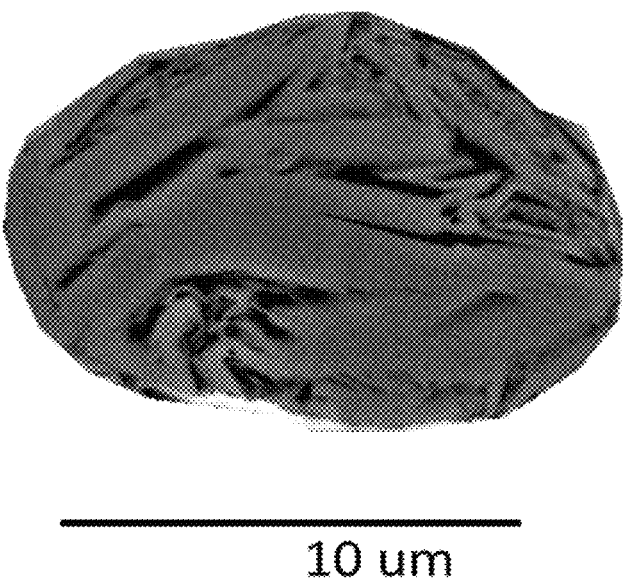
FIG. 15 is an SEM image of one granulated particle in the carbon material of Comparative Example L1 (a photograph substituted for a drawing).

As shown in the left figure of FIG. 13, three lines are drawn that are parallel to the minor axis of a target granulated particle and split the major axis of the granulated particle into four parts, and inter-void distances Z (μm) of the granulated particle on each line (see the right figure of FIG. 13) are each measured. The average of 30 particles in total is calculated. This is defined as the average inter-void distance Z (Zave) of 30 particles.

W/X

In this embodiment (e.g., but not limited to, Invention $L^3$), the carbon material for a non-aqueous secondary battery comprises granulated particles satisfying (1L) and (2L) above and has a standard deviation (W) of void sizes Y of 30 particles as defined below and a volume-based average particle diameter X determined by laser diffraction in a ratio (W/X) of preferably 0.018 or less, more preferably 0.016 or less, still more preferably 0.014 or less, and typically 0.001 or greater, preferably 0.005 or greater, more preferably 0.008 or greater, the 30 granulated particles satisfying (1L) and (2L) above and being randomly selected from a cross-sectional SEM image.

W/X is a quotient of a standard deviation of void sizes divided by a particle size, and a larger value of W/X means that a higher proportion of relatively large voids.

A W/X in the above range means relatively uniform void sizes or a low proportion of large voids, meaning that the carbon material has a fine void structure that allows an electrolyte solution to uniformly permeate into the particles.

Definition of Standard Deviation (W) of Void Sizes Y (μm) of 30 Particles

As shown in the left figure of FIG. 13, three lines are drawn that are parallel to the minor axis of a target granulated particle and split the major axis of the granulated particle into four parts, and void sizes Y (μm) of the granulated particle on each line (see the right figure of FIG. 13) are each measured. The standard deviation of 30 particles in total is calculated. This is defined as the standard deviation (W) of void sizes Y of 30 particles.

The standard deviation is determined by the following formula, where Yave is the average of Y, and Ny is the number of Y.

$$W = \left( \frac{\sum (Y - Y_{ave})^2}{Ny} \right)^{1/2} \qquad \text{[Mathematical 6]}$$

Condition of Voids

Preferably, the granulated particles in the carbon material for a non-aqueous secondary battery according to this embodiment (e.g., but not limited to, Invention $L^3$) have slit-like voids, and the slit-like voids are arranged mainly in layers.

More specifically, among 30 granulated particles satisfying (1L) and (2L) above randomly selected from a cross-sectional SEM image, the proportion (by number) of particles having slit-like voids arranged mainly in layers is more preferably 70% or more, particularly preferably 80% or more, most preferably 90% or more. Within this range, it can be said that most of all the particles have voids having a slit-like and layered structure.

"Slit-like void" refers to a long and narrow void (with a high aspect ratio) like a gap. The aspect ratio of the void is preferably 10 or greater, more preferably 15 or greater. The aspect ratio is a value obtained by dividing the major axis of the void by the minor axis, that is, (major axis of void)/(minor axis of void). The major axis and the minor axis of the void can be calculated by the same method as in Selection of Granulated Particles and Definition of Minor Axis described below.

"Voids in layers" means that major axes of voids in a particle are arranged in parallel. If the angle between the major axes of two voids is within ±30°, the two voids are regarded as being in parallel.

The proportion of the area of voids in layers (the area of voids in layers/the gross area of voids) in a granulated particle is preferably 40% or more, more preferably 50% or more, still more preferably 60% or more, and typically 100% or less, preferably 90% or less. The proportion of the number of slit-like voids (the number of slit-like voids/the total number of voids) is preferably 70% or more, more preferably 80% or more, still more preferably 90% or more, and typically 100% or less, preferably 90% or less. If the number and the area of slit-like voids are in these ranges, it can be said that the particle has so many fine slit-like structures that provide more reaction initiation surfaces of Li and sufficient permeability of electrolyte solution.

The above-described Zave/X and W/X of the carbon material for a non-aqueous secondary battery are calculated taking the following (a) to (d) into account.

(a) Selection of Granulated Particles and Definition of Minor Axis

In an SEM image acquired, 30 granulated particles satisfying the above conditions (1L) and (2L) are randomly selected. In the selection, particle boundaries are established along the outlines of the granulated particles. The particle boundary may be established by any method by which the boundary is clearly defined, that is, the boundary between the particle and other regions is established such that the region of interest (ROI) representing the shape of the particle is completely included. For example, it may be established by freehand or the approximation by a polygon. When the boundary is not linear-like but has a complicated shape, for example, the boundary may be divided into any desired number of equally spaced sections to approximate the particle region by a polygon. The boundary is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1|\leq 0.1$.

For one randomly selected granulated particle, the barycenter (centroid) is defined. First, the particle defined by the boundary is approximated by square cells. The size of each cell is preferably, but not necessarily, 5 nm or less in actual size. Two-dimensional coordinates are determined in the image. The coordinates of the barycenter of each cell are defined. Assuming that the weights of the cells are the same, the cells are numbered from 1 to N. The following formula is used to determine the coordinates of the barycenter of the granulated particle.

$$\vec{r_G} = \frac{\sum_1^N \vec{r_i}}{N} \quad \text{[Mathematical 7]}$$

In the formula, $r_i$ represents the coordinates of an i-th cell, and $r_G$ represents the coordinates of the barycenter. The barycenter may be determined by operating any desired image software, or by the following formula if the barycenter of each divided mesh can be defined by any given figure.

$$\vec{r_G} = \frac{\sum_1^N A_i \vec{r_i}}{\sum_1^N A_i} \quad \text{[Mathematical 8]}$$

In the formula, $A_i$ is the area of an i-th figure, and $r_i$ is the barycentric (centroid) coordinates of the i-th figure.

Next, the longest line segment among line segments passing through the barycenter obtained and bounded by the boundary fixed as described above is defined as a major axis. The line segment orthogonal to the major axis among line segments passing through the barycenter and bounded by the boundary fixed as described above is defined as a minor axis.

(b) Definition and Calculation Method of Intra-Particle Voids

If necessary, binarization may be performed such that void regions and other carbon particle regions are clearly distinguished from each other. As shown in FIG. 9, the binarization may be carried out by any method by which intra-particle voids and carbon portions are clearly distinguished from each other. It is supposed that the image to be processed is an 8-bit gray-scale image, the luminance of one picture element (1 Pixel) of which is expressed by a natural number from 0 to 255. The binarization refers dividing luminances into two and representing the two divided images in two values (e.g., 0 and 255 in this case). The binarization may be carried out using any desired image processing software. The division by setting a threshold can be carried out using any algorithm, such as the mode method and the ISOData method, by which void portions and carbon portions can be clearly distinguished from each other. The target image needs to be a binarizable image. The binarizable image, in this case, refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

(c) Voids on Line of Granulated Particle

"Voids in a granulated particle intersecting the minor axis of the granulated particle" refers to voids on three lines that are parallel to the minor axis of the granulated particle and split the major axis of the granulated particle into four parts (see FIG. 13). Picture elements intersecting lines translated from the three lines parallel to the minor axis of the granulated particle in the major axis direction by ±0.5 pixel are regarded as voids on the minor axis.

(d) Average Interval (Zave) Between Voids and Standard Deviation (W) of Void Sizes The interval between voids (the distance between a void and a void) in one randomly selected granulated particle is determined on the above-described three lines parallel to the minor axis of the granulated particle (see FIG. 13). In one granulated particle, distances Z between voids on the three lines parallel to the minor axis are each measured. This measurement is made on 30 particles. Its average value is defined as the average inter-void distance Z (Zave) of 30 particles.

Furthermore, sizes Y of voids on the three lines (see FIG. 13) are each measured. This measurement is made on 30 particles. Its standard deviation is defined as the standard deviation (W) of void sizes Y of 30 particles.

In this embodiment (e.g., but not limited to, Invention $L^3$), voids in the granulated particle are preferably arranged, mainly, relatively parallel to the major axis of the granulated particle.

Physical Properties of Composite Carbon Material for Non-Aqueous Secondary Battery A description will be given below of preferred physical properties of the composite carbon material. Physical properties not described in this section are preferably within the ranges of the physical properties of the carbon material for a non-aqueous secondary battery described above.

Volume-Based Average Particle Diameter (Average Particle Diameter d50)

The volume-based average particle diameter (also referred to as "average particle diameter d50") of the composite carbon material is preferably 1 μm or more, more preferably 5 μm or more, still more preferably 8 μm or more, particularly preferably 10 μm or more, most preferably 11 μm or more. The average particle diameter d50 is preferably 50 μm or less, more preferably 40 μm or less, still more preferably 35 μm or less, even more preferably 31 μm or less, particularly preferably 30 μm or less, most preferably 25 μm or less. An average particle diameter in this range tends to prevent the increase in irreversible capacity and prevent streaks that can occur during a slurry application, thus leading to no reduction in productivity. In other words, an excessively small average particle diameter d50 tends to cause an increase in irreversible capacity and a loss in initial battery capacity of a non-aqueous secondary battery comprising the composite carbon material, and an excessively large average particle diameter d50 can cause process defects such as streaks that occur in a slurry application, degraded high-current-density charge-discharge characteristics, and degraded low-temperature output characteristics.

The average particle diameter d50 is defined as a volume-based median diameter determined by suspending 0.01 g of a composite carbon material in 10 mL of a 0.2% by mass aqueous solution of a polyoxyethylene sorbitan monolaurate surfactant (e.g., Tween 20 (registered trademark)), placing the suspension (a measurement sample) in a commercially available laser diffraction/scattering particle size distribution analyzer (e.g., LA-920 available from HORIBA), irradiating the measurement sample with ultrasonic waves of 28 kHz at a power of 60 W for 1 minute, and then performing a measurement with the analyzer.

Tap Density

The tap density of the composite carbon material is typically in the range of 0.6 g/cm$^3$ or more, preferably 0.70 g/cm$^3$ or more, more preferably 0.75 g/cm$^3$ or more, still more preferably 0.8 g/cm$^3$ or more, even more preferably 0.85 g/cm$^3$ or more, particularly preferably 0.88 g/cm$^3$ or more, more particularly preferably 0.9 g/cm$^3$ or more, most preferably 0.93 g/cm$^3$ or more, and typically 1.5 g/cm$^3$ or less, preferably 1.3 g/cm$^3$ or less, more preferably 1.2 g/cm$^3$ or less, still more preferably 1.1 g/cm$^3$ or less.

A tap density in this range prevents streaks that can occur during the formation of an electrode plate, thus leading to improved productivity and excellent fast charge-discharge characteristics. In addition, such a tap density tends to inhibit the increase in intraparticle carbon density, thus providing good rolling properties and making it easy to form a high-density negative electrode sheet.

The tap density is defined as a density calculated from a volume and a mass of a sample. The volume is determined as follows: using a powder density meter, the composite carbon material particles are dropped through a sieve with openings of 300 μm into a cylindrical tap cell with a diameter of 1.6 cm and a volume capacity of 20 cm$^3$ to fill up the cell; a tap with a stroke length of 10 mm is given 1,000 times; and the volume at this time is measured.

Roundness

The roundness of the composite carbon material is 0.88 or greater, preferably 0.90 or greater, more preferably 0.91 or greater. The roundness is preferably 1 or less, more preferably 0.98 or less, still more preferably 0.97 or less. A roundness in this range tends to inhibit the degradation of high-current-density charge-discharge characteristics of non-aqueous secondary batteries. The roundness is defined by the following equation, and a theoretically perfect sphere has a roundness of 1.

A roundness in the above range tends to decrease the degree of flection of Li-ion diffusivity to smoothen the movement of electrolyte solution in intra-particle voids and enable moderate contact between the composite particles, thus providing good fast charge-discharge characteristics and cycle characteristics.

Roundness=(perimeter of equivalent circle having the same area as projected particle shape)/(actual perimeter of projected particle shape)

As the value of the roundness is used a value determined, for example, using a flow-type particle image analyzer (e.g., FPIA available from Sysmex Industrial Corp.) by dispersing about 0.2 g of a sample (composite particles) in a 0.2% by mass aqueous solution (approximately 50 mL) of a polyoxyethylene (20) sorbitan monolaurate surfactant, irradiating the dispersion with ultrasonic waves of 28 kHz at a power of 60 W for 1 minute, and then measuring the roundness of particles with a diameter in the range of 1.5 to 40 μm with a detection range set to 0.6 to 400 μm.

X-Ray Parameter

The d-value (interplanar spacing) of lattice planes ((002) planes) of the composite carbon material, as determined by X-ray diffractometry in accordance with the method of the Japan Society for Promotion of Scientific Research, is preferably 0.335 nm to less than 0.340 nm. The d-value is more preferably 0.339 nm or less, still more preferably 0.337 nm or less. A $d_{002}$-value in this range tends to increase the crystallinity of the graphite, thus inhibiting the increase in initial irreversible capacity. The theoretical value of graphite is 0.335 nm.

The crystallite size (Lc) of the composite particles, as determined by X-ray diffractometry in accordance with the method of the Japan Society for Promotion of Scientific Research, is preferably in the range of 90 nm or more, more preferably 100 nm or more. A crystallite size in this range provides particles having not too low crystallinity, thus providing a non-aqueous secondary battery the reversible capacity of which is less likely to decrease.

Ash Content

The ash content of the composite carbon material is preferably 1% by mass or less, more preferably 0.5 W by mass or less, still more preferably 0.1% by mass or less, based on the total mass of the composite carbon material. The ash content is preferably at least 1 ppm.

An ash content in this range can provide a non-aqueous secondary battery that undergoes only negligible degradation of battery performance due to the reaction between composite particles and electrolyte solution during charging and discharging. In addition, such an ash content does not require much time or energy to produce a carbon material and eliminates the need for equipment for preventing contamination, thus reducing the increase in cost.

BET Specific Surface Area (SA)

The specific surface area (SA) of the composite carbon material, as determined by BET method, is preferably 1 m$^2$/g or more, more preferably 2 m$^2$/g or more, still more preferably 3 m$^2$/g or more, particularly preferably 4 m$^2$/g or more, and preferably 30 m$^2$/g or less, more preferably 20 m$^2$/g or less, still more preferably 17 m$^2$/g or less, particularly preferably 15 m$^2$/g or less, most preferably 12 m$^2$/g or less.

A specific surface area in this range tends to sufficiently secure sites where Li enters and exits, thus providing excellent fast charge-discharge characteristics and output characteristics, and tends to moderately control the activity of the composite carbon material, an active material, against electrolyte solution, thus inhibiting the increase in initial irreversible capacity, as a result of which a high-capacity battery can be produced.

Furthermore, such a specific surface area can inhibit the increase in the reactivity of a negative electrode formed using the composite carbon material with an electrolyte solution to reduce gas generation, thus providing a preferred non-aqueous secondary battery.

The BET specific surface area is defined as a value determined as follows: using a surface area meter (e.g., a Gemini 2360 specific surface area analyzer available from Shimadzu Corporation), a composite particle sample is preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area is measured by a nitrogen adsorption BET multipoint method according to a flowing gas method.

True Density

The true density of the composite carbon material is preferably 1.9 g/cm$^3$ or more, more preferably 2 g/cm$^3$ or more, still more preferably 2.1 g/cm$^3$ or more, particularly preferably 2.2 g/cm$^3$ or more, and up to 2.26 g/cm$^3$. The upper limit is the theoretical value of graphite. A true density in this range tends to avoid too low carbon crystallinity, thus inhibiting the increase in initial irreversible capacity of non-aqueous secondary batteries.

Aspect Ratio

The aspect ratio of the composite carbon material in powder form is theoretically 1 or greater, preferably 1.1 or greater, more preferably 1.2 or greater. The aspect ratio is preferably 10 or less, more preferably 8 or less, still more preferably 5 or less.

An aspect ratio in this range tends to prevent streaks of a slurry (a material for forming a negative electrode) containing the composite particles from occurring during the formation of an electrode plate so as to provide a uniform coated surface, thus avoiding degraded high-current-density charge-discharge characteristics of non-aqueous secondary batteries.

The aspect ratio is expressed as A/B, where A is the longest diameter of a composite particle observed in a three-dimensional manner, and B is the shortest diameter among the diameters orthogonal to the longest diameter. The observation of the composite particle is carried out under a scanning electron microscope capable of magnifying observation. Fifty composite particles immobilized on the surface of a metal having a thickness of 50 microns or less are randomly selected. For each of the particles, A and B are determined while a stage on which the samples are immobilized is rotated and tilted, and the average value of A/B is calculated.

Raman R Value

The Raman R value of the composite carbon material is preferably 0.01 or greater, more preferably 0.1 or greater, still more preferably 0.15 or greater, particularly preferably 0.2 or greater. The Raman R value is typically 1 or less, preferably 0.6 or less, more preferably 0.5 or less, still more preferably 0.4 or less.

The Raman R value is defined as an intensity ratio ($I_B/I_A$) in a Raman spectrum obtained by Raman spectroscopy, where $I_A$ is an intensity of peak $P_A$ near 1,580 cm$^{-1}$, and $I_B$ is an intensity of peak $P_B$ near 1,360 cm$^{1}$.

As used herein, "near 1,580 cm$^{-1}$" refers to a range of 1,580 to 1,620 cm$^{-1}$, and "near 1,360 cm$^{-1}$" a range of 1,350 to 1,370 cm$^{-1}$.

A Raman R value in this range tends to reduce the possibility that the crystallinity of the surface of the composite carbon material increases and that crystals, when the density is increased, are oriented in the direction parallel to a negative electrode plate, thus avoiding degraded load characteristics. Furthermore, such a Raman R value tends to reduce the possibility that crystals on the particle surface of the composite carbon material are disordered and inhibit the increase in the reactivity of a negative electrode with an electrolyte solution, thus avoiding reduced charge-discharge efficiency and increased gas generation of non-aqueous secondary batteries.

The Raman spectrum described above can be measured using a Raman spectroscope. Specifically, a sample is loaded by gravity-dropping target particles into a measuring cell, and the measuring cell is irradiated with an argon-ion laser beam while being rotated in a plane perpendicular to the laser beam. The measurement conditions are as follows:

Wavelength of argon-ion laser beam: 514.5 nm
Laser power on sample: 25 mW
Resolution: 4 cm$^{-1}$
Measurement range: 1,100 cm$^{-1}$ to 1,730 cm$^{-1}$
Measurement of peak intensity, measurement of peak half-width: background processing, smoothing processing (convolution by simple average, 5 points)

Mode Pore Diameter (PD) in Pore Diameter Range of 0.01 μm to 1 μm

The mode pore diameter (PD) in a pore diameter range of 0.01 μm to 1 μm of the composite carbon material is a value determined by mercury intrusion (mercury porosimetry) and typically 0.01 μm or more, preferably 0.03 μm or more, more preferably 0.05 μm or more, still more preferably 0.06 μm or more, particularly preferably 0.07 μm or more, and typically 1 μm or less, preferably 0.65 μm or less, more preferably 0.5 μm or less, still more preferably 0.4 μm or less, even more preferably 0.3 μm or less, particularly preferably 0.2 μm or less, most preferably 0.1 μm or less.

A mode pore diameter (PD) in a pore diameter range of 0.01 μm to 1 μm outside this range tends to prevent an electrolyte solution from being efficiently distributed into intra-particle voids and prevent the efficient use of Li-ion insertion/extraction sites in the particles, thus resulting in degraded low-temperature output characteristics and cycle characteristics.

Cumulative Pore Volume at Pore Diameters in Range of 0.01 μm to 1 μm

The cumulative pore volume at pore diameters in a range of 0.01 μm to 1 μm of the composite carbon material is a value determined by mercury intrusion (mercury porosimetry) and, even when pressure is applied, typically 0.07 mL/g or more, preferably 0.08 mL/g or more, more preferably 0.09 mL/g or more, most preferably 0.10 mL/g or more, and preferably 0.3 mL/g or less, more preferably 0.25 mL/g or less, still more preferably 0.2 mL/g or less, particularly preferably 0.18 mL/g or less.

An excessively small cumulative pore volume at pore diameters in a range of 0.01 μm to 1 μm tends to prevent an electrolyte solution from permeating into the particles and prevent the efficient use of Li-ion insertion/extraction sites in the particles. This impedes smooth insertion/extraction of lithium ions in fast charging and discharging and results in degraded low-temperature output characteristics. A cumulative pore volume within the above range tends to allow an electrolyte solution to be smoothly and efficiently distributed into the particles, thus enabling the effective and efficient use of Li-ion insertion/extraction sites in the particles as well as on the periphery of the particles during charging and discharging and providing good low-temperature output characteristics.

Half Width at Half Maximum of Pore Distribution (log (nm))

The half width at half maximum of pore distribution (log (nm)) of the composite carbon material refers to a half width at half maximum at a micropore side of a peak in a pore diameter range of 0.01 µm to 1 µm in a pore distribution (nm), as determined by mercury intrusion (mercury porosimetry), with a horizontal axis expressed in common logarithm (log (nm)).

(In the Case where the Composite Carbon Material has a d50 of 13 µm or More)

The half width at half maximum of pore distribution (log (nm)) of the composite carbon material having a d50 of 13 µm or more is preferably 0.3 or greater, more preferably 0.35 or greater, still more preferably 0.4 or greater, particularly preferably 0.45 or greater, preferably 10 or less, more preferably 5 or less, still more preferably 3 or less, particularly preferably 1 or less.

(In the Case where the Composite Carbon Material has a d50 of Less than 13 µm)

When the d50 of the composite carbon material is less than 13 µm, its half width at half maximum of pore distribution (log (nm)) is preferably 0.01 or greater, more preferably 0.05 or greater, still more preferably 0.1 or greater, and preferably 0.33 or less, more preferably 0.3 or less, still more preferably 0.25 or less, particularly preferably 0.23 or less.

When the half width at half maximum of pore distribution (log (nm)) is in this range, intra-particle voids in a pore diameter range of 0.01 µm to 1 µm tend to be formed to have a finer structure and thus allow an electrolyte solution to be smoothly and efficiently distributed into the particles. This enables the effective and efficient use of Li-ion insertion/extraction sites in the particles as well as on the periphery of the particles during charging and discharging, thus providing good low-temperature output characteristics and cycle characteristics.

Total Pore Volume

The total pore volume of the composite carbon material is a value determined by mercury intrusion (mercury porosimetry) and preferably 0.1 mL/g or more, more preferably 0.3 mL/g or more, still more preferably 0.5 mL/g or more, particularly preferably 0.6 mL/g or more, most preferably 0.7 mL/g or more, and preferably 10 mL/g or less, more preferably 5 mL/g or less, still more preferably 2 mL/g or less, particularly preferably 1 mL/g or less.

A total pore volume in this range eliminates the need for using an excess amount of binder in forming an electrode plate and facilitates the diffusion of a thickener and a binder in forming an electrode plate.

As an apparatus for the mercury porosimetry, a mercury porosimeter (Autopore 9520 available from Micromeritics Corp.) can be used. A sample (carbon material) is weighed to around 0.2 g and placed in a powder cell. The cell is sealed, and a pretreatment is carried out by degassing the cell at room temperature under vacuum (50 µmHg or lower) for 10 minutes.

Subsequently, mercury is introduced into the cell under a reduced pressure of 4 psia (approximately 28 kPa). The pressure is increased stepwise from 4 psia (approximately 28 kPa) to 40,000 psia (approximately 280 MPa) and then reduced to 25 psia (approximately 170 kPa).

The number of steps in the pressure increase is at least 80. In each step, the amount of mercury intrusion is measured after an equilibration time of 10 seconds. From the mercury intrusion curve thus obtained, a pore distribution is calculated using the Washburn equation.

The calculation is made assuming that the surface tension (γ) of mercury is 485 dyne/cm, and the contact angle (Ψ) is 140°. The average pore diameter is defined as a pore diameter at a cumulative pore volume of 50%.

Ratio (PD/d50(%)) of Mode Pore Diameter (PD) in Pore Diameter Range of 0.01 µm to 1 µm to Volume-Based Average Particle Diameter (d50)

The ratio (PD/d50) of mode pore diameter (PD) in a pore diameter range of 0.01 µm to 1 µm to volume-based average particle diameter (d50) of the composite carbon material is expressed by equation (1A) and typically 1.8 or less, preferably 1.80 or less, more preferably 1.00 or less, still more preferably 0.90 or less, particularly preferably 0.80 or less, most preferably 0.70 or less, and typically 0.01 or greater, preferably 0.10 or greater, more preferably 0.20 or greater.

$$PD/d50(\%) = \text{mode pore diameter } (PD) \text{ in } a \text{ pore diameter range of } 0.01 \text{ µm to } 1 \text{ µm in } a \text{ pore distribution determined by mercury intrusion/volume-based average particle diameter } (d50) \times 100 \quad \text{Equation (1A)}$$

A mode pore diameter (PD) in a pore diameter range of 0.01 µm to 1 µm outside this range tends to prevent an electrolyte solution from being efficiently distributed into intra-particle voids and prevent the efficient use of Li-ion insertion/extraction sites in the particles, thus resulting in degraded low-temperature output characteristics and cycle characteristics.

In one aspect of the composite carbon material according to one embodiment of the present invention, the relationship of inequality (1D) is satisfied.

Inequality (1D)

$$10Y_d + 0.26X_d \geq \alpha \quad (1D)$$

($Y_d$=tap density (g/cm$^3$), $X_d$=specific surface area (SA) (m$^2$/g) of carbon material determined by BET method, α=12.60)

In the composite carbon material according to this embodiment (e.g., but not limited to, Invention D), a given by inequality (1D) is 12.60 or greater, preferably 12.65, more preferably 12.70, more preferably 12.80, particularly preferably 13.00.

If the relationship represented by inequality (1D) is not satisfied, the balance between usable regions in Li-ion insertion/extraction sites in the particles and particle-filling properties tends to be poor, thus resulting in degraded low-temperature output characteristics and a reduced capacity.

The tap density of the composite carbon material according to this embodiment is preferably 1.00 g/cm$^3$ or more, more preferably 1.05 g/cm$^3$ or more, still more preferably 1.10 g/cm$^3$ or more, particularly preferably 1.12 g/cm$^3$ or more, most preferably 1.14 g/cm$^3$ or more, and preferably 1.40 g/cm$^3$ or less, more preferably 1.35 g/cm$^3$ or less, still more preferably 1.30 g/cm$^3$ or less, particularly preferably 1.25 g/cm$^3$ or less.

A tap density in this range provides sufficient filling properties, thus increasing capacity. In addition, such a tap density tends to inhibit the increase in intraparticle carbon density, thus providing good rolling properties and making it easy to form a high-density negative electrode sheet.

Specific Surface Area (SA) Determined by BET Method

The specific surface area (SA) of the carbon material according to this embodiment (e.g., but not limited to, Invention D), as determined by BET method, is preferably 2 m$^2$/g or more, more preferably 2.5 m$^2$/g or more, still more preferably 3 m$^2$/g or more, particularly preferably 4 m$^2$/g or more, and preferably 30 m$^2$/g or less, more preferably 20 m$^2$/g or less, still more preferably 17 m$^2$/g or less, particularly preferably 15 m$^2$/g or less.

A specific surface area in this range tends to sufficiently secure sites where Li enters and exits, thus providing excellent input-output characteristics, and tends to moderately control the activity of an active material against electrolyte solution, thus inhibiting the increase in initial irreversible capacity, as a result of which a high-capacity battery can be produced.

In this embodiment, the composite carbon material is produced by coating irregularities of the surface of the carbon material to have reduced dibutyl phthalate (DBP) absorption and thus, when processed into a coating material in forming an electrode, can have a low viscosity, leading to improved coating properties.

"Coated" in this embodiment refers to a state in which at least part or all of the surface of the carbon material is coated or deposited with a carbonaceous material.

In this embodiment (e.g., but not limited to, Invention D), the crystallite size (Lc) of the carbon material, as determined by X-ray diffractometry in accordance with the method of the Japan Society for Promotion of Scientific Research, is typically in the range of 30 nm or more, preferably 50 nm or more, more preferably 100 nm or more, still more preferably 500 nm or more, particularly preferably 1,000 nm or more. A crystallite size in this range provides particles having not too low crystallinity, thus providing a non-aqueous secondary battery the reversible capacity of which is less likely to decrease. The lower limit of Lc is the theoretical value of graphite.

In one aspect of the composite carbon material according to one embodiment of the present invention, the true density and the specific surface area (SA) determined by BET method preferably satisfy a particular relationship.

Specifically, the composite carbon material according to an embodiment of the present invention (e.g., but not limited to, Invention E) preferably satisfies the relationship of inequality (1E).

Inequality (1E)

$$Y_e - 0.01 X_e \leq \alpha \quad (1E)$$

($Y_e$=true density (g/cm³), $X_e$=specific surface area (SA) (m²/g) of carbon material determined by BET method, $\alpha$=2.20)

In the carbon material, a given by inequality (1E) is 2.20, preferably 2.195, more preferably 2.19, still more preferably 2.16.

If the relationship represented by inequality (1E) is not satisfied, the balance between usable regions in Li-ion insertion/extraction sites in the particles and a carbonaceous material having such crystallinity that facilitates Li-ion insertion/extraction tends to be poor, thus resulting in degraded low-temperature output characteristics.

In this embodiment (e.g., but not limited to, Invention E), the true density of the composite carbon material is preferably 2.15 g/cm³ or more, more preferably 2.16 g/cm³ or more, still more preferably 2.17 g/cm³ or more, particularly preferably 2.18 g/cm³ or more, most preferably 2.19 g/cm³ or more, and preferably 2.26 g/cm³ or less, more preferably 2.25 g/cm³ or less.

A true density in this range provides a moderate amount of low-crystallinity structure, which facilitates Li-ion insertion/extraction, thus providing good input-output characteristics.

Specific Surface Area (SA) Determined by BET Method

The specific surface area (SA) of the composite carbon material according to this embodiment (e.g., but not limited to, Invention E), as determined by BET method, is preferably 2 m²/g or more, more preferably 2.5 m²/g or more, still more preferably 3 m²/g or more, particularly preferably 4 m²/g or more, and preferably 30 m²/g or less, more preferably 20 m²/g or less, still more preferably 17 m²/g or less, particularly preferably 15 m²/g or less. A specific surface area in this range tends to sufficiently secure sites where Li enters and exits, thus providing excellent input-output characteristics, and tends to moderately control the activity of an active material against electrolyte solution, thus inhibiting the increase in initial irreversible capacity, as a result of which a high-capacity battery can be produced.

90% Particle Diameter (d90) to 10% Particle Diameter (d10) Ratio (d90/d10) in Volume-Based Particle Size Distribution The 90% particle diameter (d90) to 10% particle diameter (d10) ratio (d90/d10) in a volume-based particle size distribution of the composite carbon material according to this embodiment (e.g., but not limited to, Invention E) is typically 2.0 or greater, preferably 2.2 or greater, more preferably 2.4 or greater, still more preferably 2.5 or greater, even more preferably 2.6 or greater, particularly preferably 2.7 or greater, and typically 5.0 or less, preferably 4.5 or less, more preferably 4.0 or less, still more preferably 3.8 or less, particularly preferably 3.5 or less.

Average Value and Standard Deviation ($\sigma_R$) of Microscopic Raman R Values

In one aspect of one embodiment of the present invention, the composite carbon material preferably comprises the carbon material (A) capable of occluding and releasing lithium ions and the carbonaceous material (B) on the surface of the carbon material (A), wherein the average value of microscopic Raman R values of 30 randomly selected composite carbon materials is 0.1 to 0.85, and the standard deviation ($\sigma_R$) is 0.1 or less.

The average value of microscopic Raman R values of the composite carbon material according to this embodiment (e.g., but not limited to, Invention F) is 0.1 to 0.85, preferably 0.15 or greater, more preferably 0.2 or greater, still more preferably 0.23 or greater, particularly preferably 0.25 or greater, and preferably 0.8 or less, more preferably 0.65 or less, still more preferably 0.5 or less, particularly preferably 0.4 or less.

The standard deviation is 0.1 or less, preferably 0.085 or less, more preferably 0.08 or less, still more preferably 0.07 or less, particularly preferably 0.06 or less, and typically 0.001 or greater, preferably 0.01 or greater, more preferably 0.02 or greater.

The average value and the standard deviation ($\sigma_R$) of microscopic Raman R values described above are determined from 30 randomly selected composite carbon materials according to an embodiment of the present invention using measurement methods described below.

An average value and a standard deviation ($\sigma_R$) of microscopic Raman R values outside the above ranges mean that the surface of the carbon material (A) is not uniformly coated with a carbonaceous material into and from which Li ions are readily inserted and extracted. This tends to cause, for example, a concentrated excessive current flow into a specific site where the carbonaceous material is sufficiently deposited and Li ions are readily inserted and extracted, particularly at low temperatures and during fast charging and discharging, so as to cause electrodeposition, which impedes uniform and smooth insertion/extraction of Li ions, resulting in degraded low-temperature output characteristics and cycle characteristics.

The Raman R values are determined by Raman microspectroscopy using a Raman spectroscope (e.g., Nicolet Almega XR available from Thermo Fisher Scientific) under the following conditions.

Target particles are gravity-dropped onto a sample stage, and Raman microspectroscopy is performed with the surface of the target flat.
   Excitation wavelength: 532 nm
   Laser power on sample: 1 mW or less
   Resolution: 10 cm$^{-1}$
   Irradiation area: 1 μm
   Measurement range: 400 cm$^{-1}$ to 4,000 cm$^{-1}$
   Measurement of peak intensity: straight baseline subtraction in the range of about 1,100 cm$^{-1}$ to 1,750 cm$^{-1}$ Method for calculating Raman R value: In a spectrum after straight baseline subtraction, a peak intensity $I_A$ at the peak top of a peak $P_A$ near 1,580 cm$^{-1}$ and a peak intensity $I_B$ at the peak top of a peak $P_B$ near 1,360 cm$^{-1}$ are read to calculate an R value $(I_B/I_A)$. The average value and the standard deviation $(\sigma_R)$ of 30 randomly selected target particles are calculated.

Microscopic Raman $R_{15}$ Value

The microscopic Raman $R_{15}$ value given by equation (1F) of the composite carbon material according to an embodiment of the present invention (e.g., but not limited to, Invention E) is typically 25% or less, preferably 15% or less, more preferably 12% or less, still more preferably 9% or less, particularly preferably 5% or less, and typically more than 0%. A microscopic Raman $R_{15}$ value in this range indicates that the surface of the carbon material (A) is uniformly coated with the carbonaceous material (B) and the surface of the carbon material (A) is less exposed. This enables uniform and smooth insertion/extraction of Li ions, thus providing a composite carbon material with excellent low-temperature output characteristics and cycle characteristics.

Microscopic Raman $R_{(15)}$ value (%)=the number of composite carbon materials having a microscopic Raman R value of 0.15 or less among 30 randomly selected composite carbon materials/ 30×100                        (1F)

In one aspect of one embodiment of the present invention, the composite carbon material preferably satisfies the relationship of inequality (1K). In inequality (1K), "carbon material" means "composite carbon material".

$10.914 > 5x_k - y_k - 0.0087a$      Inequality (1K)

In inequality (1K), $x_k$ is a true density [g/cm$^3$] of the carbon material; $y_k$ is a value determined by equation (2K); and a is a volume-based average particle diameter [μm] of the carbon material.

$y_k$=(density [g/cm$^3$] of carbon material under uniaxial load of 100 kgf/3.14 cm$^2$)−(tap density of carbon material [g/cm$^3$])      Equation (2K)

In one aspect of the present invention, the carbon material according to another embodiment of the present invention preferably satisfies the relationship of inequality (3K). In other words, the carbon material according to an embodiment of the present invention (e.g., but not limited to, Invention K) preferably satisfies inequality (1K) or (3K).

$10.990 > 5x_k - y_k$      Inequality (3K)

(In inequality (3K), $x_k$ is a true density [g/cm$^3$] of the carbon material, and $y_k$ is a value determined by equation (2K).)

$y_k$=(density [g/cm$^3$] of carbon material under uniaxial load of 100 kgf/3.14 cm$^2$)−(tap density of carbon material [g/cm$^3$])      Equation (2K)

When the relationship represented by inequality (1K) or (3K) is not satisfied, the particles tend to fracture in pressing an electrode in battery production so as to cause flattening of the particles or separation of the amorphous carbon, thus resulting in degraded low-temperature output characteristics and a reduced capacity. Methods for measuring physical properties used to calculate inequality (1K) or (3K) will be described below.

Particle Density Under Uniaxial Load of 100 Kgf/3.14 cm$^2$

The density under a uniaxial load of 100 kgf/3.14 cm$^2$ of the carbon material according to this embodiment (e.g., but not limited to, Invention K) is preferably 0.7 g/cm$^3$ or more, more preferably 0.9 g/cm$^3$ or more, still more preferably 1.2 g/cm$^3$ or more, particularly preferably 1.24 g/cm$^3$ or more, and preferably 1.8 g/cm$^3$ or less, more preferably 1.7 g/cm$^3$ or less, still more preferably 1.6 g/cm$^3$ or less.

A density in this range can prevent particle fracture under a given load, thus leading to excellent input-output characteristics.

The density under a uniaxial load of 100 kgf/3.14 cm$^2$ can be measured using an apparatus capable of measuring a load and a thickness under any given uniaxial pressure. For example, the measurement is made using an MCP-PD51 powder resistivity measurement system available from Mitsubishi Chemical Analytech Co., Ltd. First, values of the apparatus are corrected. For a load correction, the load measured when the bottom of a cylindrical container for accommodating the carbon material and a push rod to be inserted into the container from above to apply pressure to the carbon material are not in contact is confirmed to be 0 kgf/3.14 cm$^2$. Next, a thickness gauge is corrected. While the cylindrical container and the push rod are brought close using a hydraulic pump, a zero-point correction is carried out such that the thickness gauge indicates 0.00 mm when the load reaches 20 kgf/3.14 cm$^2$. After the corrections are carried out, 3.0 g of the carbon material is placed in the cylindrical container with a diameter of 2 cm, and the height of the carbon material is adjusted so as to receive a load evenly. A seat is lifted using the hydraulic pump, and the push rod is inserted into the cylindrical container. After the thickness gauge has indicated 15.0 mm, loads are measured at thicknesses at 0.5-mm intervals until the load exceeds 1,000 kgf/3.14 cm$^2$. From the thicknesses obtained, the densities of the powder are calculated, and using Microsoft Excel, a graph is created with powder density plotted on the horizontal axis and load on the vertical axis. A cubic spline curve of the graph is created, and the formula obtained is used to calculate a carbon material density under a load of 100 kgf/3.14 cm$^3$. To reduce variation in measurements, the measurement is made at least twice. When variation occurs, the measurement is made three times, and the average of two closest values is used.

$y_k$: (density [g/cm$^3$] of carbon material under uniaxial load of 100 kgf/3.14 cm$^2$)−(tap density of carbon material [g/cm$^3$])

The value of y in this embodiment (e.g., but not limited to, Invention K) is typically 0.10 or greater, more preferably 0.12 or greater, still more preferably 0.18 or greater, particularly preferably 0.19 or greater, and preferably 1 or less, more preferably 0.9 or less, still more preferably 0.5 or less.

A value of y in this range causes less particle fracture under a given load to reduce amorphous separation and particle deformation, thus providing excellent input-output characteristics.

In one aspect of one embodiment of the present invention, the composite carbon material has a large number of voids having fine structures in the particles.

Specifically, the carbon material for a non-aqueous secondary battery according to an embodiment of the present invention (e.g., but not limited to, Inventions $L^1$ to $L^3$) comprises a composite carbon material made of granulated particles satisfying (1L) and (2L) and further has a characteristic particle cross section such that a box-counting dimension is determined from an image of the particle cross section.

Carbon Material (Granulated Particles) Satisfying (1L) and (2L) in Carbon Material for Non-Aqueous Secondary Battery The granulated particles in the carbon material for a non-aqueous secondary battery satisfies the following:
(1) Being made of a carbonaceous material; and
(2) Satisfying the relationship $|X_1-X|/X_1 \leq 0.2$, preferably $\leq 0.15$, more preferably $\leq 0.1$, where X is a volume-based average particle diameter determined by laser diffraction, and $X_1$ is an equivalent circular diameter determined from a cross-sectional SEM image.

If $|X_1-X|/X_1$ is too large, typical particles cannot be selected, which results in failure to express the overall tendency.

The volume-based average particle diameter X is defined as a volume-based median diameter determined by suspending 0.01 g of a carbon material in 10 mL of a 0.2%, by mass aqueous solution of a polyoxyethylene sorbitan monolaurate surfactant (e.g., Tween 20 (registered trademark)), placing the suspension (a measurement sample) in a commercially available laser diffraction/scattering particle size distribution analyzer (e.g., LA-920 available from HORIBA), irradiating the measurement sample with ultrasonic waves of 28 kHz at a power of 60 W for 1 minute, and then performing a measurement with the analyzer.

The equivalent circular diameter $X_1$ determined from a cross-sectional SEM image is expressed by the following formula using a particle circumference L [μm].

$$X_1 = \frac{L}{2\pi} \qquad \text{[Mathematical 9]}$$

The granulated particles in the carbon material for a non-aqueous secondary battery satisfies the relationship $|R-R_1| \leq 0.1$, preferably $\leq 0.08$, more preferably $\leq 0.06$, where R is a roundness determined with a flow-type particle image analyzer, and $R_1$ is a roundness determined from a cross-sectional SEM image.

If $|R-R_1|$ is too large, a particle boundary is not defined correctly but overestimated, which may result in incorrect analysis.

As the value of the roundness R determined with a flow-type particle image analyzer is used a value determined, for example, using a flow-type particle image analyzer (e.g., FPIA available from Sysmex Industrial Corp.) by dispersing about 0.2 g of a sample (the carbon material for a non-aqueous secondary battery according to the present invention) in a 0.2% by mass aqueous solution (approximately 50 mL) of a polyoxyethylene (20) sorbitan monolaurate surfactant, irradiating the dispersion with ultrasonic waves of 28 kHz at a power of 60 W for 1 minute, and then measuring the roundness of particles with a diameter in the range of 1.5 to 40 μm with a detection range set to 0.6 to 400 μm.

The roundness $R_1$ determined from a cross-sectional SEM image is calculated by the following formula using a particle area S [μm$^2$] determined from a cross-sectional SEM image and a circumference L [μm].

$$R_1 = \frac{4\pi S}{(L)^2} \qquad \text{[Mathematical 10]}$$

The particle boundary may be defined by any method, and it may be defined automatically or manually using commercially available analysis software. It is preferable to approximate a particle by a polygon, and in this case, an approximation by a polygon with 15 or more sides is more preferred. This is because if a polygon with less than 15 sides is used, a background portion may be determined to be a part of the particle in approximating a curve.

Acquisition of Particle Cross-Sectional Image

For the image of a particle cross section is used a reflected electron image acquired at an acceleration voltage of 10 kV using a scanning electron microscope (SEM). An SEM observation sample for acquiring a particle cross-sectional image may be prepared by any method, and a particle cross-sectional image is acquired using an SEM after a sample is prepared by cutting an electrode plate containing the carbon material for a non-aqueous secondary battery, a film coated with the carbon material for a non-aqueous secondary battery, with a focused ion beam (FIB) or ion milling to obtain a particle cross section.

The acceleration voltage in observing the cross section of the carbon material for a non-aqueous secondary battery with a scanning electron microscope (SEM) is 10 kV. This acceleration voltage makes a difference between a reflected electron SEM image and a secondary electron SEM image to allow void regions and other regions of the carbon material for a non-aqueous secondary battery to be easily distinguished. The imaging magnification is typically 500× or more, more preferably 1,000× or more, still more preferably 2,000× or more, and typically 10,000 or less. An imaging magnification in this range enables the acquisition of an entire image of one particle of the carbon material for a non-aqueous secondary battery. The resolution is 200 dpi (ppi) or more, preferably 256 dpi (ppi) or more. The number of picture elements suitable for evaluation is at least 800 pixels.

Average Box-Counting Dimension Relative to Void Regions in Cross-Sectional SEM Image The carbon material for a non-aqueous secondary battery has an average box-counting dimension relative to void regions of 1.55 or greater, preferably 1.60 or greater, more preferably 1.62 or greater, and typically 1.80 or less, preferably 1.75 or less, more preferably 1.70 or less, as calculated from images obtained by randomly selecting 30 granulated particles satisfying (1L) and (2L) above from a cross-sectional SEM image, dividing the cross-sectional SEM image of each granulated particle into void regions and non-void regions, and binarizing the image.

An excessively small average box-counting dimension relative to void regions means that the amount of finer structure is small, in which case excellent output characteristics, one of the effects of the present invention, cannot be provided. An excessively large average box-counting dimension increases the specific surface area of the particles, leading to low initial efficiency.

The box-counting dimensions of the particles of the carbon material for a non-aqueous secondary battery are determined taking the following (a) to (d) into account.

(a) Definition and Calculation Method of Box-Counting Dimension

Box-counting dimension is a method for estimating a fractal dimension by observing a certain area split into certain sizes (box sizes) to examine how much fractal patterns are contained (see JP 2013-77702 A). Box-counting dimension is an indicator of shape complexity, the degree of surface irregularity, and others, and larger fractal dimensions indicate more complex irregularities. The fractal dimension is defined by the following formula, where Nδ (F) is the number of square boxes of side δ necessary for covering a pattern F.

$$D = \lim_{\delta \to 0} \frac{N_\delta(F)}{\log \delta}$$ [Mathematical 11]

In this embodiment (e.g., but not limited to, Invention $L^1$), a cross-sectional SEM image of a particle composed of voids and carbon is split into grid areas (boxes) at regular intervals δ (split into square subareas of side δ), and the number of boxes containing voids is counted with varying values of δ. Next, a double logarithmic graph is created with the number of boxes counted plotted on the vertical axis and δ on the horizontal axis, and a fractal dimension is determined from the slope of the graph.

Specifically, in a cross-sectional SEM image of a particle composed of voids and carbon, voids and other regions of the particle are binarized. The binarization is performed in units of pixels of the image. Analysis objects are portions representing pixels of voids among the binarized regions. The region outside the particle (outside the outline of the particle) requires value conversion so as not to be regarded as a void. The image is split into grid areas (boxes) having a specific pixel size. Although the boxes may be arranged in any manner, they are preferably arranged parallel to the major axis (the longest diameter passing through the barycenter) of the particle. In the arrangement, the image is split into boxes as shown in FIGS. 7 and 8. The number of split boxes including at least one pixel representing a void is counted. The same procedure is repeated with varying box sizes, and a double logarithmic graph is created with the number of boxes counted plotted on the vertical axis and the box size δ on the horizontal axis. A linear approximation of this plot is performed, and the slope of the line is multiplied by −1. The product obtained is the fractal dimension according to the box-counting method. The slope may be calculated by the least-squares method.

The fractal dimension is an indicator of the degree of self-similarity, and in expressing a binarized image, it serves as an indicator of the complexity and the fineness of a structure. This means that in a binarized image having a more complicated partial structure, the proportion of fine structure in a box tends to increase, that is, the slope tends to be steeper with decreasing box size, and the fineness of the partial structure and the amount of such structure are expressed. In other words, the box-counting dimension in the present invention is an indicator of the complexity of a fine structure of voids and the amount of such structure.

(b) Definition of Box Size

The image may be split into any box size, but based on the maximum pixel of the image, it is preferably split into 10 parts or more, more preferably 15 parts or more, particularly preferably 20 parts or more, and typically 50 parts or less, preferably 40 parts or less, more preferably 30 parts or less, on a logarithmic graph. A box size in this range reduces the possibility that differences between picture elements occur and eliminates the need for a high-resolution image.

(c) Method of Binarization

The binarization may be carried out by any method by which intra-particle voids and carbon portions are clearly distinguished from each other, as shown in FIG. 9. The binarization, when performed on an 8-bit gray-scale image, such as an SEM image, refers to dividing luminances into two and representing the two divided images in two values (e.g., 0 and 255, in the case of 8-bit). The binarization may be carried out using any desired image processing software. The division by setting a threshold can be carried out using any algorithm, such as the mode method and the ISOData method, by which void portions and carbon portions can be clearly distinguished from each other. The target image needs to be a binarizable image. The binarizable image, in this case, refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

(d) Definition of Particle Boundary

The particle boundary may be established by any method, for example, by freehand or the approximation by a polygon, provided that the boundary needs to be clearly defined. Although there is no limitation, it is necessary to establish the boundary between the particle and other regions such that the region of interest (ROI) representing the shape of the particle is completely included. When the boundary is not a simple oval but has a complicated shape, for example, the boundary may be divided into any desired number of equally spaced sections to approximate the particle region by a polygon. The boundary, however, is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1| \le 0.1$. When an electrode coated with a binder having poor conductivity is used, the boundary may be difficult to determine under the measurement conditions of the present invention. This is a phenomenon that occurs due to the poor conductivity of the binder when the side of the particle is visible in depth of the cross section of the particle. In such a case, it is necessary to take another image with a clear boundary at a lower acceleration voltage to determine a boundary.

In one aspect of one embodiment of the present invention, the carbon material for a non-aqueous secondary battery comprises uniformly dispersed intra-particle pores.

Specifically, the carbon material for a non-aqueous secondary battery according to an embodiment of the present invention (e.g., but not limited to, Invention $L^2$) comprises a composite carbon material made of granulated particles satisfying (1L) and (2L) above and further has a characteristic particle cross section such that the void dispersity D of the present invention is determined from an image of the particle cross section.

Void Dispersity D in Cross-Sectional SEM Image

The carbon material for a non-aqueous secondary battery typically has an average dispersity D of 30 particles, as determined by the following measurement method using 30 granulated particles satisfying (1L) and (2L) above randomly selected from a cross-sectional SEM image, of 60% or more, preferably 61% or more, more preferably 62% or more, and typically 90% or less, preferably 85% or less, more preferably 80% or less.

Measurement Method

Using a cross-sectional SEM image, grid lines are drawn to split the minor axis and the major axis of a target granulated particle each into 20 parts. Using cells in the grid, the granulated particle is compartmentalized as defined below. The expectation E of void area of each compartment is calculated using equation (A) below, and the dispersity D of the granulated particle is calculated using equation (B) below.

The cross-sectional SEM image is a reflected electron image acquired at an acceleration voltage of 10 kV.

How to Create Grid

Using a cross-sectional SEM image, grid lines are drawn to split the minor axis and the major axis of a target granulated particle each into 20 parts, as shown in FIG. 11. This image needs to be parallel to the particle major axis and the image.

Definition of Compartment

The compartment is defined as a granulated particle portion and/or a region where a void is present in the granulated particle in each cell of the grid. The outside of the boundary of the granulated particle is excluded from the compartment. For grid cells that are divided by the particle boundary into two, as shown in FIG. 12, the region including the particle is defined as a compartment.

Definition of Expectation

For compartments defined by grid lines and the particle boundary, the expectation E of a void area corresponding to each compartment area is determined from equation (A).

Expectation $E[\mu m^2]$ of void area in target compartment=(gross area $[\mu m^2]$ of internal voids of one target granulated particle)/(cross-sectional area $[\mu m^2]$ of one target granulated particle)×(area $[\mu m^2]$ of target compartment)  Equation (A)

The expectation E of a compartment defined by the particle boundary is calculated to be smaller than the expectation E of a grid cell according to the area of the compartment.

Definition of Dispersity D

The dispersity D, an indicator of the void dispersity in a particle, is calculated by equation (B).

Dispersity $D(\%)$=(sum total $[\mu m^2]$ of areas of compartments that satisfy (gross area $[\mu m^2]$ of voids in target compartment)/(expectation $E[\mu m^2]$ of void area in target compartment)=0.5 or greater)/(sum total $[\mu m^2]$ of areas of all the compartments of one target granulated particle)×100  Equation (B)

The dispersity D indicates how voids are dispersed throughout the inside of a particle, excluding compartments having only a small void area.

The equation (A) and the equation (B) of the carbon material for a non-aqueous secondary battery are calculated taking the following (a) to (d) into account.

(a) Method of Selecting Granulated Particles and Definition of Major Axis and Minor Axis The particle boundary may be established by any method by which the boundary is clearly defined, provided that the boundary between the particle and other regions needs to be established such that the region of interest (ROI) representing the shape of the particle is completely included. For example, it may be established by freehand or the approximation by a polygon. When the boundary is not a simple oval but has a complicated shape, for example, the boundary may be divided into any desired number of equally spaced sections to approximate the particle region by a polygon. The boundary, however, is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1| \leq 0.1$. When an electrode coated with a binder having poor conductivity is used, the boundary may be difficult to determine under the measurement conditions of the present invention. This is a phenomenon that occurs due to the poor conductivity of the binder when the side of the particle is visible in the cross section of the particle. In such a case, it is necessary to take another image with a clear boundary at a lower acceleration voltage to determine a boundary.

For one randomly selected granulated particle, the barycenter (centroid) is defined. First, the particle defined by the boundary is approximated by square cells. The size of each cell is preferably, but not necessarily, 5 nm or less in actual size. Two-dimensional coordinates are determined in the image. The coordinates of the barycenter of each cell are defined. Assuming that the weights of the cells are the same, the cells are numbered from 1 to N. The following formula is used to determine the coordinates of the barycenter of the granulated particle.

$$\vec{r_G} = \frac{\sum_1^N \vec{r_i}}{N} \qquad \text{[Mathematical 12]}$$

In the formula, $r_i$ represents the coordinates of an i-th cell, and $r_G$ represents the coordinates of the barycenter. The barycenter may be determined by operating any desired image software, or by the following formula if the barycenter of each divided mesh can be defined by any given figure.

$$\vec{r_G} = \frac{\sum_1^N A_i \vec{r_i}}{\sum_1^N A_i} \qquad \text{[Mathematical 13]}$$

In the formula, $A_i$ is the area of an i-th figure, and $r_i$ is the barycentric (centroid) coordinates of the i-th figure.

Next, the longest line segment among line segments passing through the barycenter obtained and bounded by the boundary fixed as described above is defined as a major axis. The line segment orthogonal to the major axis among line segments passing through the barycenter and bounded by the boundary fixed as described above is defined as a minor axis.

(b) Definition of Void Region and Non-Void Region and Method of Calculating their Areas The binarization may be carried out by any method by which intra-particle voids and carbon portions are clearly distinguished from each other, as shown in FIG. 9, and is preferably carried out such that void regions and other carbon particle regions are clearly distinguished from each other. The binarization, when performed on an 8-bit grayscale image, such as an SEM image, refers to dividing luminances into two and representing the two divided images in two values (e.g., 0 and 255, in the case of 8-bit). The binarization is not particularly limited to, and may be carried out using any desired image processing software. The division by setting a threshold can be carried out using any algorithm, such as the mode method and the ISOData method, by which void portions and carbon portions can be clearly distinguished from each other. The image needs to be a binarizable image. The binarizable image, in this case, refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

The areas of the void region and the non-void region in the particle thus calculated are each calculated as an approximation in a pixel unit and converted into an actual unit.

(c) Creation of Grid

In the binarized image is created cells that split the minor axis and the major axis of the granulated particle each into 20 parts. The cells may be arranged such that they are parallel to the major axis and the minor axis of the granulated particle.

(d) Calculation of Expectation E and Dispersity D of Target Compartment

For each of the 400 cells created by splitting the minor axis and the major axis of the granulated particle each into 20 parts, the expectation E is calculated by equation (A) above. The sum total of areas of compartments having an expectation E of 0.5 or greater is calculated, and the dispersity D is calculated by equation (B) above.

For each of the 30 granulated particles selected, the dispersity D is calculated, and the average dispersity D of the 30 particles is calculated.

In one aspect of the present invention, the carbon material for a non-aqueous secondary battery comprises intra-particle voids the orientation of which and the interval between which are controlled.

Specifically, the carbon material for a non-aqueous secondary battery according to an embodiment of the present invention (e.g., but not limited to, Invention $L^3$) comprises a composite carbon material made of granulated particles satisfying the following (1L) and (2L) and further has a characteristic particle cross section such that the ratio (Zave/X) of average inter-void distance Z (Zave) of 30 particles to volume-based average particle diameter X determined by laser diffraction of the present invention is determined from an image of the particle cross section.

Zave/X

The carbon material for a non-aqueous secondary battery according to this embodiment (e.g., but not limited to, Invention $L^3$) comprises granulated particles satisfying (1L) and (2L) above and has an average inter-void distance Z (Zave) of 30 particles as defined below and a volume-based average particle diameter X determined by laser diffraction in a ratio (Zave/X) of typically 0.060 or less, preferably 0.055 or less, more preferably 0.050 or less, still more preferably 0.045 or less, and typically 0.001 or greater, preferably 0.010 or greater, more preferably 0.020 or greater, the 30 granulated particles satisfying (1L) and (2L) and being randomly selected from a cross-sectional SEM image.

An excessively large Zave/X means that the distance between the carbon material and voids constituting the granulated particle is wide, which disadvantageously results in a low liquid retention in the particle.

Definition of Average Inter-Void Distance Z (Zave) of 30 Particles

As shown in the left figure of FIG. 13, three lines are drawn that are parallel to the minor axis of a target granulated particle and split the major axis of the granulated particle into four parts, and inter-void distances Z (μm) of the granulated particle on each line (see the right figure of FIG. 13) are each measured. The average of 30 particles in total is calculated. This is defined as the average inter-void distance Z (Zave) of 30 particles.

W/X

In this embodiment (e.g., but not limited to, Invention $L^3$), the carbon material for a non-aqueous secondary battery comprises granulated particles satisfying (1L) and (2L) above and has a standard deviation (W) of void sizes Y of 30 particles as defined below and a volume-based average particle diameter X determined by laser diffraction in a ratio (W/X) of preferably 0.018 or less, more preferably 0.016 or less, still more preferably 0.014 or less, and typically 0.001 or greater, preferably 0.005 or greater, more preferably 0.008 or greater, the 30 granulated particles satisfying (1L) and (2L) above and being randomly selected from a cross-sectional SEM image.

W/X is a quotient of a standard deviation of void sizes divided by a particle size, and a larger value of W/X means that a higher proportion of relatively large voids.

A W/X in the above range means relatively uniform void sizes or a low proportion of large voids, i.e., a fine void structure that allows an electrolyte solution to uniformly permeate into the particles.

Definition of Standard Deviation (W) of Void Sizes Y (μm) of 30 Particles

As shown in the left figure of FIG. 13, three lines are drawn that are parallel to the minor axis of a target granulated particle and split the major axis of the granulated particle into four parts, and void sizes Y (μm) of the granulated particle on each line (see the right figure of FIG. 13) are each measured. The standard deviation of 30 particles in total is calculated. This is defined as the standard deviation (W) of void sizes Y of 30 particles.

The standard deviation is determined by the following formula, where Yave is the average of Y, and Ny is the number of Y.

$$W = \left( \frac{\sum (Y - Y_{ave})^2}{Ny} \right)^{1/2} \quad \text{[Mathematical 14]}$$

Condition of Voids

Preferably, the granulated particles in the carbon material for a non-aqueous secondary battery according to the present invention have slit-like voids, and the slit-like voids are arranged mainly in layers.

More specifically, among 30 granulated particles satisfying (1L) and (2L) above randomly selected from a cross-sectional SEM image, the proportion (by number) of particles having slit-like voids arranged mainly in layers is more preferably 70% or more, particularly preferably 80% or more, most preferably 90% or more. Within this range, it can be said that most of the particles have a slit-like and layered structure.

"Slit-like void" refers to a long and narrow void (with a high aspect ratio) like a gap. The aspect ratio of the void is preferably 10 or greater, more preferably 15 or greater. The aspect ratio is a value obtained by dividing the major axis of the void by the minor axis, that is, (major axis of void)/(minor axis of void). The major axis and the minor axis of the void can be calculated by the same method as in Selection of Granulated Particles and Definition of Minor Axis described below.

In the present invention, "voids in layers" means that major axes of voids in a particle are arranged in parallel. For example, if the angle between the major axes of two voids is within ±30°, the two voids are regarded as being in parallel.

The proportion of the area of voids in layers (the area of voids in layers/the gross area of voids) in a granulated particle is preferably 40% or more, more preferably 50% or more, still more preferably 60% or more, and typically 100% or less, preferably 90% or less. The proportion of the number of slit-like voids (the number of slit-like voids/the total number of voids) is preferably 70% or more, more preferably 80% or more, still more preferably 90% or more, and typically 100% or less, preferably 90% or less. If the number and the area of slit-like voids are in these ranges, it can be said that the particle has so many fine slit-like structures that provide more reaction initiation surfaces of Li and sufficient permeability of electrolyte solution.

The above-described Zave/X and W/X of the carbon material for a non-aqueous secondary battery are calculated taking the following (a) to (d) into account.

(a) Selection of Granulated Particles and Definition of Minor Axis

In an SEM image acquired, 30 granulated particles satisfying the above conditions (1L) and (2L) are randomly selected. In the selection, particle boundaries are established along the outlines of the granulated particles. The particle boundary may be established by any method by which the boundary is clearly defined. For example, it may be established by freehand or the approximation by a polygon. It is necessary to establish the boundary between the particle and other regions such that the region of interest (ROI) representing the shape of the particle is completely included. When the boundary is not linear-like but has a complicated shape, for example, the boundary may be divided into any desired number of equally spaced sections to approximate the particle region by a polygon. The boundary is established so as not to deviate from a roundness R determined with a flow-type particle image analyzer. As used herein, "not deviate" means that a degree of spheroidization R determined by a flow-type particle image analyzer and a degree of spheroidization $R_1$ determined from a cross-sectional SEM image satisfy the relationship $|R-R_1| \leq 0.1$.

For one randomly selected granulated particle, the barycenter (centroid) is defined. First, the particle defined by the boundary is approximated by square cells. The size of each cell is preferably, but not necessarily, 5 nm or less in actual size. Two-dimensional coordinates are determined in the image. The coordinates of the barycenter of each cell are defined. Assuming that the weights of the cells are the same, the cells are numbered from 1 to N. The following formula is used to determine the coordinates of the barycenter of the granulated particle.

$$\vec{r_G} = \frac{\sum_1^N \vec{r_i}}{N} \quad \text{[Mathematical 15]}$$

In the formula, $r_i$ represents the coordinates of an i-th cell, and $r_G$ represents the coordinates of the barycenter. The barycenter may be determined by operating any desired image software, or by the following formula if the barycenter of each divided mesh can be defined by any given figure.

$$\vec{r_G} = \frac{\sum_1^N A_i \vec{r_i}}{\sum_1^N A_i} \quad \text{[Mathematical 16]}$$

In the formula, $A_i$ is the area of an i-th figure, and $r_i$ is the barycentric (centroid) coordinates of the i-th figure.

Next, the longest line segment among line segments passing through the barycenter obtained and bounded by the boundary fixed as described above is defined as a major axis. The line segment orthogonal to the major axis among line segments passing through the barycenter and bounded by the boundary fixed as described above is defined as a minor axis.

(b) Definition and Calculation Method of Intra-Particle Voids

The binarization may be carried out by any method by which intra-particle voids and carbon portions are clearly distinguished from each other, as shown in FIG. 9. It is supposed that the image to be processed is an 8-bit grayscale image, the luminance of one picture element (1 Pixel) of which is expressed by a natural number from 0 to 255. The binarization refers dividing luminances into two and representing the two divided images in two values (e.g., 0 and 255 in this case). The binarization may be carried out using any desired image processing software. The division by setting a threshold can be carried out using any algorithm, such as the mode method and the ISOData method, by which void portions and carbon portions can be clearly distinguished from each other. The target image needs to be a binarizable image. The binarizable image, in this case, refers to an image in which the luminance of void portions and the luminance of carbon portions are clearly distinguished from each other by a certain threshold. In some images, the surface may be rough due to low processing accuracy; the cross section may be facing obliquely; or the luminances of void portions and carbon portions may be close to each other depending on the settings such as contrast and brightness. Such images may show incorrect void distributions when binarized and thus are preferably excluded from analysis objects. For example, FIG. 10 is an image in which the surface of a graphite portion in the middle has a rough pattern and a low luminance, and fine voids have high luminances. When such an image is binarized picking up fine parts, carbon portions are also expressed as voids; by contrast, if a luminance at a carbon portion with no void is used as a threshold, fine voids, which are actually voids, cannot be displayed. Although such particles are preferably not selected, the cross section of such particles may be typical, and thus it is necessary not to analyze such an SEM image unsuitable for binarization but to retake an image and adjust the brightness and the contrast.

(c) Voids on Line Segment of Granulated Particle

"Voids in a granulated particle intersecting the minor axis of the granulated particle" refers to voids on three line segments that are parallel to the minor axis of the granulated particle and split the major axis of the granulated particle into four parts (see FIG. 13). Picture elements intersecting line segments translated from the three line segments parallel to the minor axis of the granulated particle in the major axis direction by ±0.5 pixel are regarded as voids on the minor axis.

(d) Average Interval (Zave) Between Voids and Standard Deviation (W) of Void Sizes The interval between voids (the distance between a void and a void) in one randomly selected granulated particle is determined on the above-described three line segments parallel to the minor axis of the granulated particle (see FIG. 13). In one granulated particle, distances Z between voids on the three line segments parallel to the minor axis are each measured. This measurement is made on 30 particles. Its average value is defined as the average inter-void distance Z (Zave) of 30 particles.

Furthermore, sizes Y of voids on the three line segments (see FIG. 13) are each measured. This measurement is made on 30 particles. Its standard deviation is defined as the standard deviation (W) of void sizes Y of 30 particles.

In this embodiment (e.g., but not limited to, Invention $L^3$), voids in the granulated particle are preferably arranged, mainly, relatively parallel to the major axis of the granulated particle.

Negative Electrode for Non-Aqueous Secondary Battery

The present invention also relates to a negative electrode comprising the carbon material of the present invention described above. There is no limitation on the basic configuration and the production method of the negative electrode of the present invention. Hereinafter, the carbon material includes a composite carbon material and a mixed carbon material unless otherwise specified. The negative electrode (hereinafter also referred to as "electrode sheet" as appropriate) for a non-aqueous secondary battery comprising the carbon material of the present invention or a carbon material produced by the method of the present invention comprises a current collector and a negative electrode active material layer on the current collector, the active material layer comprising the carbon material of the present invention or a carbon material produced by the method of the present invention. More preferably, the active material layer comprises a binder.

Any binders may be used, but those having olefinic unsaturated bonds in their molecules are preferred. Specific examples include, but are not limited to, styrene-butadiene rubbers, styrene-isoprene-styrene rubbers, acrylonitrile-butadiene rubbers, butadiene rubbers, and ethylene-propylene-diene copolymers. These binders, having olefinic unsaturated bonds, can inhibit the active material layer from being swollen by an electrolyte solution. In particular, styrene-butadiene rubbers are preferred from the viewpoint of availability.

Combining the carbon material, an active material, of the present invention with such a binder having an olefinic unsaturated bond can increase the strength of a negative electrode plate. A negative electrode with increased strength is less prone to degradation by charging and discharging, leading to a prolonged cycle life. Furthermore, in the negative electrode according to the present invention, the adhesive strength between the active material layer and the current collector is high. Thus, even if the amount of binder in the active material layer is small, the active material layer will not probably be peeled off the current collector when the negative electrode is wound to produce a battery.

Preferred binders having olefinic unsaturated bonds in their molecules are those having high molecular weights and/or those having high proportions of unsaturated bonds. Specifically, in the case of binders having high molecular weights, preferred are those having weight average molecular weights preferably in the range of 10,000 or greater, more preferably 50,000 or greater, and preferably 1,000,000 or less, more preferably 300,000 or less. In the case of binders having high proportions of unsaturated bonds, preferred are those having olefinic unsaturated bonds in a molar amount preferably in the range of $2.5 \times 10^{-7}$ mol or more, more preferably $8 \times 10^{-7}$ mol or more, and preferably $1 \times 10^{-6}$ mol or less, more preferably $5 \times 10^{-6}$ mol or less, per gram of the binders. Although the binder is only required to satisfy one of the regulation of molecular weight and the regulation of proportion of unsaturated bonds, those satisfying both the regulations are more preferred. A molecular weight of a binder having an olefinic unsaturated bond in this range provides high mechanical strength and flexibility.

The binder having an olefinic unsaturated bond preferably has a degree of unsaturation of 15% or more, more preferably 20% or more, still more preferably 40% or more, and preferably 90% or less, more preferably 80% or less. The degree of unsaturation is a proportion (%) of double bonds relative to repeating units of a polymer.

In the present invention, a binder having no olefinic unsaturated bond can be used in combination with the above-described binder having an olefinic unsaturated bond to the extent that the effects of the present invention are eliminated. The binder having no olefinic unsaturated bond is added in an amount preferably in the range of 150% by mass or less, more preferably 120% by mass or less, relative to the binder having an olefinic unsaturated bond.

Combined use of a binder having no olefinic unsaturated bond can improve coating properties, but an excessive amount of binder reduces the strength of the active material layer.

Examples of binders having no olefinic unsaturated bond include polysaccharide thickeners, such as methylcellulose, carboxymethylcellulose, starch, carrageenan, pullulan, guar gum, and xanthan gum (xanthane gum); polyethers, such as polyethylene oxide and polypropylene oxide; vinyl alcohols, such as polyvinyl alcohol and polyvinyl butyral; polyacids, such as polyacrylic acid and polymethacrylic acid; metal salts of these polymers; fluorine-containing polymers, such as polyvinylidene fluoride; alkane polymers, such as polyethylene and polypropylene; and copolymers thereof.

When the carbon material according to the present invention is used in combination with the above-described binder having an olefinic unsaturated bond, the ratio of the binder in the active material layer can be smaller than before. Specifically, the mass ratio of the carbon material according to the present invention to a binder (which may optionally be a mixture of a binder having an unsaturated bond and a binder having no unsaturated bond as described above) is preferably in the range of 90/10 or greater, more preferably 95/5 or greater, and preferably 99.9/0.1 or less, more preferably 99.5/0.5 or less, on a dry mass basis. A binder in a ratio in this range can prevent or reduce the decrease in capacity and the increase in resistance, and further provides an electrode plate with high strength.

The negative electrode is formed by dispersing the carbon material and the binder described above in a dispersion medium to prepare a slurry and applying the slurry to a current collector. Examples of dispersion media that can be used include organic solvents, such as alcohols, and water. To the slurry, a conductive agent (conductive auxiliary) may optionally be added. Examples of conductive agents include carbon blacks, such as acetylene black, Ketjen black, and furnace black, and fine powders of Cu, Ni, and alloys thereof with an average particle diameter of 1 μm or less. The amount of conductive agent is preferably about 10% by mass or less relative to the carbon material of the present invention.

The current collector to which the slurry is applied may be those known in the art. Specific examples include thin metal films such as rolled copper foil, electrolytic copper foil, and stainless foil. The thickness of the current collector is preferably 4 μm or more, more preferably 6 μm or more, and preferably 30 μm or less, more preferably 20 μm or less.

The slurry, after being applied to the current collector, is dried in dry air or an inert atmosphere at a temperature of preferably 60° C. or higher, more preferably 80° C. or higher, and preferably 200° C. or lower, more preferably 195° C. or lower, to form an active material layer.

The active material layer obtained by applying and drying the slurry preferably has a thickness of 5 μm or more, more preferably 20 μm or more, still more preferably 30 μm or more, and preferably 200 μm or less, more preferably 100 μm or less, still more preferably 75 μm or less. The thickness of the active material layer in this range is well-balanced with the particle diameter of the active material to provide a highly practical negative electrode that sufficiently occludes and releases Li at a high-density current.

The thickness of the active material layer may be adjusted to be a thickness in the above range by pressing the slurry that has been applied and dried.

In applications where capacity is important, the density of the carbon material in the active material layer is preferably 1.55 g/cm$^3$ or more, more preferably 1.6 g/cm$^3$ or more, still more preferably 1.65 g/cm$^3$ or more, particularly preferably 1.7 g/cm$^3$ or more, and preferably 1.9 g/cm$^3$ or less, although the density varies depending on the application. A density in this range can ensure a sufficient battery capacity per unit volume and reduces the possibility of degradation of rate characteristics.

For example, in applications where input-output characteristics are important, such as automotive applications and power tool applications, the density is typically 1.1 g/cm$^3$ to 1.65 g/cm$^3$. A density in this range can avoid increases in contact resistance between particles, which might occur at an excessively low density, and, on the other hand, can prevent or reduce the degradation of rate characteristics, which might occur at an excessively high density. In these applications, the density is preferably 1.2 g/cm$^3$ or more, more preferably 1.25 g/cm$^3$ or more.

In applications where capacity is important, including mobile device applications such as cellular phones and personal computers, the density can be typically 1.45 g/cm$^3$ or more, and typically 1.9 g/cm$^3$ or less. A density in this range can avoid decreases in battery capacity per unit volume, which might occur at an excessively low density, and, on the other hand, can prevent or reduce the degradation of rate characteristics, which might occur at an excessively high density. In these applications, the density is preferably 1.55 g/cm$^3$ or more, more preferably 1.65 g/cm$^3$ or more, particularly preferably 1.7 g/cm$^3$ or more.

When a negative electrode for a non-aqueous secondary battery is produced using the carbon material described above, there is no limitation on the method and the selection of other materials. Furthermore, when a lithium ion secondary battery is produced using this negative electrode, there is no limitation on the selection of members that constitute the lithium ion secondary battery and are essential for a battery configuration, such as a positive electrode and an electrolyte solution. Hereinafter, a detailed description will be given of a negative electrode for a lithium ion secondary battery comprising the carbon material of the present invention and a lithium ion secondary battery comprising the carbon material of the present invention, but the following specific examples of usable materials, production methods, and others should not be construed as limiting.

Non-Aqueous Secondary Battery

The non-aqueous secondary battery, particularly, the lithium ion secondary battery, the basic configuration of which is the same as those of lithium ion secondary batteries known in the art, typically comprises a positive electrode and a negative electrode, each being capable of occluding and releasing lithium ions, and an electrolyte. The negative electrode comprises the above-described carbon material according to one embodiment of the present invention or a carbon material produced by the method according to one embodiment of the present invention.

The positive electrode comprises a current collector and a positive electrode active material layer on the current collector, the positive electrode active material layer comprising a positive electrode active material and a binder.

Examples of positive electrode active materials include metal chalcogenides, which are capable of occluding and releasing alkali metal cations, such as lithium ions, during charging and discharging. Examples of metal chalcogenides include transition metal oxides, such as oxides of vanadium, oxides of molybdenum, oxides of manganese, oxides of chromium, oxides of titanium, and oxides of tungsten; transition metal sulfides, such as sulfides of vanadium, sulfides of molybdenum, sulfides of titanium, and CuS; phosphorus-sulfur compounds of transition metals, such as NiPS$_3$ and FePS$_3$; selenium compounds of transition metals, such as VSe$_2$ and NbSe$_3$; composite oxides of transition metals, such as Fe$_{0.25}$V$_{0.75}$S$_2$ and Na$_{0.1}$CrS$_2$; and composite sulfides of transition metals, such as LiCoS$_2$ and LiNiS$_2$.

Of these, from the viewpoint of occlusion and release of lithium ions, preferred are, for example, V$_2$O$_5$, V$_5$O$_{13}$, VO$_2$, Cr$_2$O$_5$, MnO$_2$, TiO$_2$, MoV$_2$O$_8$, LiCoO$_2$, LiNiO$_2$, LiMn$_2$O$_4$, TiS$_2$, V$_2$S$_5$, Cr$_{0.55}$V$_{0.75}$S$_2$, and Cr$_{0.5}$V$_{0.5}$S$_2$, and particularly preferred are LiCoO$_2$, LiNiO$_2$, LiMn$_2$O$_4$, and lithium-transition metal composite oxides in which these transition metals are partially substituted with other metals. These positive electrode active materials may be used alone or in combination.

For binding the positive electrode active material, any known binder can be selected for use. Examples include inorganic compounds, such as silicates and water glass, and resins having no unsaturated bond, such as Teflon (registered trademark) and polyvinylidene fluoride. Of these, resins having no unsaturated bond are preferred because they are less likely to decompose during oxidation reactions. Resins having an unsaturated bond, when used as resins for binding the positive electrode active material, may decompose during oxidation reactions. The weight average molecular weights of these resins are typically in the range of 10,000 or greater, preferably 100,000 or greater, and typically 3,000,000 or less, preferably 1,000,000 or less.

To the positive electrode active material layer, a conductive agent (conductive auxiliary) may be added to improve the conductivity of the electrode. The conductive agent may be any conductive agent capable of imparting conductivity when added in an appropriate amount to the active material, and typical examples include carbon powders, such as acetylene black, carbon black, and graphite powder, metal fibers, metal powders, and metal foils.

A positive plate is formed using a method similar to that for producing a negative electrode described above by slurrying the positive electrode active material and the binder with a solvent and applying the slurry to a current collector, followed by drying. Examples of raw materials of the current collector of the positive electrode include, but are not limited to, aluminum, nickel, and stainless steel (SUS).

The electrolyte (also referred to as "electrolyte solution") for use is, for example, a non-aqueous electrolyte solution of a lithium salt in a non-aqueous solvent, or a variant of the non-aqueous electrolyte solution formed into a gel, a rubber, or a solid sheet by adding a macromolecular organic compound or other compounds.

The non-aqueous solvent for use in the non-aqueous electrolyte solution is not limited to a particular solvent, and it can be appropriately selected from known non-aqueous solvents that have been conventionally used as solvents for non-aqueous electrolyte solutions. Examples include linear carbonates, such as diethyl carbonate, dimethyl carbonate, and ethyl methyl carbonate; cyclic carbonates, such as ethylene carbonate, propylene carbonate, and butylene carbonate; linear ethers, such as 1,2-dimethoxyethane; cyclic ethers, such as tetrahydrofuran, 2-methyltetrahydrofuran, sulfolane, and 1,3-dioxolane; linear esters, such as methyl formate, methyl acetate, and methyl propionate; and cyclic esters, such as γ-butyrolactone and γ-valerolactone.

Any one of these non-aqueous solvents may be used alone, or two or more of these may be used in combination. In the case of a mixed solvent, preferred is a mixed solvent containing a cyclic carbonate and a linear carbonate, and particularly preferred is a mixed solvent containing ethylene carbonate and propylene carbonate as cyclic carbonates because such a mixed solvent can provide high ion conductivity even at low temperatures to improve low-temperature charge load characteristics. In particular, the amount of propylene carbonate is preferably in the range of 2% by mass to 80% by mass, more preferably in the range of 5% by mass to 70% by mass, still more preferably in the range of 10% by mass to 60% by mass, based on the total amount of non-aqueous solvent. Propylene carbonate in an amount below this range reduces ion conductivity at low temperatures. Propylene carbonate in an amount above this range, when a graphite electrode is used, is solvated in lithium ions to penetrate between graphite phases, thereby causing the graphite negative electrode active material to delaminate and degrade, which disadvantageously results in an insufficient capacity.

The lithium salt for use in the non-aqueous electrolyte solution is also not limited to a particularly salt, and it can be appropriately selected from known lithium salts known to be usable in this application. Examples include inorganic lithium salts, such as halides including LiCl and LiBr, perhalogen acid salts including $LiClO_4$, $LiBrO_4$, and $LiClO_4$, and inorganic fluoride salts including $LiPF_6$, $LiBF_4$, and $LiAsF_6$; and fluorine-containing organic lithium salts, such as perfluoroalkanesulfonic acid salts including $LiCF_3SO_3$ and $LiC_4F_9SO_3$, and perfluoroalkanesulfonic imide salts including Li trifluoromethanesulfonyl imide (($CF_3SO_2)_2NLi$). Of these, $LiClO_4$, $LiPF_6$, and $LiBF_4$ are preferred.

These lithium salts may be used alone or in a combination of two or more. The concentration of lithium salts in the non-aqueous electrolyte solution is typically in the range of 0.5 mol/L to 2.0 mol/L.

When the non-aqueous electrolyte solution is used in the form of a gel, a rubber, or a solid sheet by incorporating a macromolecular organic compound, specific examples of macromolecular organic compounds include macromolecular polyether compounds, such as polyethylene oxide and polypropylene oxide; cross-linked polymers of macromolecular polyether compounds; macromolecular vinyl alcohol compounds, such as polyvinyl alcohol and polyvinyl butyral; insolubilized macromolecular vinyl alcohol compounds; polyepichlorohydrin; polyphosphazene; polysiloxane; macromolecular vinyl compounds, such as polyvinylpyrrolidone, polyvinylidene carbonate, and polyacrylonitrile; and polymer copolymers, such as poly(☐-methoxyoligooxyethylene methacrylate), poly(☐-methoxyoligooxyethylene methacrylate-co-methyl methacrylate), and poly(hexafluoropropylene-vinylidene fluoride).

The non-aqueous electrolyte solution may further contain a film-forming agent. Specific examples of film-forming agents include carbonate compounds, such as vinylene carbonate, vinyl ethyl carbonate, and methylphenyl carbonate; alkene sulfides, such as ethylene sulfide and propylene sulfide; sultone compounds, such as 1,3-propane sultone and 1,4-butane sultone; and acid anhydrides, such as maleic anhydride and succinic anhydride. Furthermore, an overcharge inhibitor such as diphenyl ether or cyclohexyl benzene may be added.

When these additives are used, the amount thereof is typically in the range of 10% by mass or less, preferably 8% by mass or less, more preferably 5% by mass or less, particularly preferably 2% by mass or less, based on the total mass of the non-aqueous electrolyte solution. An excessive amount of these additives may have adverse effects on battery characteristics, such as increases in initial irreversible capacity, degradation of low-temperature characteristics and rate characteristics, and other effects.

The electrolyte may also be a polymer solid electrolyte, which conducts alkali metal cations, such as lithium ions. Examples of polymer solid electrolytes include solutions of lithium salts in the above-described macromolecular polyether compounds and polyether derivatives terminated with alkoxides in place of hydroxyl groups.

Typically, the positive electrode and the negative electrode are intervened by a porous separator, such as a porous membrane or a nonwoven fabric, to prevent a short circuit between the electrodes. In this case, the porous separator is impregnated with the non-aqueous electrolyte solution.

Examples of raw materials of the separator include polyolefins, such as polyethylene and polypropylene, and polyethersulfone, and polyolefins are preferred.

The non-aqueous secondary battery may be of any type. Examples include cylindrical batteries including spirally-disposed sheet electrodes and a separator, cylindrical batteries having an inside-out structure combining pellet electrodes and a separator, and coin batteries in which pellet electrodes and a separator are laminated. The batteries of these types can be put in any desired outer case of any desired shape, such as coins, cylinders, and prisms, and any desired size.

The non-aqueous secondary battery may be assembled in any appropriate procedure depending on the battery structure. For example, a negative electrode is placed on an outer case; an electrolyte solution and a separator are placed thereon; a positive electrode is placed oppositely to the negative electrode; and these are caulked with a gasket and a sealing plate to form a battery.

The carbon material for a non-aqueous secondary battery negative electrode of the present invention can provide a non-aqueous secondary battery having high stability, a high output, a high capacity, a low irreversible capacity, and a high cycle retention.

EXAMPLES

Specific embodiments of the present invention will now be described in more detail with reference to examples, but these examples are not intended to limit the present invention.

The viscosity, contact angle, surface tension, and $r \cos \theta$ of granulating agents were each measured by the methods described in the specification.

First examples (Examples A) of the present invention will now be described.

In Examples A, physical properties of carbon materials produced were measured by the following methods.

Preparation of Electrode Sheet

An electrode plate having an active material layer with an active material layer density of $1.60\pm0.03$ g/cm$^3$ was prepared using graphite particles of Examples or Comparative Examples. Specifically, $50.00\pm0.02$ g of a carbon material, $50.00\pm0.02$ g (0.500 g on a solids basis) of a 1% by mass aqueous carboxymethylcellulose sodium salt solution, and $1.00\pm0.05$ g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the carbon material adhered in an amount of $12.00\pm0.3$ mg/cm$^2$. The coated foil was roll-pressed using a roller having a diameter of 20 cm to adjust the density of the active material layer to be $1.60\pm0.03$ g/cm$^3$, thereby preparing an electrode sheet.

Production of Non-Aqueous Secondary Battery (2016 Coin Battery)

The electrode sheet prepared by the above-described method was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of LiPF$_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of LiPF$_6$ in a mixed solvent of ethylene carbonate, ethyl methyl carbonate, and dimethyl carbonate (volume ratio=3:3:4) was injected in an amount of 250 μL to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Mode Pore Diameter (PD) in Pore Diameter Range of 0.01 µm to 1 µm, Half Width at Half Maximum of Pore Distribution (Log (Nm)), Cumulative Pore Volume at Pore Diameters in Range of 0.01 µm to 1 µm, and Total Pore Volume The measurement by mercury intrusion was carried out using a mercury porosimeter (Autopore 9520 available from Micromeritics Corp). Around 0.2 g of a sample (carbon material) was weighed into a powder cell, and the cell was sealed. The cell was subjected to a degassing pretreatment at room temperature under vacuum (50 µmHg or lower) for 10 minutes, and then the pressure in the cell was reduced stepwise to 4 psia. Mercury was introduced into the cell, and the pressure was increased stepwise from 4 psia to 40,000 psia and then reduced to 25 psia. From the mercury intrusion curve obtained, a pore distribution was calculated using the Washburn equation. The calculation was made assuming that the surface tension of mercury was 485 dyne/cm, and the contact angle of mercury was 140°.

From the pore distribution obtained, a mode pore diameter (PD) in a pore diameter range of 0.01 µm to 1 µm, a cumulative pore volume at pore diameters in a range of 0.01 µm to 1 µm, and a total pore volume were calculated. The half width at half maximum of pore distribution (log (nm)) is defined as a half width at half maximum at a micropore side of a peak in a pore diameter range of 0.01 µm to 1 µm in the pore distribution (nm) with the horizontal axis expressed in common logarithm (log (nm)).

Roundness (Average Roundness)

Using a flow-type particle image analyzer (FPIA-2000 available from Sysmex Corporation), a particle size distribution based on equivalent circle diameter was measured, and a roundness was determined. Ion-exchanged water was used as a dispersion medium, and polyoxyethylene (20) monolaurate was used as a surfactant. The equivalent circle diameter is a diameter of a circle (equivalent circle) having the same projected area as that of a captured particle image, and the roundness is a ratio of the perimeter of the equivalent circle, as the numerator, to the perimeter of the captured particle projection image, as the denominator. Roundnesses of particles having an equivalent diameter in the range of 1.5 to 40 µm were averaged to determine the roundness.

Frequency of Particles of 3 µm or Less

The frequency of particles with a particle diameter of 3 µm or less was determined by mixing 50 mL of a 0.2% by volume aqueous solution of a polyoxyethylene sorbitan monolaurate surfactant (Tween 20 (registered trademark)) with 0.2 g of a carbon material, applying ultrasonic waves of 28 kHz at a power of 60 W for 5 minutes using a flow-type particle image analyzer "FPIA-2000 available from Sysmex Industrial Corp.", and then counting the number of particles with a detection range set to 0.6 to 400 µm.

Tap Density

Using a powder density meter, the carbon material of the present invention was dropped through a sieve with openings of 300 µm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Specific Surface Area (SA)

The BET specific surface area was defined as a value determined as follows: using a surface area meter (e.g., a Gemini 2360 specific surface area analyzer available from Shimadzu Corporation), a carbon material sample was preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Example A1

A flake natural graphite having a d50 of 100 µm was crushed with a mechanical crusher having a crushing rotor and a liner to give a flake natural graphite having a d50 of 30 µm and a water content of 0.03% by mass. To 100 g of the resulting flake natural graphite, 6 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized natural graphite having a d50 of 19.4 µm. Using the measurement methods described above, d50, Tap (tap density), specific surface area, pore diameter, pore volume, roundness, pore distribution, frequency of particles, discharge capacity, and low-temperature output characteristics were measured. The results are shown in Tables 1A and 2A.

Comparative Example A1

Using a Model NHS-1 hybridization system available from Nara Machinery Co., Ltd., a flake natural graphite having a d50 of 100 µm was mechanically spheroidized at a rotor peripheral speed of 85 m/sec for 3 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 19.5 µm. The results of the measurements made in the same manner as in Example A1 are shown in Tables 1A and 2A.

Comparative Example A2

The sample obtained in Comparative Example A1 was further mechanically spheroidized at a rotor peripheral speed of 85 m/sec for 3 minutes using a Model NHS-1 hybridization system available from Nara Machinery Co., Ltd. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 19.3 µm. The results of the measurements made in the same manner as in Example A1 are shown in Tables 1A and 2A.

Example A2

The spheroidized natural graphite before heat treatment obtained in Example A1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.03. The results of the measurements made in the same manner as in Example A1 are shown in Tables 1A and 2A.

Example A3

A multi-layered carbon material made of graphite particles and an amorphous carbon combined with each other was obtained in the same manner as in Example A2 except that the mass ratio of spheroidized graphite particle to amorphous carbon (spheroidized graphite particle/amorphous carbon) was 1:0.065. The results of the measurements made in the same manner as in Example A1 are shown in Tables 1A and 2A.

Comparative Example A3

The spheroidized natural graphite obtained in Comparative Example A2 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.03. The results of the measurements made in the same manner as in Example A1 are shown in Tables 1A and 2A.

Example A4

A flake natural graphite having a d50 of 100 μm was crushed with a dry air-flow crusher to give a flake natural graphite having a d50 of 6 μm, a Tap of 0.13 g/cm$^3$, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 9.2 μm. The results of the measurements made in the same manner as in Example A1 are shown in Tables 1A and 2A.

Example A5

A flake natural graphite having a d50 of 100 μm was crushed with a dry swirl-flow crusher to give a flake natural graphite having a d50 of 6 μm, a Tap of 0.38 g/cm$^3$, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 9.9 μm. The results of the measurements made in the same manner as in Example A1 are shown in Tables 1A and 2A.

Comparative Example A4

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 10.8 μm. The results of the measurements made in the same manner as in Example A1 are shown in Tables 1A and 2A.

Comparative Example A5

A flake natural graphite having a d50 of 100 μm was spheroidized and then classified to remove the above-described flake graphite fine powder. The spheroidized graphite obtained by spheroidizing the flake graphite was isotropically pressurized to give a spheroidized natural graphite having a cumulative pore volume at pore diameters of 0.01 μm to 1 μm of 0.069. After that, the spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.03. The results of the measurements made in the same manner as in Example A1 are shown in Tables 1A and 2A.

Example A6

A flake natural graphite having a d50 of 100 μm was crushed with a dry swirl-flow crusher to give a flake natural graphite having a d50 of 8.1 μm, a Tap of 0.39 g/cm$^3$, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 12.9 μm. The results of the measurements made in the same manner as in Example A1 are shown in Tables 1A and 2A.

Example A7

The spheroidized natural graphite before heat treatment obtained in Example A6 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example A1 are shown in Tables 1A and 2A.

Example A8

The spheroidized natural graphite before heat treatment obtained in Example A6 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.08. The results of the measurements made in the same manner as in Example A1 are shown in Tables 1A and 2A.

Comparative Example A6

The spheroidized natural graphite obtained in Comparative Example A4 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example A1 are shown in Tables 1A and 2A.

TABLE 1A

| | d50, μm | Tap, g/cm³ | Roundness | SA, m²/g | PD, μm | PD/50, % | Intra-Particle Half Width at Half Maximum | Frequency of Particles Having Pore Diameter of 3 μm or less, % | Cumulative Pore Volume at Pore Diameters to 1 μm, ml | Total Pore Volume, ml |
|---|---|---|---|---|---|---|---|---|---|---|
| Example A1 | 19.4 | 1.06 | 0.93 | 13.4 | 0.22 | 1.11 | 0.71 | 51 | 0.11 | 0.76 |
| Comparative Example A1 | 19.5 | 0.90 | 0.91 | 4.9 | 0.67 | 3.44 | 0.42 | 64 | 0.14 | 0.57 |
| Comparative Example A2 | 19.3 | 1.08 | 0.94 | 6.3 | 0.43 | 2.24 | 0.41 | 66 | 0.12 | 0.56 |
| Example A2 | 18.4 | 1.19 | 0.93 | 5.6 | 0.22 | 1.19 | 0.46 | — | 0.09 | 0.47 |
| Example A3 | 20.0 | 1.20 | 0.93 | 4.1 | 0.22 | 1.09 | 0.38 | — | 0.10 | 0.48 |
| Comparative Example A3 | 19.2 | 1.19 | 0.94 | 2.79 | 0.44 | 2.29 | 0.26 | — | 0.10 | 0.47 |
| Example A4 | 9.2 | 0.77 | 0.92 | 15.0 | 0.09 | 0.99 | 0.24 | 20 | 0.19 | 0.88 |
| Example A5 | 9.9 | 0.91 | 0.93 | 21.3 | 0.06 | 0.64 | 0.21 | 13 | 0.16 | 0.78 |
| Comparative Example A4 | 10.8 | 0.93 | 0.93 | 8.8 | 0.22 | 2.03 | 0.35 | 44 | 0.13 | 0.65 |
| Comparative Example A5 | 21.9 | 1.20 | 0.92 | 8.8 | — | — | — | — | <0.069 | <0.54 |
| Example A6 | 12.9 | 0.88 | 0.93 | 15.3 | 0.11 | 0.84 | 0.28 | 16 | 0.13 | 0.67 |
| Example A7 | 12.0 | 1.05 | 0.93 | 7.9 | 0.11 | 0.91 | 0.25 | — | 0.12 | 0.62 |
| Example A8 | 11.8 | 1.02 | 0.93 | 7.1 | 0.11 | 0.92 | 0.26 | — | 0.11 | 0.67 |
| Comparative Example A6 | 11.4 | 1.04 | 0.92 | 3.1 | 0.54 | 4.77 | 0.33 | — | 0.11 | 0.63 |

TABLE 2A

| | Discharge Capacity, mAh/g | Low-Temperature Output Characteristics, (Comparative Example A1 = 100) |
|---|---|---|
| Example A1 | 367 | 122 |
| Comparative Example A1 | 368 | 100 |
| Comparative Example A2 | 368 | 104 |
| Example A2 | 362 | 132 |
| Example A3 | 363 | 126 |
| Comparative Example A3 | 366 | 108 |
| Example A4 | 365 | 128 |
| Example A5 | 362 | 172 |
| Comparative Example A4 | 365 | 118 |
| Comparative Example A5 | 362 | 91 |
| Example A6 | 365 | 128 |
| Example A7 | 362 | 142 |
| Example A8 | 359 | 151 |
| Comparative Example A6 | 362 | 103 |

In Examples A1 to A8, the flake natural graphite adjusted to have a prescribed particle size was spheroidized while fine powder generated during the spheroidization was deposited on the base material and/or incorporated into the spheroidized particles, whereby a PD/d50(%) in the prescribed range was successfully achieved to provide a high capacity and excellent low-temperature output characteristics. By contrast, in Comparative Examples A1 to A4 and A6, where the PD/d50(%) was outside the prescribed range, and Comparative Example A5, where the cumulative pore volume in a range of 0.01 μm to 1 μm was outside the prescribed range, degraded low-temperature output characteristics were provided.

Second examples (Examples B) of the present invention will now be described. In Examples B, physical properties of carbon materials produced were measured by the following methods.

d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Tap Density

Using a powder density meter, the carbon material was dropped through a sieve with openings of 300 μm into a cylindrical tap cell with a diameter of 1.6 cm and a volume capacity of 20 cm³ to fill up the cell, and then a tap with a stroke length of 10 mm was given 1,000 times. The density calculated from the volume at this time and the mass of the sample was defined as the tap density.

Specific Surface Area SA

The specific surface area SA was defined as a value determined as follows: using a surface area meter (Gemini 2360 specific surface area analyzer available from Shimadzu Corporation), a carbon material sample was preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Residual Carbon Ratio of Granulating Agent

Sample weights before and after heat treatment of a granulating agent in an inert atmosphere at 700° C. for 1 hour were measured, and the residual carbon ratio of the granulating agent was calculated by the following formula.

Residual carbon ratio (% by mass) of granulating agent=$[w2/w1] \times 100$ (w1 is a mass (g) of a granulating agent before heat treatment, and w2 is a mass (g) of the granulating agent after heat treatment)

Example B1

A flake natural graphite having a d50 of 100 μm was crushed with a dry swirl-flow crusher to give a flake natural graphite having a d50 of 8.1 μm, a Tap of 0.39 g/cm³, and a water content of 0.08% by mass. To 100 g of the resulting flake natural graphite, 9 g of a granulating agent of N-methyl-2-pyrrolidone (NMP) (Wako Pure Chemical Industries, Ltd., special grade; flash point, 86° C.) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the sample obtained was mechanically spheroidized at a rotor peripheral speed of 85 m/sec for 10 minutes. The sample obtained was heat treated in a nitrogen atmosphere at 700° C. to give a spheroidized graphite sample from which the granulating agent was removed. Using the measurement methods described above, the residual carbon ratio, viscosity, contact angle with graphite, and surface tension of the granulating agent were measured, and the d50, d10, d90, SA, and Tap of the sample obtained were measured. The results are shown in Table 1B.

Example B2

A sample was prepared in the same manner as in Example B1 except that 12 g of a granulating agent of NMP (Wako Pure Chemical Industries, Ltd., special grade; flash point, 86° C.) was added. The results of the measurements made in the same manner as in Example B1 are shown in Table 1B.

Example B3

A sample was prepared in the same manner as in Example B1 except that 15 g of a granulating agent of NMP (Wako Pure Chemical Industries, Ltd., special grade; flash point, 86° C.) was added. The results of the measurements made in the same manner as in Example B1 are shown in Table 1B.

Example B4

A sample was prepared in the same manner as in Example B1 except that 12 g of a granulating agent of a solution of 3% by mass methyl methacrylate polymer (PMMA) (Wako Pure Chemical Industries, Ltd.) in NMP (Wako Pure Chemical Industries, Ltd., special grade; flash point, 86° C.) was added. The results of the measurements made in the same manner as in Example B1 are shown in Table 1B.

Example B5

A sample was prepared in the same manner as in Example B1 except that 12 g of a granulating agent of a solution of 10% by mass PMMA (Wako Pure Chemical Industries, Ltd.) in NMP (Wako Pure Chemical Industries, Ltd., special grade; flash point, 86° C.) was added. The results of the measurements made in the same manner as in Example B1 are shown in Table 1B.

Example B6

A sample was prepared in the same manner as in Example B1 except that 12 g of a granulating agent of a solution of 15% by mass PMMA (Wako Pure Chemical Industries, Ltd.) in NMP (Wako Pure Chemical Industries, Ltd., special grade; flash point, 86° C.) was added. The results of the measurements made in the same manner as in Example B1 are shown in Table 1B.

Example B7

A sample was prepared in the same manner as in Example B1 except that 12 g of a granulating agent of pure water was added. The results of the measurements made in the same manner as in Example B1 are shown in Table 1B.

Example B8

A sample was prepared in the same manner as in Example B1 except that 12 g of a granulating agent of an aqueous solution of 10% by mass polyacrylic acid ammonium ($PAANH_3$) (Wako Pure Chemical Industries, Ltd., first grade) was added. The results of the measurements made in the same manner as in Example B1 are shown in Table 1B.

Example B9

A sample was prepared in the same manner as in Example B1 except that 12 g of a granulating agent of an aqueous solution of 30% by mass polyacrylic acid ammonium ($PAANH_3$) (Wako Pure Chemical Industries, Ltd., first grade) was added. The results of the measurements made in the same manner as in Example B1 are shown in Table 1B.

Example B10

A sample was prepared in the same manner as in Example B1 except that 12 g of a granulating agent of an aqueous solution of 44% by mass $PAANH_3$ (Wako Pure Chemical Industries, Ltd., first grade) was added. The results of the measurements made in the same manner as in Example B1 are shown in Table 1B.

Example B11

A sample was prepared in the same manner as in Example B1 except that 15 g of a granulating agent of coal tar (flash point, 70° C.) was added. Since the viscosity of the coal tar was 500 cP or more at 25° C., the contact angle was measured in accordance with the measurement method described above after the sample was heated to 60° C. to decrease the viscosity to 500 cP or lower. The other properties were measured in the same manner as in Example B1. The results are shown in Table 1B.

Example B12

A sample was prepared in the same manner as in Example B1 except that 9 g of a granulating agent of creosote oil (flash point, 70° C.) was added. The results of the measurements made in the same manner as in Example B1 are shown in Table 1B.

Example B13

A sample was prepared in the same manner as in Example B1 except that 12 g of a granulating agent of creosote oil was added. The results of the measurements made in the same manner as in Example B1 are shown in Table 1B.

Example B14

A sample was prepared in the same manner as in Example B1 except that 15 g of a granulating agent of creosote oil was added. The results of the measurements made in the same manner as in Example B1 are shown in Table 1B.

Example B15

A sample was prepared in the same manner as in Example B1 except that 9 g of a granulating agent of a paraffinic oil (liquid paraffin available from Wako Pure Chemical Industries, Ltd., first grade; flash point, 238° C.; aniline point, >100° C.) was added. The results of the measurements made in the same manner as in Example B1 are shown in Table 1B.

Example B16

A sample was prepared in the same manner as in Example B1 except that 12 g of a granulating agent of a paraffinic oil (liquid paraffin available from Wako Pure Chemical Industries, Ltd., first grade; flash point, 238° C.; aniline point, >100° C.) was added. The results of the measurements made in the same manner as in Example B1 are shown in Table 1B.

Example B17

A sample was prepared in the same manner as in Example B1 except that 15 g of a granulating agent of a paraffinic oil (liquid paraffin available from Wako Pure Chemical Industries, Ltd., first grade; flash point, 238° C.; aniline point, >100° C.) was added. The results of the measurements made in the same manner as in Example B1 are shown in Table 1B.

Example B18

A sample was prepared in the same manner as in Example B1 except that 9 g of a granulating agent of an aromatic oil (1) (flash point, 242° C.; aniline point, 29° C.; containing a naphthalene ring structure in its molecule) was added. The results of the measurements made in the same manner as in Example B1 are shown in Table 1B.

Example B19

A sample was prepared in the same manner as in Example B1 except that 12 g of a granulating agent of the aromatic oil (1) (flash point, 242° C.; aniline point, 29° C.; containing a naphthalene ring structure in its molecule) was added. The results of the measurements made in the same manner as in Example B1 are shown in Table 1B.

Example B20

A sample was prepared in the same manner as in Example B1 except that 15 g of a granulating agent of the aromatic oil (1) (flash point, 242° C.; aniline point, 29° C.; containing a naphthalene ring structure in its molecule) was added. The results of the measurements made in the same manner as in Example B1 are shown in Table 1B.

Example B21

A sample was prepared in the same manner as in Example B1 except that 9 g of a granulating agent of an aromatic oil (2) (flash point, 150° C.; aniline point, none; mixed aniline point, 15° C.; containing a benzene ring structure in its molecule) was added. The results of the measurements made in the same manner as in Example B1 are shown in Table 1B.

Example B22

A sample was prepared in the same manner as in Example B1 except that 12 g of a granulating agent of the aromatic oil (2) (flash point, 150° C.; aniline point, none; mixed aniline point, 15° C.; containing a benzene ring structure in its molecule) was added. The results of the measurements made in the same manner as in Example B1 are shown in Table 1B.

Example B23

A sample was prepared in the same manner as in Example B1 except that 15 g of a granulating agent of the aromatic oil (2) (flash point, 150° C.; aniline point, none; mixed aniline point, 15° C.; containing a benzene ring structure in its molecule) was added. The results of the measurements made in the same manner as in Example B1 are shown in Table 1B.

Comparative Example B1

A sample was prepared in the same manner as in Example B1 except that no granulating agent was added. The results of the measurements made in the same manner as in Example B1 are shown in Table 1B.

Comparative Example B2

A sample was prepared in the same manner as in Example B1 except that 12 g of a granulating agent of coal-tar pitch (softening point, 90° C.; being solid during granulation) was added. The results of the measurements made in the same manner as in Example B1 are shown in Table 1B.

Comparative Example B3

A sample was prepared in the same manner as in Example B1 except that 12 g of an organic compound of PMMA (Wako Pure Chemical Industries, Ltd.; melting point, 105° C.; being solid during granulation) was added. The results of the measurements made in the same manner as in Example B1 are shown in Table 1B.

Comparative Example B4

The sample obtained in Comparative Example B1 was air classified to remove the flake graphite fine powder that had not been granulated to give a spheroidized graphite having a d50 of 10.9 μm and a Tap density of 0.88 g/cm$^3$. The results of the measurements made in the same manner as in Example B1 are shown in Table 1B.

TABLE 1B

| | Granulating Agent | Residual Carbon Ratio, % | Viscosity, cP (25° C.) | Contact Angle θ, ° (25° C.) | Surface Tension γ, mN/m (25° C.) | γcosθ | Amount of Granulating Agent, g | d10, μm | d50, μm | d50, μm | Tap, g/cm$^3$ | SA, m$^2$/g |
|---|---|---|---|---|---|---|---|---|---|---|---|---|
| Example B1 | NMP | 0 | 1.9 | 4.4 | 40.8 | 40.7 | 9 | 6.6 | 10.4 | 15.7 | 0.92 | 15.8 |
| Example B2 | | | | | | | 12 | 7.5 | 11.3 | 17.1 | 0.91 | 16.0 |
| Example B3 | | | | | | | 15 | 6.7 | 10.6 | 16.0 | 0.89 | 16.4 |
| Example B4 | 3% PMMA in NMP solution | 0 | 6.2 | 7.3 | 41.0 | 40.6 | 12 | 7.8 | 11.7 | 17.3 | 0.92 | 16.6 |
| Example B5 | 10% PMMA in NMP solution | 0 | 43 | 9.7 | 41.3 | 40.7 | 12 | 8.1 | 12.1 | 17.9 | 0.92 | 16.6 |
| Example B6 | 15% PMMA in NMP solution | 0 | 164 | 13.1 | 41.7 | 40.6 | 12 | 9.0 | 14.1 | 22.6 | 0.96 | 17.4 |
| Example B7 | Pure water | 0 | 0.9 | 95.5 | 72.1 | −6.9 | 12 | 2.9 | 6.9 | 12.6 | 0.76 | 11.2 |
| Example B8 | Aqueous solution of 10% PAANH3 | 1.5 | 3.9 | 94.8 | 72.9 | −6.1 | 12 | 3.9 | 8.0 | 13.3 | 0.87 | 10.3 |
| Example B9 | Aqueous solution of 30% PAANH3 | 4.4 | 32 | 88.1 | 75.8 | 2.5 | 12 | 6.5 | 11.1 | 18.1 | 1.00 | 11.4 |
| Example B10 | Aqueous solution of 44% PAANH3 | 6.5 | 169 | 83.8 | 78.6 | 8.5 | 12 | 5.5 | 10.8 | 20.4 | 1.00 | 13.2 |
| Example B11 | Coal tar | 27 | 6030 | 20.8 (60° C.) | 37.6 | 35.1 | 15 | 7.8 | 12.9 | 22.1 | 0.93 | 11.9 |
| Example B12 | Creosote oil | 0.4 | 5.0 | 10.8 | 39.4 | 38.7 | 9 | 7.0 | 10.8 | 16.2 | 0.94 | 15.4 |
| Example B13 | | | | | | | 12 | 8.0 | 11.9 | 17.7 | 0.94 | 15.3 |
| Example B14 | | | | | | | 15 | 8.2 | 12.3 | 18.1 | 0.89 | 15.2 |
| Example B15 | Paraffinic oil | 0 | 90 | 13.2 | 31.7 | 30.9 | 9 | 7.5 | 11.4 | 17.0 | 0.85 | 15.1 |
| Example B16 | | | | | | | 12 | 8.4 | 12.5 | 18.3 | 0.86 | 15.9 |
| Example B17 | | | | | | | 15 | 9.5 | 14.7 | 24.1 | 0.88 | 18.5 |
| Example B18 | Aromatic oil (1) | 0 | 58 | 12.9 | 33.7 | 32.8 | 9 | 7.5 | 11.4 | 17.0 | 0.92 | 15.9 |
| Example B19 | | | | | | | 12 | 8.2 | 12.4 | 18.6 | 0,92 | 16.3 |
| Example B20 | | | | | | | 15 | 9.4 | 14.3 | 22.4 | 0.92 | 17.9 |
| Example B21 | Aromatic oil (2) | 0 | 8.4 | 11.4 | 36.4 | 35.7 | 9 | 7.1 | 10.8 | 15.9 | 0.92 | 15.5 |
| Example B22 | | | | | | | 12 | 7.8 | 11.5 | 16.7 | 0.90 | 15.5 |
| Example B23 | | | | | | | 15 | 7.7 | 12.0 | 18.3 | 0.81 | 15.1 |
| Comparative Example B1 | — | — | — | — | — | — | 0 | 2.7 | 6.5 | 12.1 | 0.79 | 12.7 |

TABLE 1B-continued

|  | Granulating Agent | Residual Carbon Ratio, % | Viscosity, cP (25° C.) | Contact Angle θ, ° (25° C.) | Surface Tension γ, mN/m (25° C.) | γcosθ | Amount of Granulating Agent, g | d10, μm | d50, μm | d50, μm | Tap, g/cm³ | SA, m²/g |
|---|---|---|---|---|---|---|---|---|---|---|---|---|
| Comparative Example B2 | Coal-tar pitch | 40 | — | — | — | — | 12 | 4.8 | 9.7 | 17.2 | 0.71 | 7.4 |
| Comparative Example B3 | PMMA | 0 | — | — | — | — | 12 | 2.9 | 6.8 | 12.6 | 0.73 | 12.1 |
| Comparative Example B4 | — | — | — | — | — | — | 0 | 6.8 | 10.9 | 17.3 | 0.88 | 8.4 |

In Examples B1 to B23, the flake natural graphite adjusted to have a suitable particle size was spheroidized with a granulating agent having prescribed physical properties added, as a result of which the granulation spheroidization was promoted to reduce the amount of flake graphite fine powder generated, leading to increases in d10 and d50. Furthermore, the spheroidization improved particle-filling properties, leading to increases in Tap density.

By contrast, in Comparative Examples B1 and B4, where the flake natural graphite was spheroidized with no granulating agent added, and Comparative Examples B2 and B3, where the spheroidization was carried out with a granulating agent not satisfying the requirements added, the flake natural graphites poorly adhered to each other, and thus the granulation spheroidization was not sufficiently promoted, leading to insufficient increases in d50 and Tap.

Batteries produced using the carbon materials of Example B16 and Comparative Example B4 were evaluated by the following method. The results are shown in Table 2B.

Preparation of Electrode Sheet

An electrode plate having an active material layer with an active material layer density of 1.60±0.03 g/cm³ or 1.35±0.03 g/cm³ was prepared using a carbon material of Examples or Comparative Examples. Specifically, 50.00±0.02 g of a carbon material, 50.00±0.02 g (0.500 g on a solids basis) of a 1% by mass carboxymethylcellulose sodium salt aqueous solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the carbon material adhered in an amount of 12.00±0.3 mg/cm² or 6.00±0.3 mg/cm². The coated foil was roll-pressed using a roller having a diameter of 20 cm to adjust the density of the active material layer to be 1.60±0.03 g/cm³ or 1.35±0.03 g/cm³, thereby preparing an electrode sheet.

Production of Non-Aqueous Secondary Battery (2016 Coin Battery)

The electrode sheet prepared by the above-described method, to which the carbon material adhered in an amount of 12.00±0.3 mg/cm² and in which the density of the active material layer was adjusted to be 1.60±0.03 g/cm³, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the carbon material adhered in an amount of 6.00±0.3 mg/cm² and in which the density of the active material layer was adjusted to be 1.35±0.03 g/cm³, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 200 μL to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. The discharge capacity at this time was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

TABLE 2B

|  | Discharge Capacity, mAh/g | Low-Temperature Output Characteristics, (Comparative Example B4 = 100) |
| --- | --- | --- |
| Example B16 | 367 | 131 |
| Comparative Example B4 | 365 | 100 |

The carbon material produced in Example B16 had a discharge capacity and low-temperature output characteristics sufficiently superior to those of the carbon material produced in Comparative Example B4.

A carbonaceous material having lower crystallinity than the raw carbon material was deposited on the carbon material obtained by the present invention to produce a carbon material, and batteries produced using this carbon material were evaluated. The production of this carbon material (Examples B24 and B25) and Comparative Example B5 will be described below, and the evaluation results of the batteries are shown in Table 3B.

Example B24

A flake natural graphite having a d50 of 100 μm was crushed with a dry swirl-flow crusher to give a flake natural graphite having a d50 of 8.1 μm, a Tap of 0.39 g/cm$^3$, and a water content of 0.08% by mass. To 100 g of the resulting flake natural graphite, 12 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the sample obtained was mechanically spheroidized at a rotor peripheral speed of 85 m/sec for 10 minutes to give granulated carbon material particles.

The granulated carbon material particles and a coal-tar pitch, serving as a carbonaceous material precursor having lower crystallinity than the raw carbon material, were mixed using a mixer at 120° C. for 20 minutes. The resulting mixture was heat treated in an inert gas at 1,300° C. for 1 hour, and then the burned product was disintegrated and classified to give multi-layered graphite particles made of the granulated carbon material particles and the carbonaceous material having lower crystallinity than the raw carbon material combined with each other. The burning yield showed that the mass ratio of the granulated carbon material particles to the carbonaceous material having lower crystallinity than the raw carbon material (granulated carbon material particle/amorphous carbon) of the multi-layered graphite particles was 1:0.065. The d50, SA, Tap, discharge capacity, and low-temperature output characteristics of the sample obtained were measured. The results are shown in Table 3B.

Example B25

Multi-layered graphite particles were obtained in the same manner as in Example B24 except that the mass ratio of the granulated carbon material particles to the carbonaceous material having lower crystallinity than the raw carbon material (granulated carbon material particle/amorphous carbon) of the multi-layered graphite particles was 1:0.08. The results of the measurements made in the same manner as in Example B24 are shown in Table 3B.

Comparative Example B5

A multi-layered carbon material was obtained in the same manner as in Example B24 except that the granulated carbon material particles were replaced with the sample obtained in Comparative Example B4. The results of the measurements made in the same manner as in Example B24 are shown in Table 3B.

TABLE 3B

|  | d50, μm | Tap g/cm$^3$ | SA, m$^2$/g | Discharge Capacity, mAh/g | Low-Temperature Output Characteristics, (Comparative Example B5 = 100) |
| --- | --- | --- | --- | --- | --- |
| Example B24 | 12.0 | 1.05 | 7.9 | 362 | 139 |
| Example B25 | 11.8 | 1.02 | 7.1 | 359 | 147 |
| Comparative Example B5 | 11.4 | 1.04 | 3.1 | 362 | 100 |

In Examples B24 and B25, the low-temperature output characteristics was sufficiently superior to those of Comparative Example B5.

Third examples (Examples C) of the present invention will now be described.

The properties of the carbon materials of Examples C or Comparative Examples C were measured as described below.

Measurement of Volume-Based Median Diameter d50

A sample in an amount of 0.01 g was suspended in 10 mL of ethanol. The suspension was placed in a laser diffraction/scattering particle size distribution analyzer (LA-920 available from HORIBA, Ltd.) and irradiated with ultrasonic waves of 28 kHz at a power of 60 W for 1 minute, and then a volume-based median diameter d50 was measured (ultrasonic intensity, 4; relative refractive index, 1.50). In Examples C3 and C4 and Comparative Examples C3 and C4, 10 mL of a 0.2% by volume aqueous solution of polyoxyethylene sorbitan monolaurate (registered trademark, Tween 20) was used as a dispersion medium in place of ethanol.

Frequency of Particles with Diameter of 5 μm or Less

A sample in an amount of 0.2 g was suspended in 50 mL of ethanol. The suspension was placed in a flow-type particle image analyzer (FPIA-2000 available from Sysmex Industrial Corp.) and irradiated with ultrasonic waves of 28 kHz at a power of 60 W for a predetermined time, and then the number of particles was counted with a detection range set to 0.6 to 400 μm to determine the percentage of the number of particles with a diameter of 5 μm or less in the total. In Examples C3 and C4 and Comparative Examples C3 and C4, 50 mL of a 0.2% by volume aqueous solution of polyoxyethylene sorbitan monolaurate (registered trademark, Tween 20) was used as a dispersion medium in place of ethanol.

Tap Density

The tap density was measured using a powder density meter (Tap Denser available from Hosokawa Micron Corporation) as follows: a sample was dropped through a sieve with openings of 300 µm into a cylindrical tap cell with a diameter of 1.6 cm and a volume capacity of 20 cm³ to fill up the cell; a tap with a stroke length of 10 mm was given 1,000 times; the volume at this time was measured; and the density was calculated from the volume and the mass of the sample.

Roundness

A sample in an amount of 0.2 g was suspended in 50 mL of a 0.2% by mass aqueous solution of polyoxyethylene sorbitan monolaurate (registered trademark, Tween 20). The suspension was placed in a flow-type particle image analyzer (FPIA available from Sysmex Industrial Corp.) and irradiated with ultrasonic waves of 28 kHz at a power of 60 W for 1 minute, and then the roundness of particles with a diameter in the range of 1.5 to 40 µm was measured with a detection range set to 0.6 to 400 µm. The ratio of the perimeter of a circle (equivalent circle) having the same area as the projected particle shape measured, as the numerator, to the perimeter of the projected particle shape measured, as the denominator, was calculated, and the average was calculated to determine the roundness.

BET Specific Surface Area

Using a surface area meter (Gemini 2360 specific surface area analyzer available from Shimadzu Corporation), a sample was preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Lc and $d_{002}$

X-ray standard high-purity silicon powder was added to a sample to prepare a mixture containing 15% by mass of the sample. Using a CuKα radiation monochromatized with a graphite monochromator as a radiation source, a wide-angle X-ray diffractometry curve was obtained by reflection diffractometry. The method of the Japan Society for Promotion of Scientific Research was used to determine an interplanar spacing ($d_{002}$) and a crystallite size (Lc).

Amounts of Eliminated CO and $CO_2$ During Temperature Rise from Room Temperature to 1,000° C. Using Pyrolysis Mass Spectrometer (TPD-MS)

A sample was heat treated under a nitrogen stream at 200° C. for 5 hours. After that, the temperature was raised from room temperature to 1,000° C. at a rate of 10° C./min under a stream of He gas at 50 mL/min. The amounts of CO and $CO_2$ generated during this process were quantitatively measured using a pyrolysis mass spectrometer (TPD-MS) to measure the amount of eliminated CO (µmol/g) and the amount of eliminated $CO_2$ (µmol/g) per gram of the sample.

The production of electrode sheets and non-aqueous batteries (laminate batteries) each including the carbon material of Examples or Comparative Examples was carried out as described below.

Preparation of Electrode Sheet

An electrode plate having an active material layer with an active material layer density of 1.60±0.03 g/cm³ was prepared using a carbon material of Examples or Comparative Examples. Specifically, 50.00±0.02 g of a carbon material, 50.00±0.02 g (0.500 g on a solids basis) of a 1% by mass carboxymethylcellulose sodium salt aqueous solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-µm-thick copper foil, serving as a current collector, to a width of 10 cm using a small die coater available from Itochu Machining Co., Ltd. such that the carbon material adhered in an amount of 12.00±0.3 mg/cm². The coated foil was roll-pressed using a roller having a diameter of 20 cm to adjust the density of the active material layer to be 1.60±0.03 g/cm³, thereby preparing an electrode sheet.

Method of Producing Non-Aqueous Secondary Battery (Laminate Battery)

The electrode sheet was cut to 4 cm×3 cm to prepare a negative electrode, and a positive electrode made of $LiNi_{1/3}Mn_{1/3}CO_{1/3}O_2$ (NMC) was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 250 µL to produce a laminate battery.

The characteristics of the laminate batteries produced were measured as described below.

Initial Low-Temperature Output Characteristics

The initial low-temperature output characteristics of the laminate batteries were measured by the following method.

A laminate battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

For the battery that had been subjected to the initial charge and discharge, charging was further performed at a current of 0.2 C to a charging rate (SOC, State Of Charge) of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics in initial 2 seconds of each battery.

Likewise, a current I that could be passed in 10 seconds was calculated, and the calculated value was defined as the low-temperature output characteristics in initial 10 seconds.

Post-Cycle Low-Temperature Output Characteristics

The post-cycle low-temperature output characteristics of the laminate batteries were measured by the following method.

A laminate battery that had yet to go through a charge and discharge cycle was subjected to a charge and discharge that involves 3 cycles in a voltage range of 4.1 V to 3.0 V at 25° C. and a current of 0.2 C and 300 cycles in a voltage range of 4.2 V to 3.0 V at a current of 0.2 C (in charging, a constant-voltage charge at 4.2 V was further performed for 2.5 hours).

For the battery that had been subjected to the 300-cycle charge and discharge, charging was performed at a current of 0.2 C to a charging rate (SOC) of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics in post-cycle 2 seconds of each battery.

Likewise, a current I that could be passed in 10 seconds was calculated, and the calculated value was defined as the low-temperature output characteristics in post-cycle 10 seconds.

Production of Non-Aqueous Secondary Battery (2016 Coin Battery)

The electrode sheet prepared by the above-described method was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method for Measuring Initial Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as an initial discharge capacity (1st discharge capacity) of this battery.

Example C1

A flake natural graphite having a volume-based median diameter d50 of 100 μm was crushed with a mechanical crusher (Turbo Mill available from Freund Corporation) having a crushing rotor and a liner to give a flake natural graphite having a volume-based median diameter d50 of 30 μm. Using an NHS-1 hybridization system available from Nara Machinery Co., Ltd., 300 g of the flake natural graphite was mechanically spheroidized at a rotor peripheral speed of 88 m/sec for 1 minute while fine powder generated during the spheroidization was deposited on the base material and incorporated into the spheroidized particles. The spheroidized graphite was further spheroidized for 2 minutes while 30 g of a liquid paraffin (Wako Pure Chemical Industries, Ltd., first grade; flash point, 238° C.) was added to the spheroidized graphite to reduce the amount of exposure of the graphite to oxygen. The gas phase during the process was sampled and analyzed by gas chromatography to show that the amount of CO and the amount of $CO_2$ generated from 1 kg of the flake natural graphite were respectively 0.3 mmol and 0.9 mmol.

The carbon material obtained had a D50 (μm), a volume-based median diameter, of 15.0 μm, a $Q_{5min}$ (%), a frequency of particles with a diameter of 5 μm or less (fine powder content) after ultrasonic irradiation for 5 minutes, of 13%, and a $Q_{5min}$ (%)/D50 (μm) of 0.9.

The carbon material had a $Q_{1min}$ (%), a frequency of particles with a diameter of 5 μm or less (fine powder content) after ultrasonic irradiation for 1 minute, of 5%, a $Q_{10min}$ (%), a frequency of particles with a diameter of 5 μm or less (fine powder content) after ultrasonic irradiation for 10 minutes, of 27%, a $Q_{1min}$ (%)/D50 (μm) of 0.3, and a $Q_{10min}$ (%)/D50 (μm) of 1.8.

The carbon material had a roundness of 0.89, a tap density of 0.79 g/cm³, and a BET specific surface area of 12.9 m²/g.

The carbon material was embedded in a resin to prepare a sample for cross-sectional observation, and a cross section was observed under a scanning electron microscope to show that the carbon material was formed of different graphite particles.

The amount of eliminated CO and the amount of $CO_2$ of the carbon material during the temperature rise from room temperature to 1,000° C. using a pyrolysis mass spectrometer (TPD-MS) were respectively 9 μmol/g and 2 μmol/g.

The carbon material had an Lc, as determined by wide-angle X-ray diffractometry, of 100 nm or more and a $d_{002}$ of 0.336 nm.

The physical properties of the carbon material are shown in Tables 1C to 3C. Initial output characteristics and post-cycle output characteristics of laminate batteries produced using the carbon material and initial discharge capacities of coin batteries produced using the carbon material are shown in Table 4C.

Example C2

The same procedure as in Example C1 was repeated except that a flake natural graphite and a liquid paraffin were mixed before spheroidization and then spheroidized for 3 minutes so that the amount of CO and the amount of $CO_2$ generated from 1 kg of the flake natural graphite would be respectively 0.3 mmol and 1.0 mmol.

The carbon material obtained had a $Q_{5min}$ (%)/D50 (μm) of 1.1.

The carbon material was embedded in a resin to prepare a sample for cross-sectional observation, and a cross section was observed under a scanning electron microscope to show that the carbon material was formed of different graphite particles. The physical properties of the carbon material are shown in Tables 1C to 3C. The properties of laminate batteries and coin batteries produced using the carbon material are shown in Table 4C.

Example C3

The same procedure as in Example C1 was repeated except that the spheroidization was carried out using ethylene glycol (Wako Pure Chemical Industries, Ltd., first grade; flash point, 110° C.) in place of the liquid paraffin so that the amount of CO and the amount of $CO_2$ generated from 1 kg of the flake natural graphite would be respectively 2.1 mmol and 4.0 mmol. Furthermore, the carbon material obtained was dried in a nitrogen atmosphere at 250° C.

The carbon material obtained had a $Q_{5min}$ (%)/D50 (μm) of 1.9.

The carbon material was embedded in a resin to prepare a sample for cross-sectional observation, and a cross section was observed under a scanning electron microscope to show that the carbon material was formed of different graphite particles.

The physical properties of the carbon material are shown in Tables 1C to 3C. The properties of laminate batteries and coin batteries produced using the carbon material are shown in Table 4C.

Example C4

The same procedure as in Example C3 was repeated except that a flake graphite and ethylene glycol were mixed before spheroidization and spheroidized for 3 minutes in an apparatus for applying a mechanical action(s) so that the amount of CO and the amount of $CO_2$ generated from 1 kg of the flake natural graphite would be respectively 2.5 mmol and 5.0 mmol.

The carbon material obtained had a $Q_{5min}$ (%)/D50 (μm) of 2.3.

The carbon material was embedded in a resin to prepare a sample for cross-sectional observation, and a cross section was observed under a scanning electron microscope to show that the carbon material was formed of different graphite particles.

The physical properties of the carbon material are shown in Tables 1C to 3C. The properties of laminate batteries and coin batteries produced using the carbon material are shown in Table 4C.

Comparative Example C1

The same procedure as in Example C1 was repeated except that the flake natural graphite having a volume-based median diameter d50 of 30 μm used in Example C1 was spheroidized in an air atmosphere. The gas phase during the process was sampled and analyzed by gas chromatography to show that the amount of CO and the amount of $CO_2$ generated from 1 kg of the flake natural graphite were respectively 7.2 mmol and 11.2 mmol.

The carbon material obtained had a D50 (μm), a volume-based median diameter, of 14.4 μm, a $Q_{5min}$ (%), a frequency of particles with a diameter of 5 μm or less (fine powder content) after 5-minute ultrasonic, of 75%, and a $Q_{5min}$ (%)/D50 (μm) of 5.2.

The carbon material was embedded in a resin to prepare a sample for cross-sectional observation, and a cross section was observed under a scanning electron microscope to show that the carbon material was formed of different graphite particles.

The physical properties of the carbon material are shown in Tables 1C to 3C. The properties of laminate batteries and coin batteries produced using the carbon material are shown in Table 4C.

Comparative Example C2

The carbon material of Comparative Example C1 obtained through the spheroidization was dried in a nitrogen atmosphere in the same manner as in Example C3 to prepare a carbon material of Comparative Example C2.

The carbon material obtained had a $Q_{5min}$ (%)/D50 (μm) of 5.3.

The carbon material was embedded in a resin to prepare a sample for cross-sectional observation, and a cross section was observed under a scanning electron microscope to show that the carbon material was formed of different graphite particles.

The physical properties of the carbon material are shown in Tables 1C to 3C. The properties of laminate batteries and coin batteries produced using the carbon material are shown in Table 4C.

Comparative Example C3

A commercially available spheroidized natural graphite A had a D50 (μm) of 20.3 μm, a $Q_{5min}$ (%) of 76%, and a $Q_{5min}$ (%)/D50 (μm) of 3.7, as measured in the same manner as in Example C3.

The natural graphite A was embedded in a resin to prepare a sample for cross-sectional observation, and a cross section was observed under a scanning electron microscope to show that natural graphite A was formed of different graphite particles.

The physical properties of the natural graphite A are shown in Tables 1C and 3C. The properties of laminate batteries and coin batteries produced using the natural graphite A are shown in Table 4C.

Comparative Example C4

A commercially available spheroidized natural graphite B had a D50 (μm) of 16.0 μm, a $Q_{5min}$ (%) of 69%, and a $Q_{5min}$ (%)/D50 (μm) of 4.3, as measured in the same manner as in Comparative Example C3.

The natural graphite B was embedded in a resin to prepare a sample for cross-sectional observation, and a cross section was observed under a scanning electron microscope to show that natural graphite B was formed of different graphite particles.

The physical properties of the natural graphite B are shown in Tables 1C and 3C. The properties of laminate batteries and coin batteries produced using the natural graphite B are shown in Table 4C.

TABLE 1C

|  | $Q_{5\,min}$ (%)/D50 (μm) | $Q_{1\,min}$ (%)/D50 (μm) | $Q_{10\,min}$ (%)/D50 (μm) | $Q_{5\,min}$ (%) | $Q_{1\,min}$ (%) | $Q_{10\,min}$ (%) |
|---|---|---|---|---|---|---|
| Example C1 | 0.9 | 0.3 | 1.8 | 13 | 5 | 27 |
| Example C2 | 1.1 | 0.5 | 1.8 | 16 | 7 | 26 |
| Example C3 | 1.9 | 0.6 | 2.9 | 28 | 9 | 42 |
| Example C4 | 2.3 | 0.6 | 2.8 | 33 | 9 | 40 |
| Comparative Example C1 | 5.2 | 5.0 | 5.3 | 75 | 72 | 77 |
| Comparative Example C2 | 5.3 | 5.1 | 5.4 | 76 | 73 | 78 |
| Comparative Example C3 | 3.7 | 2.7 | 4.1 | 76 | 55 | 83 |
| Comparative Example C4 | 4.3 | 3.0 | 4.8 | 69 | 48 | 76 |

TABLE 2C

|  | Amount of eliminated CO + $CO_2$ (μmol/g) during temperature rise from room temperature to 1,000° C., as determined by TPD-MS | Amount of eliminated CO (μmol/g) during temperature rise from room temperature to 1,000° C., as determined by TPD-MS | Amount of eliminated $CO_2$ (μmol/g) during temperature rise from room temperature to 1,000° C., as determined by TPD-MS |
|---|---|---|---|
| Example C1 | 11 | 9 | 2 |
| Example C2 | 11* | 10 | 2 |
| Example C3 | 51 | 40 | 11 |
| Example C4 | 62 | 49 | 13 |
| Comparative Example C1 | 163 | 130 | 33 |
| Comparative Example C2 | 155 | 127 | 28 |
| Comparative Example C3 | — | — | — |
| Comparative Example C4 | — | — | — |

*11 (μmol/g) is a value obtained by rounding off 11.3 (μmol/g), the total amount of the amount of eliminated CO 9.7 (μmol/g) and the amount of eliminated $CO_2$ 1.6 (μmol/g), to the nearest integer.

TABLE 3C

|  | Tap Density (g/cm³) | Roundness | BET Specific Surface Area (m²/g) | Volume-Based Median Diameter (μm) | Lc (nm) | $d_{002}$ (nm) |
|---|---|---|---|---|---|---|
| Example C1 | 0.79 | 0.89 | 12.9 | 15.0 | >100 | 0.336 |
| Example C2 | 0.85 | 0.89 | 13.5 | 14.7 | >100 | 0.336 |
| Example C3 | 0.98 | 0.90 | 11.7 | 14.7 | >100 | 0.336 |
| Example C4 | 0.98 | 0.90 | 11.7 | 14.5 | >100 | 0.336 |
| Comparative Example C1 | 0.76 | 0.87 | 11.0 | 14.4 | >100 | 0.336 |
| Comparative Example C2 | 0.73 | 0.88 | 11.0 | 14.4 | >100 | 0.336 |
| Comparative Example C3 | 0.92 | 0.89 | 5.1 | 20.3 | >100 | 0.336 |
| Comparative Example C4 | 1.02 | 0.93 | 7.0 | 16.0 | >100 | 0.336 |

TABLE 4C

|  | Low-Temperature Output in Initial 2 Seconds (W) | Low-Temperature Output in Initial 10 Seconds (W) | Low-Temperature Output in Post-Cycle 2 Seconds (W) | Low-Temperature Output in Post-Cycle 10 Seconds (W) | Initial Discharge Capacity (mAh/g) |
|---|---|---|---|---|---|
| Example C1 | 0.093 | 0.076 | 0.068 | 0.044 | 365 |
| Example C2 | 0.098 | 0.080 | 0.068 | 0.043 | 365 |
| Example C3 | 0.079 | 0.064 | 0.060 | 0.040 | 364 |
| Example C4 | 0.083 | 0.068 | 0.062 | 0.041 | 362 |
| Comparative Example C1 | 0.074 | 0.061 | 0.055 | 0.038 | 365 |
| Comparative Example C2 | 0.077 | 0.063 | 0.055 | 0.038 | 365 |
| Comparative Example C3 | 0.046 | 0.037 | 0.044 | 0.027 | 368 |
| Comparative Example C4 | 0.060 | 0.047 | 0.049 | 0.030 | 368 |

The batteries produced using Examples C1 to C4, the carbon materials of the present invention, have high and excellent initial and post-cycle low-temperature output characteristics. By contrast, the carbon materials used in Comparative Examples C1 to C4 have a $Q_{5min}$ (%) to D50 (μm) ratio outside the prescribed range, where $Q_{5min}$ is a frequency of particles with a diameter of 5 μm or less (fine powder content) after ultrasonic irradiation for 5 minutes, and D50 is a volume-based median diameter, and thus provide low initial and post-cycle low-temperature output characteristics.

Fourth examples (Examples D) of the present invention will now be described.

Preparation of Electrode Sheet

An electrode plate having an active material layer with an active material layer density of 1.50±0.03 g/cm³ was prepared using graphite particles of Examples or Comparative Examples. Specifically, 50.00±0.02 g of a negative electrode material (carbon material), 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.00±0.3 mg/cm² or 12.00±0.3 mg/cm². The coated foil was roll-pressed using a roller having a diameter of 20 cm to adjust the density of the active material layer to be 1.50±0.03 g/cm³, thereby preparing an electrode sheet.

Production of Non-Aqueous Secondary Battery (2016 Coin Battery)

The electrode sheet prepared by the above-described method, to which the negative electrode material adhered in an amount of 12.00±0.3 mg/cm², was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the negative electrode material adhered in an amount of 6.00±0.3 mg/cm², was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 250 μL to produce a laminate battery.

Method for Measuring 1st Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.04 C and further charged at a constant voltage of 5 mV to a current density of 0.005 C. The negative electrode was doped with lithium, and then the lithium counter electrode was discharged to 1.5 V at a current density of 0.08 C. Subsequently, a second charging and discharging was performed at the same current density. The discharge capacity at the second cycle was defined as a 1st discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at –30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Average Particle Diameter d50; d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Tap Density; Tap ($Y_d$)

Using a powder density meter, the carbon material of the present invention was dropped through a sieve with openings of 300 μm into a cylindrical tap cell with a diameter of 1.6 cm and a volume capacity of 20 cm³ to fill up the cell, and then a tap with a stroke length of 10 mm was given 1,000 times. The density calculated from the volume at this time and the mass of the sample was defined as the tap density.

Specific Surface Area Determined by BET Method; SA ($X_d$)

Using a surface area meter (fully automatic surface area analyzer available from Ohkura Riken Co., Ltd.), a carbon material sample was preliminarily dried under a nitrogen stream at 350° C. for 15 minutes, and then using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Example D1

A flake natural graphite having a d50 of 100 μm was crushed with a mechanical crusher having a crushing rotor and a liner to give a flake natural graphite having a d50 of 30 μm and a water content of 0.03% by mass. To 100 g of the resulting flake natural graphite, 6 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 19.4 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.030. Using the measurement methods described above, d50, SA, Tap, 1st discharge capacity, and low-temperature output characteristics were measured. The results are shown in Table 1D.

Example D2

The spheroidized natural graphite obtained in Example D1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.042. The results of the measurements made in the same manner as in Example D1 are shown in Table 1D.

Example D3

The spheroidized natural graphite obtained in Example D1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.050. The results of the measurements made in the same manner as in Example D1 are shown in Table 1D.

Example D4

The spheroidized natural graphite obtained in Example D1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example D1 are shown in Table 1D.

Example D5

The spheroidized natural graphite obtained in Example D1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.100. The results of the measurements made in the same manner as in Example D1 are shown in Table 1D.

Comparative Example D1

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.020. The results of the measurements made in the same manner as in Example D1 are shown in Table 1D.

Comparative Example D2

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.040. The results of the measurements made in the same manner as in Example D1 are shown in Table 1D.

Comparative Example D3

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 15.7 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.015. The results of the measurements made in the same manner as in Example D1 are shown in Table 1D.

Comparative Example D4

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 15.7 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.040. The results of the measurements made in the same manner as in Example D1 are shown in Table 1D.

Comparative Example D5

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.013. The results of the measurements made in the same manner as in Example D1 are shown in Table 1D.

Comparative Example D6

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 19.5 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.075. The results of the measurements made in the same manner as in Example D1 are shown in Table 1D.

TABLE 1D

| | d50 (μm) | SA ($X_d$) ($m^2$/g) | Tap ($Y_d$) (g/$cm^3$) | $10Y_d$ + $0.26X_d$ | 1st Discharge Capacity (mAh/g) | Low-Temperature Output (W) |
|---|---|---|---|---|---|---|
| Example D1 | 17.9 | 7.38 | 1.16 | 13.51 | 366 | 0.094 |
| Example D2 | 18.4 | 5.79 | 1.19 | 13.37 | 363 | 0.099 |
| Example D3 | 19.4 | 5.15 | 1.18 | 13.15 | 363 | 0.099 |
| Example D4 | 20.0 | 4.30 | 1.20 | 13.08 | 362 | 0.102 |
| Example D5 | 22.4 | 2.88 | 1.19 | 12.64 | 358 | 0.090 |
| Comparative Example D1 | 10.4 | 3.92 | 1.08 | 11.82 | 364 | 0.087 |
| Comparative Example D2 | 10.5 | 2.97 | 1.11 | 11.87 | 360 | 0.080 |
| Comparative Example D3 | 15.8 | 3.53 | 1.11 | 12.06 | 362 | 0.085 |
| Comparative Example D4 | 15.4 | 2.51 | 1.15 | 12.13 | 361 | 0.069 |
| Comparative Example D5 | 10.7 | 4.48 | 1.07 | 11.88 | 364 | 0.086 |
| Comparative Example D6 | 19.3 | 1.82 | 1.21 | 12.56 | 361 | 0.059 |

In Examples D1 to D5, the flake natural graphite adjusted to have a prescribed particle size was spheroidized while fine powder generated during the spheroidization was deposited on the base material and/or incorporated into the spheroidized particles, whereby the above inequality (1D) was successfully satisfied to provide a high capacity and excellent low-temperature output characteristics.

Fifth examples (Examples E) of the present invention will now be described.
Preparation of Electrode Sheet
An electrode plate having an active material layer with an active material layer density of 1.50±0.03 g/$cm^3$ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.00±0.3 mg/$cm^2$ or 12.00±0.3 mg/$cm^2$. The coated foil was roll-pressed using a roller having a diameter of 20 cm to adjust the density of the active material layer to be 1.50±0.03 g/$cm^2$, thereby preparing an electrode sheet.
Production of Non-Aqueous Secondary Battery (2016 Coin Battery)

The electrode sheet prepared by the above-described method, to which the negative electrode material adhered in an amount of 12.00±0.3 mg/$cm^2$, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.
Method of Producing Non-Aqueous Secondary Battery (Laminate Battery)

The electrode sheet prepared by the above-described method, to which the negative electrode material adhered in an amount of 6.00±0.3 mg/$cm^2$, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 250 μl to produce a laminate battery.
Method for Measuring Initial Discharge Capacity Using the non-aqueous secondary battery (2016 coin battery) produced by the above-described method, the capacity of the battery during charging and discharging was measured by the following method.

The lithium counter electrode was charged to 5 mV at a current density of 0.04 C and further charged at a constant voltage of 5 mV to a current density of 0.005 C. The negative electrode was doped with lithium, and then the lithium counter electrode was discharged to 1.5 V at a current density of 0.08 C. Subsequently, a second charging and discharging was performed at the same current density. The discharge capacity at the second cycle was defined as an initial discharge capacity (1st discharge capacity) of this battery.
Low-Temperature Output Characteristics Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Average Particle Diameter d50; d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Average Particle Diameter d90; d90 d90 is a particle diameter corresponding to a cumulative total of 90% from the smallest particle, as measured on a volume basis.

Average Particle Diameter d10; d10 d10 is a particle diameter corresponding to a cumulative total of 10% from the smallest particle, as measured on a volume basis.

Tap Density

Using a powder density meter, the carbon material of the present invention was dropped through a sieve with openings of 300 μm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Specific Surface Area Determined by BET Method; SA ($X_e$)

Using a surface area meter (TriStar II3020 available from Micromeritics Corp.), a carbon material sample was preliminarily dried under a nitrogen stream at 350° C. for 60 minutes, and then using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

True Density: $Y_e$

The true density of a carbon material sample was measured by pycnometry using a true density meter (MAT-7000 Auto True Denser available from Seishin Enterprise Co., Ltd).

Example E1

A flake natural graphite having a d50 of 100 μm was crushed with a mechanical crusher having a crushing rotor and a liner to give a flake natural graphite having a d50 of 30 μm and a water content of 0.03% by mass. To 100 g of the resulting flake natural graphite, 6 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 19.4 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.03. Using the measurement methods described above, d50, d90, d10, SA, Tap, true density, initial discharge capacity, and low-temperature output characteristics were measured. The results are shown in Table 1E.

Example E2

The spheroidized natural graphite obtained in Example E1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.042. The results of the measurements made in the same manner as in Example E1 are shown in Table 1E.

Example E3

The spheroidized natural graphite obtained in Example E1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.05. The results of the measurements made in the same manner as in Example E1 are shown in Table 1E.

Example E4

The spheroidized natural graphite obtained in Example E1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example E1 are shown in Table 1E.

Example E5

The spheroidized natural graphite obtained in Example E1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.10. The results of the measurements made in the same manner as in Example E1 are shown in Table 1E.

Example E6

A flake natural graphite having a d50 of 100 μm was crushed with a mechanical crusher having a crushing rotor and a liner to give a flake natural graphite having a d50 of 6 μm and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 9.2 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example E1 are shown in Table 1E.

Example E7

A flake natural graphite having a d50 of 100 μm was crushed with a mechanical crusher having a crushing rotor and a liner to give a flake natural graphite having a d50 of 6 μm and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 9.2 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.1. The results of the measurements made in the same manner as in Example E1 are shown in Table 1E.

Comparative Example E1

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.02. The results of the measurements made in the same manner as in Example E1 are shown in Table 1E.

Comparative Example E2

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example E1 are shown in Table 1E.

Comparative Example E3

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 15.7 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.015. The results of the measurements made in the same manner as in Example E1 are shown in Table 1E.

Comparative Example E4

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 15.7 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example E1 are shown in Table 1E.

Comparative Example E5

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.013. The results of the measurements made in the same manner as in Example E1 are shown in Table 1E.

Comparative Example E6

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 19.5 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.075. The results of the measurements made in the same manner as in Example E1 are shown in Table 1E.

TABLE 1E

| | $X_e$: SA ($m^2/g$) | $Y_e$: True Density ($g/cm^3$) | $Y_e - 0.01X_e$ | d50 (μm) | d90/d10 | Tap ($g/cm^3$) | Initial Discharge Capacity (mAH/g) | Low-Temperature Output Characteristics (W) |
|---|---|---|---|---|---|---|---|---|
| Example E1 | 7.38 | 2.25 | 2.17 | 17.9 | 3.2 | 1.16 | 366 | 0.094 |
| Example E2 | 5.79 | 2.24 | 2.18 | 18.4 | 3.1 | 1.19 | 363 | 0.098 |
| Example E3 | 5.15 | 2.24 | 2.19 | 19.4 | 3.0 | 1.18 | 363 | 0.099 |
| Example E4 | 4.30 | 2.23 | 2.19 | 20.0 | 2.8 | 1.20 | 362 | 0.102 |
| Example E5 | 2.88 | 2.22 | 2.19 | 22.4 | 3.1 | 1.19 | 358 | 0.090 |
| Example E6 | 8.69 | 2.23 | 2.14 | 8.9 | 2.8 | 0.94 | 361 | 0.107 |
| Example E7 | 6.21 | 2.22 | 2.15 | 10.2 | 3.1 | 0.80 | 356 | 0.106 |
| Comparative Example E1 | 3.92 | 2.25 | 2.21 | 10.4 | 2.3 | 1.08 | 364 | 0.087 |

TABLE 1E-continued

| | $X_e$: SA ($m^2/g$) | $Y_e$: True Density ($g/cm^3$) | $Y_e - 0.01X_e$ | d50 (μm) | d90/d10 | Tap ($g/cm^3$) | Initial Discharge Capacity (mAH/g) | Low-Temperature Output Characteristics (W) |
|---|---|---|---|---|---|---|---|---|
| Comparative Example E2 | 2.97 | 2.24 | 2.21 | 10.6 | 2.1 | 1.11 | 360 | 0.080 |
| Comparative Example E3 | 3.53 | 2.25 | 2.22 | 15.8 | 2.4 | 1.11 | 362 | 0.085 |
| Comparative Example E4 | 2.51 | 2.24 | 2.21 | 15.4 | 2.2 | 1.15 | 361 | 0.069 |
| Comparative Example E5 | 4.48 | 2.25 | 2.21 | 10.5 | 2.2 | 1.07 | 364 | 0.086 |
| Comparative Example E6 | 1.82 | 2.23 | 2.21 | 19.3 | 2.5 | 1.21 | 361 | 0.059 |

In Examples E1 to E7, the flake natural graphite adjusted to have a prescribed particle size was spheroidized while fine powder generated during the spheroidization was deposited on the base material and/or incorporated into the spheroidized particles, whereby the above inequality (1E) was successfully satisfied to provide a high capacity and excellent low-temperature output characteristics.

Sixth examples (Examples F) of the present invention will now be described.

In Examples F, physical properties and characteristics of carbon materials produced were measured by the following methods.

Preparation of Electrode Sheet

An electrode plate having an active material layer with an active material layer density of 1.35±0.03 g/cm³ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.00±0.3 mg/cm². The coated foil was roll-pressed using a roller having a diameter of 20 cm to adjust the density of the active material layer to be 1.35±0.03 g/cm³, thereby preparing an electrode sheet.

Production of Non-Aqueous Secondary Battery (2016 Coin Battery)

The electrode sheet prepared by the above-described method, to which the negative electrode material adhered in an amount of 12.00±0.3 mg/cm², was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method for Measuring Initial Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.04 C and further charged at a constant voltage of 5 mV to a current density of 0.005 C. The negative electrode was doped with lithium, and then the lithium counter electrode was discharged to 1.5 V at a current density of 0.08 C. Subsequently, a second charging and discharging was performed at the same current density. The discharge capacity at the second cycle was defined as an initial discharge capacity (1st discharge capacity) of this battery.

Method of Producing Non-Aqueous Secondary Battery (Laminate Battery)

The electrode sheet prepared by the above-described method was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 200 μL to produce a laminate battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Average Value, Standard Deviation ($\sigma_R$), and Raman $R_{15}$ Value of Microscopic Raman R Values Using a Raman spectroscope (Nicolet Almega XR available from Thermo Fisher Scientific K.K.), Raman microspectroscopy was performed under the following conditions to determine the average value and the standard deviation ($\sigma_R$) of microscopic Raman R values.

Target particles were gravity-dropped onto a sample stage, and Raman microspectroscopy was performed with the surface of the target flat.

Excitation wavelength: 532 nm
Laser power on sample: 1 mW or less
Resolution: 10 cm$^{-1}$
Irradiation area: 1 μm □
Measurement range: 400 cm to 4,000 cm
Measurement of peak intensity: straight baseline subtraction in the range of about 1,100 cm$^{-1}$ to 1,750 cm$^{-1}$ Method for calculating Raman R value: In a spectrum after straight baseline subtraction, a peak intensity $I_A$ at the peak top of a peak $P_A$ near 1,580 cm$^{-1}$ and a peak intensity $I_B$ at the peak top of a peak $P_B$ near 1,360 cm$^{-1}$ were read to calculate an R value ($I_B/I_A$), and the average value and the standard deviation ($\sigma_R$) were calculated.

Method of calculating Raman $R_{(15)}$ value (%): the number of composite carbon materials having a microscopic Raman R value of 0.15 or less among 30 randomly selected composite carbon materials/30×100 d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Mode Pore Diameter (PD) in Pore Diameter Range of 0.01 μm to 1 μm, Half Width at Half Maximum of Pore Distribution (Log (Nm)), Cumulative Pore Volume at Pore Diameters in Range of 0.01 μm to 1 μm, and Total Pore Volume The measurement by mercury intrusion was carried out using a mercury porosimeter (Autopore 9520 available from Micromeritics Corp). Around 0.2 g of a sample (negative electrode material) was weighed into a powder cell, and the cell was sealed. The cell was subjected to a degassing pretreatment at room temperature under vacuum (50 μmHg or lower) for 10 minutes, and then the pressure in the cell was reduced stepwise to 4 psia. Mercury was introduced into the cell, and the pressure was increased stepwise from 4 psia to 40,000 psia and then reduced to 25 psia. From the mercury intrusion curve obtained, a pore distribution was calculated using the Washburn equation. The calculation was made assuming that the surface tension of mercury was 485 dyne/cm, and the contact angle was 140°.

From the pore distribution obtained, a mode pore diameter (PD) in a pore diameter range of 0.01 μm to 1 μm, a cumulative pore volume at pore diameters in a range of 0.01 μm to 1 μm, and a total pore volume were calculated. The half width at half maximum of pore distribution (log (nm)) is defined as a half width at half maximum at a micropore side of a peak in a pore diameter range of 0.01 μm to 1 μm in the pore distribution (nm) with the horizontal axis expressed in common logarithm (log (nm)).

BET Specific Surface Area (SA)

Using a surface area meter (Gemini 2360 specific surface area analyzer available from Shimadzu Corporation), a carbon material sample was preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Tap Density (Tap)

Using a powder density meter, the carbon material of the present invention was dropped through a sieve with openings of 300 μm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Example F1

A flake natural graphite having a d50 of 100 μm was crushed with a dry air-flow crusher to give a flake natural graphite having a d50 of 6 μm and a Tap of 0.13 g/cm$^3$. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while the flake natural graphites were made to adhere to each other and fine powder generated during the spheroidization was deposited on the base material and incorporated into the spheroidized particles, thereby providing a spheroidized graphite having a d50 of 9.2 μm, a Tap density of 0.71 g/cm$^3$, a PD of 0.09 μm, a PD/d50 of 0.99, and a cumulative pore volume at pore diameters in a range of 0.01 μm to 1 μm of 0.16 mL/g. The spheroidized graphite powder obtained and a coal-tar pitch having a residual carbon ratio of 40% and a density of 1.2 g/cm$^3$, serving as an amorphous carbon precursor, were mixed while being heated to a temperature equal to or higher than the softening point of the coal-tar pitch, and heat treated in an inert gas at 1,300° C., after which the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.07. Using the measurement methods described above, d50, SA, Tap density, average value of microscopic Raman R values, $\sigma_R$, Raman $R_{15}$ value, discharge capacity, and low-temperature output characteristics were measured. The results are shown in Tables 1F and 2F.

Example F2

A flake natural graphite having a d50 of 100 μm was crushed with a dry swirl-flow crusher to give a flake natural graphite having a d50 of 9 µm and a Tap of 0.42 g/cm³. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while the flake natural graphites were made to adhere to each other and fine powder generated during the spheroidization was deposited on the base material and incorporated into the spheroidized particles, thereby providing a spheroidized graphite having a d50 of 12.7 µm, a Tap density of 0.87 g/cm³, a PD of 0.09 µm, a PD/d50 of 0.71, and a cumulative pore volume at pore diameters in a range of 0.01 µm to 1 µm of 0.16 mL/g. The spheroidized graphite powder obtained and a coal-tar pitch having a residual carbon ratio of 40% and a density of 1.2 g/cm³, serving as an amorphous carbon precursor, were mixed while being heated to a temperature equal to or higher than the softening point of the coal-tar pitch, and heat treated in an inert gas at 1,300° C., after which the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.08. The results of the measurements made in the same manner as in Example F1 are shown in Table 1F.

Example F3

A multi-layered carbon material was obtained in the same manner as in Example 2 except that a coal tar having a residual carbon ratio of 28% and a density of 1.2 g/cm³ was used as an amorphous carbon precursor. The burning yield showed that the mass ratio of spheroidized graphite particle to amorphous carbon (spheroidized graphite particle/amorphous carbon) of the multi-layered carbon material was 1:0.08. The results of the measurements made in the same manner as in Example F1 are shown in Table 1F.

Comparative Example F1

Using a Model NHS-1 hybridization system available from Nara Machinery Co., Ltd., a flake natural graphite having a d50 of 100 µm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.8 µm, a Tap density of 0.88 g/cm³, a PD of 0.36 µm, a PD/d50 of 3.27, and a cumulative pore volume at pore diameters in a range of 0.01 µm to 1 µm of 0.14 mL/g.

The spheroidized graphite powder obtained and a coal tar having a residual carbon ratio of 28% and a density of 1.2 g/cm³, serving as an amorphous carbon precursor, were mixed while being heated to a temperature equal to or higher than the softening point of the coal-tar pitch, and heat treated in an inert gas at 1,300° C., after which the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.07. The results of the measurements made in the same manner as in Example F1 are shown in Table 1F.

Comparative Example F2

A multi-layered carbon material was obtained in the same manner as in Comparative Example 1 except that a coal-tar pitch having a residual carbon ratio of 40% and a density of 1.2 g/cm³ was used as an amorphous carbon precursor. The burning yield showed that the mass ratio of spheroidized graphite particle to amorphous carbon (spheroidized graphite particle/amorphous carbon) of the multi-layered carbon material was 1:0.07. The results of the measurements made in the same manner as in Example F1 are shown in Table 1F.

Example F4

A flake natural graphite having a d50 of 100 µm was crushed with a mechanical crusher having a crushing rotor and a liner to give a flake natural graphite having a d50 of 30 µm. To 100 g of the resulting flake natural graphite, 4 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 16.3 µm, a Tap density of 1.03 g/cm³, a PD of 0.22 µm, a PD/d50 of 1.33, and a cumulative pore volume at pore diameters in a range of 0.01 µm to 1 µm of 0.10 mL/g. The spheroidized graphite powder and a coal-tar pitch having a residual carbon ratio of 40% and a density of 1.2 g/cm³, serving as an amorphous carbon precursor, were mixed while being heated to a temperature equal to or higher than the softening point of the coal-tar pitch, and heat treated in an inert gas at 1,300° C., after which the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example F1 are shown in Table 1F.

Example F5

A multi-layered carbon material was obtained in the same manner as in Example 5 except that a coal tar having a residual carbon ratio of 28% and a density of 1.2 g/cm³ was used as an amorphous carbon precursor. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example F1 are shown in Table 1F.

Comparative Example F3

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 15.7 μm, a Tap density of 1.02 g/cm³, a PD of 0.36 μm, a PD/d50 of 2.31, and a cumulative pore volume at pore diameters in a range of 0.01 μm to 1 μm of 0.13 mL/g. The spheroidized graphite powder obtained and a petroleum-derived heavy oil having a residual carbon ratio of 18% and a density of 1.1 g/cm³, serving as an amorphous carbon precursor, were mixed while being heated to a temperature equal to or higher than the softening point of the coal-tar pitch, and heat treated in an inert gas at 1,300° C., after which the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example F1 are shown in Table 1F.

F3, the percentage of R values of 0.15 or less was in the preferred range, thus leading to particularly excellent low-temperature output characteristics. By contrast, in Comparative Examples F1 to F3, where the $\sigma_R$ was outside the prescribed range, degraded low-temperature output characteristics were provided.

Seventh examples (Examples G) of the present invention will now be described.

In Examples G, physical properties of negative electrode materials produced were measured by the following methods.

Preparation of Electrode Sheet

An electrode plate having an active material layer with an active material layer density of 1.50±0.03 g/cm³ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.00±0.3 mg/cm². The coated foil was roll-pressed using a roller having a diameter of 20 cm to adjust the density of the active material layer to be 1.35±0.03 g/cm³, thereby preparing an electrode sheet.

Production of Non-Aqueous Secondary Battery (2016 Coin Battery)

The electrode sheet prepared by the above-described method, to which the negative electrode material adhered in

TABLE 1F

| | d50 (μm) | SA (m²/g) | Tap (g/cm³) | Average Raman R value | $\sigma_R$ | Raman $R_{15}$ value (%) | Low-Temperature Output Characteristics (Comparative Example F1 = 100) | Intitial Discharge Capacity (mAh/g) |
|---|---|---|---|---|---|---|---|---|
| Example F1 | 9.4 | 8.7 | 0.94 | 0.28 | 0.077 | 3.3 | 139 | 362 |
| Example F2 | 11.8 | 7.1 | 1.02 | 0.24 | 0.056 | 3.3 | 147 | 359 |
| Example F3 | 12.2 | 7.6 | 0.78 | 0.28 | 0.088 | 10.0 | 126 | 359 |
| Comparative Example F1 | 11.4 | 3.1 | 1.04 | 0.33 | 0.150 | 6.7 | 100 | 362 |
| Comparative Example F2 | 11.3 | 3.1 | 1.02 | 0.27 | 0.126 | 13.3 | 107 | 362 |
| Example F4 | 15.8 | 4.8 | 1.22 | 0.22 | 0.058 | 13.3 | 121 | 363 |
| Example F5 | 15.6 | 5.2 | 1.16 | 0.23 | 0.084 | 20.0 | 122 | 363 |
| Comparative Example F3 | 16.8 | 3.3 | 1.16 | 0.28 | 0.107 | 20.0 | 107 | 363 |

In Examples F1 to F5, a carbon material having specific intra-particle pores was mixed with an appropriate amount of a specific carbonaceous material precursor, whereby the standard deviation ($\sigma_R$) of microscopic Raman R values was controlled within the prescribed range to provide excellent low-temperature output characteristics. In Examples F1 to an amount of 12.00±0.3 mg/cm², was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method for Measuring Initial Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.04 C and further charged at a constant voltage of 5 mV to a current density of 0.005 C. The negative electrode was doped with lithium, and then the lithium counter electrode was discharged to 1.5 V at a current density of 0.08 C. Subsequently, a second charging and discharging was performed at the same current density. The discharge capacity at the second cycle was defined as an initial discharge capacity (1st discharge capacity) of this battery.

Method of Producing Non-Aqueous Secondary Battery (Laminate Battery)

The electrode sheet prepared by the above-described method, to which the negative electrode material adhered in an amount of 6.00±0.3 mg/cm$^2$, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 250 µl to produce a laminate battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Average Particle Diameter d50; d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Tap Density; Tap

Using a powder density meter, the carbon material of the present invention was dropped through a sieve with openings of 300 µm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Specific Surface Area Determined by BET Method; SA

Using a surface area meter (fully automatic surface area analyzer available from Ohkura Riken Co., Ltd.), a carbon material sample was preliminarily dried under a nitrogen stream at 350° C. for 15 minutes, and then using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Pore Volume

Using an Autoforb (Quantachrome Co.), a sample was placed in a powder cell, and the cell was sealed and pre-treated at 350° C. under vacuum (1.3 Pa or lower) for 2 hours, after which an adsorption isotherm (adsorption gas: nitrogen) was measured at liquid nitrogen temperature. Using the adsorption isotherm obtained, a BJH analysis was performed to determine a micropore distribution, from which the cumulative pore volume at pore diameters in a range of 2 to 4 nm, the cumulative pore volume at pore diameters in a range of 2 to 100 nm, and the maximum dV/dlog (D) (V: cumulative pore volume, D: pore diameter) at pore diameters in a range of 2 to 4 nm were calculated. The dV/dlog (D) was measured such that the interval of log (D) was 0.010 to 0.050.

Example G1

A flake natural graphite having a d50 of 100 µm was crushed with a mechanical crusher having a crushing rotor and a liner to give a flake natural graphite having a d50 of 8.5 µm. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered.

Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized natural graphite having a d50 of 12.9 µm. Using the measurement methods described above, d50, SA, Tap, pore volume, low-temperature output characteristics, and initial discharge capacity were measured. The results are shown in Table 1G.

Example G2

A flake natural graphite having a d50 of 100 µm was crushed with a mechanical crusher having a crushing rotor and a liner to give a flake natural graphite having a d50 of 30 μm. To 100 g of the resulting flake natural graphite, 4 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized natural graphite having a d50 of 16.3 μm. The results of the measurements made in the same manner as in Example G1 are shown in Table 1G.

Example G3

A flake natural graphite having a d50 of 100 μm was crushed with a mechanical crusher having a crushing rotor and a liner to give a flake natural graphite having a d50 of 30 μm. To 100 g of the resulting flake natural graphite, 6 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized natural graphite having a d50 of 19.4 μm. The results of the measurements made in the same manner as in Example G1 are shown in Table 1G.

Comparative Example G1

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 10.9 μm. The results of the measurements made in the same manner as in Example G1 are shown in Table 1G.

Comparative Example G2

Using a Model NHS-1 hybridization system available from Nara Machinery Co., Ltd., a flake natural graphite having a d50 of 100 μm was mechanically spheroidized at a rotor peripheral speed of 85 m/sec for 5 minutes. In the sample obtained was confirmed the presence of a large amount of flake graphite and flake graphite fine powder generated during the spheroidization that were not deposited on the base material or incorporated. This sample was heat treated in an inert gas at 720° C. and classified to remove the flake graphite fine powder, thereby providing a spheroidized graphite having a d50 of 15.7 μm. The results of the measurements made in the same manner as in Example G1 are shown in Table 1G.

Comparative Example G3

A flake natural graphite having a d50 of 100 μm was crushed with a mechanical crusher having a crushing rotor and a liner to give a flake natural graphite having a d50 of 9.8 μm. The results of the measurements made in the same manner as in Example G1 are shown in Table 1G.

TABLE 1G

| | d50 (μm) | Tap (g/cm³) | SA (m²/g) | Pore Volume at Pore Diameters of 2 to 4 nm (cm³/g) | Pore Volume at Pore Diameters of 2 to 100 nm (cm³/g) | Maximum dV/dlog (D) at Pore Diameters of 2 to 4 nm (cm³/g) | Low-Temperature Output Characteristics, (Comparative Example G1 = 100) | Initial Discharge Capacity (mAh/g) |
|---|---|---|---|---|---|---|---|---|
| Example G1 | 12.9 | 0.88 | 15.3 | 0.0037 | 0.0560 | 0.0143 | 130 | 361 |
| Example G2 | 16.3 | 1.03 | 13.8 | 0.0038 | 0.0405 | 0.0163 | 111 | 362 |
| Example G3 | 19.4 | 1.06 | 13.4 | 0.0035 | 0.0487 | 0.0154 | 107 | 362 |
| Comparative Example G1 | 10.9 | 0.88 | 8.4 | 0.0020 | 0.0234 | 0.0087 | 100 | 369 |
| Comparative Example G2 | 15.7 | 1.02 | 6.9 | 0.0018 | 0.0156 | 0.0079 | 89 | 368 |
| Comparative Example G3 | 9.8 | 0.69 | 7.1 | 0.0023 | 0.0223 | 0.0103 | 100 | 369 |

The carbon materials of Examples G1 to G3 provided excellent low-temperature output characteristics. This is probably because of abundant lithium-ion insertion/extraction sites due to a large cumulative pore volume at pore diameters in a range of 2 to 4 nm, and the smooth movement of electrolyte solution between particles due to a high tap density.

Eighth examples (Examples H) of the present invention will now be described.

In Examples H, physical properties of negative electrode materials produced were measured by the following methods.

Preparation of Electrode Sheet

An electrode plate having an active material layer with an active material layer density of 1.60±0.03 g/cm³ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.0±0.3 mg/cm² or 9.0±0.3 mg/cm². The coated foil was roll-pressed using a roller having a diameter of 20 cm to adjust the density of the active material layer to be 1.35±0.03 g/cm³ or 1.60±0.03 g/cm³, thereby preparing an electrode sheet.

Production of Non-Aqueous Secondary Battery (2016 Coin Battery)

The electrode sheet prepared by the above-described method, to which the negative electrode material adhered in an amount of 9.0±0.3 mg/cm² and in which the density of the active material layer was 1.60±0.03 g/cm³, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the negative electrode material adhered in an amount of 6.0±0.3 mg/cm² and in which the density of the active material layer was 1.35±0.03 g/cm³, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 200 μL to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Measurement of Thermal Weight Loss (□TG) (%)

Into a platinum pan, 5 mg of a carbon material was weighed, and the pan was placed in a differential thermal balance (TG8120 available from Rigaku Corporation). Under an air stream of 100 mL/min, the temperature was raised from room temperature to 400° C. at a rate of 20° C./min and then from 400° C. to 600° C. at a rate of 2° C./min, and the amount of thermal weight loss was measured. The thermal weight loss between 400° C. and 600° C. in this measurement was calculated and defined as a thermal weight loss (□TG) (%) in the present invention.

BET Specific Surface Area (SA)

Using a surface area meter (AMS8000 specific surface area analyzer available from Ohkura Riken Co., Ltd.), 0.4 g of a carbon material was loaded into a cell, and the carbon material sample was preliminarily dried under a nitrogen stream at 350° C. for 15 minutes, after which using a nitrogen-helium mixed gas precisely regulated so as to have a nitrogen pressure of 0.3 relative to atmospheric pressure, a BET specific surface area was measured by a nitrogen adsorption BET method according to a flowing gas method.

Raman R Value

The measurement was made as follows: using a Raman spectroscope (Raman spectroscope available from JASCO Corporation), a sample was loaded by gravity-dropping a carbon material into a measuring cell, and the measuring cell was irradiated with an argon-ion laser beam while being rotated in a plane perpendicular to the laser beam.

Wavelength of argon-ion laser beam: 514.5 nm
    Laser power on sample: 25 mW
    Resolution: 4 cm$^{-1}$
    Measurement range: 1,100 cm$^{-1}$ to 1,730 cm$^{-1}$.
    Measurement of peak intensity, measurement of peak half-width: background processing, smoothing processing (convolution by simple average, 5 points)

d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Roundness

Using a flow-type particle image analyzer (FPIA-2000 available from Sysmex Corporation), a particle size distribution based on equivalent circle diameter was measured, and a roundness was determined. Ion-exchanged water was used as a dispersion medium, and polyoxyethylene (20) monolaurate was used as a surfactant. The equivalent circle diameter is a diameter of a circle (equivalent circle) having the same projected area as that of a captured particle image, and the roundness is a ratio of the perimeter of the equivalent circle, as the numerator, to the perimeter of the captured particle projection image, as the denominator. Roundnesses of particles having an equivalent diameter in the range of 1.5 to 40 µm were averaged to determine the roundness.

Tap Density

Using a powder density meter, the carbon material of the present invention was dropped through a sieve with openings of 300 µm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Example H1

A flake natural graphite having a d50 of 100 µm was crushed with a dry swirl-flow crusher to give a flake natural graphite having a d50 of 8.1 µm and a Tap of 0.39 g/cm$^3$. To 100 g of the resulting flake natural graphite, 12 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent adhered. Using a Model NHS-1 hybridization system available from Nara Machinery Co., Ltd., the sample obtained was mechanically spheroidized at a rotor peripheral speed of 85 m/sec for 10 minutes. The sample obtained was heat treated in a nitrogen atmosphere at 500° C. to give a spheroidized graphite sample from which the granulating agent was removed. Using the measurement methods described above, d50, SA, Tap, roundness, ☐TG (%)/SA (m$^2$/g), Raman R value, discharge capacity, and low-temperature output characteristics were measured. The results are shown in Tables 1H and 2H.

Example H2

A sample was prepared in the same manner as in Example H1 except that the heat-treatment temperature was 700° C. The results of the measurements made in the same manner as in Example H1 are shown in Tables 1H and 2H.

Example H3

A sample was prepared in the same manner as in Example H1 except that the heat-treatment temperature was 850° C. The results of the measurements made in the same manner as in Example H1 are shown in Tables 1H and 2H.

Example H4

A sample was prepared in the same manner as in Example H1 except that the heat-treatment temperature was 1,000° C. The results of the measurements made in the same manner as in Example H1 are shown in Tables 1H and 2H.

Comparative Example H1

Using a Model NHS-1 hybridization system available from Nara Machinery Co., Ltd., a flake natural graphite having a d50 of 100 µm was mechanically spheroidized at a rotor peripheral speed of 85 m/sec for 10 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 10.8 µm. The results of the measurements made in the same manner as in Example H1 are shown in Tables 1H and 2H.

Comparative Example H2

A sample was prepared in the same manner as in Example H1 except that the spheroidized graphite of Comparative Example H1 was heat treated in a nitrogen atmosphere at 700° C. The results of the measurements made in the same manner as in Example H1 are shown in Tables 1H and 2H.

Comparative Example H3

A sample was prepared in the same manner as in Comparative Example H2 except that the heat-treatment temperature was 850° C. The results of the measurements made in the same manner as in Example H1 are shown in Tables 1H and 2H.

Comparative Example H4

A sample was prepared in the same manner as in Comparative Example H2 except that the heat-treatment temperature was 1,000° C. The results of the measurements made in the same manner as in Example H1 are shown in Tables 1H and 2H.

Comparative Example H5

A sample was prepared in the same manner as in Comparative Example H2 except that the heat-treatment temperature was 1,300° C. The results of the measurements made in the same manner as in Example H1 are shown in Tables 1H and 2H.

Comparative Example H6

The spheroidized graphite of Comparative Example H1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.07. The results of the measurements made in the same manner as in Example H1 are shown in Tables 1H and 2H.

Comparative Example H7

A sample was prepared in the same manner as in Example H1 except that the heat-treatment temperature was 1,300° C.

The results of the measurements made in the same manner as in Example H1 are shown in Tables 1H and 2H.

Example H5

A flake natural graphite having a d50 of 100 μm was crushed with a mechanical crusher having a crushing rotor and a liner to give a flake natural graphite having a d50 of 30 μm. To 100 g of the resulting flake natural graphite, 4 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent adhered. Using a Model NHS-1 hybridization system available from Nara Machinery Co., Ltd., the sample obtained was mechanically spheroidized at a rotor peripheral speed of 85 m/sec for 10 minutes. The sample obtained was heat treated in a nitrogen atmosphere at 700° C. to give a spheroidized graphite sample from which the granulating agent was removed. The results of the measurements made in the same manner as in Example H1 are shown in Tables 1H and 2H.

Comparative Example H8

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 15.4 μm. The results of the measurements made in the same manner as in Example H1 are shown in Tables 1H and 2H.

Example H6

A sample was prepared in the same manner as in Example H4 except that 6 g of a granulating agent of a liquid paraffin (Wako Pure Chemical Industries, Ltd., first grade) was added. The results of the measurements made in the same manner as in Example H1 are shown in Tables 1H and 2H.

Comparative Example H9

Using a Model NHS-1 hybridization system available from Nara Machinery Co., Ltd., a flake natural graphite having a d50 of 100 μm was mechanically spheroidized at a rotor peripheral speed of 70 m/sec for 5 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 18.2 μm. The results of the measurements made in the same manner as in Example H1 are shown in Tables 1H and 2H.

TABLE 1H

| | d50 (X) μm | SA, $m^2/g$ | Tap, $g/cm^3$ | Roundness | ΔTG (%)/SA $(m^2/g)$ | Raman R value |
|---|---|---|---|---|---|---|
| Example H1 | 12.2 | 15.9 | 0.84 | 0.94 | 0.29 | 0.38 |
| Example H2 | 12.9 | 15.3 | 0.88 | 0.94 | 0.20 | 0.38 |
| Example H3 | 12.4 | 16.0 | 0.93 | 0.94 | 0.14 | 0.38 |
| Example H4 | 12.3 | 15.9 | 0.94 | 0.94 | 0.12 | 0.37 |
| Comparative Example H1 | 10.8 | 7.2 | 0.87 | 0.92 | 0.35 | 0.24 |
| Comparative Example H2 | 10.9 | 7.3 | 0.92 | 0.92 | 0.51 | 0.32 |
| Comparative Example H3 | 11.1 | 7.4 | 0.95 | 0.92 | 0.21 | 0.29 |
| Comparative Example H4 | 11.2 | 7.4 | 0.96 | 0.92 | 0.12 | 0.29 |
| Comparative Example H5 | 10.8 | 7.1 | 0.98 | 0.92 | 0.02 | 0.15 |
| Comparative Example H6 | 11.4 | 2.8 | 1.04 | 0.92 | 0.47 | 0.37 |
| Comparative Example H7 | 12.6 | 15.5 | 0.97 | 0.94 | 0.03 | 0.16 |
| Example H5 | 16.3 | 13.8 | 1.03 | 0.93 | 0.15 | 0.39 |
| Comparative Example H8 | 15.4 | 5.9 | 1.01 | 0.93 | 0.35 | 0.24 |
| Example H6 | 19.4 | 13.4 | 1.06 | 0.93 | 0.14 | 0.35 |
| Comparative Example H9 | 18.2 | 5.6 | 1.08 | 0.93 | 0.31 | 0.27 |

TABLE 2H

| | Discharge Capacity, mAh/g | Low-Temperature Output Characteristics, (Comparative Example H1 = 100) |
|---|---|---|
| Example H1 | 365 | 122 |
| Example H2 | 367 | 126 |
| Example H3 | 364 | 118 |
| Example H4 | 364 | 118 |
| Comparative Example H1 | 365 | 100 |
| Comparative Example H2 | 363 | 86 |
| Comparative Example H3 | 366 | 88 |
| Comparative Example H4 | 366 | 94 |
| Comparative Example H5 | 366 | 89 |
| Comparative Example H6 | 358 | 103 |
| Comparative Example H7 | 365 | 114 |
| Example H5 | 368 | 116 |
| Comparative Example H8 | 367 | 91 |
| Example H6 | 367 | 117 |
| Comparative Example H9 | 367 | 89 |

In Examples H1 to H6, the flake natural graphite adjusted to have a prescribed particle size was granulated with a granulating agent having prescribed physical properties added, whereby a Raman R value and a ☐TG/SA value in the prescribed ranges were successfully achieved to provide a high capacity and excellent low-temperature output characteristics. By contrast, in Comparative Examples H1 to H9, where the Raman R value and/or the ☐TG/SA value were outside the prescribed ranges, degraded low-temperature output characteristics were provided.

Ninth examples (Examples I) of the present invention will now be described.

In the Examples, physical properties of negative electrode materials produced were measured by the following methods. The viscosity, contact angle, surface tension, and r cos θ of granulating agents were each measured by the methods described in the specification.

Preparation of Electrode Sheet

An electrode plate having an active material layer with an active material layer density of 1.35±0.03 g/cm$^3$ or 1.60±0.03 g/cm$^3$ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.0±0.3 mg/cm$^2$ or 9.0±0.3 mg/cm$^2$. The coated foil was roll-pressed using a roller having a diameter of 20 cm to adjust the density of the active material layer to be 1.35±0.03 g/cm$^3$ or 1.60±0.03 g/cm$^3$, thereby preparing an electrode sheet.

Production of Non-Aqueous Secondary Battery (2016 Coin Battery)

The electrode sheet prepared by the above-described method, to which the negative electrode material adhered in an amount of 9.0±0.3 mg/cm$^2$ and in which the density of the active material layer was 1.60±0.03 g/cm$^3$, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the negative electrode material adhered in an amount of 6.0±0.3 mg/cm$^2$ and in which the density of the active material layer was 1.35±0.03 g/cm$^2$, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 200 μl to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Surface Oxygen Content (O/C) For X-ray photoelectron spectroscopy, an X-ray photoelectron spectroscope was used. A measuring object was mounted on a sample stage such that the surface of the object was flat, and a multiplex measurement was performed using a Kα radiation of aluminum as an X-ray source to measure spectra of C1s (280 to 300 eV) and O1s (525 to 545 eV).

Charge correction was performed with the C1s peak top obtained set to 284.3 eV. Peak areas of the spectra of C1s and O1s were determined and then multiplied by an apparatus sensitivity to determine the surface atom concentrations of C and O. The O/C ratio of the atom concentrations of O and C obtained (O atom concentration/C atom concentration)×100 was defined as the surface oxygen content O/C value of the carbon material.

Total Oxygen Content

An oxygen/nitrogen/hydrogen analyzer (TCH600 ONH determinator available from LECO) was used. In an inert gas atmosphere impulse furnace, 50 mg of the carbon material was melted and decomposed, and the amounts of carbon monoxide and carbon dioxide in a discharged carrier gas were measured using an infrared detector to determine the total oxygen content (mol %) of the carbon material.

BET Specific Surface Area (SA)

Using a surface area meter (AMS8000 specific surface area analyzer available from Ohkura Riken Co., Ltd.), 0.4 g of a carbon material was loaded into a cell, and the carbon material sample was preliminarily dried under a nitrogen stream at 350° C. for 15 minutes, after which using a nitrogen-helium mixed gas precisely regulated so as to have a nitrogen pressure of 0.3 relative to atmospheric pressure, a BET specific surface area was measured by a nitrogen adsorption BET method according to a flowing gas method.

d50

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Roundness (Average Roundness)

Using a flow-type particle image analyzer (FPIA-2000 available from Sysmex Corporation), a particle size distribution based on equivalent circle diameter was measured, and a roundness was determined. Ion-exchanged water was used as a dispersion medium, and polyoxyethylene (20) monolaurate was used as a surfactant. The equivalent circle diameter is a diameter of a circle (equivalent circle) having the same projected area as that of a captured particle image, and the roundness is a ratio of the perimeter of the equivalent circle, as the numerator, to the perimeter of the captured particle projection image, as the denominator. Roundnesses of particles having an equivalent diameter in the range of 1.5 to 40 µm were averaged to determine the roundness.

Tap Density

Using a powder density meter, the carbon material of the present invention was dropped through a sieve with openings of 300 µm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

Oxygen Functional Group Dispersity

The oxygen functional group dispersity was determined by the following formula.

Oxygen functional group dispersity ($Y_i$)=total oxygen content (mol %) determined by elemental analysis/surface oxygen content (O/C) (mol %) determined by X-ray photoelectron spectroscopy Example I1

A flake natural graphite having a d50 of 100 µm was crushed with a dry swirl-flow crusher to give a flake natural graphite having a d50 of 8.1 µm, a Tap of 0.39 g/cm$^3$, and a water content of 0.08% by mass. To 100 g of the resulting flake natural graphite, 12 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent adhered. Using a Model NHS-1 hybridization system available from Nara Machinery Co., Ltd., the sample obtained was mechanically granulated at a rotor peripheral speed of 85 m/sec for 10 minutes. The sample obtained was heat treated in a nitrogen atmosphere at 500° C. to give a granulated carbon material from which the granulating agent was removed. Using the measurement methods described above, d50, SA, Tap, roundness, O/C, total oxygen content, oxygen functional group dispersity, discharge capacity, and low-temperature output characteristics were measured. The results are shown in Tables 1I and 2I.

Example I2

A sample was prepared in the same manner as in Example I1 except that the heat-treatment temperature was 700° C. The results of the measurements made in the same manner as in Example I1 are shown in Tables 1I and 2I.

Example I3

A flake natural graphite having a d50 of 100 µm was crushed with a mechanical crusher having a crushing rotor and a liner to give a flake natural graphite having a d50 of 30 µm and a water content of 0.03% by mass. To 100 g of the resulting flake natural graphite, 4 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent adhered. Using a Model NHS-1 hybridization system available from Nara Machinery Co., Ltd., the sample obtained was mechanically granulated at a rotor peripheral speed of 85 m/sec for 10 minutes. The sample obtained was heat treated in a nitrogen atmosphere at 700° C. to give a granulated carbon material from which the granulating agent was removed. The results of the measurements made in the same manner as in Example I1 are shown in Tables 1I and 2I.

Example I4

A sample was prepared in the same manner as in Example I3 except that 6 g of a granulating agent of a liquid paraffin (Wako Pure Chemical Industries, Ltd., first grade) was added. The results of the measurements made in the same manner as in Example I1 are shown in Tables 1I and 2I.

Comparative Example I1

Using a Model NHS-1 hybridization system available from Nara Machinery Co., Ltd., a flake natural graphite having a d50 of 100 µm was mechanically granulated at a rotor peripheral speed of 85 m/sec for 10 minutes. In the sample obtained was confirmed the presence of a large amount of flake graphite fine powder not deposited on the base material or incorporated into the granulated particles. This sample was classified to remove the flake graphite fine powder, thereby providing a granulated carbon material having a d50 of 10.9 µm. The results of the measurements made in the same manner as in Example I1 are shown in Tables 1I and 2I.

Comparative Example I2

A sample was prepared in the same manner as in Example 1 except that the granulated carbon material of Comparative Example I1 was heat treated in a nitrogen atmosphere at 700° C. The results of the measurements made in the same manner as in Example I1 are shown in Tables 1I and 2I.

Comparative Example I3

Using a Model NHS-1 hybridization system available from Nara Machinery Co., Ltd., a flake natural graphite having a d50 of 100 µm was mechanically granulated at a rotor peripheral speed of 85 m/sec for 5 minutes. In the sample obtained was confirmed the presence of a large amount of flake graphite fine powder not deposited on the base material or incorporated into the granulated particles.

This sample was classified to remove the flake graphite fine powder, thereby providing a granulated carbon material having a d50 of 15.4 μm. The results of the measurements made in the same manner as in Example I1 are shown in Tables 1I and 2I.

Comparative Example I4

Using a Model NHS-1 hybridization system available from Nara Machinery Co., Ltd., a flake natural graphite having a d50 of 100 μm was mechanically granulated at a rotor peripheral speed of 70 m/sec for 3 minutes. In the sample obtained was confirmed the presence of a large amount of flake graphite fine powder not deposited on the base material or incorporated into the granulated particles. This sample was classified to remove the flake graphite fine powder, thereby providing a granulated carbon material having a d50 of 19.5 μm. The granulated carbon material was further mechanically granulated at a rotor peripheral speed of 70 m/sec for 3 minutes using a Model NHS-1 hybridization system available from Nara Machinery Co., Ltd. and then classified to remove the flake graphite fine powder not deposited on the base material or incorporated into the granulated particles, thereby providing a granulated carbon material having a d50 of 18.2 μm. The results of the measurements made in the same manner as in Example I1 are shown in Tables 1I and 2I.

TABLE 1I

| | d50 ($X_i$), μm | Tap, g/cm³ | SA, m²/g | O/C, mol % | Total Oxygen Content, mol % | Oxygen Functional Group Dispersity ($Y_i$) | $100Y_i + 0.26X_i$ | Roundness |
|---|---|---|---|---|---|---|---|---|
| Example I1 | 12.7 | 0.87 | 15.4 | 0.72 | 0.078 | 0.108 | 14.1 | 0.94 |
| Example I2 | 12.9 | 0.88 | 15.3 | 0.78 | 0.055 | 0.071 | 10.4 | 0.94 |
| Example I3 | 16.3 | 1.03 | 13.8 | 0.65 | 0.041 | 0.063 | 10.5 | 0.93 |
| Example I4 | 19.4 | 1.06 | 13.4 | 0.72 | 0.034 | 0.047 | 9.7 | 0.93 |
| Comparative Example I1 | 10.9 | 0.88 | 8.4 | 2.79 | 0.183 | 0.066 | 9.4 | 0.92 |
| Comparative Example I2 | 11.3 | 0.89 | 8.4 | 0.83 | 0.050 | 0.060 | 9.0 | 0.92 |
| Comparative Example I3 | 15.4 | 1.01 | 5.9 | 2.60 | 0.139 | 0.053 | 9.3 | 0.93 |
| Comparative Example I4 | 18.2 | 1.08 | 5.6 | 2.31 | 0.109 | 0.047 | 9.4 | 0.93 |

TABLE 2I

| | Discharge Capacity, mAh/g | Low-Temperature Output Characteristics, (Comparative Example I1 = 100) |
|---|---|---|
| Example I1 | 365 | 122 |
| Example I2 | 367 | 126 |
| Example I3 | 368 | 116 |
| Example I4 | 367 | 117 |
| Comparative Example I1 | 365 | 100 |
| Comparative Example I2 | 363 | 86 |
| Comparative Example I3 | 367 | 91 |
| Comparative Example I4 | 367 | 89 |

In Examples I1 to I4, the flake natural graphite adjusted to have a prescribed particle size was granulated with a granulating agent having prescribed physical properties added, whereby the relationship between oxygen functional group dispersity and d50 (μm) in the prescribed range was successfully achieved to provide a high capacity and excellent low-temperature output characteristics. By contrast, in Comparative Examples I1 to I4, where the relationship between oxygen functional group dispersity and d50 (μm) was outside the prescribed range, degraded low-temperature output characteristics were provided.

Tenth examples (Examples J) of the present invention will now be described.

In Examples J, physical properties and characteristics of carbon materials produced were measured by the following methods.

d50

The d50 was determined as a volume-based median diameter by suspending 0.01 g of a negative electrode material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Tap Density

Using a powder density meter, the negative electrode material was dropped through a sieve with openings of 300 μm into a cylindrical tap cell with a diameter of 1.6 cm and a volume capacity of 20 cm³ to fill up the cell, and then a tap with a stroke length of 10 mm was given 1,000 times. The density calculated from the volume at this time and the mass of the sample was defined as the tap density.

Specific Surface Area SA

The specific surface area SA was defined as a value determined as follows: using a surface area meter (Gemini 2360 specific surface area analyzer available from Shimadzu Corporation), a negative electrode material sample was preliminarily vacuum dried under a nitrogen stream at 100° C. for 3 hours and then cooled to liquid nitrogen temperature, and using a nitrogen-helium mixed gas precisely regulated so as to have a nitrogen pressure of 0.3 relative to atmospheric pressure, a BET specific surface area was measured by a nitrogen adsorption BET multipoint method according to a flowing gas method.

Preparation of Electrode Sheet

An electrode plate having an active material layer with an active material layer density of 1.60±0.03 g/cm$^3$ or 1.35±0.03 g/cm$^3$ was prepared using a negative electrode material of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 12.00±0.3 mg/cm$^2$ or 6.00±0.3 mg/cm$^2$. The coated foil was roll-pressed using a roller having a diameter of 20 cm to adjust the density of the active material layer to be 1.60±0.03 g/cm$^3$ or 1.35±0.03 g/cm$^3$, thereby preparing an electrode sheet.

Production of Non-Aqueous Secondary Battery (2016 Coin Battery)

The electrode sheet prepared by the above-described method, to which the negative electrode material adhered in an amount of 12.00±0.3 mg/cm$^2$ and in which the density of the active material layer was adjusted to be 1.60±0.03 g/cm$^3$, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of LiPF$_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the negative electrode material adhered in an amount of 6.00±0.3 mg/cm$^2$ and in which the density of the active material layer was adjusted to be 1.35±0.03 g/cm$^3$, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of LiPF$_6$ in a mixed solvent of ethylene carbonate, ethyl methyl carbonate, and dimethyl carbonate (volume ratio=3:3:4) was injected in an amount of 200 μL to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. The discharge capacity at this time was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

High-Temperature Storage Characteristics

High-temperature storage characteristics were measured by the following measurement method using the laminate non-aqueous electrolyte secondary battery produced by the method for producing a non-aqueous electrolyte secondary battery described above.

A non-aqueous electrolyte secondary battery that has yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

The battery was further charged at a current of 0.2 C to an SOC of 80% and then stored in a high-temperature environment at 60° C. for 2 weeks. After that, the battery was discharged at 25° C. and 0.2 C to 3.0 V, charged at 0.2 C to 4.2 V, and discharged at 0.2 C to 3.0 V. The discharge capacity at this time was defined as a discharge capacity A (mAh). The ratio (%) of the discharge capacity A to a discharge capacity B (mAh) at a fifth initial charge and discharge cycle was used as high-temperature storage characteristics. (High-temperature storage characteristics (%)=A (mAh)/B (mAh)×100)

Example J1

A flake natural graphite having a d50 of 100 μm was crushed with a dry swirl-flow crusher to give a flake natural graphite having a d50 of 8.1 μm, a Tap of 0.39 g/cm$^3$, and a water content of 0.08% by mass. To 100 g of the resulting flake natural graphite, 12 g of a granulating agent of an aromatic oil I (aniline point, 29° C.; containing a naphthalene ring structure in its molecule) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the sample obtained was mechanically spheroidized at a rotor peripheral speed of 85 m/sec for 10 minutes to give granulated carbon material particles.

The granulated carbon material particles and a coal-tar pitch, serving as a carbonaceous material precursor having lower crystallinity than the raw carbon material, were mixed using a mixer at 120° C. for 20 minutes. The resulting mixture was heat treated in an inert gas at 1,300° C. for 1 hour, and then the burned product was disintegrated and classified to give multi-layered graphite particles made of the granulated carbon material particles and the carbonaceous material having lower crystallinity than the raw carbon material combined with each other. The burning yield showed that the mass ratio of the granulated carbon material particles to the carbonaceous material having lower crystallinity than the raw carbon material (granulated carbon material particle/amorphous carbon) of the multi-layered graphite particles was 1:0.065. The d50, SA, Tap, discharge capacity, low-temperature output characteristics, and high-temperature storage characteristics of the sample obtained were measured. The results are shown in Table 1J.

Example J2

Multi-layered graphite particles were obtained in the same manner as in Example J1 except that the mass ratio of the granulated carbon material particles to the carbonaceous material having lower crystallinity than the raw carbon material (granulated carbon material particle/amorphous carbon) was 1:0.08. The results of the measurements made in the same manner as in Example J1 are shown in Table 1J.

Example J3

Multi-layered graphite particles were obtained in the same manner as in Example J2 except that an aromatic oil II (aniline point, none; mixed aniline point, 15° C.; containing a benzene ring structure in its molecule) was used as a granulating agent. The results of the measurements made in the same manner as in Example J1 are shown in Table 1J.

Reference Example J1

Multi-layered graphite particles were obtained in the same manner as in Example J1 except that a paraffinic oil (aniline point, >100° C.) was used as a granulating agent. The results of the measurements made in the same manner as in Example J1 are shown in Table 1J.

Reference Example J2

Multi-layered graphite particles were obtained in the same manner as in Comparative Example J1 except that the mass ratio of the granulated carbon material particles to the carbonaceous material having lower crystallinity than the raw carbon material (granulated carbon material particle/amorphous carbon) was 1:0.08. The results of the measurements made in the same manner as in Example J1 are shown in Table 1J.

Reference Example J3

Multi-layered graphite particles were obtained in the same manner as in Comparative Example J1 except that the mass ratio of the granulated carbon material particles to the carbonaceous material having lower crystallinity than the raw carbon material (granulated carbon material particle/amorphous carbon) was 1:0.1. The results of the measurements made in the same manner as in Example J1 are shown in Table 1J.

Comparative Example J1

A flake natural graphite having a d50 of 100 μm was mechanically spheroidized as it is at a rotor peripheral speed of 85 m/sec for 10 minutes using a Model NHS-1 hybridization system available from Nara Machinery Co., Ltd. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 10.8 μm and a Tap density of 0.88 g/cm³. The spheroidized graphite and a coal-tar pitch, serving as a carbonaceous material precursor having lower crystallinity than the raw carbon material, were mixed using a mixer at 120° C. for 20 minutes. The resulting mixture was heat treated in an inert gas at 1,300° C. for 1 hour, and then the burned product was disintegrated and classified to give multi-layered graphite particles made of the granulated carbon material particles and the carbonaceous material having lower crystallinity than the raw carbon material combined with each other. The burning yield showed that the mass ratio of the granulated carbon material particles to the carbonaceous material having lower crystallinity than the raw carbon material (granulated carbon material particle/amorphous carbon) of the multi-layered graphite particles was 1:0.065. The d50, SA, Tap, discharge capacity, low-temperature output characteristics, and high-temperature storage characteristics of the sample obtained were measured. The results are shown in Table 1J.

TABLE 1J

| | d50, μm | Tap, g/cm³ | SA, m²/g | Discharge Capacity, mAh/g | Low-Temperature Output Characteristics, (Reference Example J2 = 100) | High-Temperature Storage Characteristics, (Reference Example J2 = 100) |
|---|---|---|---|---|---|---|
| Example J1 | 11.8 | 1.02 | 7.8 | 362 | 109.9 | 98.9 |
| Example J2 | 12.0 | 0.92 | 6.1 | 359 | 104.8 | 100.4 |
| Example J3 | 11.9 | 0.94 | 5.8 | 359 | 103.1 | 101.1 |
| Reference Example J1 | 12.0 | 1.05 | 7.9 | 362 | 94.4 | 98.6 |
| Reference Example J2 | 11.8 | 1.02 | 7.1 | 359 | 100.0 | 100.0 |
| Reference Example J3 | 12.0 | 0.92 | 5.7 | 357 | 91.2 | 100.4 |
| Comparative Example J1 | 11.4 | 1.04 | 3.1 | 362 | 68.1 | 104.4 |

In Examples J1 to J3, the low-temperature output characteristics and the high-temperature storage characteristics were sufficiently superior to those in Reference Examples J1 to J3 and Comparative Example J1.

Eleventh examples (Examples K) of the present invention will now be described.

Preparation of Electrode Sheet

An electrode plate having an active material layer with an active material layer density of 1.35±0.03 g/cm³ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 0.5 g (on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 6.0±0.3 mg/cm$^2$ or 12.0±0.3 mg/cm$^2$. The coated foil was roll-pressed using a roller having a diameter of 20 cm to adjust the density of the active material layer to be 1.35±0.03 g/cm$^3$, thereby preparing an electrode sheet.

Production of Non-Aqueous Secondary Battery (2016 Coin Battery)

The electrode sheet prepared by the above-described method, to which the negative electrode material adhered in an amount of 12.0±0.3 mg/cm$^2$ and in which the density of the active material layer was 1.35±0.03 g/cm$^3$, was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of LiPF$_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method, to which the negative electrode material adhered in an amount of 6.0±0.3 mg/cm$^2$ and in which the density of the active material layer was 1.35±0.03 g/cm$^3$, was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of LiPF$_6$ in a mixed solvent of ethylene carbonate, ethyl methyl carbonate, and dimethyl carbonate (volume ratio=3:3:4) was injected in an amount of 200 μL to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

a: Volume-Based Average Particle Diameter (d50)

The d50 was determined as a volume-based median diameter by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

$x_k$: True Density

The true density of a carbon material sample was measured by pycnometry using a true density meter (MAT-7000 Auto True Denser available from Seishin Enterprise Co., Ltd).

Density Under Uniaxial Load of 100 Kgf/3.14 cm$^2$

The density under a uniaxial load of 100 kgf/3.14 cm$^2$ was measured using an MCP-PD51 powder resistivity measurement system available from Mitsubishi Chemical Analytech Co., Ltd. First, values of the apparatus were corrected. For a load correction, the load measured when the bottom of a cylindrical container for accommodating the carbon material and a push rod to be inserted into the container from above to apply pressure to the carbon material were separated from each other was confirmed to be 0 kgf/3.14 cm$^2$. Next, a thickness gauge was corrected. While the cylindrical container and the push rod were brought close using a hydraulic pump, a zero-point correction was carried out such that the thickness gauge indicated 0.00 mm when the load reached 20 kgf/3.14 cm$^2$. After the corrections were carried out, 3.0 g of the carbon material was placed in the cylindrical container with a diameter of 2 cm, and the height of the carbon material was adjusted so as to receive a load evenly. A seat was lifted using the hydraulic pump, and the push rod was inserted into the cylindrical container. After the thickness gauge had indicated 15.0 mm, loads were measured at thicknesses at 0.5-mm intervals until the load exceeded 1,000 kgf/3.14 cm$^2$. From the thicknesses obtained, the densities of the powder were calculated, and using Microsoft Excel, a graph was created with powder density plotted on the horizontal axis and load on the vertical axis. A cubic spline curve of the graph was created, and the formula obtained was used to calculate a carbon material density under a load of 100 kgf/3.14 cm$^3$. To reduce variation in measurements, the measurement was made at least twice. When variation occurred, the measurement was made three times, and the average of two closest values was used.

Tap Density: Tap

Using a powder density meter, the carbon material of the present invention was dropped through a sieve with openings of 300 μm into a cylindrical tap cell with a diameter of 1.6 cm and a volume capacity of 20 cm$^3$ to fill up the cell, and then a tap with a stroke length of 10 mm was given 1,000 times. The density calculated from the volume at this time and the mass of the sample was defined as the tap density.

$y_k$: Density Under Uniaxial Load of 100 Kgf/3.14 cm$^2$–Tap Density $y_k$ is a value obtained by subtracting a tap density from a density under a uniaxial load of 100 kgf/3.14 cm$^2$.

Example K1

A flake natural graphite having a d50 of 100 μm was crushed with a dry swirl-flow crusher to give a flake natural graphite having a d50 of 8.1 μm, a tap density of 0.39 g/cm$^3$, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 13 μm.

The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of the granulated graphite particles to the carbonaceous material having lower crystallinity than the raw graphite (granulated graphite particle/amorphous carbon) of the multi-layered graphite particles was 1:0.065. The true density, d50, tap density, density under a uniaxial load of 100 kgf/3.14 cm$^2$, discharge capacity, and low-temperature output characteristics of the sample obtained were measured. The results are shown in Table 1K.

Example K2 Multi-layered graphite particles were obtained in the same manner as in Example K1 except that the mass ratio of the granulated graphite particles to the carbonaceous material having lower crystallinity than the raw graphite (granulated graphite particle/amorphous carbon) of the multi-layered graphite particles was 1:0.08. The results of the measurements made in the same manner as in Example K1 are shown in Table 1K.

Comparative Example K1

A spheroidized natural graphite was prepared in the same manner as in Example K1 except that no granulating agent was added, and the spheroidized natural graphite was air classified to remove the flake graphite fine powder that had not been granulated, thereby providing a spheroidized natural graphite having a d50 of 10.9 μm and a Tap density of 0.88 g/cm$^3$. The spheroidized natural graphite and a petroleum-derived heavy oil, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.02. The results of the measurements made in the same manner as in Example K1 are shown in Table 1K.

Comparative Example K2

A multi-layered carbon material was obtained in the same manner except that the mixing ratio of the petroleum-derived heavy oil was changed from that in Comparative Example K1. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example K1 are shown in Table 1K.

Comparative Example K3

A multi-layered carbon material was obtained in the same manner except that the mixing ratio of the petroleum-derived heavy oil was changed from that in Comparative Example K1. The burning yield showed that the mass ratio of spheroidized graphite particle to amorphous carbon (spheroidized graphite particle/amorphous carbon) of the multi-layered carbon material was 1:0.05. The results of the measurements made in the same manner as in Example K1 are shown in Table 1K.

Comparative Example K4

A multi-layered carbon material was obtained in the same manner as in Comparative Example K1 except that a coal-tar pitch was used as an amorphous carbon precursor in place of the petroleum-derived heavy oil, and its mixing ratio was changed. The burning yield showed that the mass ratio of spheroidized graphite particle to amorphous carbon (spheroidized graphite particle/amorphous carbon) of the multi-layered carbon material was 1:0.07. The results of the measurements made in the same manner as in Example K1 are shown in Table 1K.

Example K3

A flake natural graphite having a d50 of 100 μm was crushed with a mechanical crusher having a crushing rotor and a liner to give a flake natural graphite having a d50 of 30 μm and a water content of 0.03% by mass. To 100 g of the resulting flake natural graphite, 6 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, thereby providing a spheroidized natural graphite having a d50 of 19.4 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.03. The results of the measurements made in the same manner as in Example K1 are shown in Table 1K.

Example K4

The spheroidized natural graphite obtained in Example K3 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.04. The results of the measurements made in the same manner as in Example K1 are shown in Table 1K.

Example K5

The spheroidized natural graphite obtained in Example K3 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.05. The results of the measurements made in the same manner as in Example K1 are shown in Table 1K.

Example K6

The spheroidized natural graphite obtained in Example K1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.10. The results of the measurements made in the same manner as in Example K1 are shown in Table 1K.

Comparative Example K5

Using a Model NHS-1 hybridization system available from Nara Machinery Co., Ltd., a flake natural graphite having a d50 of 100 μm was mechanically spheroidized at a rotor peripheral speed of 85 m/sec for 3 minutes. In the sample obtained was confirmed the presence of a large amount of flake graphite and flake graphite fine powder generated during the spheroidization that were not deposited on the base material or incorporated. This sample was classified to remove the flake graphite fine powder, thereby providing a spheroidized graphite having a d50 of 19 μm. The spheroidized natural graphite and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.01. The results of the measurements made in the same manner as in Example K1 are shown in Table 1K.

Comparative Example K6

A multi-layered carbon material was obtained in the same manner except that the mixing ratio of the coal-tar pitch was changed from that in Comparative Example K5. The burning yield showed that the mass ratio of spheroidized graphite particle to amorphous carbon (spheroidized graphite particle/amorphous carbon) of the multi-layered carbon material was 1:0.03.

The results of the measurements made in the same manner as in Example K1 are shown in Table 1K.

Comparative Example K7

A multi-layered carbon material was obtained in the same manner except that the mixing ratio of the coal-tar pitch was changed from that in Comparative Example K5. The burning yield showed that the mass ratio of spheroidized graphite particle to amorphous carbon (spheroidized graphite particle/amorphous carbon) of the multi-layered carbon material was 1:0.06.

The results of the measurements made in the same manner as in Example K1 are shown in Table 1K.

Comparative Example K8

A multi-layered carbon material was obtained in the same manner except that the mixing ratio of the coal-tar pitch was changed from that in Comparative Example K5. The burning yield showed that the mass ratio of spheroidized graphite particle to amorphous carbon (spheroidized graphite particle/amorphous carbon) of the multi-layered carbon material was 1:0.08.

The results of the measurements made in the same manner as in Example K1 are shown in Table 1K.

TABLE 1K

|  | $X_k$ True Density (g/cm³) | a d50 (μm) | Tap (g/cm³) | Density under 100 kgf/3.14 cm² (g/cm³) | $Y_k$ (g/cm³) | Right Side of Inequality (1K) | Right Side of Inequality (3K) | Discharge Capacity (mAh/g) | Low-Temperature Output Characteristics (Comparative Example K4 = 100) (%) |
|---|---|---|---|---|---|---|---|---|---|
| Example K1 | 2.23 | 12 | 1.05 | 1.24 | 0.19 | 10.868 | 10.972 | 362 | 139 |
| Example K2 | 2.23 | 12 | 1.02 | 1.25 | 0.24 | 10.817 | 10.920 | 359 | 147 |
| Comparative Example K1 | 2.25 | 11 | 0.99 | 1.23 | 0.24 | 10.923 | 11.020 | 368 | 111 |
| Comparative Example K2 | 2.24 | 11 | 1.03 | 1.21 | 0.18 | 10.931 | 11.029 | 365 | 103 |
| Comparative Example K3 | 2.24 | 11 | 1.04 | 1.20 | 0.16 | 10.934 | 11.033 | 363 | 102 |
| Comparative Example K4 | 2.23 | 11 | 1.04 | 1.18 | 0.14 | 10.927 | 11.026 | 361 | 100 |
| Example K3 | 2.25 | 18 | 1.16 | 1.34 | 0.18 | 10.896 | 11.052 | 366 | 118 |
| Example K4 | 2.24 | 18 | 1.19 | 1.34 | 0.15 | 10.896 | 11.056 | 363 | 124 |
| Example K5 | 2.24 | 19 | 1.18 | 1.35 | 0.16 | 10.864 | 11.033 | 363 | 124 |
| Example K6 | 2.22 | 22 | 1.19 | 1.31 | 0.12 | 10.796 | 10.991 | 358 | 113 |
| Comparative Example K5 | 2.25 | 18 | 1.14 | 1.31 | 0.18 | 10.935 | 11.095 | 367 | 91 |
| Comparative Example K6 | 2.25 | 19 | 1.17 | 1.29 | 0.12 | 10.961 | 11.128 | 367 | 93 |
| Comparative Example K7 | 2.24 | 19 | 1.19 | 1.28 | 0.09 | 10.960 | 11.127 | 364 | 79 |
| Comparative Example K8 | 2.23 | 19 | 1.21 | 1.28 | 0.07 | 10.920 | 11.087 | 358 | 67 |

In Examples K1 to K6, values of the right side of inequality (1K) are less than 10.914, showing that the capacity and the low-temperature output characteristics were superior to those of Comparative Examples K1 to K8, where values of the right side of inequality (1K) are greater than 10.914. Furthermore, in Examples K1 to K2, values of the right side of inequality (3K) are less than 10.990, showing that the capacity and the low-temperature output are very excellent.

Twelfth examples (Examples L) of the present invention will now be described.

Preparation of Electrode Sheet

An electrode plate having an active material layer with an active material layer density of 1.60±0.03 g/cm³ was prepared using graphite particles of Examples or Comparative Examples. Specifically, 50.00±0.02 g of a negative electrode material, 50.00±0.02 g (0.500 g on a solids basis) of a 1% by mass aqueous carboxymethylcellulose sodium salt solution, and 1.00±0.05 g (0.5 g on a solids basis) of an aqueous dispersion of a styrene-butadiene rubber having a weight average molecular weight of 270,000 were stirred with a Keyence hybrid mixer for 5 minutes, and the mixture was defoamed for 30 seconds to give a slurry.

The slurry was applied to a 10-μm-thick copper foil, serving as a current collector, to a width of 10 cm using a small die coater available from Itochu Machining Co., Ltd. such that the negative electrode material adhered in an amount of 12.00±0.3 mg/cm². The coated foil was roll-pressed using a roller having a diameter of 20 cm to adjust the density of the active material layer to be 1.60±0.03 g/cm³, thereby preparing an electrode sheet.

Production of Non-Aqueous Secondary Battery (2016 Coin Battery)

The electrode sheet prepared by the above-described method was cut into a disk having a diameter of 12.5 mm, and lithium metal foil was cut into a disk having a diameter of 14 mm to prepare a counter electrode. A separator (made of a porous polyethylene film) was placed between the two electrodes, the separator being impregnated with an electrolyte solution of 1 mol/L of $LiPF_6$ in a mixed solvent of ethylene carbonate and ethyl methyl carbonate (volume ratio=3:7). In this manner, 2016 coin batteries were produced.

Method of Producing Non-Aqueous Secondary Battery (Laminate Battery)

The electrode sheet prepared by the above-described method was cut to 4 cm×3 cm to prepare a negative electrode, and a positive electrode made of NMC was cut to the same area. The negative electrode and the positive electrode were combined with a separator (made of a porous polyethylene film) placed therebetween. An electrolyte solution of 1.2 mol/L of $LiPF_6$ in a mixed solvent of ethylene carbonate, ethyl methyl carbonate, and dimethyl carbonate (volume ratio=3:3:4) was injected in an amount of 250 μl to produce a laminate battery.

Method for Measuring Discharge Capacity

Using the non-aqueous secondary battery (2016 coin battery) produced by the above-described method, the capacity of the battery during charging and discharging was measured by the following method.

The lithium counter electrode was charged to 5 mV at a current density of 0.05 C and further charged at a constant voltage of 5 mV to a current density of 0.005 C. The negative electrode was doped with lithium, and then the lithium counter electrode was discharged to 1.5 V at a current density of 0.1 C. Subsequently, a second charging and discharging was performed at the same current density. The discharge capacity at the second cycle was defined as a discharge capacity of this battery.

Low-Temperature Output Characteristics

Using the laminate non-aqueous electrolyte secondary battery produced by the method for producing a non-aqueous electrolyte secondary battery described above, low-temperature output characteristics were measured by the following method.

A non-aqueous electrolyte secondary battery that had yet to go through a charge and discharge cycle was subjected to an initial charge and discharge that involves three cycles in a voltage range of 4.1 V to 3.0 V at 25° C. and a current of 0.2 C (1 C is a current at which a rated capacity at a 1-hour rate discharge capacity is discharged in 1 hour, and so on) and two cycles in a voltage range of 4.2 V to 3.0 V at a current of 0.2 C (in charging, a constant-voltage charge at 4.2 V was further performed for 2.5 hours).

Furthermore, charging was performed at a current of 0.2 C to an SOC of 50%, and then constant-current discharging was performed in a low-temperature environment at −30° C. for 2 seconds at varying currents of ⅛ C, ¼ C, ½ C, 1.5 C, and 2 C. The battery voltage drop at 2 seconds after discharging under each condition was measured. From each measurement, a current I that could be passed in 2 seconds when the upper limit charge voltage was 3 V was calculated, and a value calculated from the formula: 3×I (W) was defined as the low-temperature output characteristics of each battery.

Roundness R Determined with Flow-Type Particle Image Analyzer

Using a flow-type particle image analyzer (FPIA-2000 available from Sysmex Corporation), a particle size distribution based on equivalent circle diameter was measured, and a roundness was determined. Ion-exchanged water was used as a dispersion medium, and polyoxyethylene (20) monolaurate was used as a surfactant. The equivalent circle diameter is a diameter of a circle (equivalent circle) having the same projected area as that of a captured particle image, and the roundness is a ratio of the perimeter of the equivalent circle, as the numerator, to the perimeter of the captured particle projection image, as the denominator. Roundnesses of particles having an equivalent diameter in the range of 1.5 to 40 μm were averaged to determine the roundness R.

Volume-Based Average Particle Diameter X Determined by Laser Diffraction: d50

The d50 was determined as a volume-based median diameter (d50) by suspending 0.01 g of a carbon material in 10 mL of a 0.2% by mass aqueous solution of a polyoxyethylene sorbitan monolaurate surfactant (Tween 20 (registered trademark)), placing the suspension (a measurement sample) in a commercially available laser diffraction/scattering particle size distribution analyzer (e.g., LA-920 available from HORIBA, Ltd.), irradiating the measurement sample with ultrasonic waves of 28 kHz at a power of 60 W for 1 minute, and then performing a measurement with the analyzer.

Tap Density

Using a powder density meter, the carbon material of the present invention was dropped through a sieve with openings of 300 μm into a cylindrical tap cell with a diameter of 1.6 cm and a volume capacity of 20 cm³ to fill up the cell, and then a tap with a stroke length of 10 mm was given 1,000 times. The density calculated from the volume at this time and the mass of the sample was defined as the tap density.

Acquisition of Cross-Sectional SEM Image

The cross-sectional SEM image of the carbon material was measured as described below. As an electrode plate containing the carbon material was used the same electrode plate as used to produce the above-described battery for performance evaluation. First, an electrode cross section was processed using a cross section polisher (IB-09020CP available from JEOL Ltd). From the processed electrode cross-section, a reflected electron image was acquired with an SEM (SU-70 available from Hitachi High-Technologies Corporation). The SEM observation was carried out under the conditions of an acceleration voltage of 10 kV and a magnification of 1,000× to obtain an image that enables the acquisition of one particle at a resolution of 256 dpi. After that, in accordance with the above-described method and conditions for measuring dispersity, 30 or more particles satisfying $|X_1−X|/X_1 \le 0.2$ and $|R−R_1| \le 0.1$ were selected using two SEM images of 150 μm×100 μm. Moreover, 30 particles each having graphite portions with an average luminance of 80 or greater and void portions with an average luminance of 65 or less were selected as binarizable images.

Establishment of Particle Boundary

Using image processing software imageJ, a particle boundary was established by an approximation by a polygon. The approximation was made by a polygon with 15 or more sides to the particle shape. The non-particle region was processed so as to have a luminance of 255 at every pixel.

Binarization of Cross-Sectional SEM Image (Division into Void Regions and Non-Void Regions)

Void regions and non-void regions of the carbon material observed in the cross-sectional SEM image were binarized using image software imageJ with a threshold set to a luminance of 80 to 85.

Equivalent Circular Diameter $X_1$ Determined from Cross-Sectional SEM Image

The equivalent circular diameter $X_1$ was calculated by the following formula, where L is a particle circumference [μm], that is, the total length of line segments of a polygonal particle boundary.

$$X_1 = \frac{L}{2\pi} \qquad \text{[Mathematical 17]}$$

Roundness $R_1$ Determined from Cross-Sectional SEM Image

The roundness $R_1$ was calculated by the following formula using the particle circumference L obtained above, where S is an area of the polygon defined by the particle boundary.

$$R_1 = \frac{4\pi S}{(L)^2} \qquad \text{[Mathematical 18]}$$

Box-Counting Dimension Relative to Void Regions

Since the maximum length of the image obtained was about 260 pixel, analyses were carried out at Box sizes of 2, 3, 4, 6, 8, 16, 32, and 64. For the 30 randomly selected particles satisfying $|x_1−X|/X_1 \le 0.2$ and $|R−R_1| \le 0.1$ in the cross-sectional SEM image, box-counting dimensions relative to void regions were calculated and averaged to determine the average box-counting dimension relative to void regions.

Average Dispersity D

In the cross-sectional SEM image, 30 granulated particles satisfying $|X_1−X|/X_1 \le 0.2$ and $|R−R_1| \le 0.1$ were randomly selected, and for each particle, the dispersity D given by equation (B) was calculated. The dispersities D of the 30 particles were averaged. The expectation E of the void area in a target compartment is calculated by equation (A).

Dispersity $D$(%)=(sum total [μm²] of areas of compartments that satisfy (gross area [μm²] of voids in target compartment)/(expectation $E$[μm²] of void area in target compartment)=0.5 or greater)/(sum total [μm²] of areas of all the compartments of one target granulated particle)×100    Equation (B)

Expectation $E[\mu m^2]$ of void area in target compartment=(gross area $[\mu m^2]$ of internal voids of one target granulated particle)/(cross-sectional area $[\mu m^2]$ of one target granulated particle)×(area $[\mu m^2]$ of target compartment)   Equation (A)

Zave/X

In the cross-sectional SEM image, 30 granulated particles satisfying $|X_1-X|/X_1 \le 0.2$ and $|R-R_1| \le 0.1$ were randomly selected, and for each particle, the inter-void distance Z was calculated as described below. The average (Zave) of the inter-void distances Z of the 30 particles was calculated, and the ratio of the average to the volume-based average particle diameter X determined by laser diffraction (Zave/X) was calculated.

Definition of Average Inter-Void Distance Z (Zave) of 30 Particles

Three lines were drawn that were parallel to the minor axis of the granulated particle and split the major axis of the granulated particle into four parts, and inter-void distances Z (μm) of the granulated particle on each line were each measured. The average of 30 particles in total was calculated. This was defined as the average inter-void distance Z (Zave) of 30 particles.

W/X

For each of the 30 particles selected in calculating Zave/X, the void size Y was calculated as described below. The standard deviation (W) of the void sizes Y of the 30 particles was calculated, and the ratio of the standard deviation to the volume-based average particle diameter X determined by laser diffraction (W/X) was calculated.

Definition of Standard Deviation (W) of Void Sizes Y (μm) of 30 Particles

Three lines were drawn that were parallel to the minor axis of the granulated particle and split the major axis of the granulated particle into four parts, and void sizes Y (μm) of the granulated particle on each line were each measured. The standard deviation of 30 particles in total was calculated. This was defined as the standard deviation (W) of void sizes Y of 30 particles.

The standard deviation was determined by the following formula, where Yave is the average of Y, and Ny is the number of Y.

$$W = \left( \frac{\sum (Y - Y_{ave})^2}{Ny} \right)^{1/2}$$ [Mathematical 19]

The Number (Percentage) of Particles Having Voids Arranged in Layers

Among the 30 particles selected in calculating Zave/X, the number of particles was counted in which the proportion of the area of slit-like voids in layers (the area of voids in layers/the gross area of voids) was 50% or more, and the proportion of the number of slit-like voids (the number of slit-like voids/the total number of voids) was 70% or more, as observed in the cross-sectional SEM image. The percentage in the 30 particles was calculated.

Example L1

A flake natural graphite having a d50 of 100 μm was crushed with a dry swirl-flow crusher to give a flake natural graphite having a d50 of 8.1 μm, a Tap of 0.39 g/cm³, and a water content of 0.08% by mass. To 100 g of the resulting flake natural graphite, 12 g of a granulating agent of a liquid paraffin (Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 12.9 μm. Using the measurement methods described above, d50, Tap, roundness, average box-counting dimension, average dispersity D, Zave/X, W/X, the number (percentage) of particles having voids arranged in layers, discharge capacity, and low-temperature output characteristics were measured. The results are shown in Tables 1L and 2L.

Example L2

A flake natural graphite having a d50 of 100 μm was crushed with a dry air-flow crusher to give a flake natural graphite having a d50 of 6 μm, a Tap of 0.13 g/cm³, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 9.2 μm. The results of the measurements made in the same manner as in Example L1 are shown in Tables 1L and 2L.

Example L3

A flake natural graphite having a d50 of 100 μm was crushed with a dry swirl-flow crusher to give a flake natural graphite having a d50 of 6 μm, a Tap of 0.38 g/cm³, and a water content of 0.08% by mass. To 100 g of the resulting flake natural graphite, 12 g of a granulating agent of a paraffinic oil (liquid paraffin available from Wako Pure Chemical Industries, Ltd., first grade, physical properties at 25° C.: viscosity=95 cP, contact angle=13.2°, surface tension=31.7 mN/m, r cos θ=30.9) was added and mixed with stirring. The sample obtained was disintegrated and mixed using a hammer mill (MF10 available from IKA) at a rotation speed of 3,000 rpm to give a flake natural graphite to which the granulating agent uniformly adhered. Using a Model NHS-1 hybridization system available from Nara Machinery Co., Ltd., the flake natural graphite to which the granulating agent uniformly adhered was mechanically spheroidized at a rotor peripheral speed of 85 m/sec for 10 minutes while fine powder generated during the spheroidization was deposited on the base material and incorporated into the spheroidized particles, and heat treated in an inert gas at 720° C. to give a spheroidized graphite having a d50 of 9.9 μm. The results of the measurements made in the same manner as in Example L1 are shown in Tables 1L and 2L.

Comparative Example L1

Using a Model NHS-1 hybridization system available from Nara Machinery Co., Ltd., a flake natural graphite having a d50 of 100 μm was mechanically spheroidized at a rotor peripheral speed of 85 m/sec for 10 minutes. In the sample obtained was confirmed the presence of a large amount of flake graphite fine powder not deposited on the base material or incorporated into the spheroidized particles. This sample was classified to remove the flake graphite fine powder, thereby providing a spheroidized graphite having a d50 of 10.8 μm. The results of the measurements made in the same manner as in Example L1 are shown in Tables 1L and 2L.

Comparative Example L2

Using a Model NHS-1 hybridization system available from Nara Machinery Co., Ltd., a flake natural graphite having a d50 of 100 μm was mechanically granulated at a rotor peripheral speed of 85 m/sec for 5 minutes. In the sample obtained was confirmed the presence of a large amount of flake graphite fine powder not deposited on the base material or incorporated into the granulated particles. This sample was classified to remove the flake graphite fine powder, thereby providing a granulated carbon material having a d50 of 15.4 μm. The results of the measurements made in the same manner as in Example L1 are shown in Tables 1L and 2L.

TABLE 2L

|  | Discharge Capacity mAh/g | Low-Temperature Output Characteristics, (Comparative Example L1 = 100) |
|---|---|---|
| Example L1 | 367 | 124 |
| Example L2 | 365 | 126 |
| Example L3 | 362 | 169 |
| Comparative Example L1 | 365 | 100 |
| Comparative Example L2 | 367 | 90 |

Example L4

The spheroidized natural graphite before heat treatment obtained in Example L1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.08. The results of the measurements made in the same manner as in Example L1 are shown in Tables 3L and 4L.

Comparative Example L3

The spheroidized natural graphite obtained in Comparative Example L1 and a coal-tar pitch, serving as an amorphous carbon precursor, were mixed and heat treated in an inert gas at 1,300° C., and then the burned product was disintegrated and classified to give a multi-layered carbon material made of graphite particles and an amorphous carbon combined with each other. The burning yield showed that the mass ratio of spheroidized graphite particle to amorphous carbon (spheroidized graphite particle/amorphous carbon) of the multi-layered carbon material was 1:0.065. The results of the measurements made in the same manner as in Example L1 are shown in Tables 3L and 4L.

TABLE 1L

|  | d50 (μm) | Tap (g/cm³) | Roundness | Average Box-Counting Dimension | Average Dispersity D (%) | Zave/X | W/X | Number (Percentage) of Particles Having Voids Arranged in Layers |
|---|---|---|---|---|---|---|---|---|
| Example L1 | 12.9 | 0.88 | 0.94 | 1.65 | 70 | 0.030 | 0.012 | 28 (93%) |
| Example L2 | 9.2 | 0.77 | 0.92 | 1.60 | 63 | 0.047 | 0.014 | 24 (80%) |
| Example L3 | 9.9 | 0.91 | 0.93 | 1.63 | 64 | 0.043 | 0.013 | 25 (83%) |
| Comparative Example L1 | 10.8 | 0.93 | 0.93 | 1.51 | 53 | 0.069 | 0.020 | 8 (27%) |
| Comparative Example L2 | 15.4 | 1.01 | 0.93 | 1.52 | 56 | 0.063 | 0.020 | 9 (30%) |

TABLE 3L

| | d50 (μm) | Tap (g/cm³) | Roundness | Average Box-Counting Dimension | Average Dispersity D (%) | Zave/X | W/X | Number (Percentage) of Particles Having Voids Arranged in Layers |
|---|---|---|---|---|---|---|---|---|
| Example L4 | 11.8 | 1.02 | 0.93 | 1.56 | 64 | 0.050 | 0.012 | 21 (70%) |
| Comparative Example L3 | 11.4 | 1.04 | 0.92 | 1.46 | 49 | 0.075 | 0.020 | 5 (17%) |

TABLE 4L

| | Discharge Capacity mAh/g | Low-Temperature Output Characteristics, (Comparative Example L3 = 100) |
|---|---|---|
| Example L4 | 359 | 147 |
| Comparative Example L3 | 362 | 100 |

INDUSTRIAL APPLICABILITY

The carbon material of the present invention, when used as an active material for a non-aqueous secondary battery negative electrode, can provide a non-aqueous secondary battery having a high capacity, excellent low-temperature output characteristics, and other characteristics. According to the production method of the present invention, which involves a small number of steps, carbon materials can be stably, efficiently, and inexpensively produced. Furthermore, carbon materials for non-aqueous secondary batteries having various types of particle structures can be stably produced.

CLAIM SCOPE AND INCORPORATED BY REFERENCE

While the invention has been described in detail and with reference to specific embodiments thereof, it will be apparent to one skilled in the art that various changes and modifications can be made therein without departing from the spirit and scope thereof.

The invention claimed is:

1. A carbon material suitable for a non-aqueous secondary battery, the carbon material comprising:
a carbonaceous material; and
a spheroidized graphite which is at least one selected from the group consisting of flake graphite, crystalline graphite, and vein graphite,
wherein the carbon material is a composite carbon material capable of occluding and releasing lithium ions,
wherein the carbon material has a Raman R value of 0.2 or greater,
wherein the carbon material has a cumulative pore volume, at a pore diameter of from 0.01 μm to 1 μm, of 0.08 mL/g or more, determined by mercury intrusion,
wherein the carbon material has a roundness, as determined by a flow-type particle image analysis, of 0.88 or greater,
wherein the carbon material has a ratio of a pore diameter to a particle diameter, PD/d50(%), of 1.8 or less, the ratio following equation (1A):

$PD/d50(\%)$=mode pore diameter $(PD)$ in a pore diameter range of 0.01 μm to 1 μm in a pore distribution determined by mercury intrusion/volume-based average particle diameter $(d50) \times 100$     (1A), wherein the carbon material has a true density in a range of from 1.9 to 2.26 g/cm³, and
wherein the carbon material has a half width at half maximum of pore distribution, log (nm), of 0.3 or greater, wherein the half width at half maximum of pore distribution, log (nm), is a half width at half maximum at a micropore side of a peak in a pore diameter range of from 0.01 μm to 1 μm in a pore distribution (nm), as determined by mercury intrusion porosimetry, of the carbon material for a non-aqueous secondary battery, with a horizontal axis expressed in common logarithm, log (nm).

2. The carbon material of claim 1, having a half width at half maximum of pore distribution, log (nm), of 0.45 or greater, wherein the half width at half maximum of pore distribution, log (nm), is a half width at half maximum at a micropore side of a peak in a pore diameter of from 0.01 μm to 1 μm in a pore distribution (nm), as determined by mercury intrusion porosimetry, of the carbon material for a non-aqueous secondary battery, with a horizontal axis expressed in common logarithm, log (nm).

3. The carbon material of claim 1, wherein the spheroidized graphite is made of the flake graphite.

4. The carbon material of claim 1, having a frequency of particles having a particle diameter of 3 μm or less of from 1% to 60%, wherein the particle diameter and the frequency of the particles is measured using a flow-type particle image analyzer after the carbon material has been irradiated with ultrasonic waves of 28 kHz at a power of 60 W for 5 minutes.

5. A non-aqueous secondary battery, comprising:
a positive electrode and a negative electrode, each being capable of occluding and releasing lithium ions; and
an electrolyte,
wherein the negative electrode comprises a current collector and a negative electrode active material layer on the current collector, and wherein the negative electrode active material layer comprises the carbon material of claim 1, and
wherein the non-aqueous secondary battery has a higher output-power at −30° C. than an otherwise identical non-aqueous secondary battery using a carbon material having a cumulative pore volume, at a pore diameter of from 0.01 μm to 1 μm, of <0.08 mL/g, determined by mercury intrusion.

6. The carbon material of claim 1, having a total pore volume, as determined by mercury intrusion porosimetry, in a range of from 0.7 mL/g to 10 mL/g.

7. The carbon material of claim 4, having a frequency of particles with a particle diameter of 3 μm or less in a range of from 1% to 30%.

8. The carbon material of claim 1, having a BET specific surface area is in a range of from 4.9 to 30 m²/g.

9. The carbon material of claim 1, having a BET specific surface area is in a range of from greater than 4.1 to 20 m²/g.

10. The carbon material of claim 1, having a BET specific surface area is in a range of from 5.1 to 18 m²/g.

11. The carbon material of claim 1, wherein the Raman R value is 0.8 or less.

12. The carbon material of claim 1, having a cumulative pore volume, at a pore diameter of from 0.01 μm to 1 μm, in a range of from 0.09 to 0.3 mL/g, determined by mercury intrusion.

13. The carbon material of claim 1, having a cumulative pore volume, at a pore diameter of from 0.01 μm to 1 μm, in a range of from 0.10 to 0.25 mL/g, determined by mercury intrusion.

14. A carbon material, comprising:
a graphite capable of occluding and releasing lithium ions,
wherein the carbon material has a total pore volume in a range of from 0.7 to 10 mL/g, determined by mercury intrusion,
wherein the carbon material has a Raman R value of 0.2 or greater,
wherein the carbon material has a cumulative pore volume, at a pore diameter of from 0.01 μm to 1 μm, of 0.08 mL/g or more, determined by mercury intrusion,
wherein the carbon material has a roundness, as determined by a flow-type particle image analysis, of 0.88 or greater,
wherein the carbon material has a ratio of a pore diameter to a particle diameter, PD/d50(%), of 1.8 or less, the ratio following equation (1A):

$PD/d50(\%)$ = mode pore diameter ($PD$) in a pore diameter range of 0.01 μm to 1 μm in a pore distribution determined by mercury intrusion/volume-based average particle diameter ($d50$) × 100 (1A), and wherein the carbon material is suitable for a non-aqueous secondary battery.

15. The carbon material of claim 14, having a cumulative pore volume, at a pore diameter of from 0.01 μm to 1 μm, in a range of from 0.09 to 0.3 mL/g, determined by mercury intrusion.

16. The carbon material of claim 14, having a cumulative pore volume, at a pore diameter of from 0.01 μm to 1 μm, in a range of from 0.10 to 0.25 mL/g, determined by mercury intrusion.

17. The carbon material of claim 14, having a cumulative pore volume, at a pore diameter of from 0.01 μm to 1 μm, in a range of from 0.11 to 0.3 mL/g, determined by mercury intrusion.

18. The carbon material of claim 14, having a tap density in a range of from 0.60 to 1.5 g/cm³.

19. A non-aqueous secondary battery, comprising:
a positive electrode and a negative electrode, each being capable of occluding and releasing lithium ions; and
an electrolyte,
wherein the negative electrode comprises a current collector and a negative electrode active material layer on the current collector, and wherein the negative electrode active material layer comprises the carbon material of claim 14, and
wherein the non-aqueous secondary battery has a higher upper limit charge voltage at −30° C. than an otherwise identical non-aqueous secondary battery using a carbon material having a cumulative pore volume, at a pore diameter of from 0.01 μm to 1 μm, of <0.08 mL/g, determined by mercury intrusion.

* * * * *